US006788315B1

(12) United States Patent
Kekic et al.

(10) Patent No.: US 6,788,315 B1
(45) Date of Patent: *Sep. 7, 2004

(54) PLATFORM INDEPENDENT COMPUTER NETWORK MANAGER

(75) Inventors: Miodrag M. Kekic, Mountain View, CA (US); Grace N. Lu, Milpitas, CA (US); Eloise H. Carlton, San Carlos, CA (US)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1144 days.

(21) Appl. No.: 08/972,219

(22) Filed: Nov. 17, 1997

(51) Int. Cl.[7] .............................. G06F 3/00; G06F 3/14

(52) U.S. Cl. ....................... 345/733; 345/736; 345/744; 345/764; 345/835; 709/203; 709/223

(58) Field of Search ................................ 345/329, 335, 345/339, 348, 349, 356, 357, 966, 969, 970, 326; 395/200.32, 200.33, 200.47, 200.49, 200.53, 200.54; 709/202, 203, 217, 219, 223, 224

(56) References Cited

U.S. PATENT DOCUMENTS

| | | | | | |
|---|---|---|---|---|---|
| 5,295,244 | A | * | 3/1994 | Dev et al. | 345/357 |
| 5,471,399 | A | * | 11/1995 | Tanaka et al. | 364/491 |
| 5,483,631 | A | * | 1/1996 | Nagai et al. | 345/329 |
| 5,491,796 | A | * | 2/1996 | Wanderer et al. | 395/200.54 |
| 5,655,081 | A | * | 8/1997 | Bonnell et al. | 395/200.32 |
| 5,748,896 | A | * | 5/1998 | Daly et al. | 395/200.53 |
| 5,751,965 | A | * | 5/1998 | Mayo et al. | 395/200.54 |
| 5,761,432 | A | * | 6/1998 | Bergholm et al. | 395/200.56 |
| 5,768,510 | A | * | 6/1998 | Gish | 395/200.33 |
| 5,848,243 | A | * | 12/1998 | Kulkarni et al. | 395/200.54 |

* cited by examiner

*Primary Examiner*—X. L. Bautista
(74) *Attorney, Agent, or Firm*—Sheppard Mullin Richter & Hampton LLP

(57) ABSTRACT

A client-server network management system includes: a plurality of managed computer network elements, a managed element server that executes on a first computer; and at least one managed element server client that typically executes on a second computer. The managed element server and managed element server client are computer processes that execute from memory of their respective computers. The client-server network management system is really two applications in one: a visual element manager builder and a manager. The manager provides the run-time environment in which element managers are executed to monitor and manage computer network behavior such as network throughput, collision rate, and number of duplicate IP packets, to name a few. The manager portion of managed element server is independent of any graphic user interface. The logic and structure of the manager of managed element server is cleanly separated from the graphic user interfaces. The visual element manager builder is a visual development environment in which device vendors or network managers may create standardized element management applications, called element managers. A user can build an element manager without writing any computer code. In addition, a user can edit an element manager without writing any computer code. A graphic user interface of this invention, that is displayed by the client, includes a visual image of a computer network element being managed. As a user looks at the visual display in the graphic user interface, the user is provided the same visual information as if the user where physically present at the location of the managed computer network element. Thus, at a glance, a user can obtain considerable information about the status of the computer network element as represented by the visual display.

16 Claims, 51 Drawing Sheets

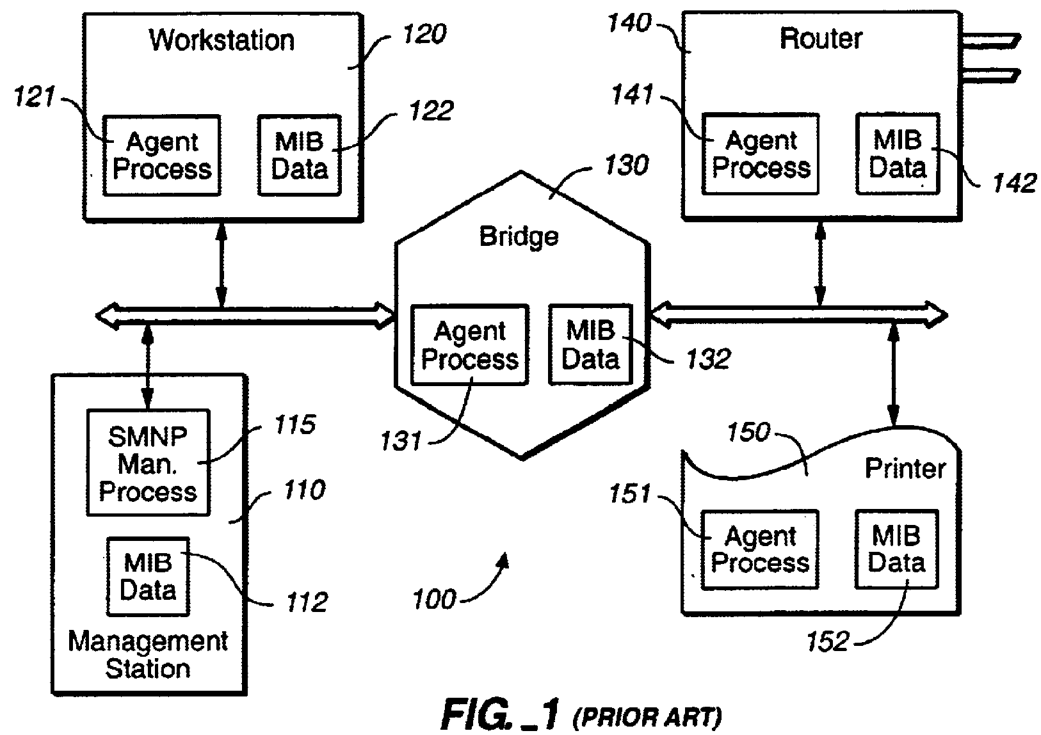
FIG._1 (PRIOR ART)
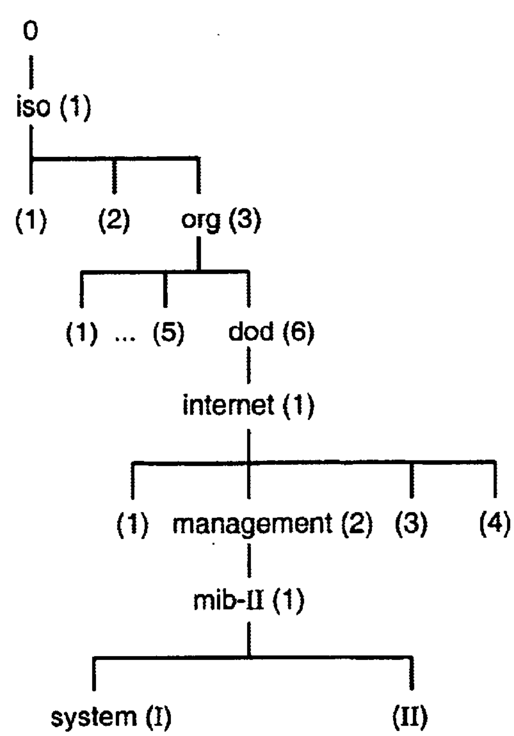
FIG._2 (PRIOR ART)

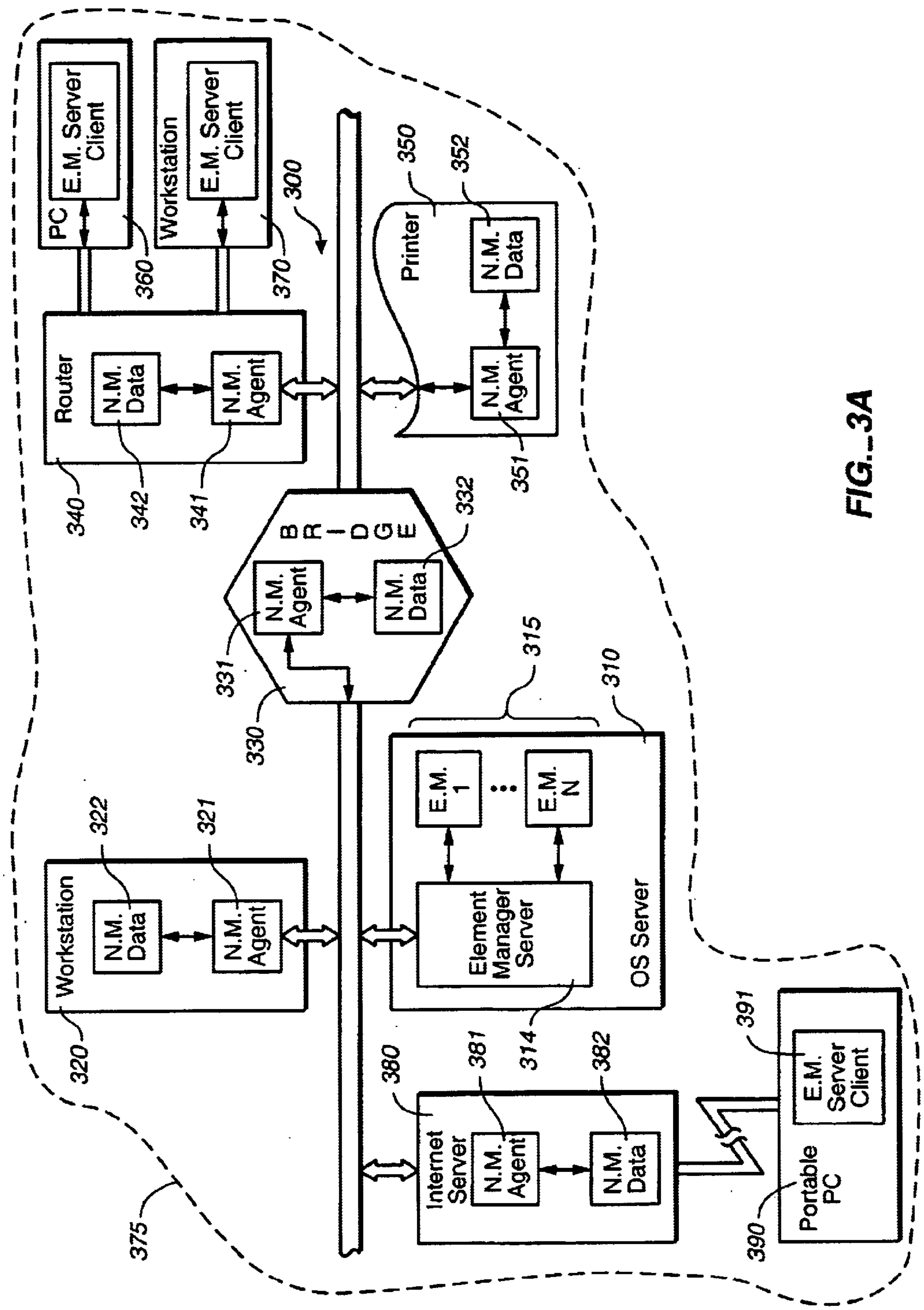
FIG._3A

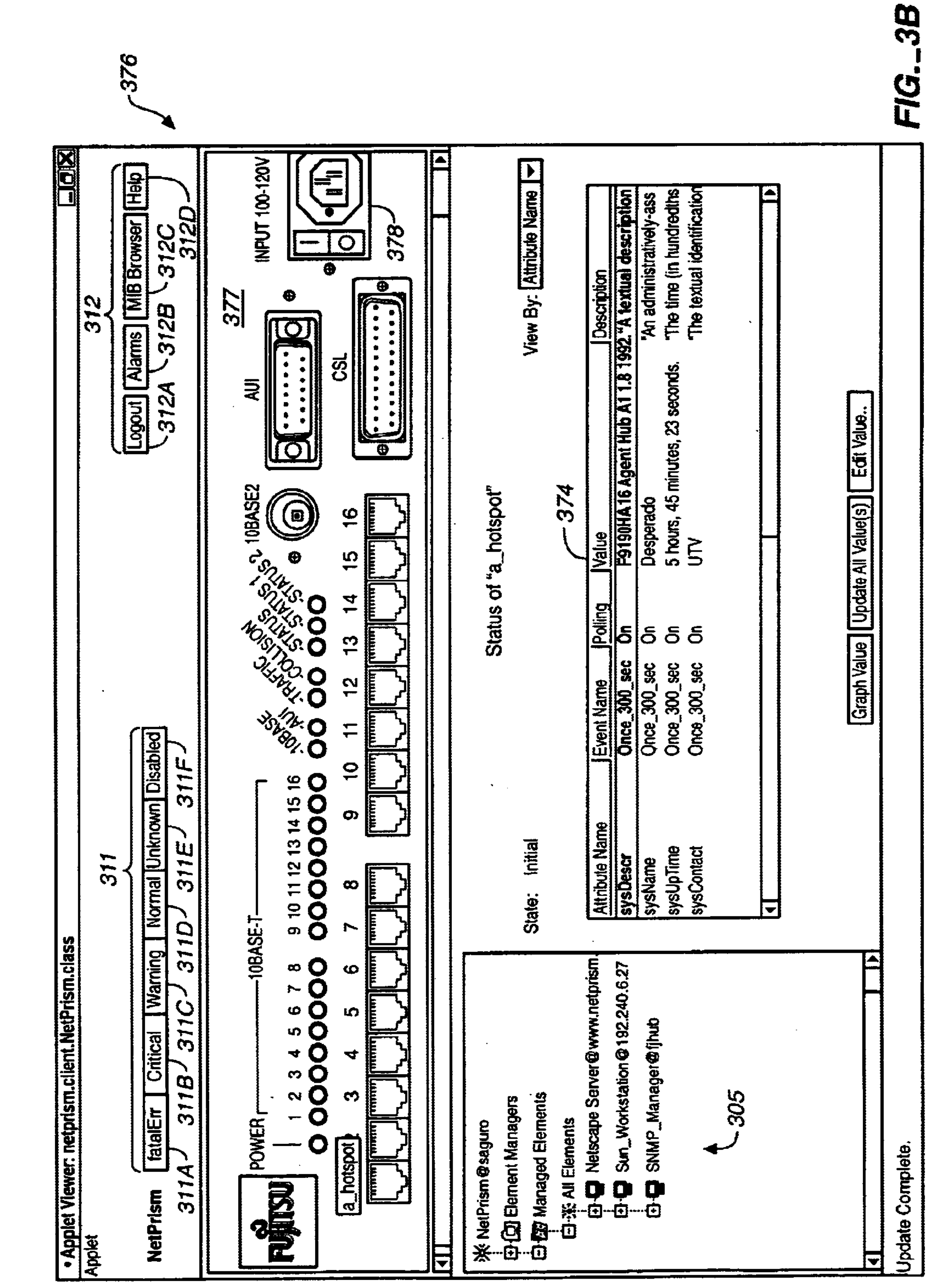
FIG._3B

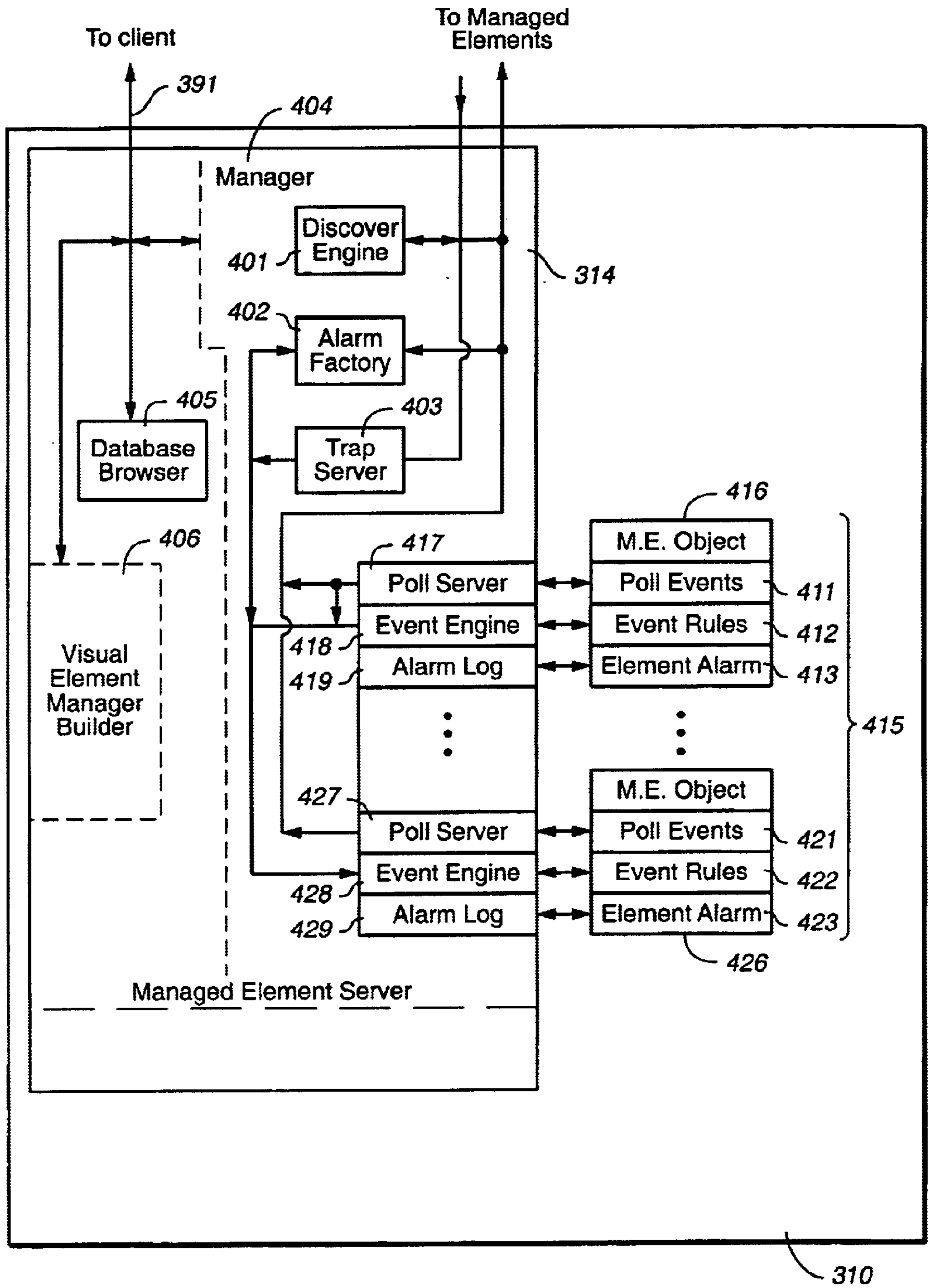
FIG._4

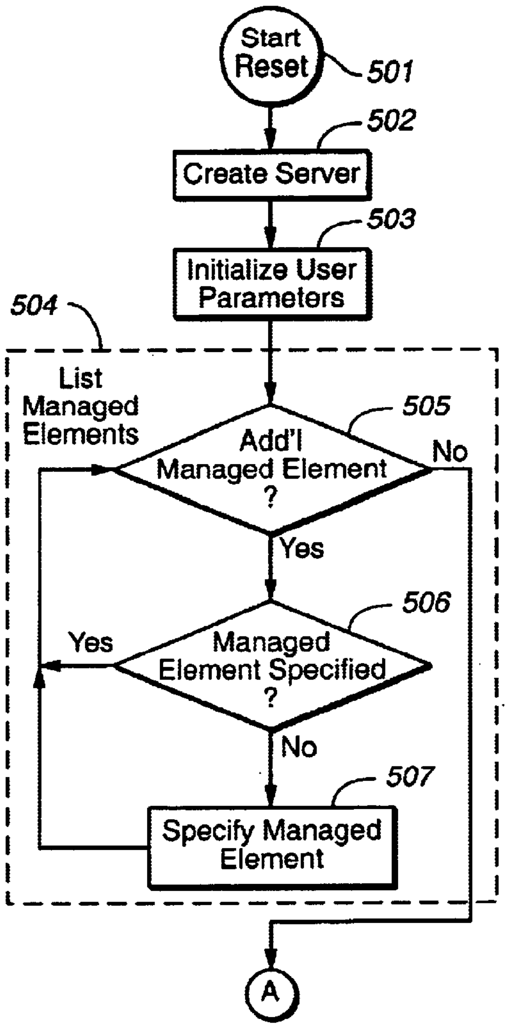
FIG._5A
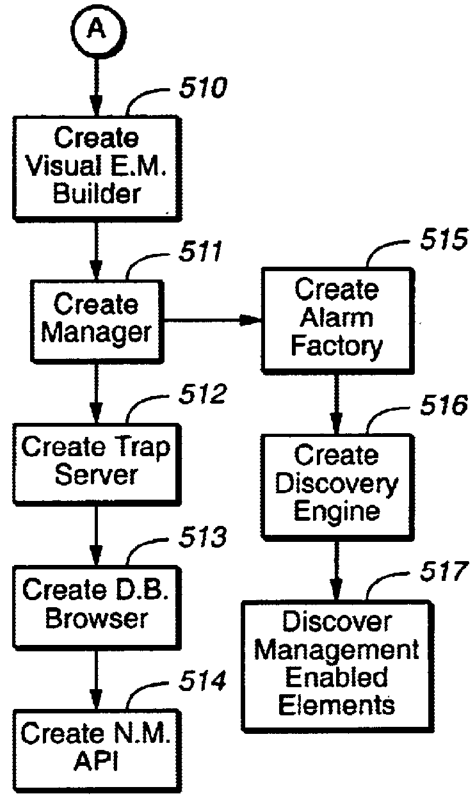
FIG._5B
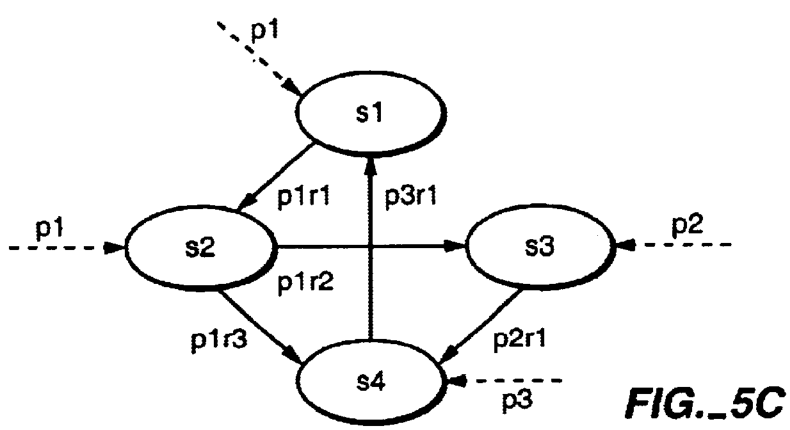
FIG._5C

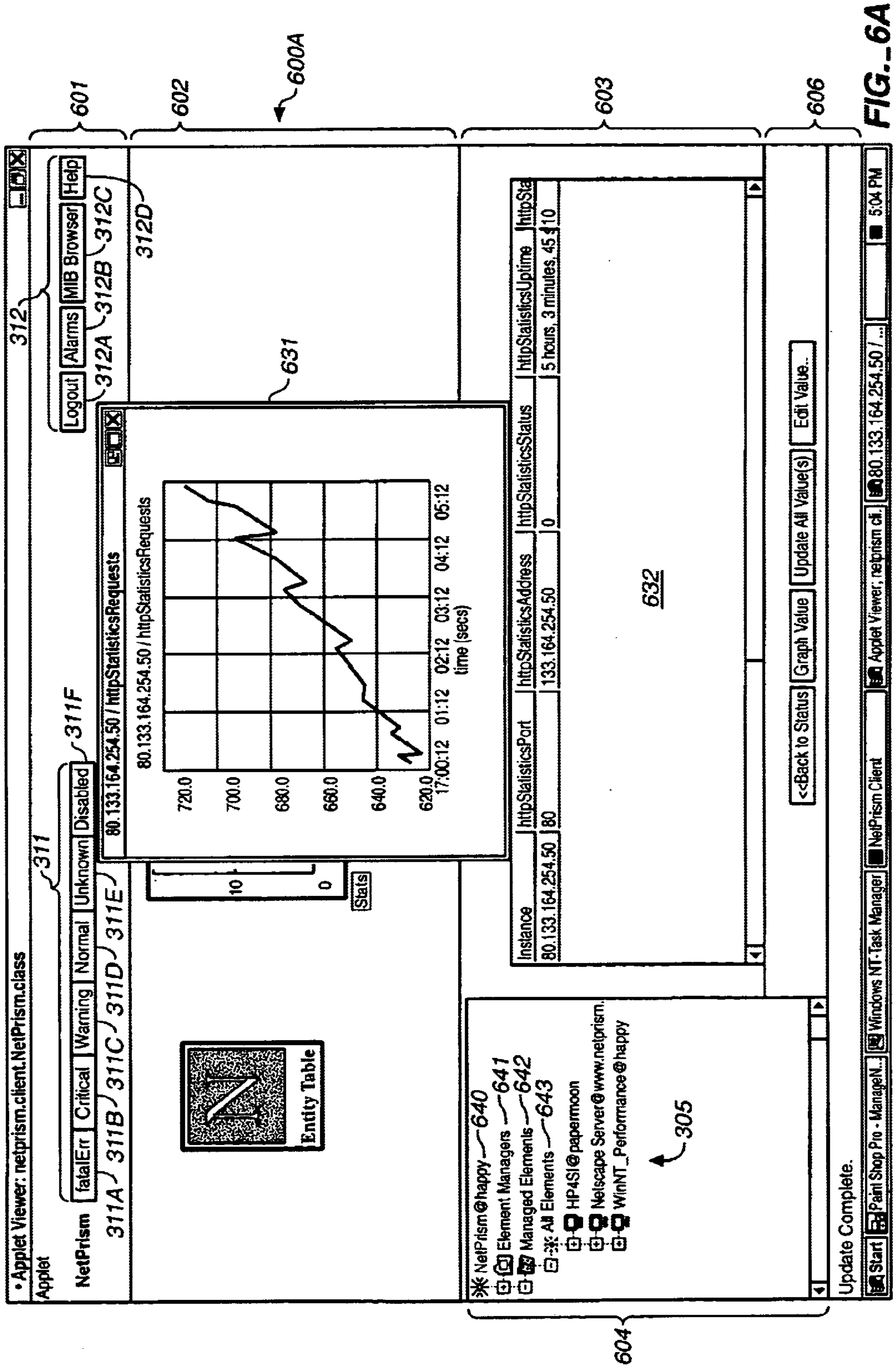
FIG._6A

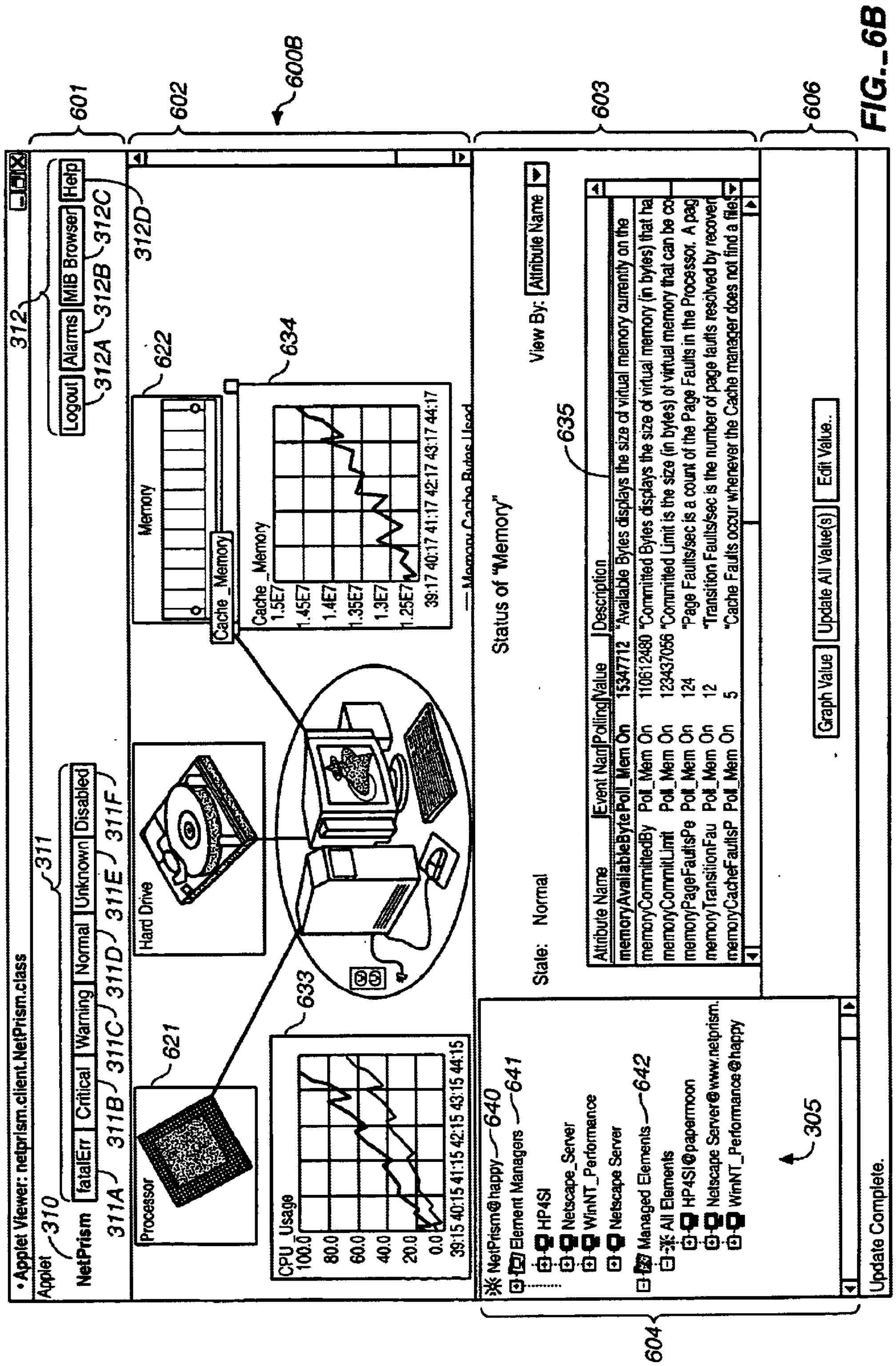
FIG._6B

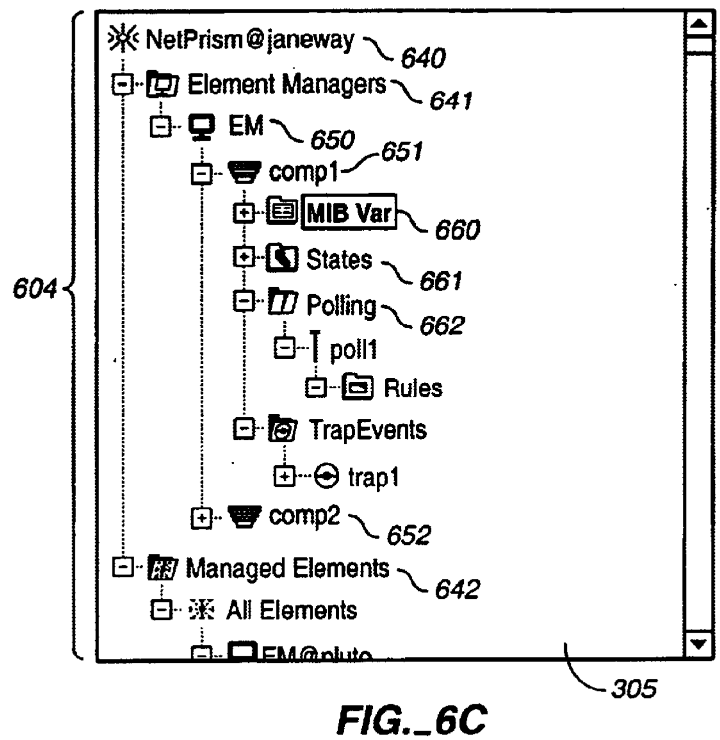
FIG._6C
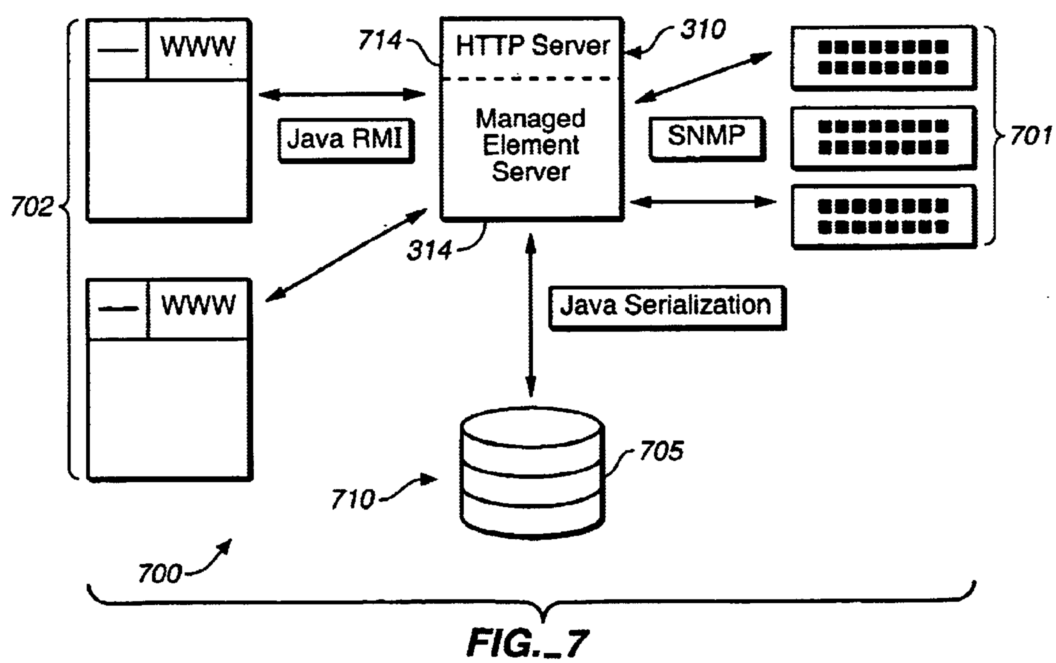
FIG._7

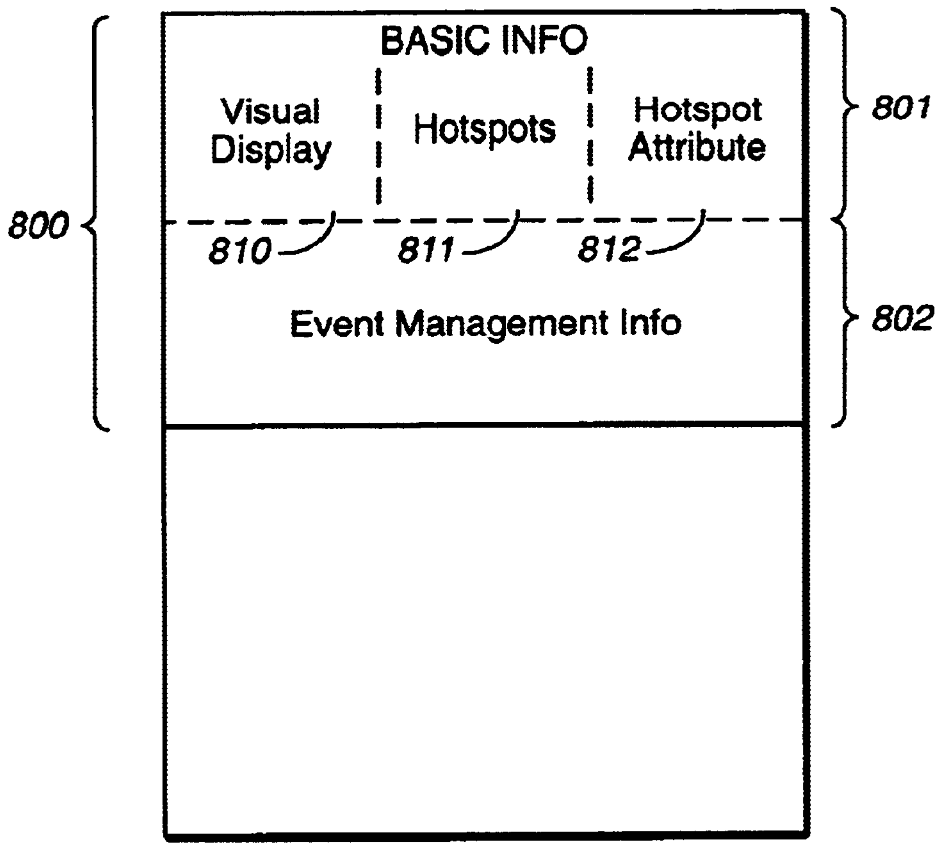
FIG._8

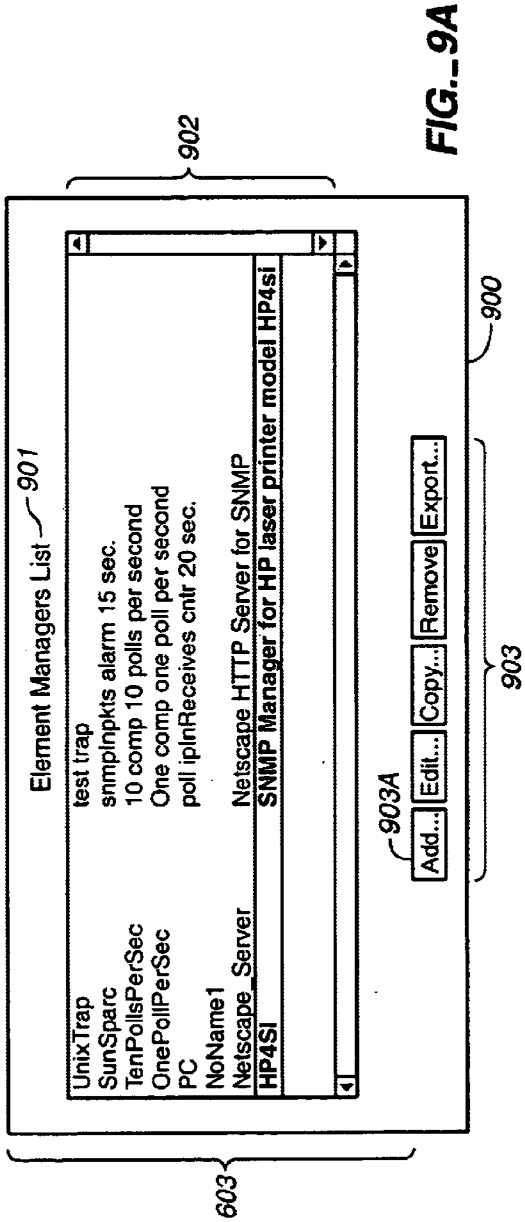
FIG._9A
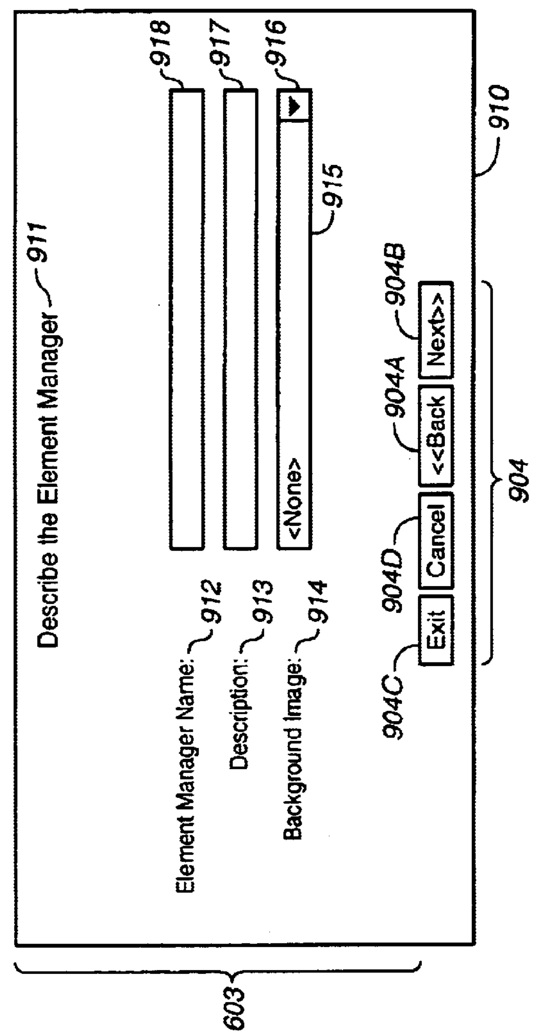
FIG._9B

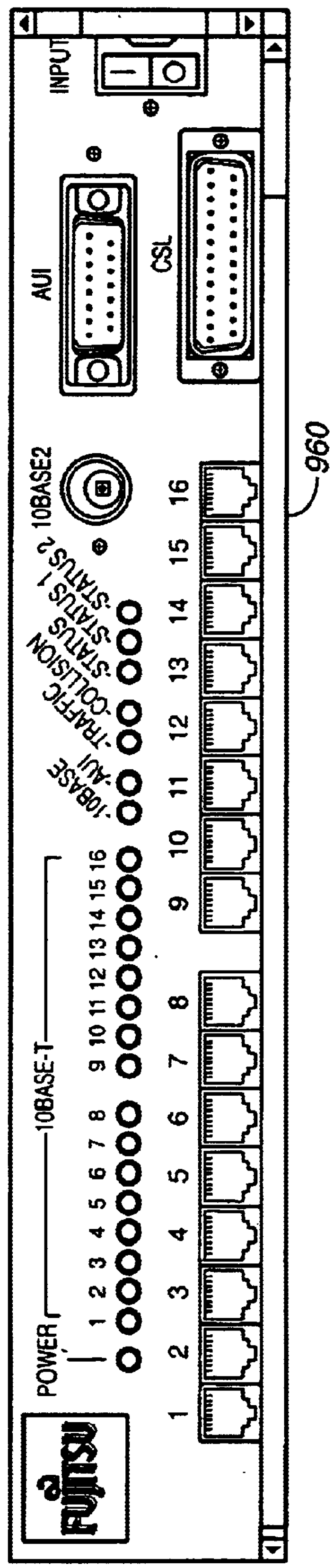
FIG._9C

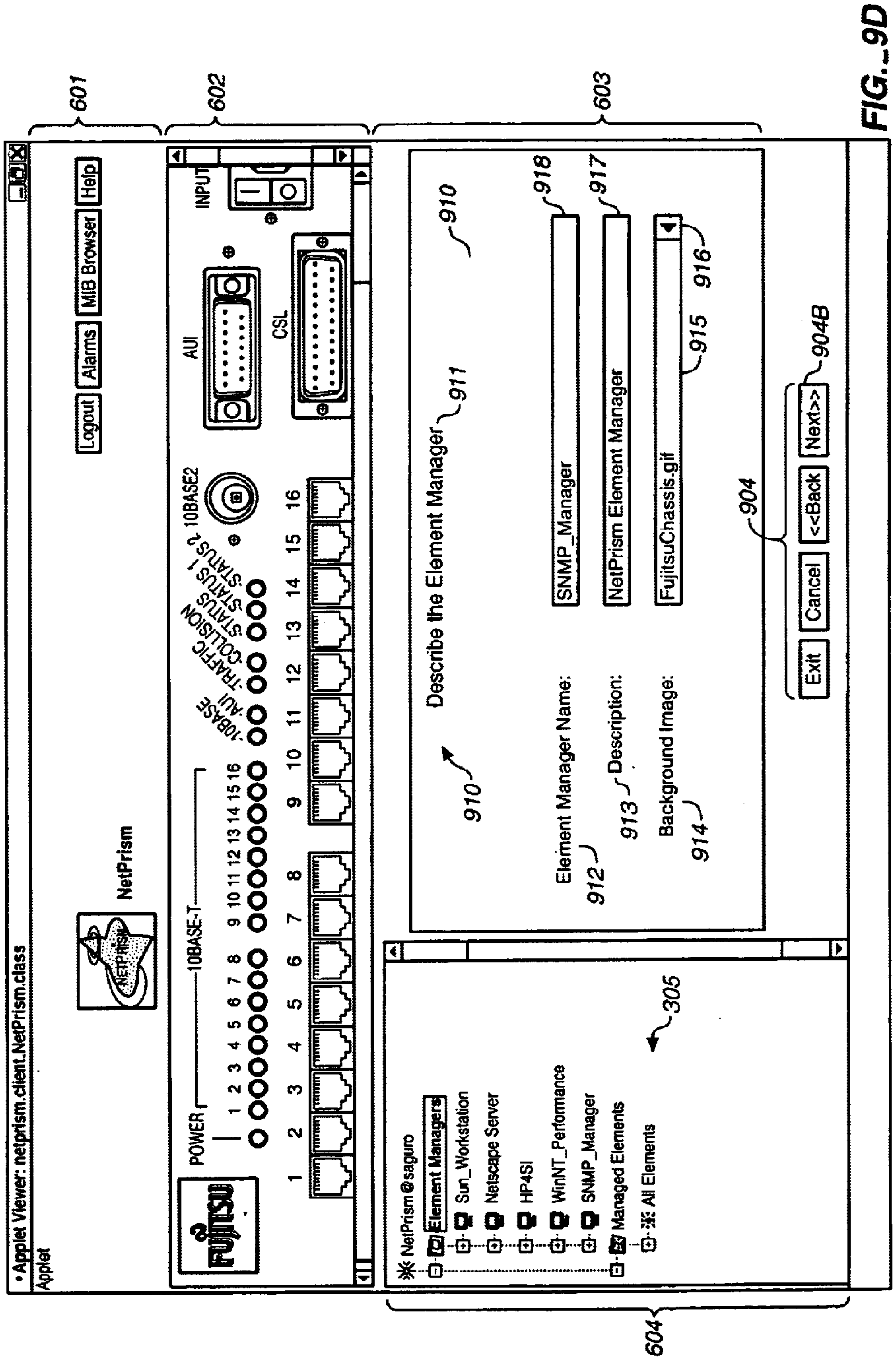
FIG._9D

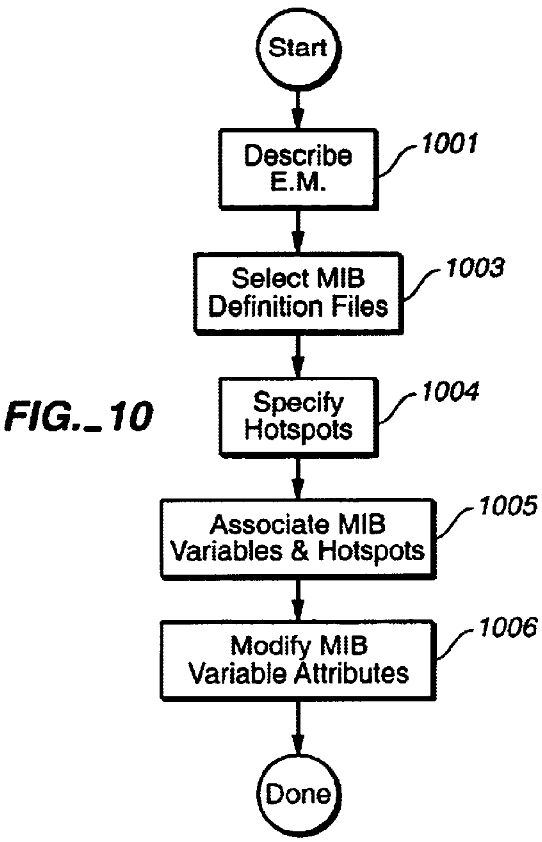
FIG._10
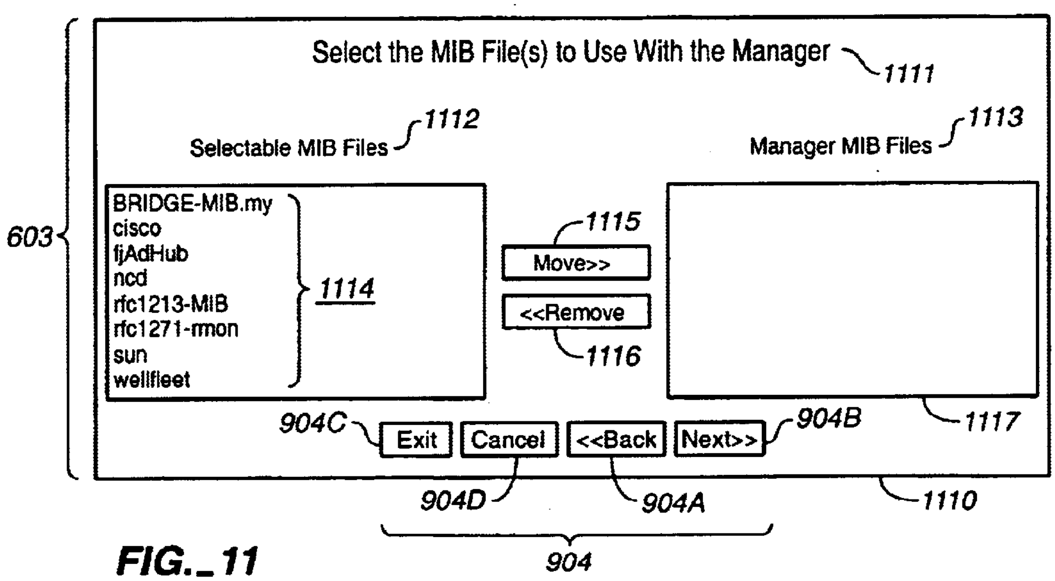
FIG._11

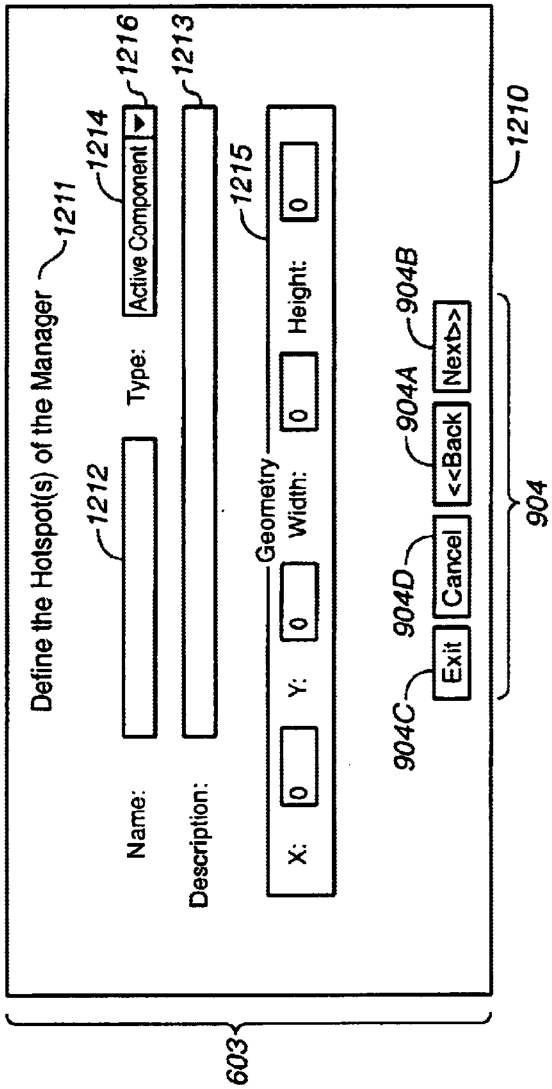
FIG._12A
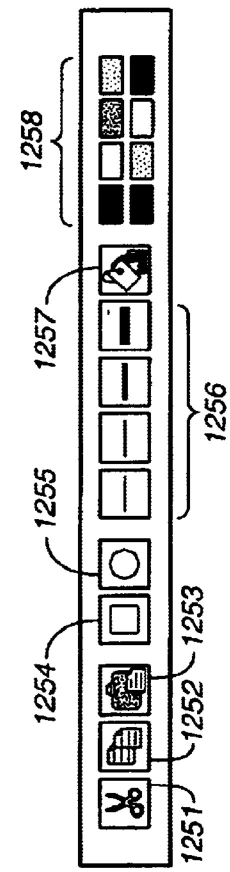
FIG._12B

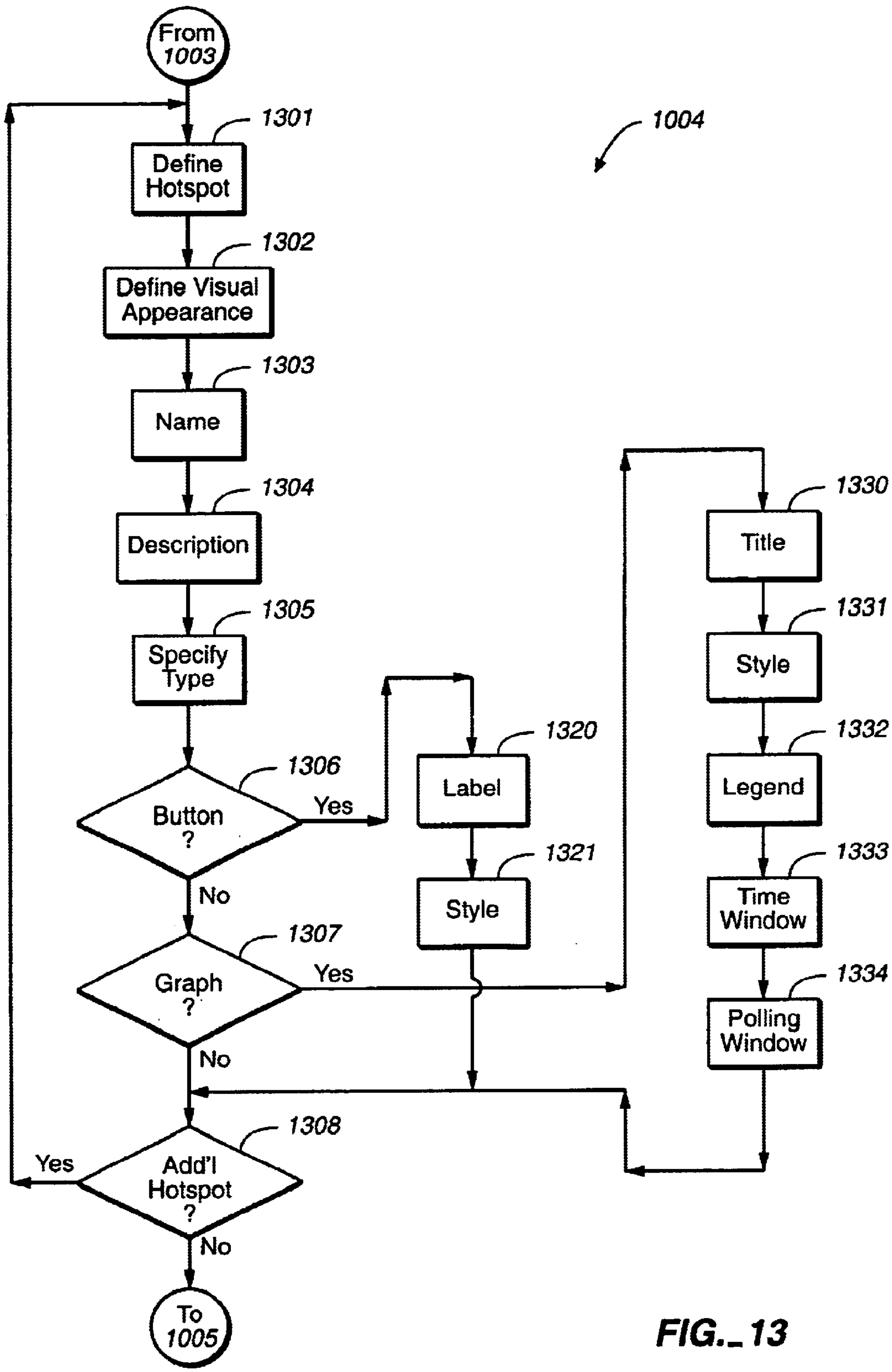
FIG._13

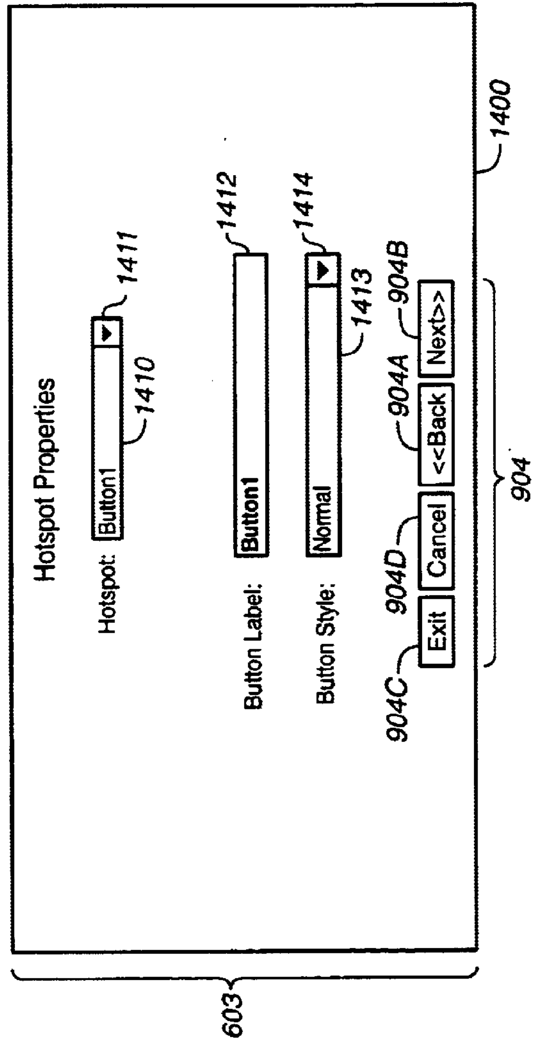
FIG._14A
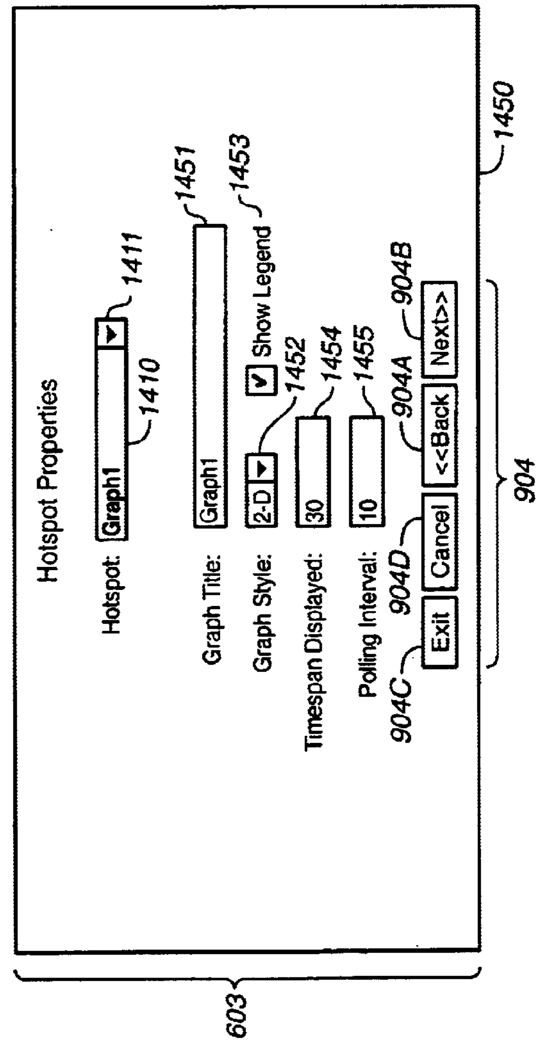
FIG._14B

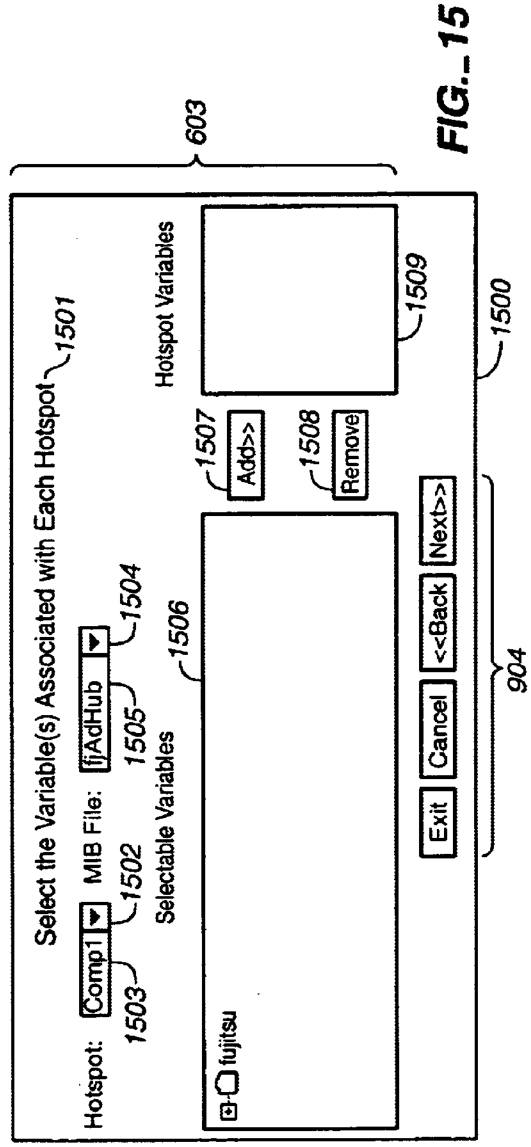
FIG._15
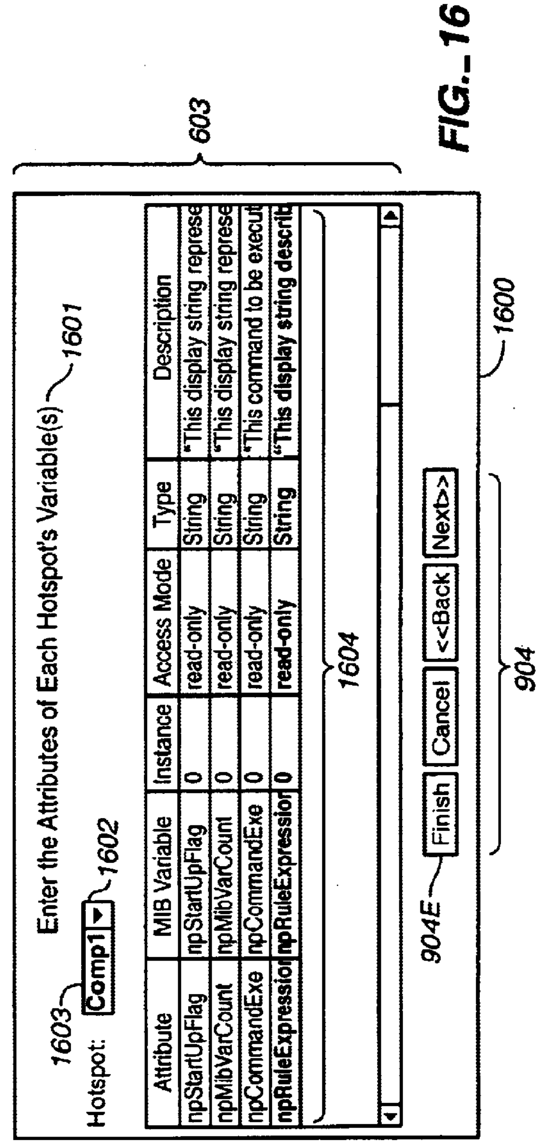
FIG._16

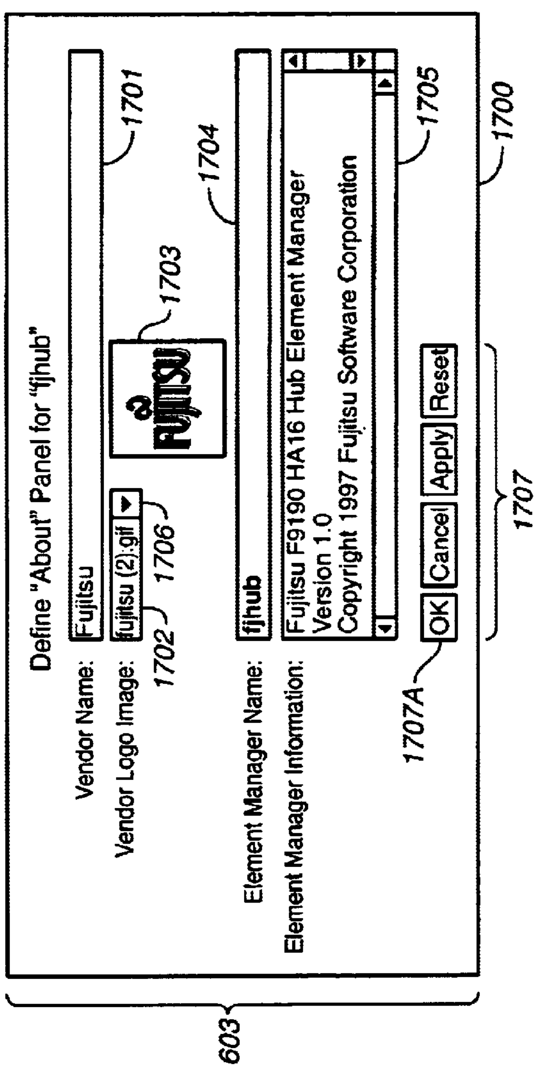
FIG._17
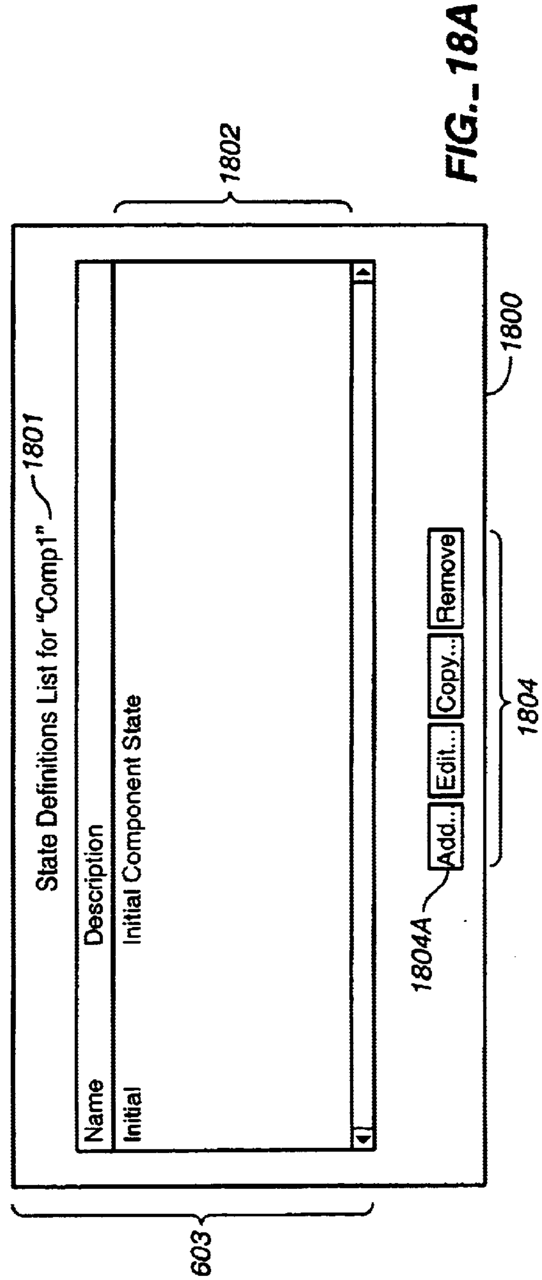
FIG._18A

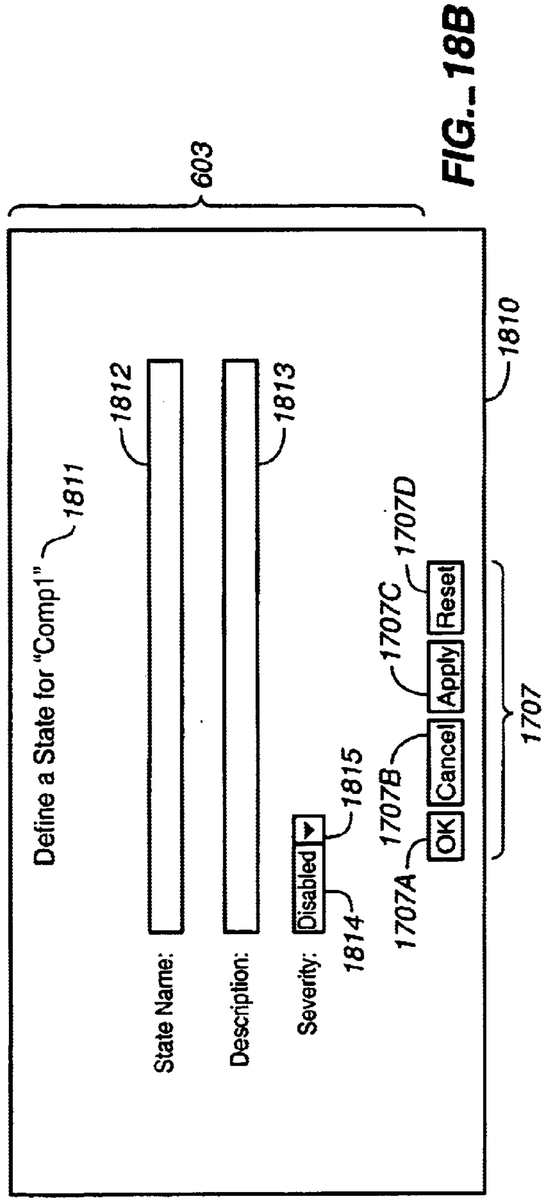
FIG._18B
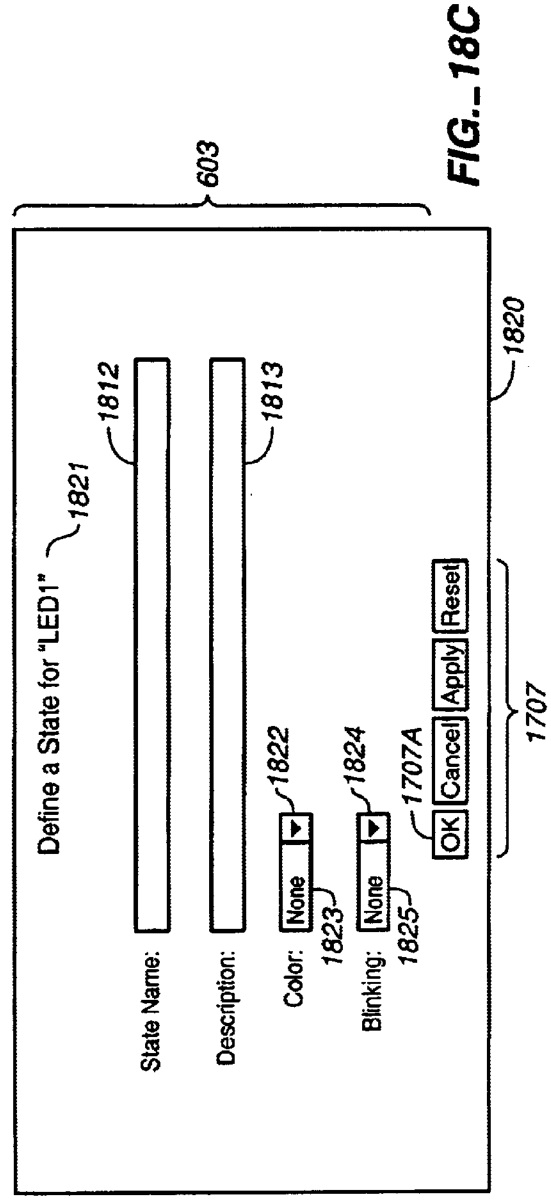
FIG._18C

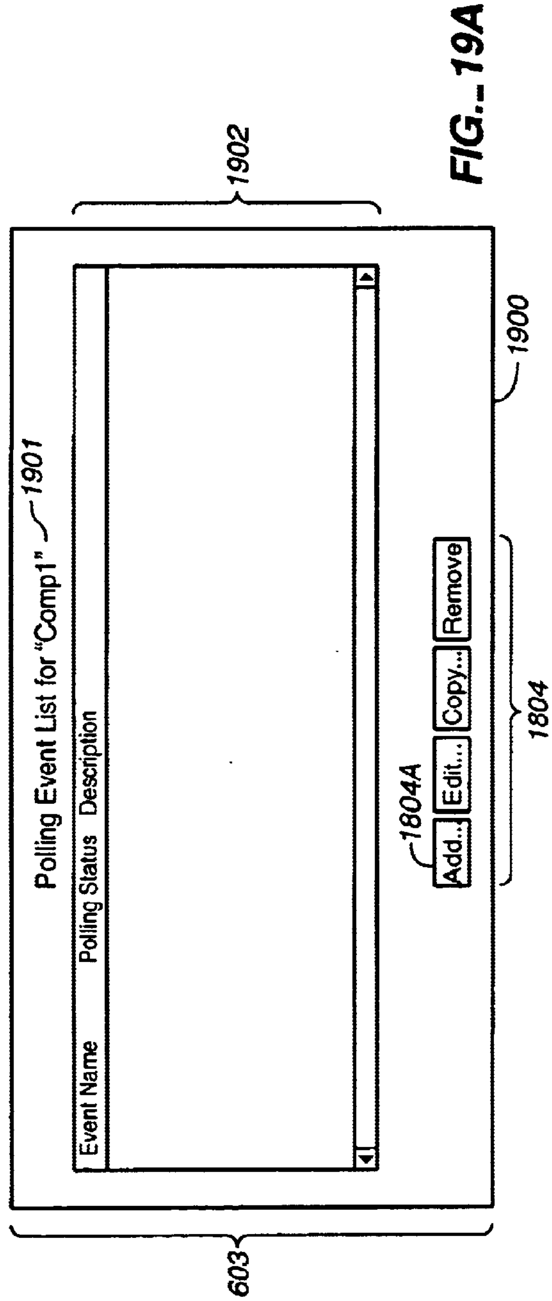
FIG._19A
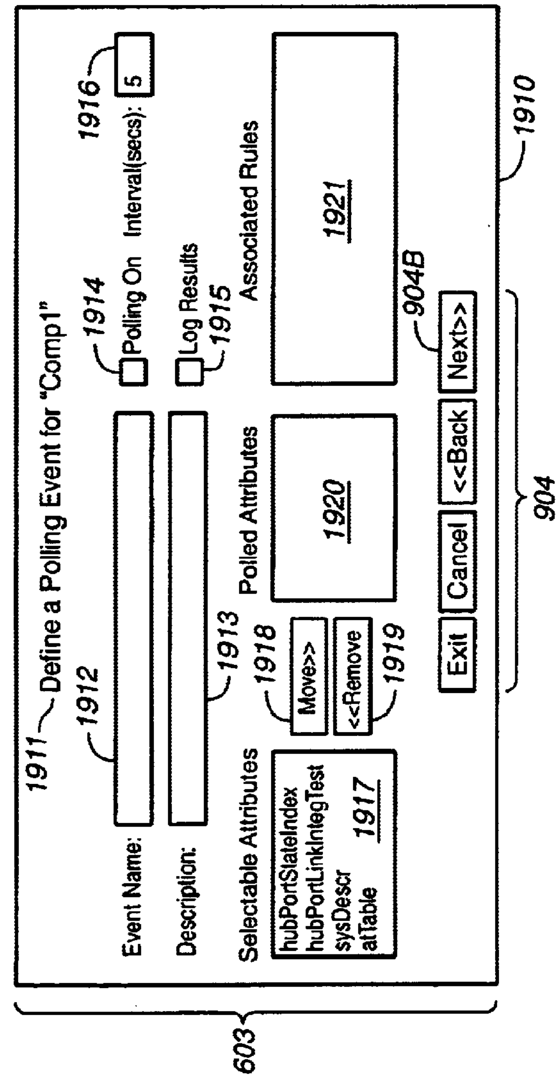
FIG._19B

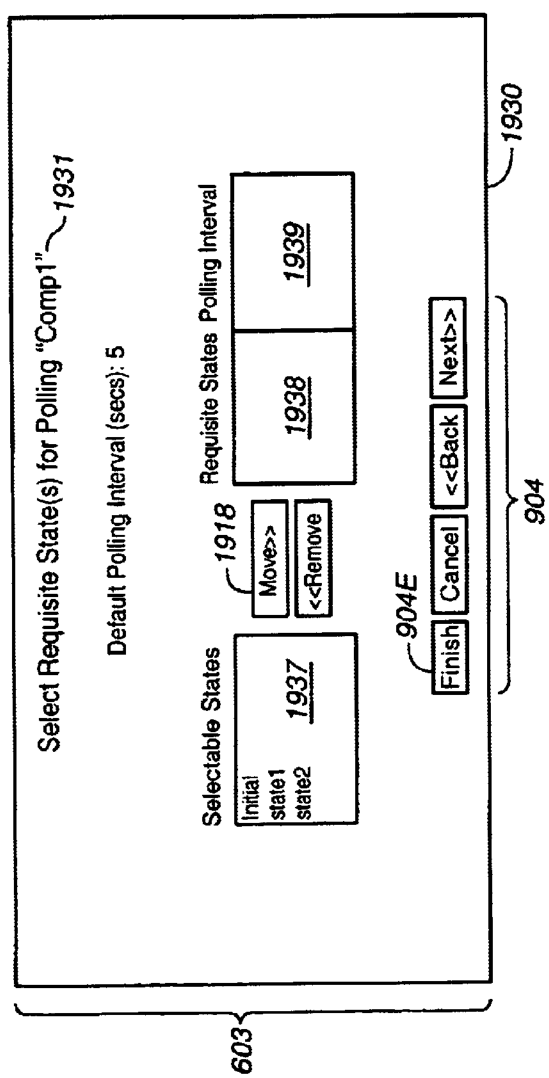
FIG._19C
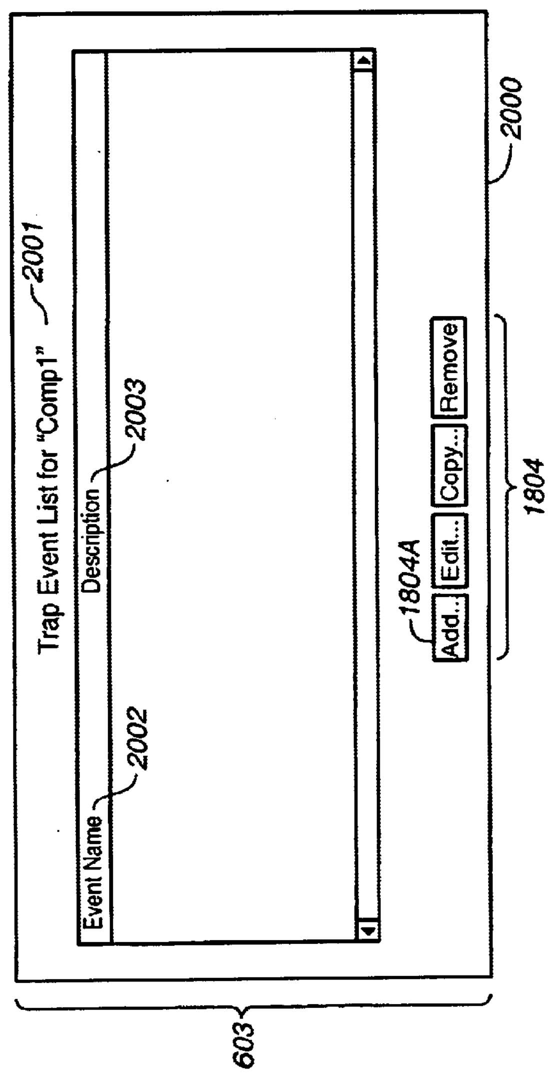
FIG._20

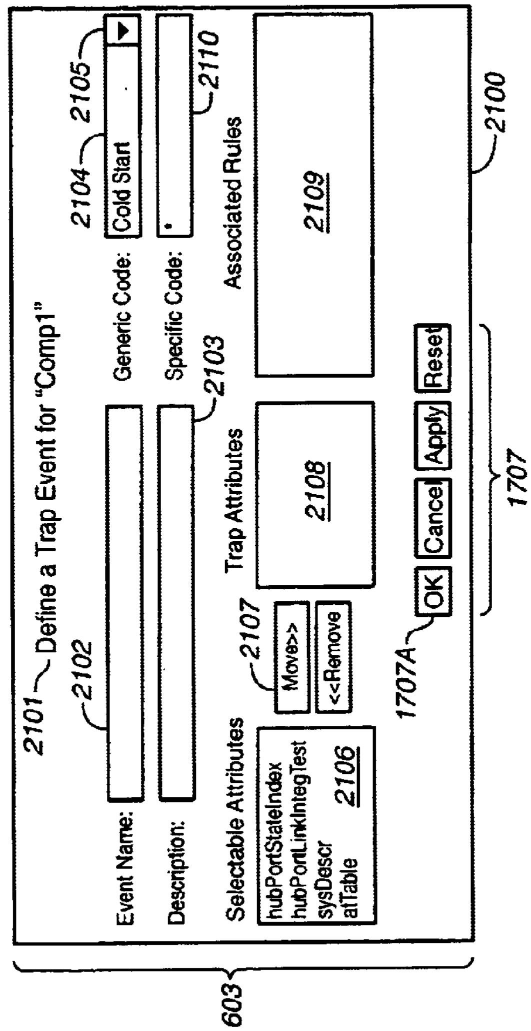
FIG._21
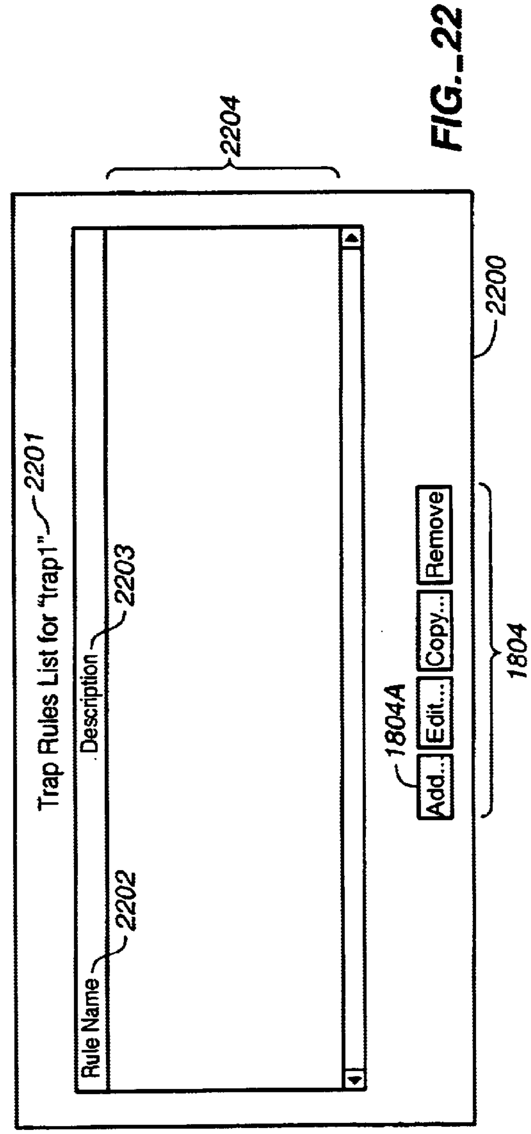
FIG._22

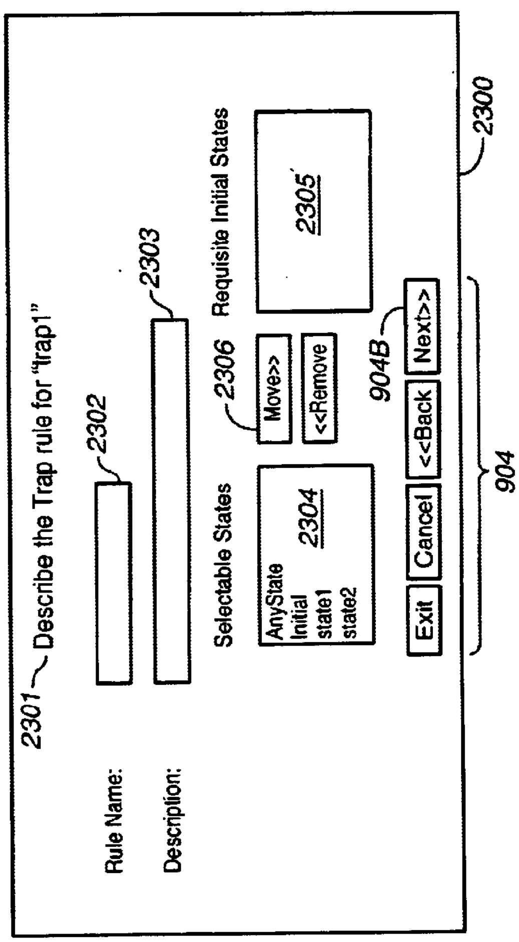
FIG._23
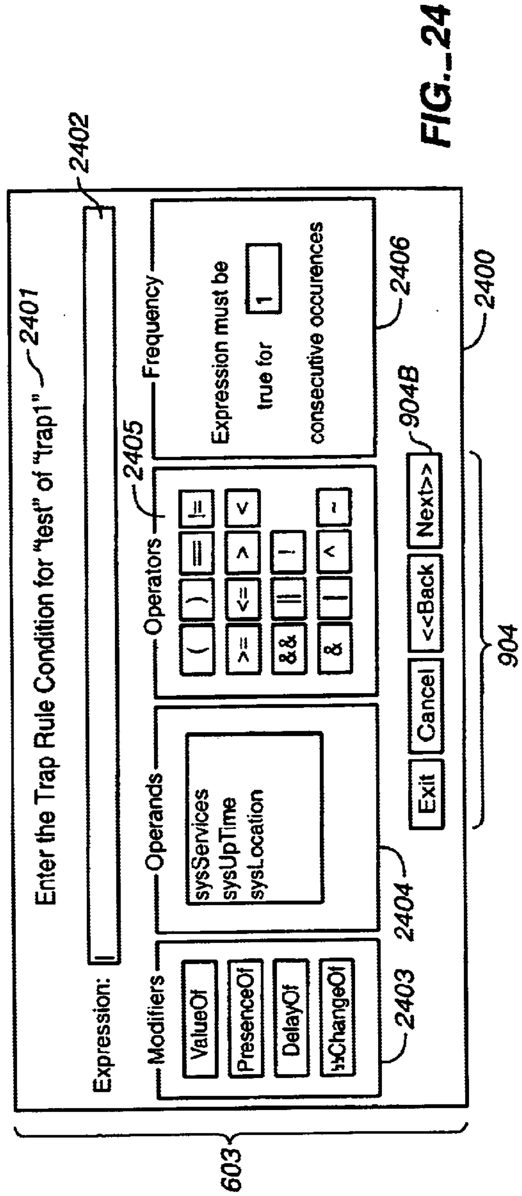
FIG._24

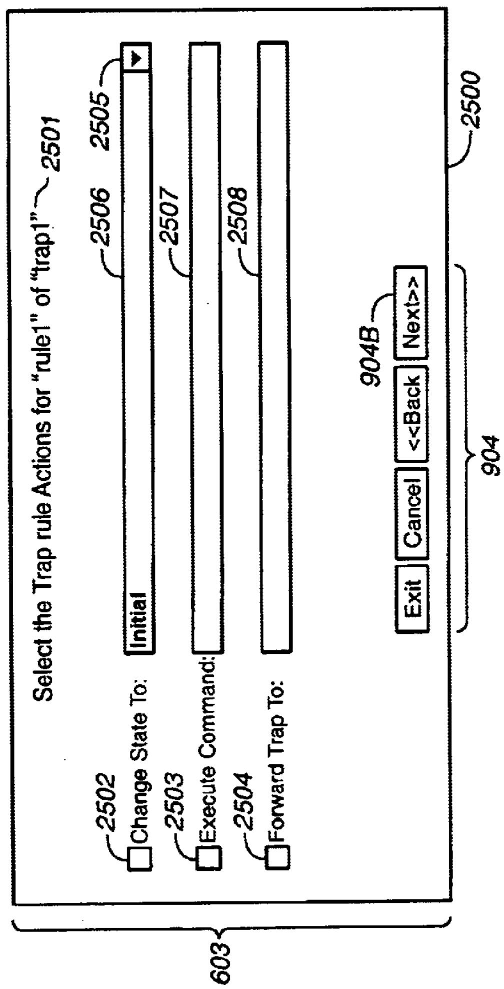
FIG._25
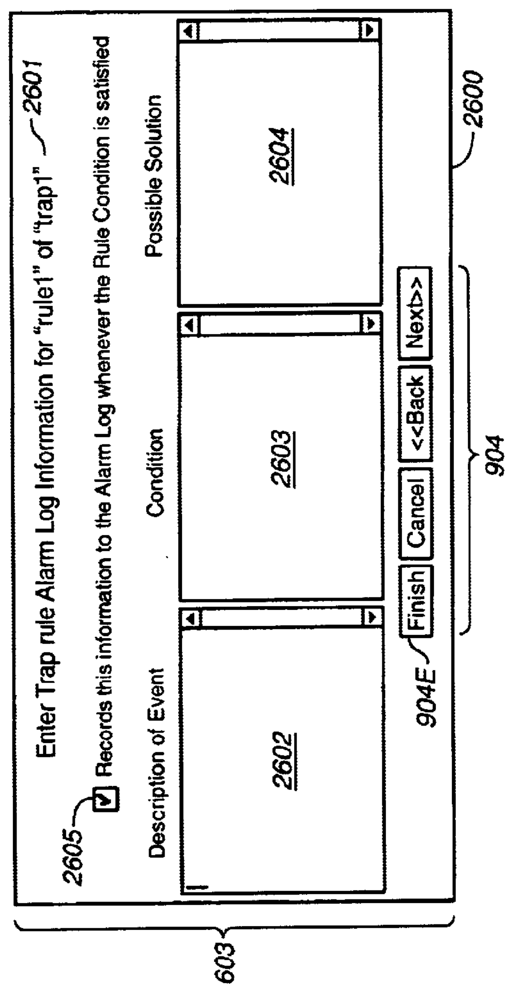
FIG._26

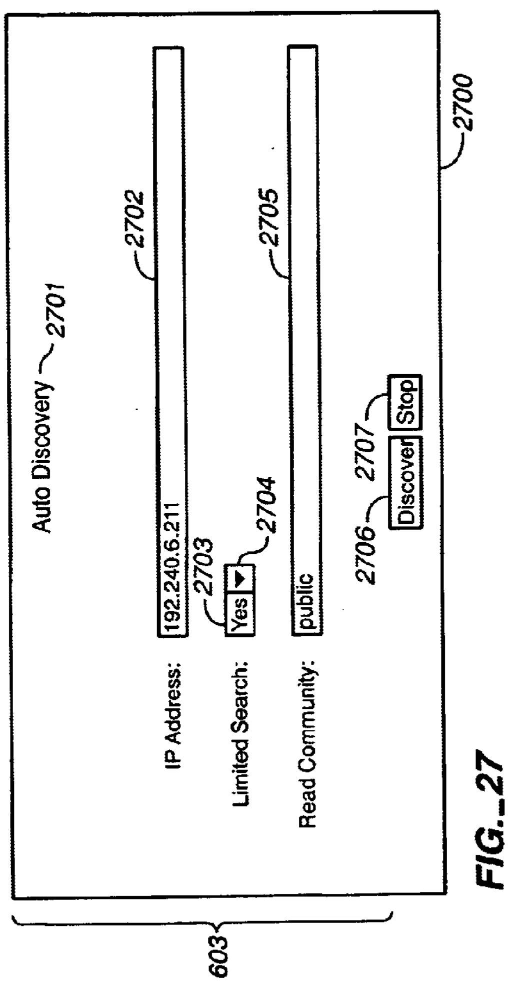
FIG._27
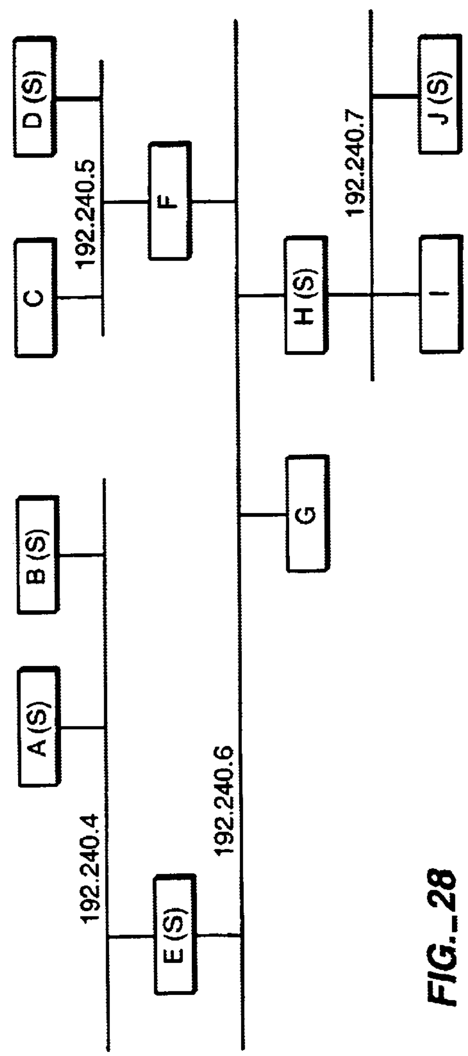
FIG._28

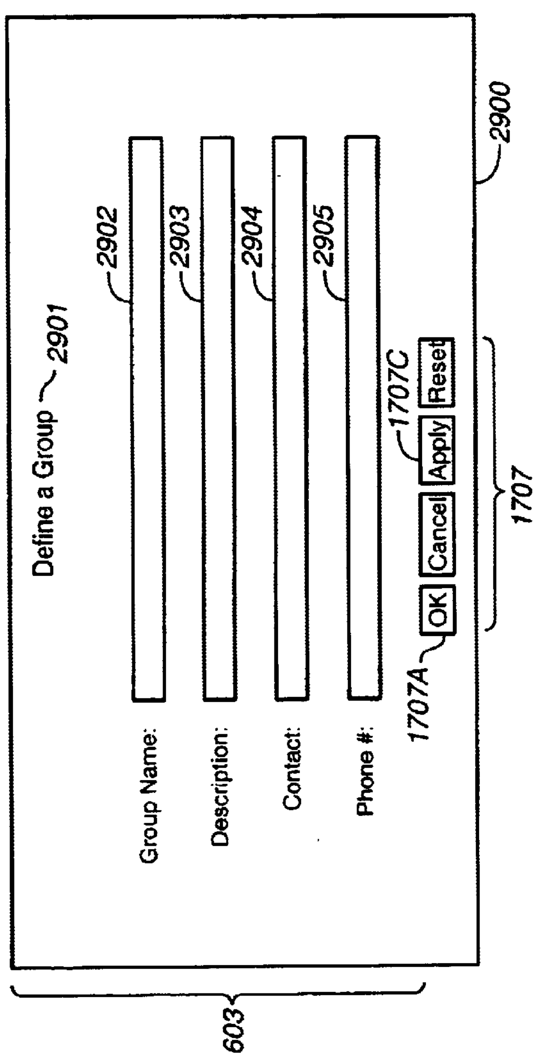
FIG._29
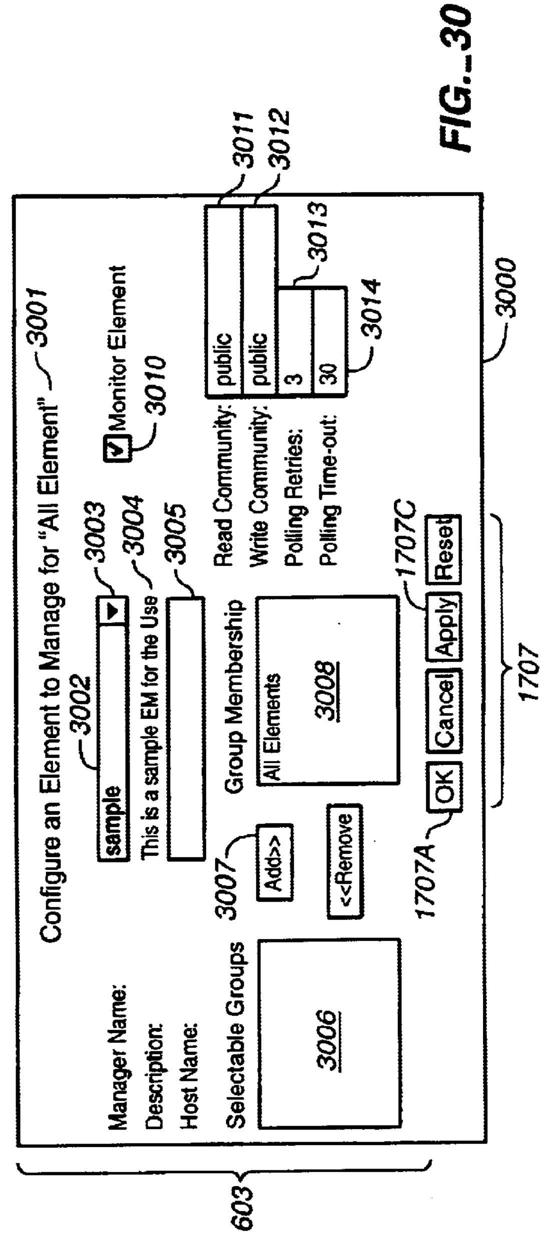
FIG._30

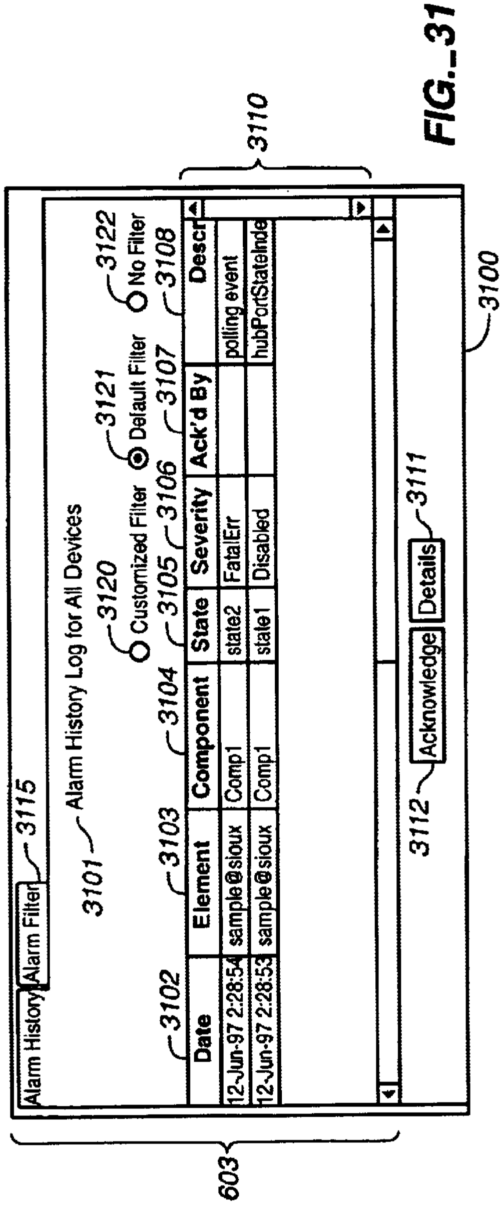
FIG._31
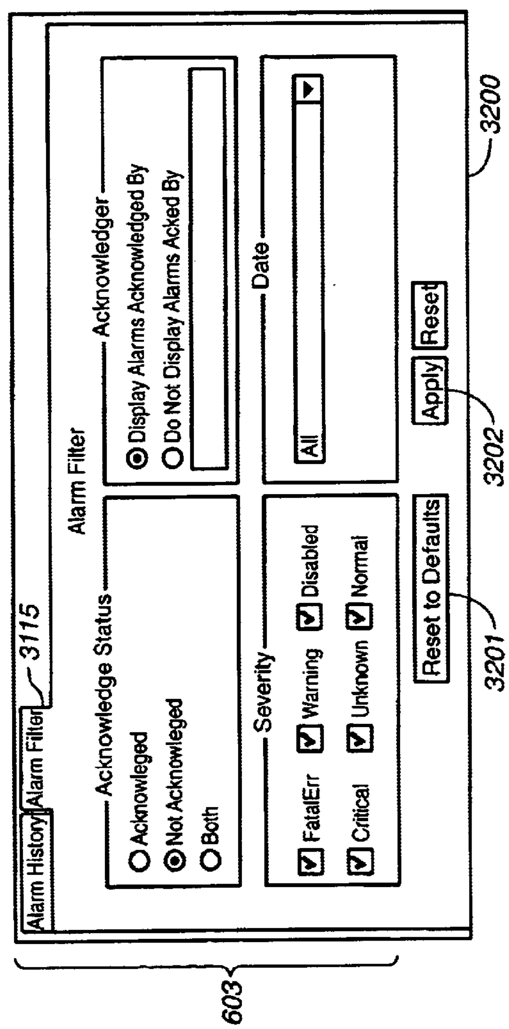
FIG._32

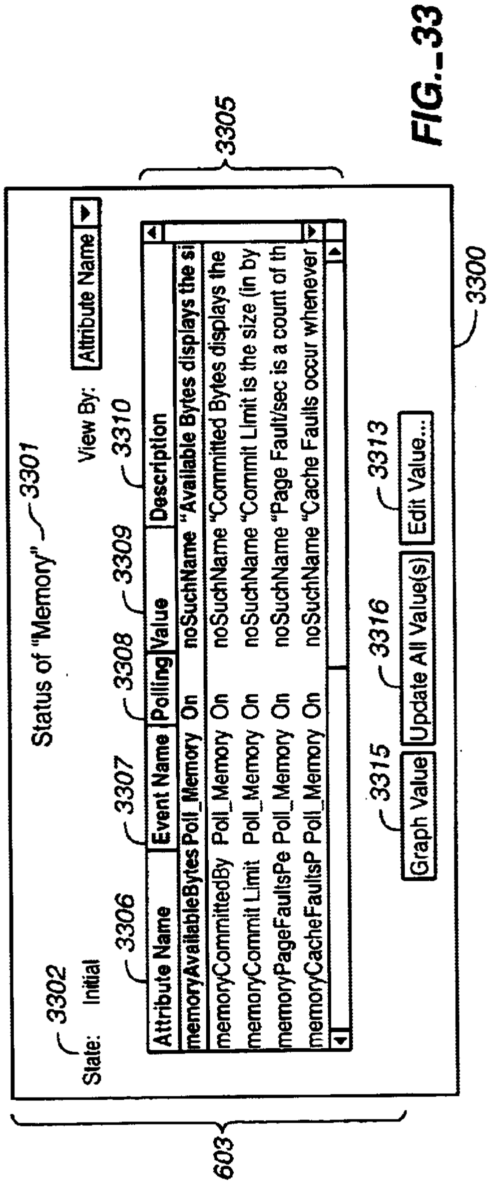
FIG._33
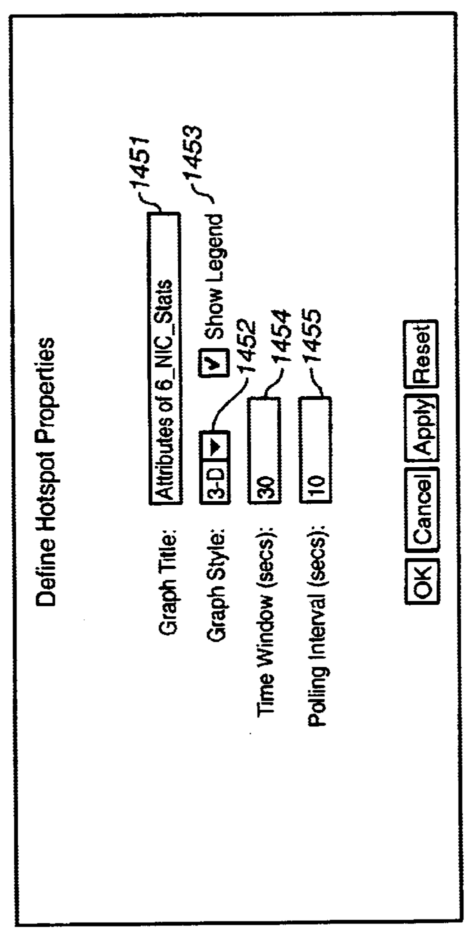
FIG._34

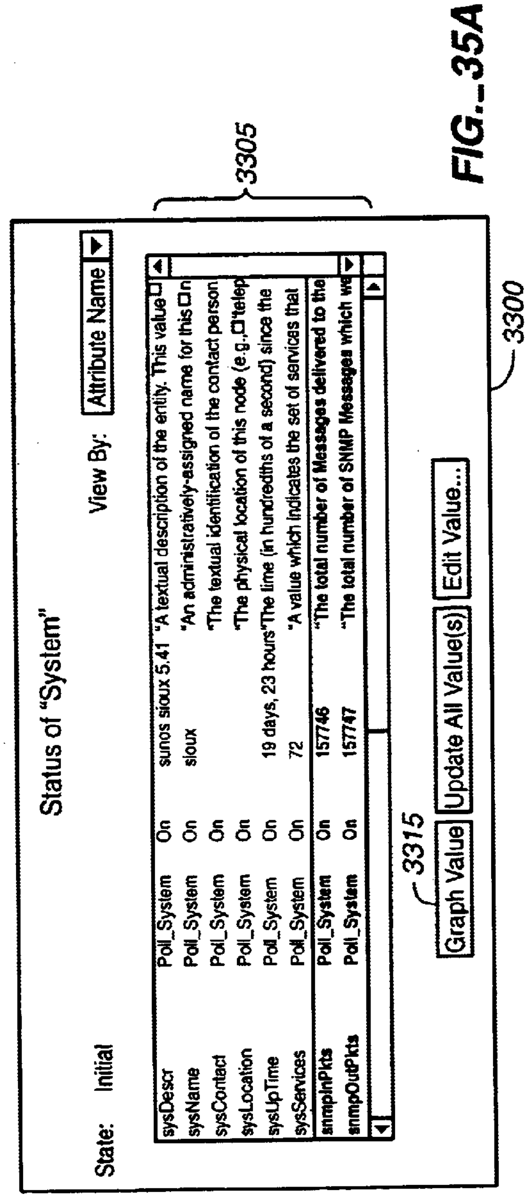
FIG._35A
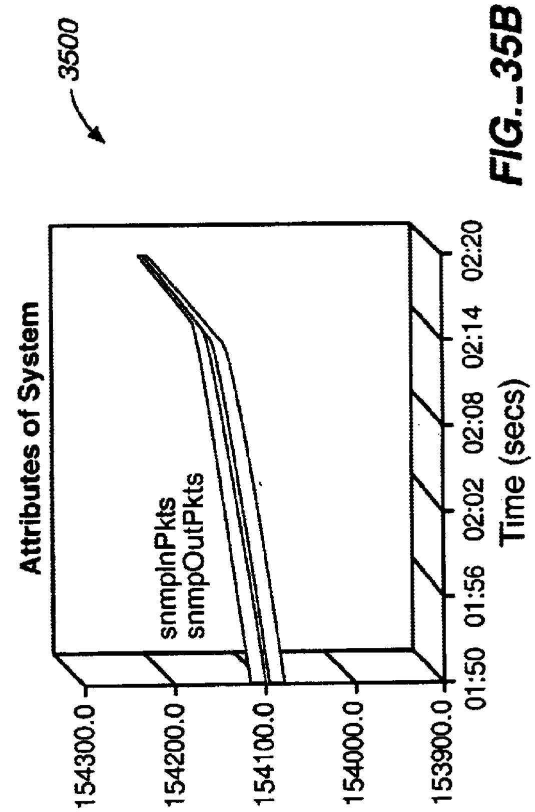
FIG._35B

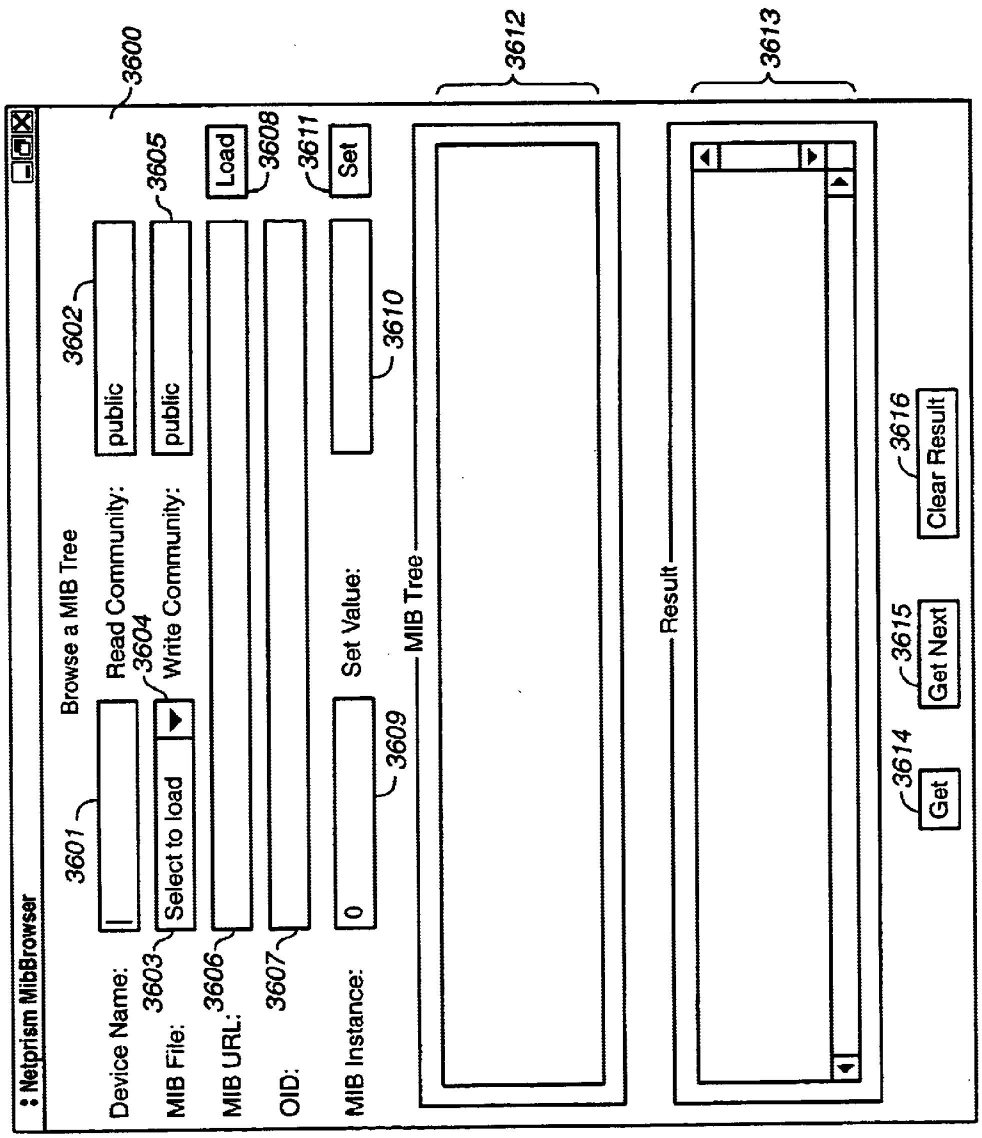
FIG._36

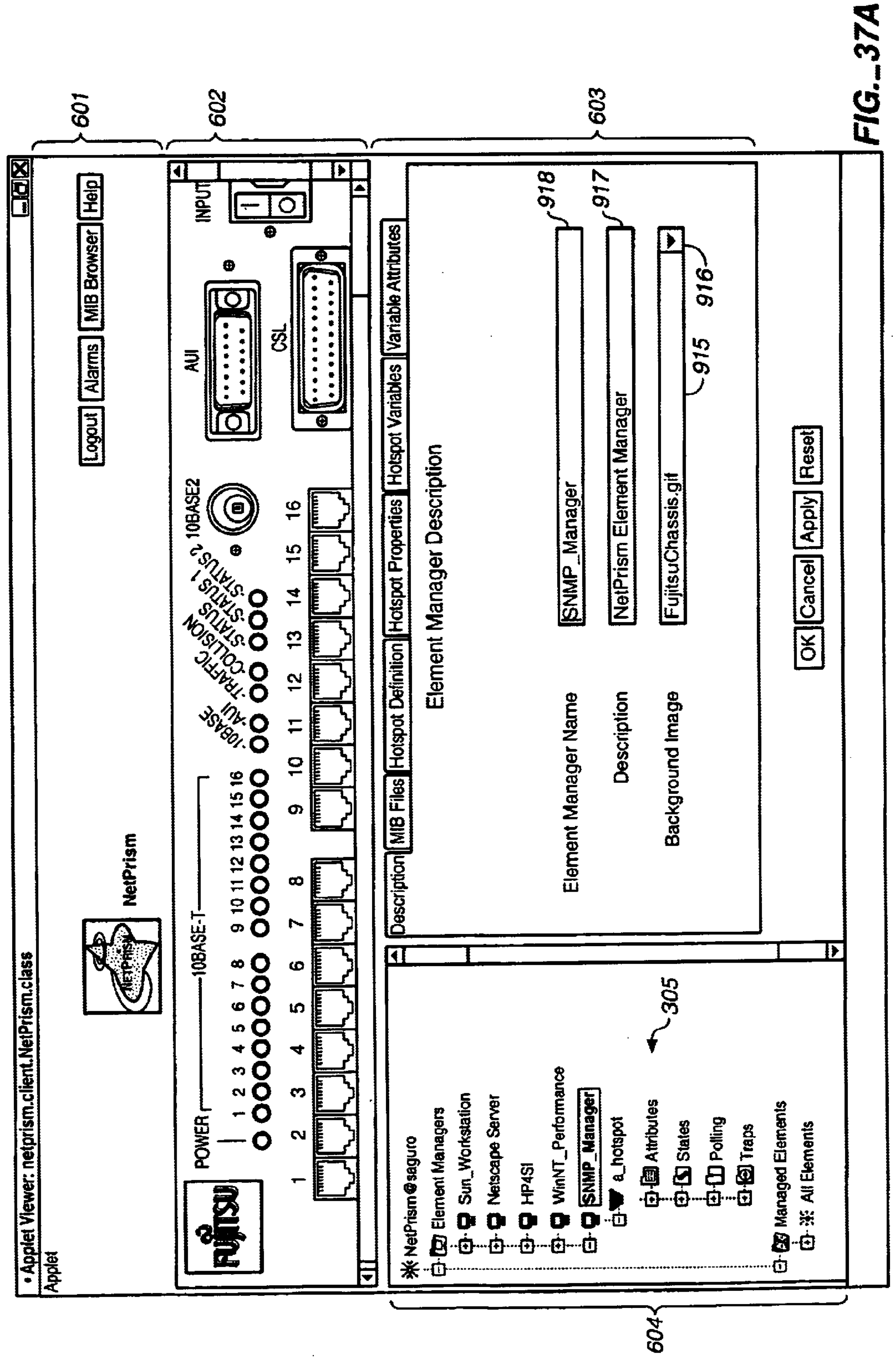
FIG._37A

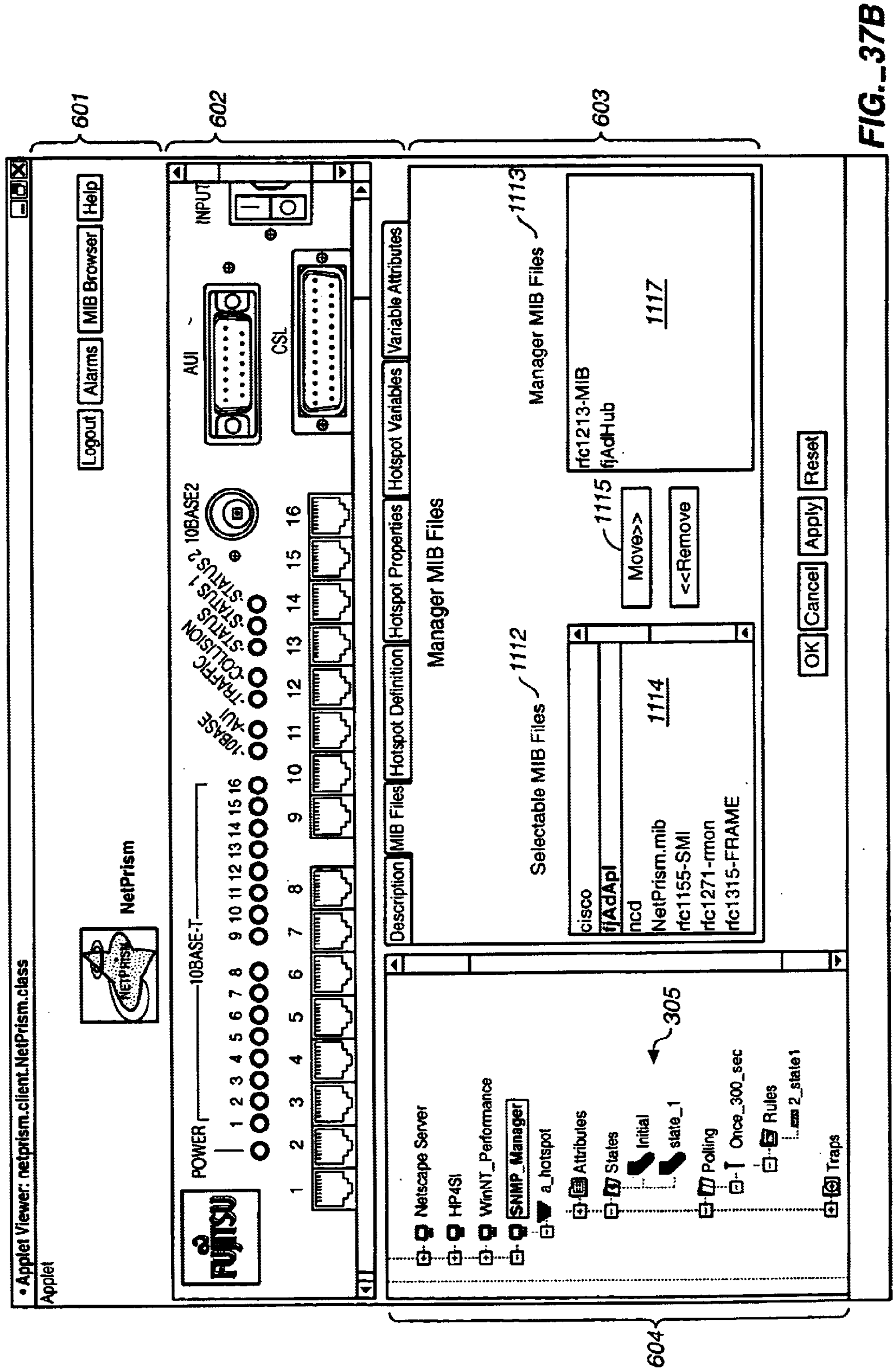
FIG._37B

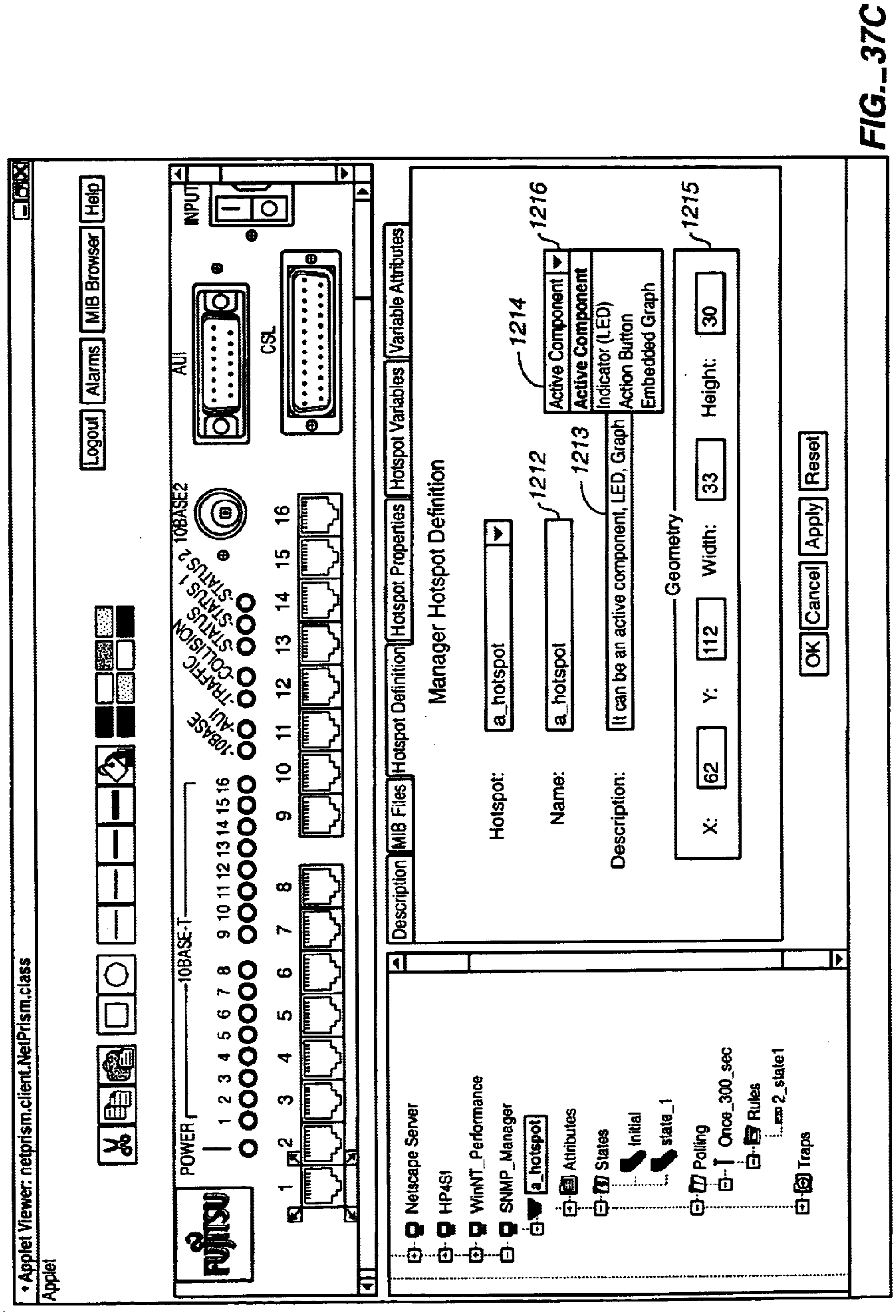
FIG._37C

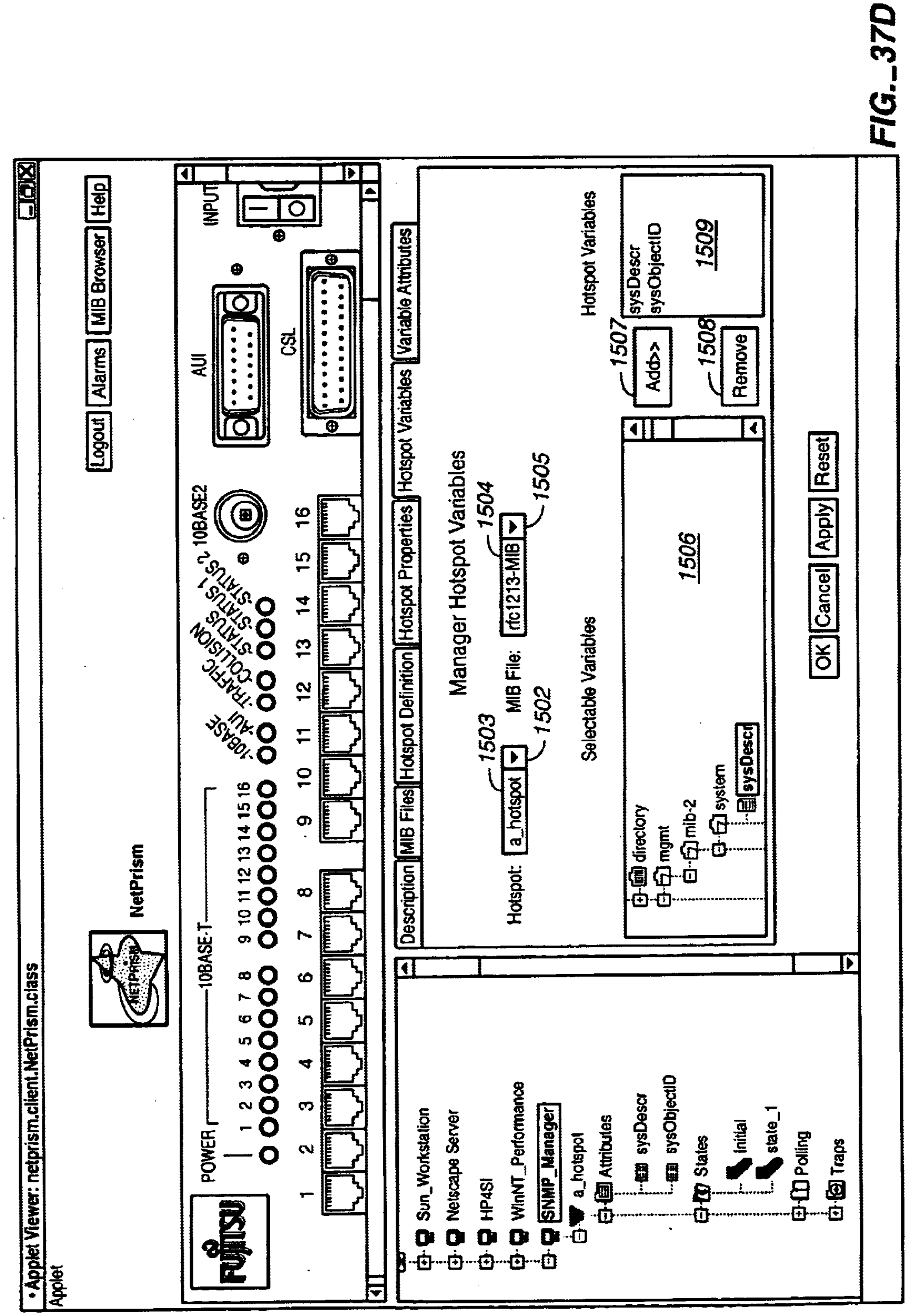
FIG._37D

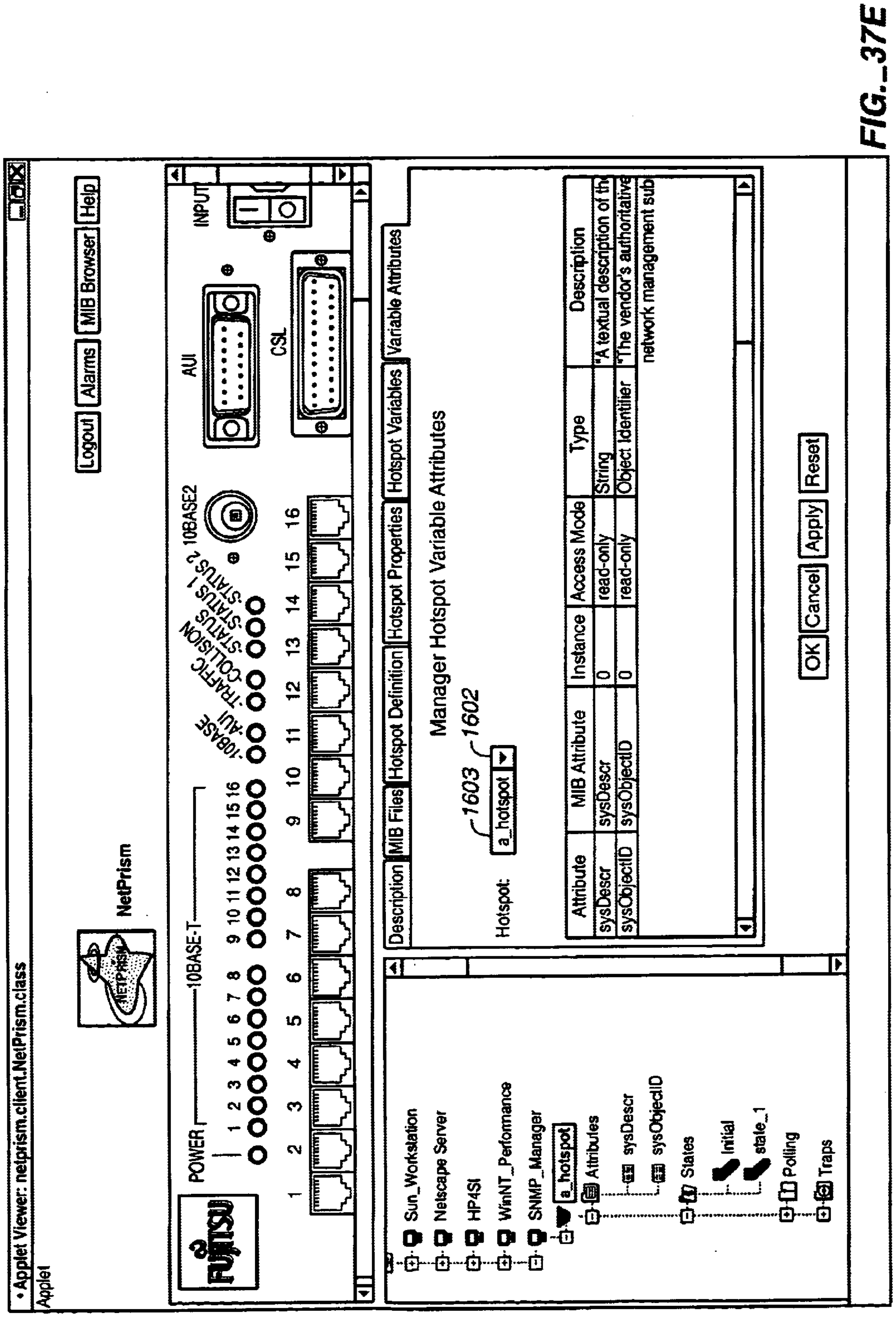
FIG._37E

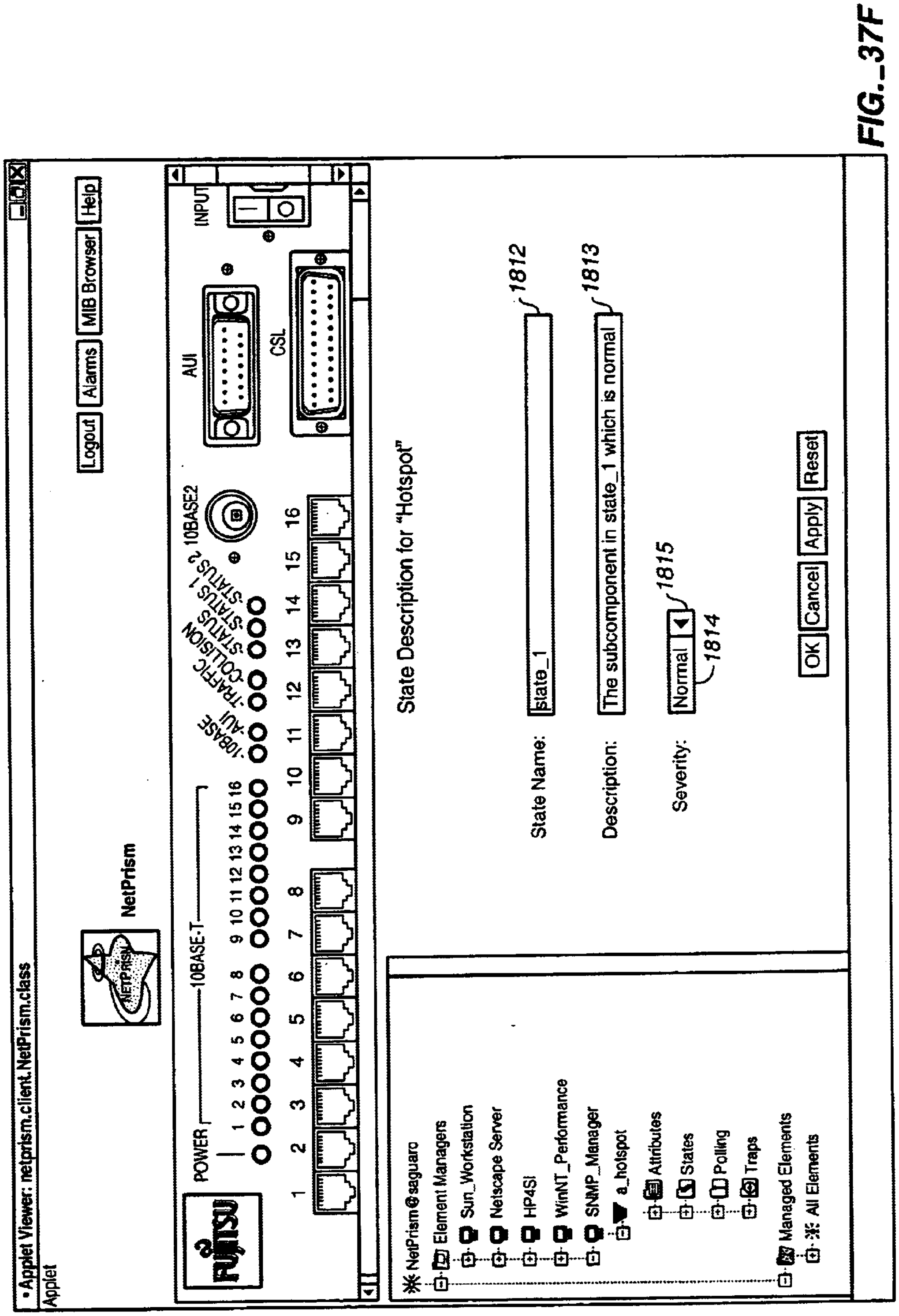
FIG._37F

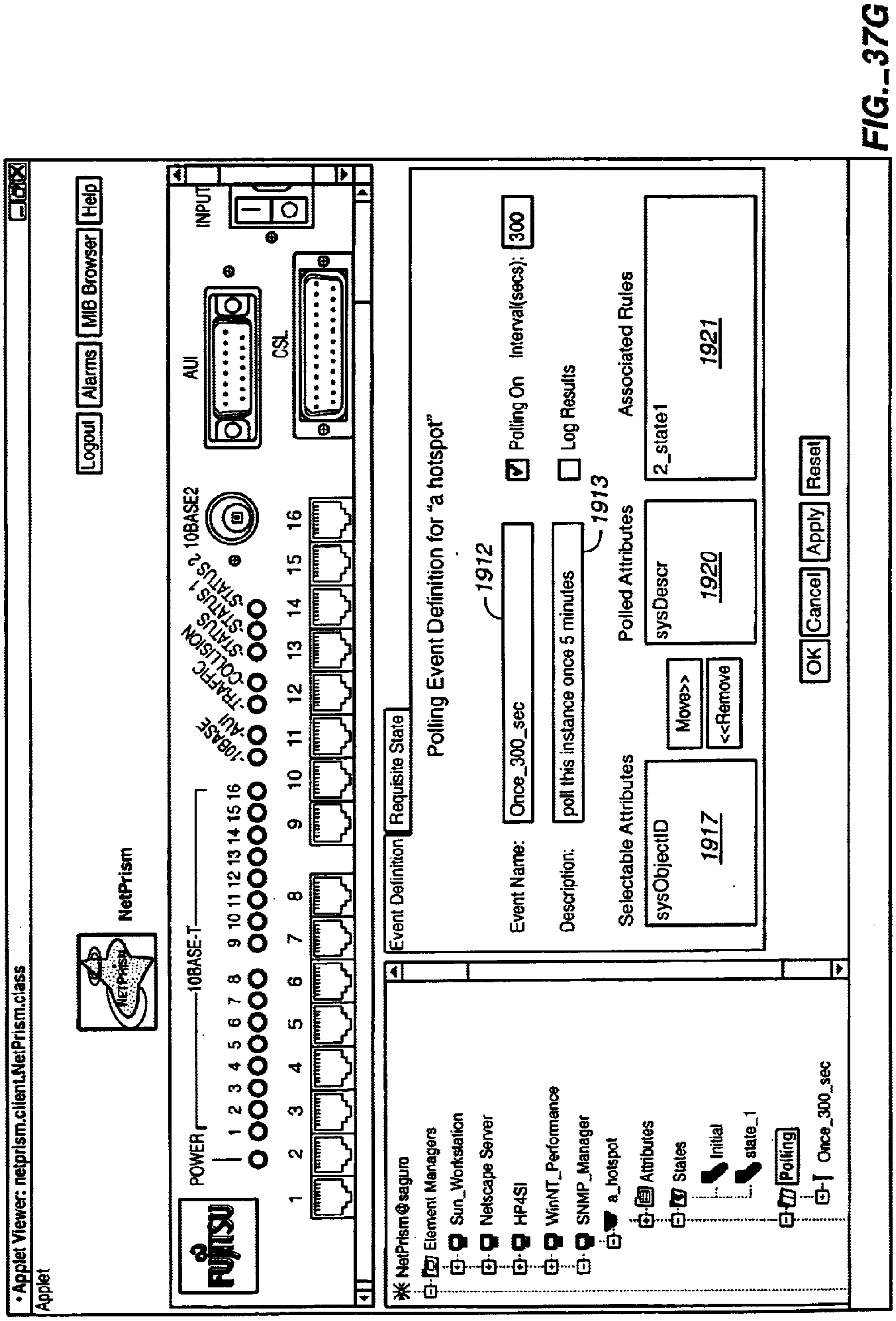
FIG._37G

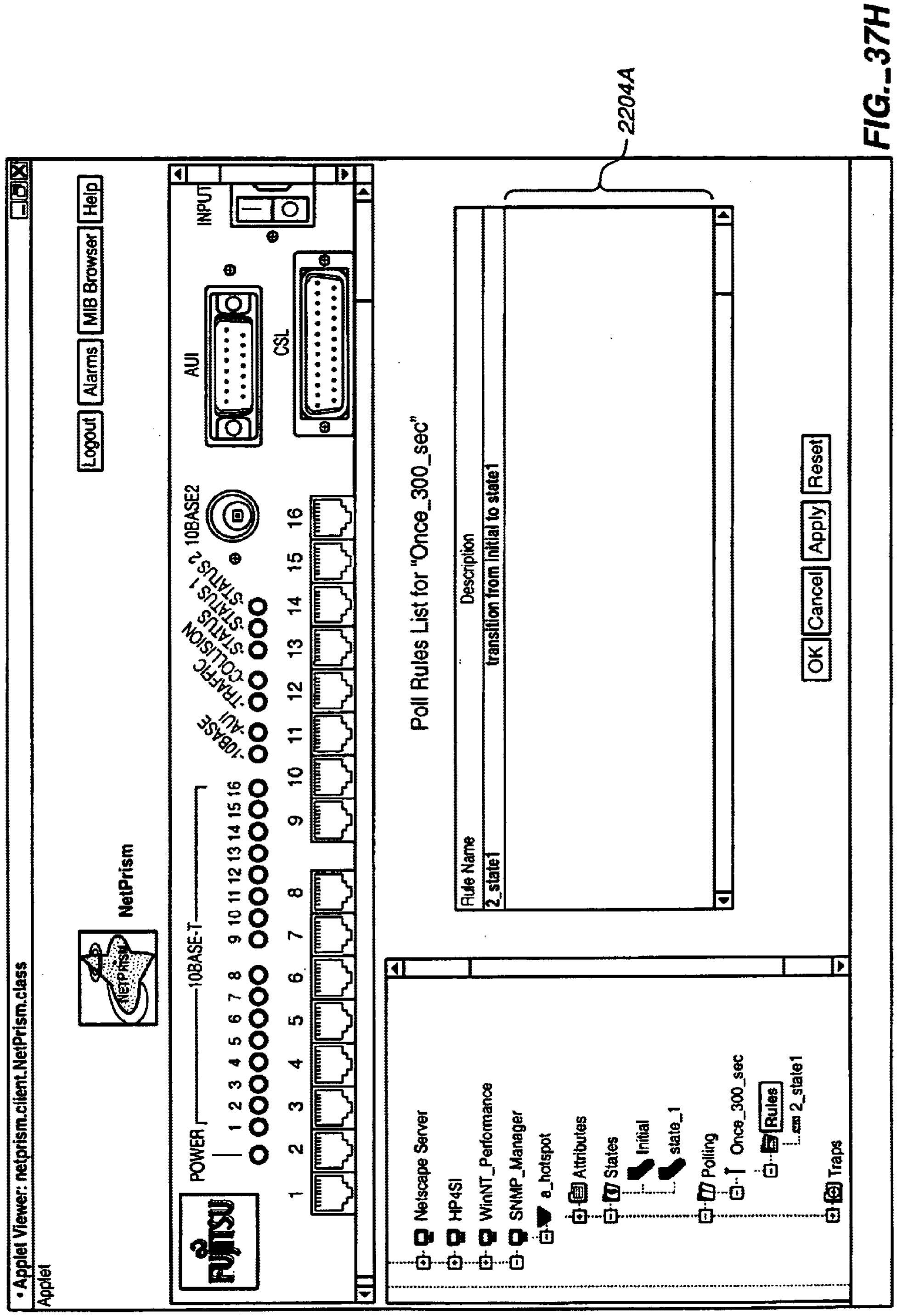
FIG._37H

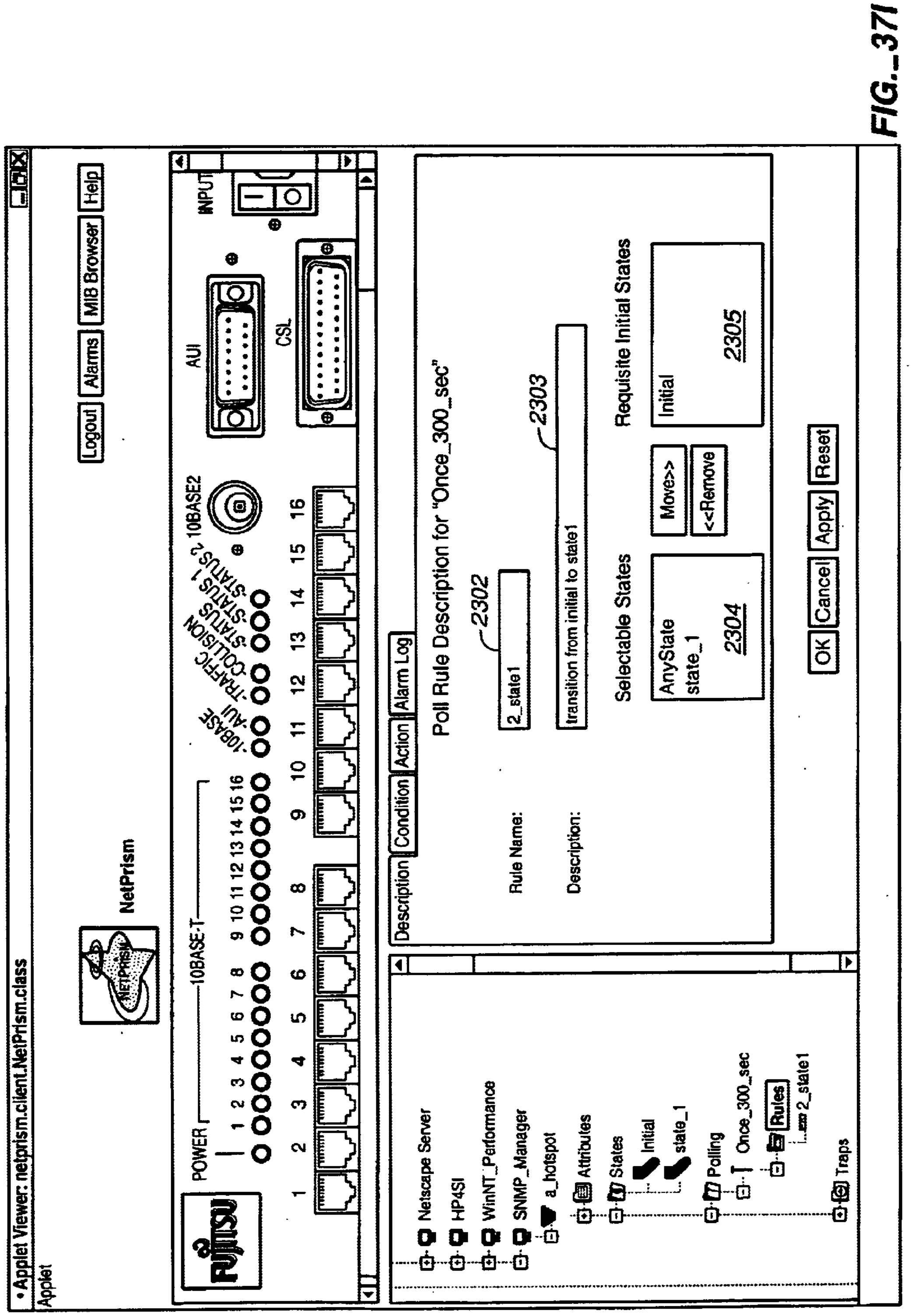
FIG._37I

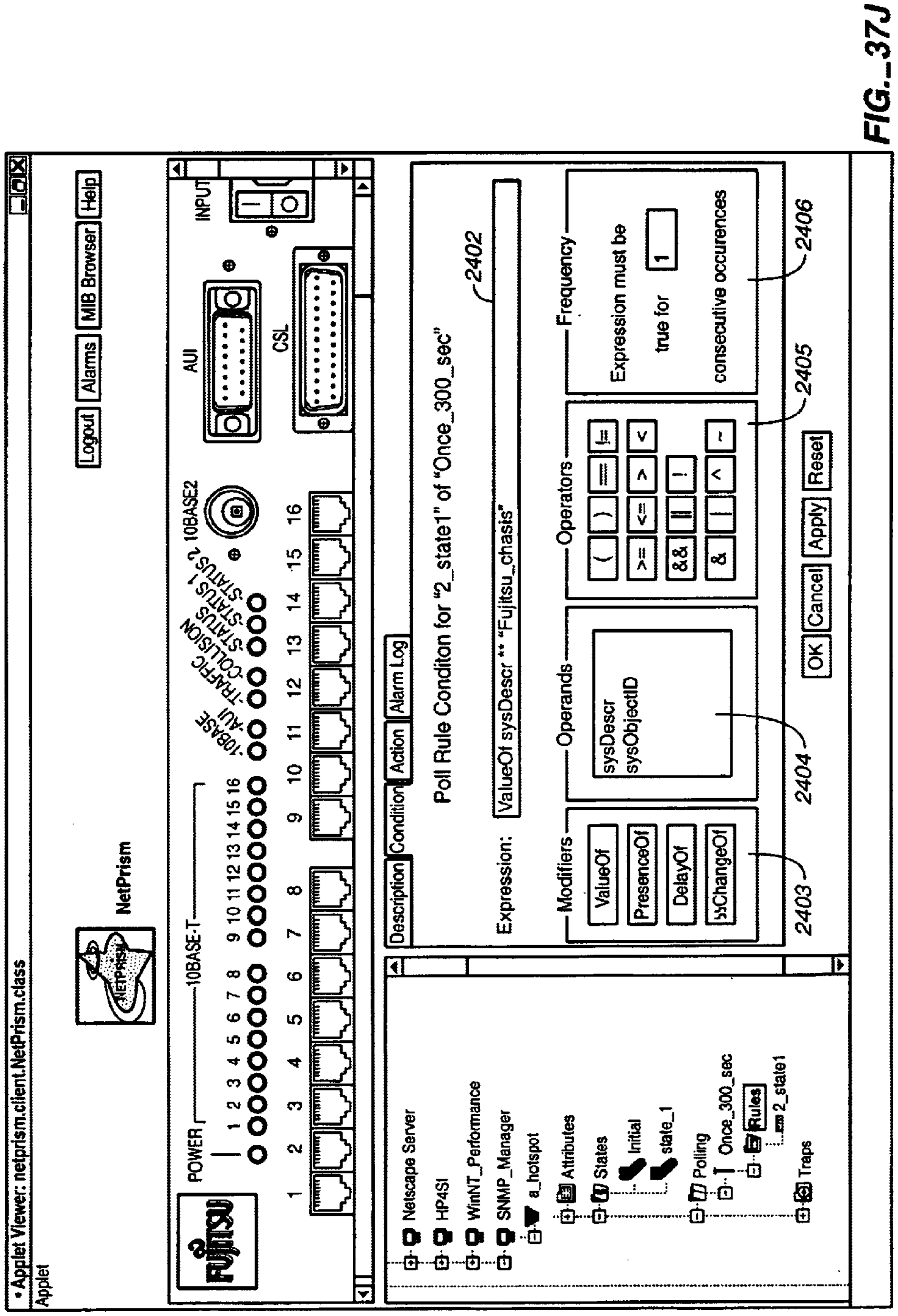
FIG._37J

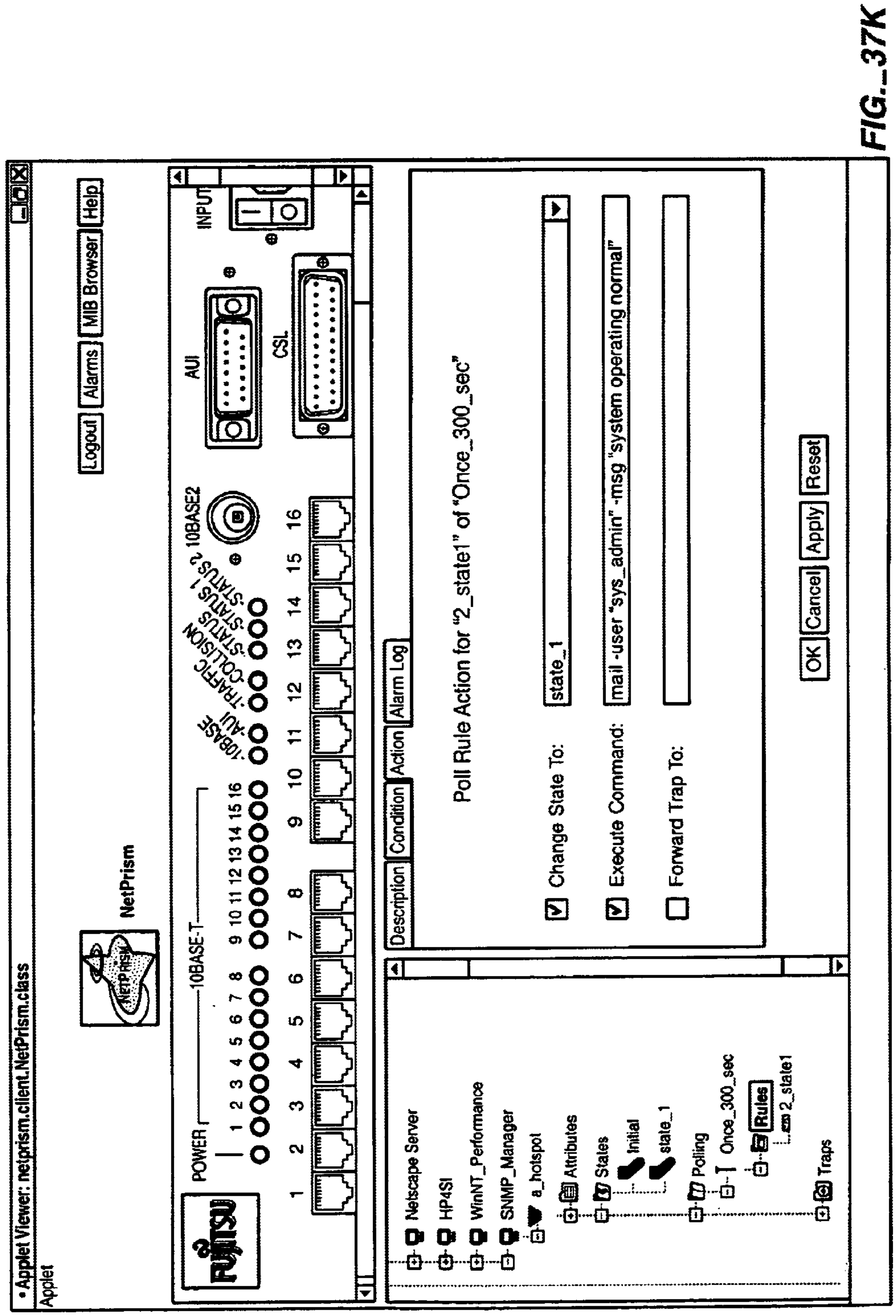
FIG._37K

FIG._37L
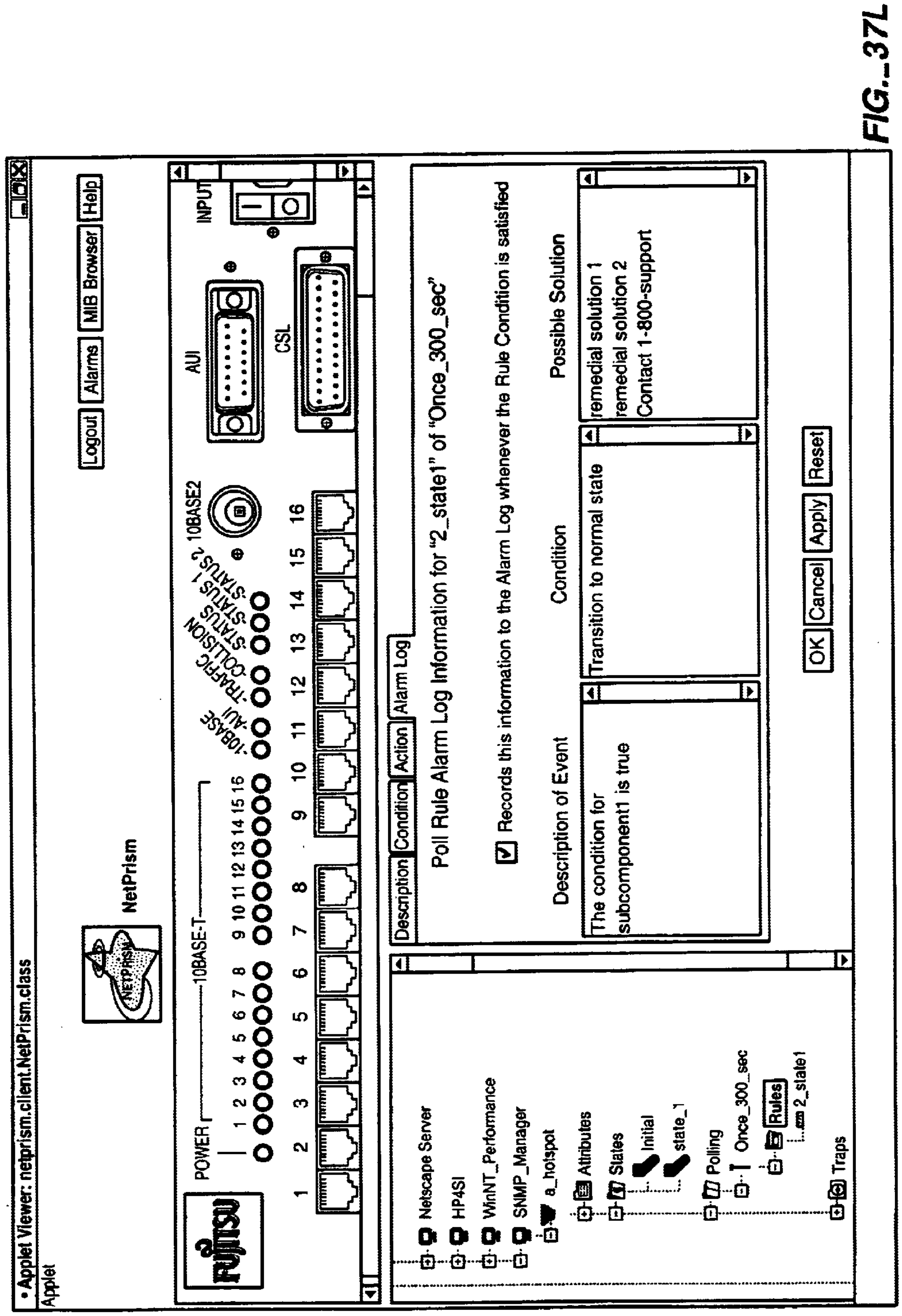

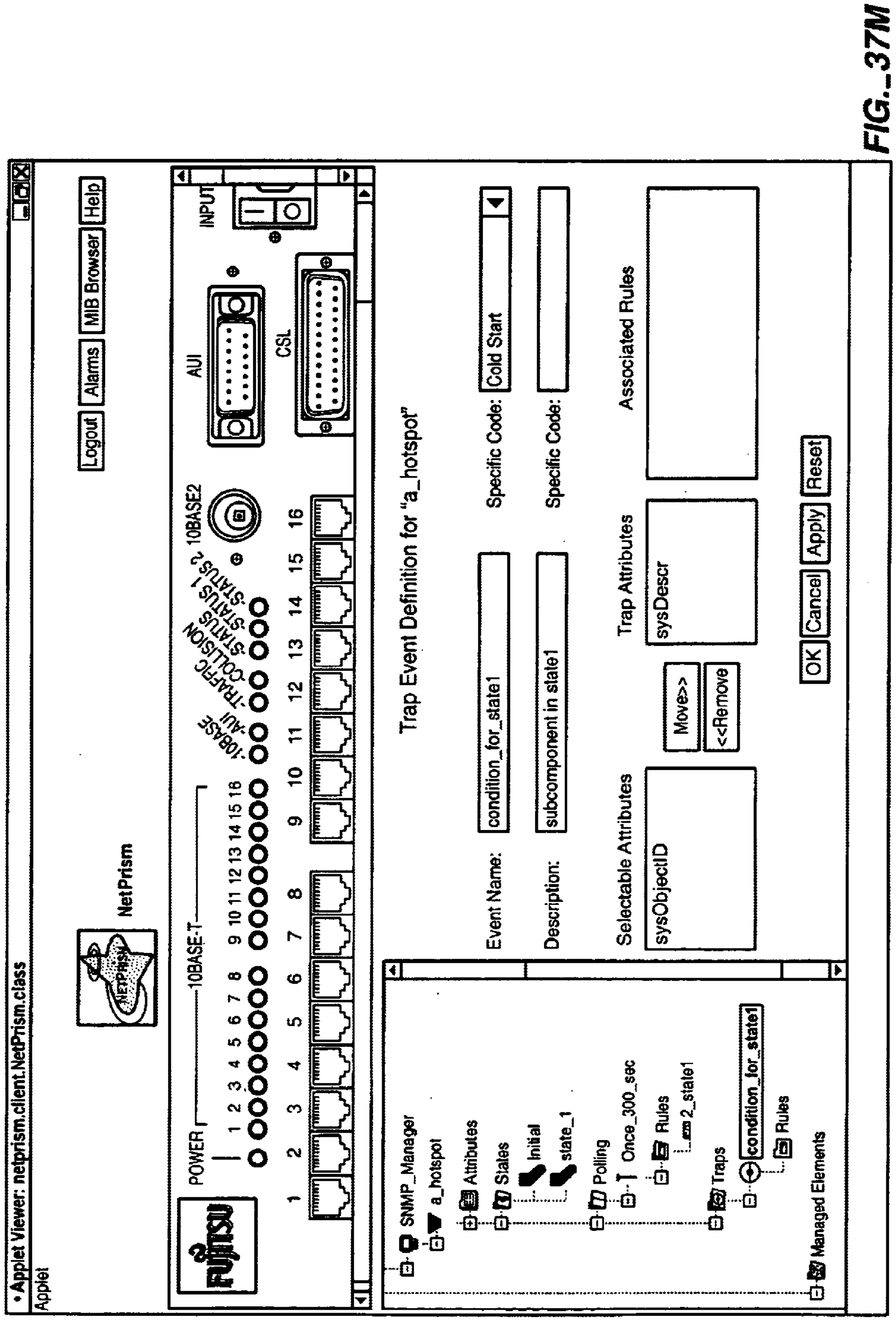
FIG._37M

FIG._38A
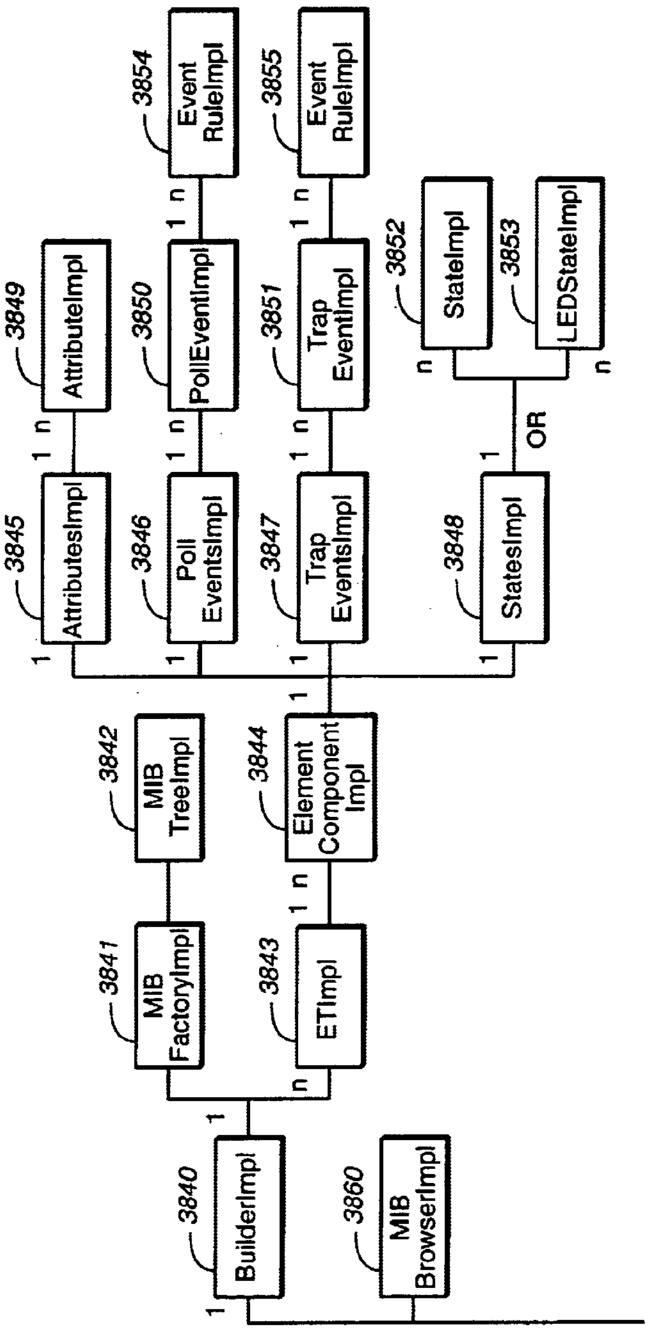
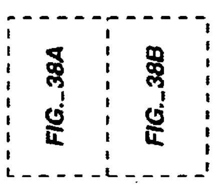
FIG._38

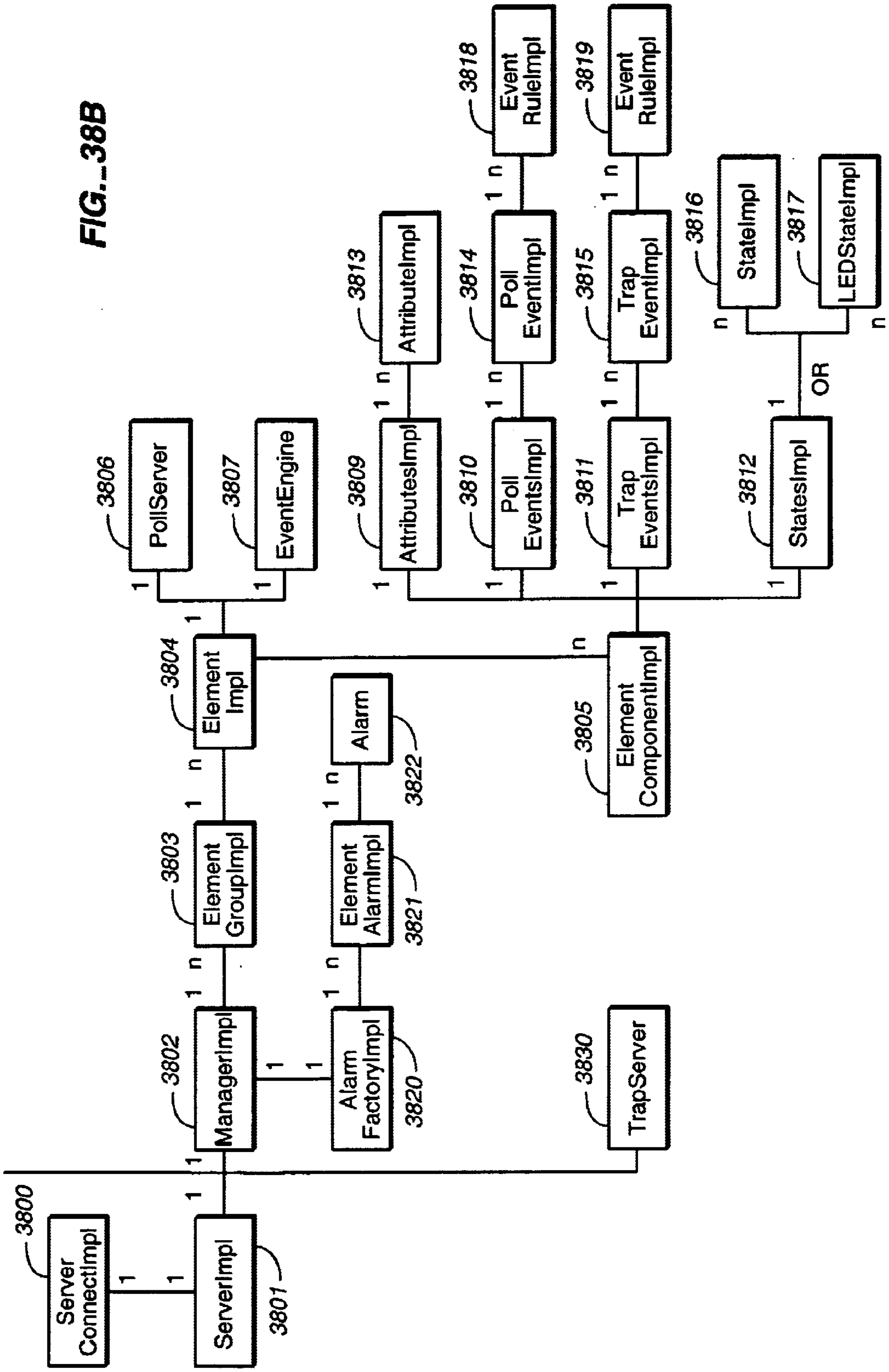
FIG._38B

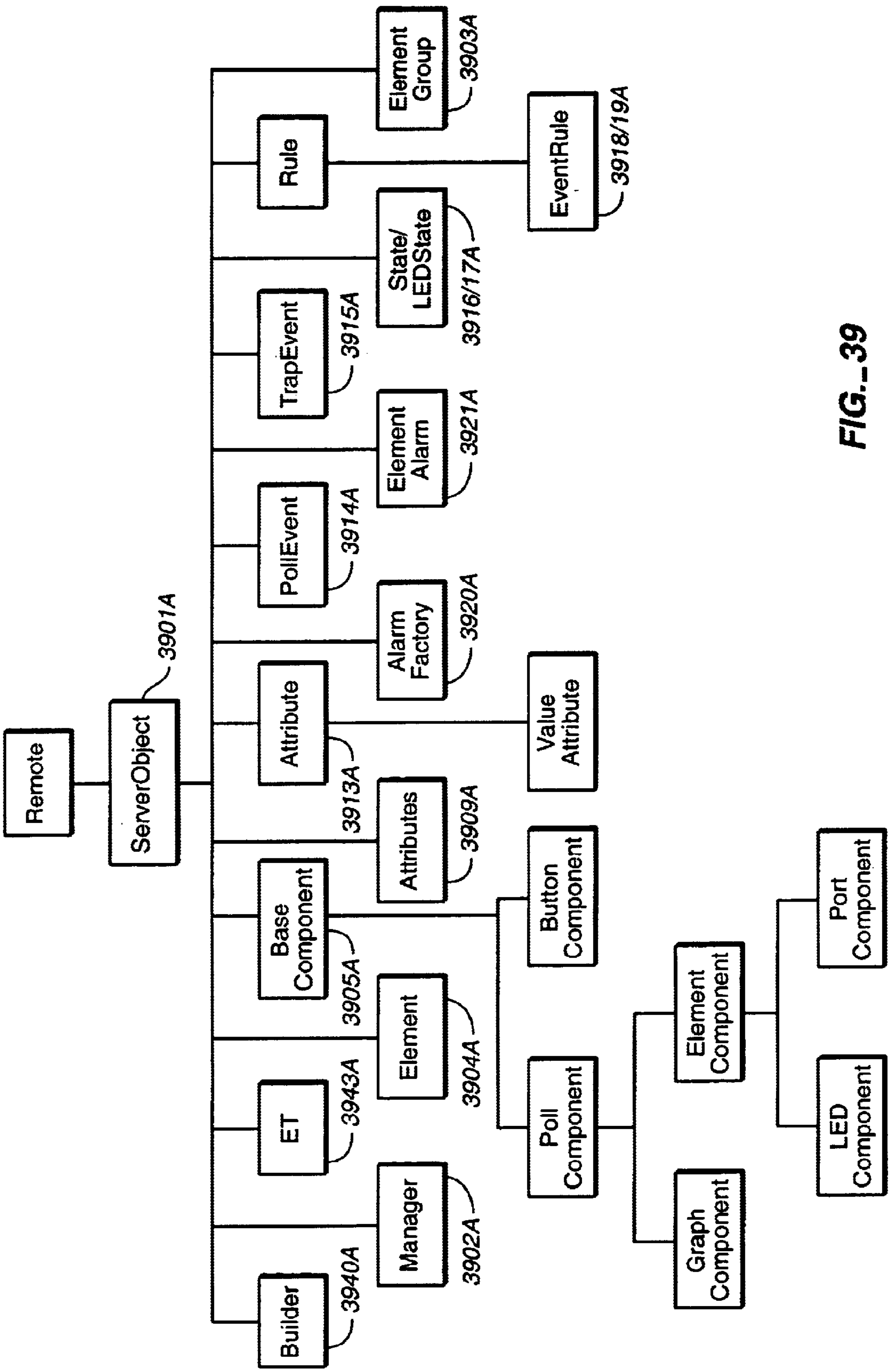
FIG._39

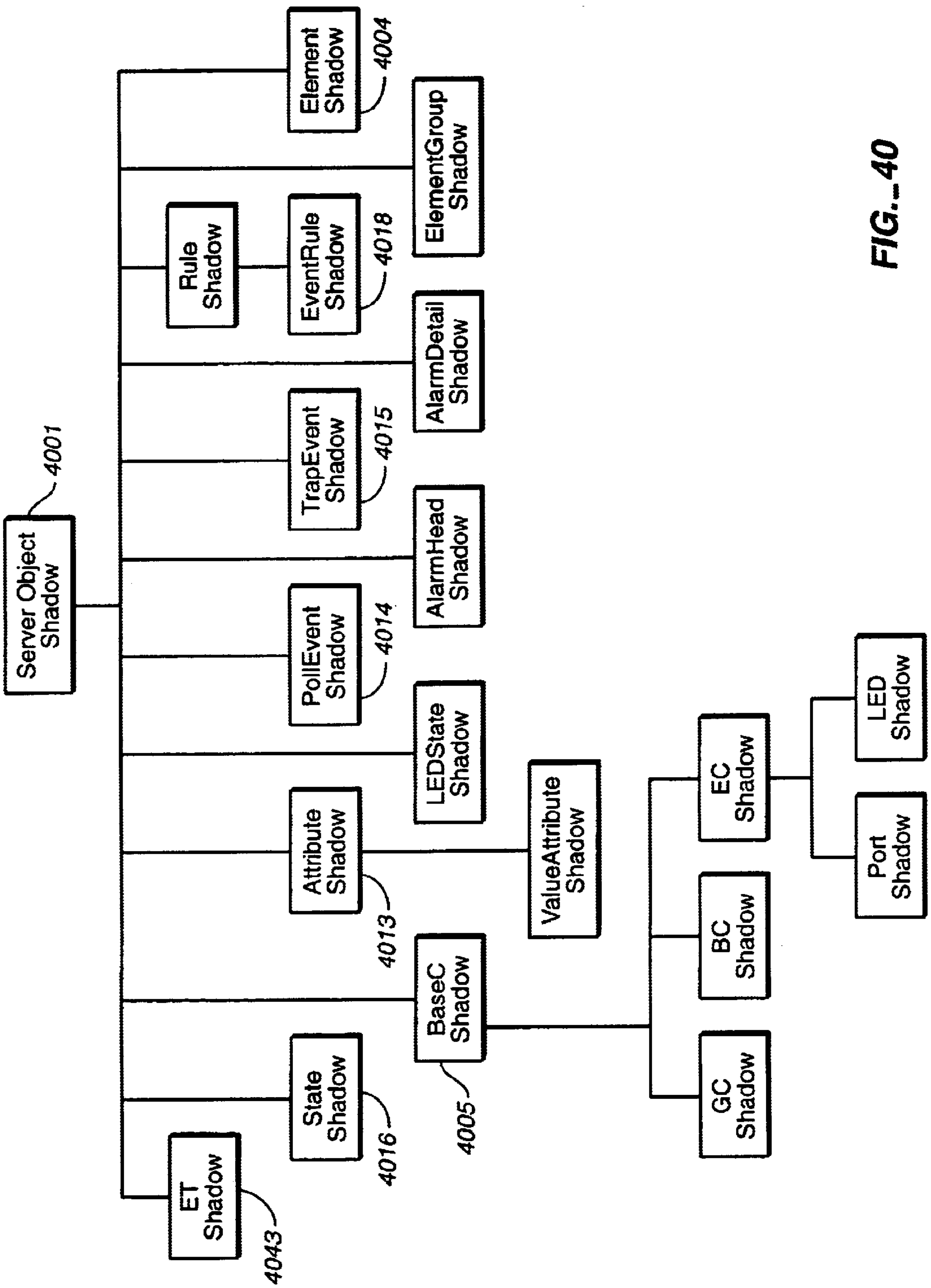
FIG._40

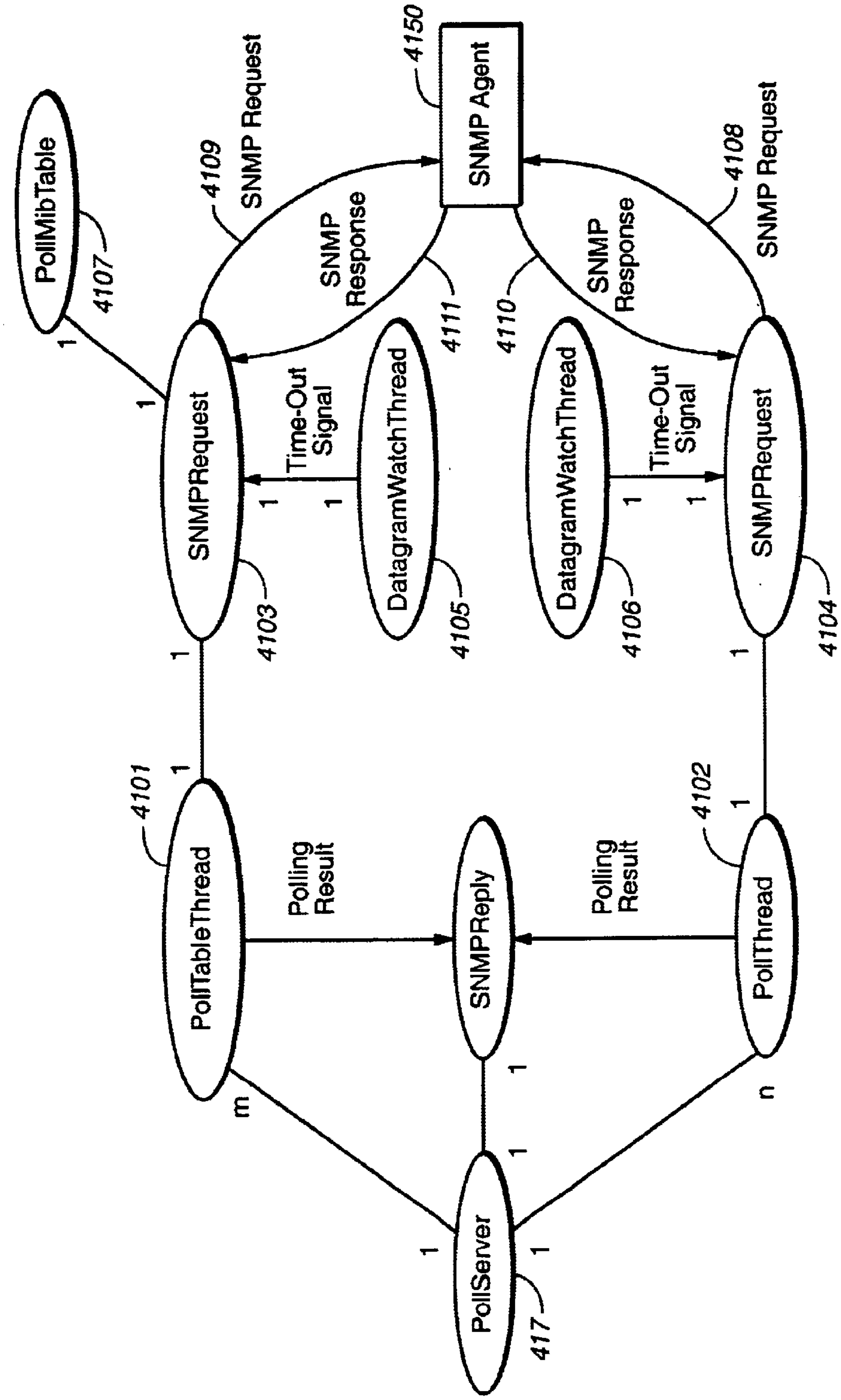
FIG._41

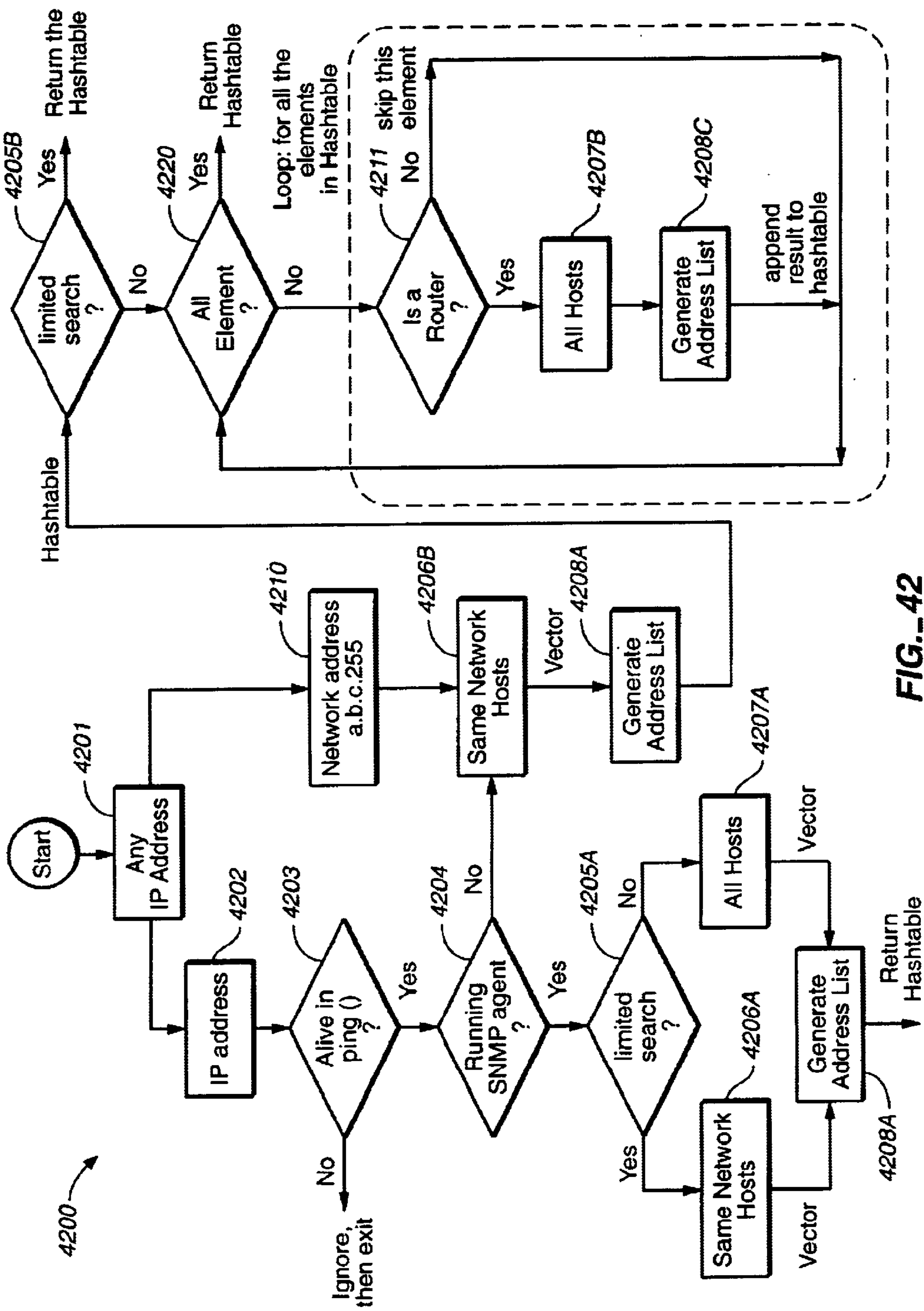
FIG._42

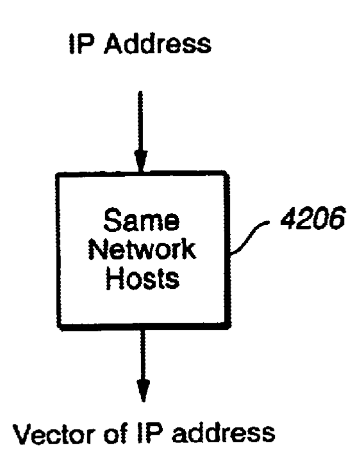
FIG._43A
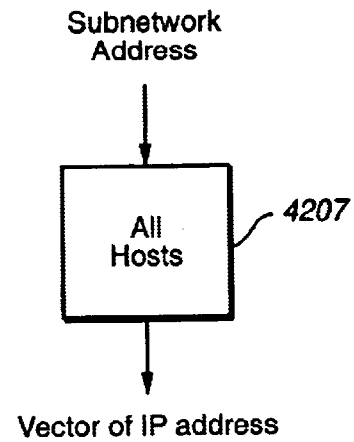
FIG._43B
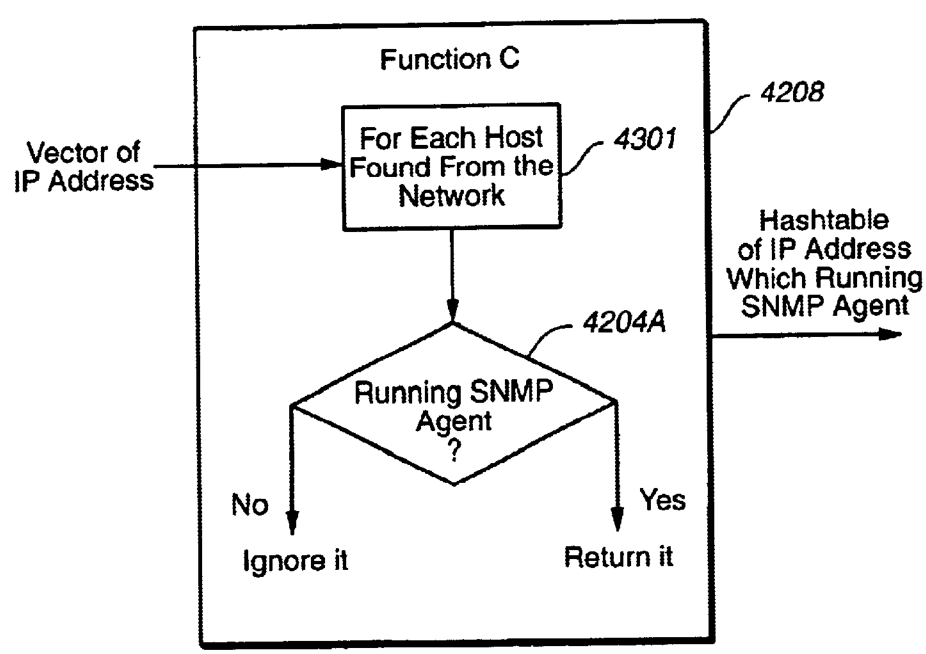
FIG._43C

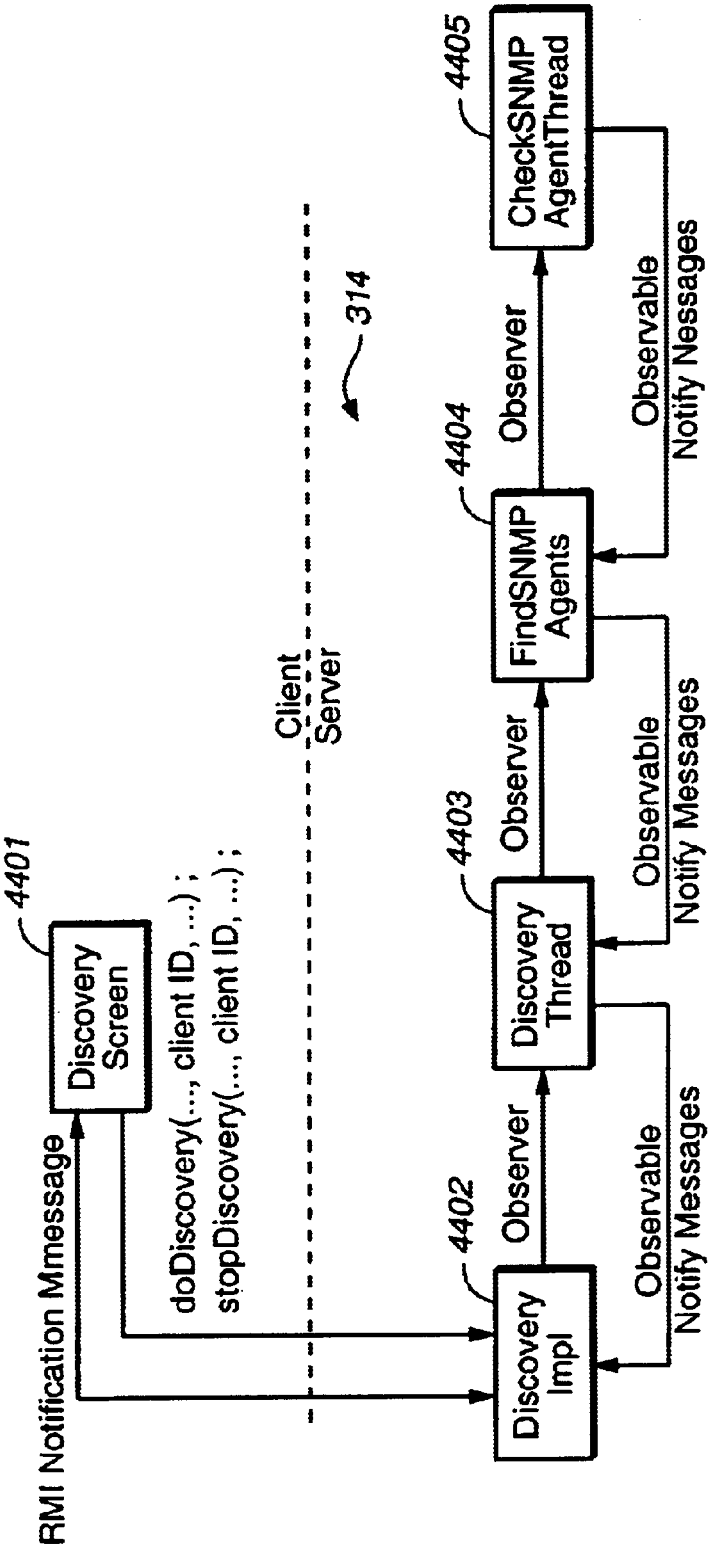
FIG._44

PLATFORM INDEPENDENT COMPUTER NETWORK MANAGER

This application is related to the following copending, commonly assigned, and cofiled applications, each of which is incorporated herein by reference in its entirety:

1. U.S. patent application Ser. No. 08/972,091, entitled "A PLATFORM INDEPENDENT COMPUTER NETWORK MANAGEMENT CLIENT," of Miodrag M. Kekic, Grace N. Lu, and Eloise H. Carlton filed on Nov. 17, 1997.
2. U.S. patent application Ser. No. 08/972,092, entitled "AN ELEMENT MANAGER FOR A MANAGEMENT-ENABLED COMPUTER NETWORK ELEMENT," of Miodrag M. Kekic, Grace N. Lu, and Eloise H. Carlton filed on Nov. 17, 1997
3. U.S. patent application Ser. No. 08/972,220, entitled "A CLIENT-SERVER COMPUTER NETWORK MANAGEMENT ARCHITECTURE," of Miodrag M. Kekic, Grace N. Lu, and Eloise H. Carlton filed on Nov. 17, 1997.

BACKGROUND OF THE INVENTION

Reference to Appendices A to D

Appendices A to D are a part of the present disclosure and each is incorporated herein by, reference in its entirety. A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Field of the Invention

The invention generally relates to generally to computer network management, and in particular to managing heterogeneous computer network elements.

2. Description of Related Art

Over the years, the organization of computer systems has changed dramatically. The concept of a large computer center with a single large computer to which all users bring their work is obsolete. The single large computer has been replaced by a large number of separate but interconnected computers that form a computer network.

There are many types of computer networks including Local Area Networks (LANs), Metropolitan Area Networks (MANs), Wide Area Networks (WANs), Wireless Networks, and Internetworks. An Internetworks is a collection of of interconnected networks and is sometimes called an internet. The Internet is a specific worldwide internet. The widespread popularity of the Internet has resulted in yet other types of computer networks such as intranets and extranets.

A computer network includes both hardware and software. Typically, a network architecture is defined in terms a set of layers and protocols that define the communication between hardware and software in a computer as well as the communication between computers on the network. One widely used network architecture is the Transmission Control Protocol/Internet Protocol (TCP/IP) Reference Model. TCP/IP is well-documented and is known to those of skill in the art.

As computer networks have become more common, a number of new devices were introduced to facilitate communications between network computers including local and remote bridges, multiprotocol routers, distributed hubs, and switching hubs. Similarly, the number and diversity of computer platforms, both hardware and software, connected to a network increased. Typically, as each new product was introduced, a new user interface was introduced to those that managed the computer network. Each new user interface has its own terminology, commands, and navigational metaphor.

Hence, in the past few years, as computer network complexity has grown exponentially, computer network management challenges have grown similarly. The networks are too complex and too critical for any single person to manage alone. Even simple networks are typically managed by more than one network administrator.

To assist in the management of TCP/IP computer networks, a Simple Network Management Protocol (SNMP) was implemented. However, today, SNMP is used in proprietary network environments including Netware IPX/SPX, DECnet, AppleTalk, and SNA environments.

SNMP is an industry standard for managing heterogeneous TCP/IP-based computer network elements from a single management application. SNMP defines the protocols and message formats which are used to communicate between the management application and the computer network element. With SNMP, a network manager can configure computer network elements and monitor computer network performance and status. SNMP, version 1 is defined by several standards documents that include:

RFC 1155, "Structure and Identification of Management Information for TCP/IP-based Internets," May, 1990;

RFC 1157, "A Simple Network Management Protocol (SNMP)," May 1990.

RFC 1212, "Concise MIB Definitions," March, 1991; and

RFC 1213, "Management Information Base for Network Management of TCP/IP-based Internets: MIB-II," March 1991.

Each of the above documents is incorporated herein by reference to demonstrate the level of skill in the art for SNMP. As used in the standards document, RFC stands for Request For Comment.

A computer network 100 (FIG. 1), that is managed using SNMP, includes, for example, a management station 110, a workstation 120, a bridge 130, a router 140, and a printer 150. Network 100 also could include, for example, personal computers, repeaters, and hubs. SNMP is a client-server based application protocol. Management station 110 executes a SNMP manager application 115 that communicates with SNMP agent processes 121, 131, 141, and 151.

Specifically, SNMP manager 115 communicates with client processes, i.e., agent process 121 on workstation 120, agent process 131 on bridge 130, agent process 141 on router 140, and agent process 151 on printer 150 using SNMP. An agent computer process must be programmed for each of the computer network elements, and the actions that are to be taken must be specifically programmed for each computer network element.

Each of agent processes 121, 131, 141, and 151 monitors and controls the operation of the computer network element containing the agent process, i.e., elements 120, 130, 140, and 150 respectively, by maintaining a data base of objects 122, 132, 142, and 152, respectively, called the Management Information Base (MIB). The MIB reflects the status of the managed computer network element. Each of the agent processes 121, 131, 141, and 151 responds to network management requests from SNMP manager 115. An agent process can also send unsolicited messages, called trap events, to SNMP manager 115 to apprise manager 115 of network events. Manager 115 maintains statistics that define the operation of network 100 in MIB 112.

The SNMP standards define proxy agents that may be used to access management information from a remote device. A common usage of proxy agents is to translate protocols when the remote device does not support SNMP.

SNMP uses well-established standards to define the format, content, and database structure of management information objects that are stored by the agent process and passed between SNMP manager 115 and the agent. These objects are carried in packets called protocol data units (PDUs) and contain operating parameters, statistics, and control information for the element and its components. The objects (variables) comprise the MIB. The current version of the MIB definition as defined by the standards body is MIB-II. Any SNMP management process can access MIB-II data.

The MIB may be extended beyond the standard set of objects to include objects specific to the agent by incorporating a private vendor-specific enterprise MIB. MIB objects are grouped according to functionality and are categorized in a tree-like data structure. The tree is comprised of a root, branches, and leaf nodes The leaf nodes represent MIB object instances and can be located by traversing the tree as deeply as possible. To simplify the traversal process, each branch at the same level in the tree is assigned a lexicographically ordered number. Thus, each node in the tree is representable by a sequence of period-separated numbers, where each number is associated with a branch level. The sequence of numbers is known as the object identifier (OID). FIG. 2 illustrates a portion of the MIB-II tree and how object identifiers are assigned. From FIG. 2, one can determine that the object identifier for the system group is 1.3.6.1.2.1.1.

RFC 1157, "A Simple Network Management Protocol (SNMP)" describes the operation of SNMP by stating:

> The network management protocol is an application protocol by which the variables of an agent's MIB may be inspected or altered. Communication among protocol entities is accomplished by the exchange of messages, each of which is entirely and independently represented within a single UDP datagram using the basic encoding rules of ASN.1. A message consists of a version identifier, a SNMP community name, and a protocol data unit (PDU). A protocol entity receives messages at UDP port 161 on the host with which it is associated for all messages except for those which report traps (i.e., all messages except those which contain the Trap-PDU). Messages which report traps should be received on port 162 for further processing. An implementation of this protocol need not accept messages whose length exceeds 484 octets. However, it is recommended that implementations support larger datagrams whenever feasible.

Compliance with SNMP, version one standard (See RFC 1157, page 16) requires that all implementations of SNMP support five PDUs, i.e., GetRequest-PDU, GetNextRequest-PDU, GetResponse-PDU, SetRequest-PDU, and Trap-PDU. The five PDUs are described in detail in TABLE 1.

TABLE 1

| Standard PDU's | |
|---|---|
| GetRequest | Issued by the management station to the agent to retrieve information from the MIB |
| GetResponse | Issued by the agent after receiving a GetRequest-PDU, GetNextRequest-PDU, or SetRequest-PDU to send MIB object values or responses to the management station |

TABLE 1-continued

| Standard PDU's | |
|---|---|
| GetNextRequest | Issued by the management station to traverse the agent's MIB tree by moving sequentially from one object value(instance) to the next without knowing the precise name of the object |
| SetRequest | Issued by the management station to modify and store information within the agent's MIB |
| Trap | An asynchronous (unsolicited) message issued by the agent to the management station to report a significant event. |

By using these operators, a SNMP manager application can communicate with managed nodes to identify the nodes, and to determine statistical information, such as network traffic flow through a given computer network, for the network.

SNMP trap events allow the SNMP agent to initiate communication with management applications when a significant (serious) network event takes place. The significant trap events are defined in RFC 1157. By default, all SNMP agents generate Trap-PDUs for the events shown in TABLE 2.

TABLE 2

| Events Resulting in Traps | |
|---|---|
| Cold Start | An agent initialization or re-initialization which may affect the values of objects has occurred |
| Warm Start | An agent re-initialization which does not affect the value of any object has occurred |
| Link Down | The agent has discovered a failure in one of the communication links of its configuration |
| Link Up | A communications link in the agent's configuration has just become activated |
| Authentication Failure | The agent has received a protocol message that was not properly authenticated with the correct community name (this trap may be suppressed upon request) |
| Neighbor Loss | The agent has discovered that a neighbor is down |
| Enterprise | The agent has experienced a vendor-specific event |

In contrast to trap events, polling events are proactive requests made by management station 110 to elicit information from the agent. A common network management technique called "trap directed polling" is for the management station to wait for a trap event and then poll for more information regarding that event. This method minimizes the impact on managed elements and network bandwidth. However, since traps are sent unreliably, some degree of polling is still required as a backup precaution.

Access to an agent is controlled by a community name. Every agent is configured to recognize one or more community names, and to provide the appropriate level of access to SNMP managers based on the community name that the managers include in their messages.

The community relationship between agents and managers defined by the community name is used to administer the MIB and to provide the agent information on where to send a trap. There are three levels of access to MIB objects: read-only(object value can be read but not modified), read-write (object value can be read or modified), and write-only (object value can be modified but not read). The level of access which the agent allows for its MIB objects is determined by comparing the community name provided in the SNMP message with that defined by the agent. If the two names match, access is given. A separate community name is defined for read and write accesses. The most common community names are public (access given to all management stations) and private (no access allowed). Community names are not considered passwords because community names cannot make any guarantees regarding the command (message) with respect to its origin, its integrity, its delivery, or its privacy. More information regarding community names is contained in RFC 1157.

While SNMP was designed to simplify network management, this has not be the case. To make SNMP successful, every device vendor must provide tools to monitor and troubleshoot their devices, or alternatively get some other company that supplies a management system to include support for their particular device. In general, the communication of vendor specific MIB objects among heterogeneous elements is problematic.

The challenge is clear. How can a group of network managers efficiently manage a constantly changing and growing network which is composed of a wide array of heterogeneous elements, that are produced by different vendors, and that support many different platform types? Any solution must be simple, flexible, robust, secure, collaborative, and most importantly has to work.

SUMMARY OF THE INVENTION

A managed element server of this invention is a comprehensive open, standards-based network management solution for computer networks having a computer network management capability. The managed element server of this invention efficiently manages a constantly changing and growing heterogeneous computer network. The solution of this invention, as described more completely below, is flexible, robust, secure, collaborative, and most importantly works.

The client-server network management system of this invention includes: a plurality of managed computer network elements, sometimes called managed elements; a managed element server that executes on a first computer; and at least one managed element server client that typically executes on a second computer. The managed element server and managed element server client are computer processes that execute from memory of their respective computers.

The managed element server and managed element server client are platform independent computer processes and can be executed on any computer platform that supports the platform independent computer language in which the server and client are written. This is particularly advantageous because it is unnecessary to write a different version of the client and server for each of the different computing platforms typically found on a heterogeneous computer network.

The client-server network management system provides a new capability for creating a managed element template, called an element manager, for a management-enabled computer network element, such as a bridge, a workstation, or perhaps, a computer software application that is executing a computer system connected to the network. A user can build an element manager without writing any computer code. In addition, a user can edit an element manager without writing any computer code. Moreover, since the computer processes are platform independent, the user does not need to be working on a particular type of computer platform to build an element manager. The user utilizes an intuitive graphical user interface (GUI) not only to builder element managers, but also to utilize the managed element server of this invention in managing computer network elements.

The graphic user interface of this invention, that is displayed by the client, includes a visual image of a computer network element being managed. The visual image includes a representation of the components of the computer network element, which include for example active components such as ports; a set of LEDs, and action buttons that are typically used to change the state of the computer network element. The user can select one of the components by clicking on a representation of the component in a navigation tree that is displayed in a navigation area of the graphic user interface, or alternatively by clicking on the component in the visual image.

The user can configure an element manager for the managed computer element represented by the display in graphic user interface so that a managed component, called a hotspot, has either a colored outline about component or the component itself has a color. The color of the outline or the color of the component itself gives the user a visual representation of the status, e.g., state of the component. Thus, as a user looks at the visual display in the graphic user interface, the user is provided the same visual information as if the user where physically present at the location of the managed computer network element. Thus, at a glance, a user can obtain considerable information about the status of the computer network element as represented by the visual display.

An alarms button in the graphic user interface flashes when the managed computer network element experiences an event that is associated with a alarm. This notifies the user that action may be required in management of the computer network element. The user can determine why the alarms button was activated by reviewing an alarm log that is presented in the graphic user interface upon the user activating the alarms button.

Using the client graphic user interface, the user can initiate action that corrects a problem that generated the alarm, or alternatively, configure the server to automatically correct such problems. Also, the user can change the management configuration for the managed computer network element by redefining rules that are used in event management to monitor and control the operation of the managed computer network element.

Through the graphic user interface, the user can configure the server to periodically send user-defined polling event requests. The managed computer network element replies with the requested information to the server. Depending on the configuration of the server, predefined actions may be executed in response to polling events. The event management also supports trap-directed polling. Thus, any user can manage the computer network from a computer connected to the network without being physically present at the location of each managed computer network element. Further, the user does this by using any computer that can be connected to the network independent of the processor or operating system on the computer, and without writing any computer code.

Hence, the intuitive client GUI of this invention makes client-server network management system easy to use and hides its complexity. The GUI presentation is separated from the application logic in the server and this reduces hardware requirements, provides scalability and extensibility, and increases the flexibility of the client-server network management system.

The client-server network management system of this invention is really two applications in one: a visual element manager builder and a manager. The visual element manager builder is a visual development environment in which device vendors or network managers may create standardized element management applications, called element managers. The manager provides the run-time environment in which the element managers are executed to monitor and manage computer network behavior such as network throughput, collision rate, and number of duplicate IP packets, to name a few. No programming is required and the separation between the visual element manager and the manager is seamless and transparent to the user.

According to the principles of this invention, one of a plurality of element managers is associated with each managed computer network element in the computer network. Herein, a management-enabled computer network element is any element in a computer network that can be managed using a computer network management protocol. A management-enabled computer network element can be any hardware or software on the computer network that implements the network management protocol by having a network management agent and a network management information database, or a similar process.

The manager of this invention includes a discovery engine that automatically interrogates each host in the computer network to determine whether the host is running a network management agent. Upon detection of a management-enabled computer network element, the discovery engine attempts to associate one of the plurality of element managers with the computer network element. If the discovery engine is able to associate the computer network element with one with one of the plurality of element managers, the discovery engine calls a process that uses the element manager to create a managed element object, and creates a poll server and an event engine for the managed computer network element. Upon completion of the discovery of management-enabled computer network elements, each management-enabled computer network element either has a managed element object and an associated poll server and an event engine, or is assigned a predefined element manager name, if no association could be made.

A poll server in the manager of this invention creates a thread for each polling event (request) specified in poll events of the managed element object. When the poll server receives a response to a polling event, the data in the response is passed to the event engine for evaluation. The managed server element allows polling events which are used to solicit the information from a computer network element, or any of its components.

The event engine in the manager of this invention, in one embodiment, is an event rule engine. The event engine process all polling events, and all trap events for the managed computer network element associated with the managed element object. The event engine uses event rules to determine the action that should be taken in response to each polling event, and each trap event. Each rule has a rule condition, and a rule action. The event engine evaluates the rule condition using the data from the polling event or trap event, and if the rule condition is true, performs the action or actions specified by the rule action.

The combination of the event engine and the event rules is a sophisticated state machine and rules engine which allows pro-active management of a managed computer network element. Each active component of a managed computer network element has states, which are defined within the managed element object. These states are used in event rules to accurately manage a device, by triggering alarms based on sequence of events rather than simple threshold conditions, or by taking some other prescribed action.

In response to the result of a poll of the managed computer network element, the event engine determines the current state of the element component for the poll event. Next the event engine loops through all the rules in event rules for the polling event to determine whether there is a rule that can be applied for the current state. If there is such a rule, the event engine uses the information returned in the result of the poll to evaluate the rule. If the rule is true, and any persistence condition is satisfied, the action specified in the rule is executed. The action specified in the rule can be one or more of: executing a system command, logging an event to the alarm log, and changing the state of the element component from the current state.

In response to a trap event from the managed computer network element, a trap server passes data in the trap to the event engine which in turn determines the current state of the element component that generated the trap. Next the event engine loops through all the rules in event rules for the trap event to determine whether there is a rule that can be applied. If there is such a rule, the event engine evaluates the rule using data sent in the trap. If the rule is true, and any persistence condition is satisfied, the action specified in the rule is executed. If there is no rule for the trap in the event rules, the event engine logs the trap into the alarm log for the computer network element.

After an alarm factory in the manager of this invention loads an existing alarm log for each managed element object. The user can view the alarms for all managed computer network elements, for a group of managed computer network elements, for a specific computer network element, or, for a component of a specific computer network element. When an alarm is received, button Alarms on the client GUI changes state, e.g., blinks, and if the alarm is associated with a particular component, the appearance of the component may be changed in response to the alarm.

The trap server, in the manager of this invention, receives all traps from other hosts on the computer network. If a received trap is from one of the managed elements, the trap server copies the data in the trap to a buffer, and notifies the event engine for the managed element that generated the trap. The event engine processes the trap data as described above.

Notice that the manager portion of managed element server described above is independent of any graphic user interface. The logic and structure of the manager of managed element server is cleanly separated from the graphic user interfaces The managed element server also interacts with managed element server clients. In one embodiment, the managed element server client is implemented as a JAVA applet and is running inside a World-Wide Web Browser or a JAVA Applet Viewer. The JAVA applet is downloaded from the managed element server. The JAVA applet includes information that allows a user a) to monitor the operation of each of the managed computer network elements, b) to edit the event management for the managed computer network elements by reconfiguring the event management model in the element manager object for the network element, and c) in one embodiment, to use a visual element manager builder that permits both building and editing of element managers.

The element manager of this invention is a template that is used by the manager in the server of this invention to manage a computer network element. The element manager includes basic information data that defines core properties of a computer network element, and event management information that is used in managing the computer network element.

A method for building an element manager for a computer network element includes entering data characterizing the element manager through a graphical user interface of a client computer process. The client computer process uses a visual element manager builder server process to build the element manager using the data. The element manager is stored in a memory on a computer that executes the server process for the client computer process.

The basic information includes a storage location of a file that contains a visual representation of the computer network element; identification of attributes that characterize operation of components of the computer network element; association of a component of the computer network element with one hotspot in a plurality of hotspots; association of attributes that characterize operation of the component with the one hotspot. All of this basic information is entered using element manager build panels in the client graphic user interface. The element manager build panels include a plurality of wizard panels. In one embodiment, a wizard panel is identified by a plurality of edit command buttons.

The event management information includes: states for a component of the computer network element; polling events for the component; a requisite component state or states for each polling event; a rule for each polling event when the component is in the requisite component state; and trap events for the component. All of this event management information is entered using element manager build panels in the client graphic user interface. The element manager build panels include a plurality of wizard panels.

Hence, in this embodiment, the element manager builder tool is downloaded from the computer server process and executed as a client process wherein the element manager builder tool presents a user with a plurality of panels in a graphic user interface to build the element manager.

BRIEF DESCRIPTION OF THE DRAWINGS

FIG. 1 is an illustration of a portion of a prior art heterogeneous computer network that is managed using SNMP.

FIG. 2 is a sample MIB tree as defined by SNMP.

FIG. 3A is an illustration of a portion of a heterogeneous computer network that includes the client-server network management application of this invention.

FIG. 3B is an illustration of one embodiment of the client grahpical user interface of this invention.

FIG. 4 is a more detailed diagram of the managed element server of this invention.

FIGS. 5A and 5B are a process flow diagram for the managed element server of this invention.

FIG. 5C is an example of a state diagram that could be implemented in one embodiment of this invention.

FIGS. 6A and 6B are specific examples of the client graphic user interface of this invention.

FIG. 6C is an example of the navigation tree that is displayed in the navigation of the client graphical user interface of this invention.

FIG. 7 is a high level illustration of the client-server computer network management system of this invention.

FIG. 8 is a block diagram that illustrates the components of an element manager stored in a memory, according to the principles of this invention.

FIG. 9A is an illustration of one embodiment of an element manager list panel and associated command buttons that are displayed in the work area and command button area of the client graphical user interface of this invention.

FIG. 9B is an illustration of one embodiment of an element manager description wizard panel and associated command buttons that are displayed in the work area and command button area, respectively, of the client graphical user interface of this invention.

FIG. 9C is an example of a background image that is displayed in the element image area of the client graphical user interface of this invention.

FIG. 9D is an illustration of the complete client graphical user interface of this invention that is utilized by the visual element manager builder.

FIG. 10 is a process flow diagram for building the basic information in an element manager according to the principles of this invention.

FIG. 11 is an illustration of one embodiment of a MIB file selection wizard panel and associated command buttons that are displayed in the work area and command button area, respectively, of the client graphical user interface of this invention.

FIG. 12A is an illustration of one embodiment of a hotspot definition wizard panel and associated command buttons that are displayed in the work area and command button area, respectively, of the client graphical user interface of this invention.

FIG. 12B is an illustration of a toolbar that is displayed in the header of the GUI of this invention, when the hotspot definition panel also is displayed in the GUI.

FIG. 13 is a process flow diagram of the operations associated with creating a hotspot in an element manager using the visual element manager builder of this invention.

FIG. 14A is an illustration of one embodiment of a button hotspot property definition wizard panel and associated command buttons that are displayed in the work area and command button area, respectively, of the client graphical user interface of this invention.

FIG. 14B is an illustration of one embodiment of an embedded graph hotspot property definition wizard panel and associated command buttons that are displayed in the work area and command button area, respectively, of the client graphical user interface of this invention.

FIG. 15 is an illustration of one embodiment of a hotspot MIB variable selection wizard panel and associated command buttons that are displayed in the work area and command button area, respectively, of the client graphical user interface of this invention.

FIG. 16 is an illustration of one embodiment of a define attributes of hotspot variable wizard panel and associated command buttons that are displayed in the work area and command button area, respectively, of the client graphical user interface of this invention.

FIG. 17 is an about edit panel for an element manager and associated command buttons, that are displayed in the work area and command button area, respectively, of the client graphical user interface of this invention.

FIG. 18A is a state definition list panel for an element manager and associated command buttons, that are displayed in the work area and command button area, respectively, of the client graphical user interface of this invention.

FIG. 18B is a state definition panel for an active component hotspot of an element manager and associated command buttons, that are displayed in the work area and command button area, respectively, of the client graphical user interface of this invention.

FIG. 18C is a state definition panel for a LED hotspot of an element manager and associated command buttons, that are displayed in the work area and command button area, respectively, of the client graphical user interface of this invention.

FIG. 19A is a polling event list panel for an element manager and associated command buttons, that are displayed in the work area and command button area, respectively, of the client graphical user interface of this invention.

FIG. 19B is a polling event definition panel for a hotspot of an element manager and associated command buttons, that are displayed in the work area and command button area, respectively, of the client graphical user interface of this invention.

FIG. 19C is a requisite state selection panel for a polling event associated with a hotspot of an element manager and associated command buttons, that are displayed in the work area and command button area, respectively, of the client graphical user interface of this invention.

FIG. 20 is a trap event list panel for an element manager and associated command buttons, that are displayed in the work area and command button area, respectively, of the client graphical user interface of this invention.

FIG. 21 is a polling event definition panel for a hotspot of an element manager and associated command buttons, that are displayed in the work area and command button area, respectively, of the client graphical user interface of this invention.

FIG. 22 is a trap event rules list panel for an element manager and associated command buttons, that are displayed in the work area and command button area, respectively, of the client graphical user interface of this invention.

FIG. 23 is a rule definition panel for a trap event associated with a hotspot of an element manager and associated command buttons, that are displayed in the work area and command button area, respectively, of the client graphical user interface of this invention.

FIG. 24 is a trap rule condition definition panel for a trap event associated with a hotspot of an element manager and associated command buttons, that are displayed in the work area and command button area, respectively, of the client graphical user interface of this invention.

FIG. 25 is a trap rule action definition panel for a trap event associated with a hotspot of an element manager and associated command buttons, that are displayed in the work area and command button area, respectively, of the client graphical user interface of this invention.

FIG. 26 is a trap rule alarm log information panel for a trap event rule for a trap event associated with a hotspot of an element manager and associated command buttons, that are displayed in the work area and command button area, respectively, of the client graphical user interface of this invention.

FIG. 27 is an auto-discovery panel and associated command buttons, that are displayed in the work area and command button area, respectively, of the client graphical user interface of this invention.

FIG. 28 is a block diagram of a computer network that is used to demonstrate the various embodiments of the auto-discovery process of this invention.

FIG. 29 is a managed element group definition panel and associated command buttons, that are displayed in the work area and command button area, respectively, of the client graphical user interface of this invention.

FIG. 30 is an element manager to physical computer network element association panel and associated command buttons, that are displayed in the work area and command button area, respectively, of the client graphical user interface of this invention.

FIG. 31 is an example of an alarm log history panel and associated command buttons, that are displayed in the work area and command button area, respectively, of the client graphical user interface of this invention.

FIG. 32 is an example of an alarm filter panel and associated command buttons, that are displayed in the work area and command button area, respectively, of the client graphical user interface of this invention.

FIG. 33 is an example of a hotspot status panel and associated command buttons, that are displayed in the work area and command button area, respectively, of the client graphical user interface of this invention.

FIG. 34 is an embedded graph hotspot definition panel and associated command buttons, that are displayed in the work area and command button area, respectively, of the client graphical user interface of this invention.

FIG. 35A illustrates highlighting variables in a hotspot status panel that are used to generate a regular graph upon activating the graph value command button of the client graphical user interface of this invention.

FIG. 35B illustrates the regular graph that is generated in response to the selections illustrated in FIG. 35A.

FIG. 36 illustrates the client graphic user interface for the MIB browser of this invention.

FIG. 37A is an illustration of one embodiment of an element manager list tabbed edit panel and associated command buttons that are displayed in the work area and command button area of the client graphical user interface of this invention.

FIG. 37B is an illustration of one embodiment of a MIB file selection tabbed edit panel and associated command buttons that are displayed in the work area and command button area, respectively, of the client graphical user interface of this invention.

FIG. 37C is an illustration of one embodiment of a hotspot definition tabbed edit panel and associated command buttons that are displayed in the work area and command button area, respectively, of the client graphical user interface of this invention.

FIG. 37D is an illustration of one embodiment of a hotspot MIB variable selection tabbed edit panel and associated command buttons that are displayed in the work area and command button area, respectively, of the client graphical user interface of this invention.

FIG. 37E is an illustration of one embodiment of a define attributes of hotspot variable tabbed edit panel and associated command buttons that are displayed in the work area and command button area, respectively, of the client graphical user interface of this invention.

FIG. 37F is a state definition list edit panel for an element manager hotspot and associated command buttons, that are displayed in the work area and command button area, respectively, of the client graphical user interface of this invention.

FIG. 37G is a polling event definition tabbed edit panel for a hotspot of an element manager and associated command buttons, that are displayed in the work area and command button area, respectively, of the client graphical user interface of this invention.

FIG. 37H is a poll event rules list edit panel for an element manager and associated command buttons, that are displayed in the work area and command button area, respectively, of the client graphical user interface of this invention.

FIG. 37I is a rule definition tabbed edit panel for a polling event associated with a hotspot of an element manager and associated command buttons, that are displayed in the work area and command button area, respectively, of the client graphical user interface of this invention.

FIG. 37J is a polling event rule condition definition tabbed edit panel for a polling event associated with a hotspot of an element manager and associated command buttons, that are displayed in the work area and command button area, respectively, of the client graphical user interface of this invention.

FIG. 37K is a trap rule action definition tabbed edit panel for a polling event associated with a hotspot of an element manager and associated command buttons, that are displayed in the work area and command button area, respectively, of the client graphical user interface of this invention.

FIG. 37L is a polling event rule alarm log information tabbed edit panel for a polling event rule for a polling event associated with a hotspot of an element manager and associated command buttons, that are displayed in the work area and command button area, respectively, of the client graphical user interface of this invention.

FIG. 37M is a trap event definition edit panel for a hotspot of an element manager and associated command buttons, that are displayed in the work area and command button area, respectively, of the client graphical user interface of this invention.

FIG. 38 is an illustration of the server object model and containment hierarchy of one embodiment of this invention.

FIG. 39 is an illustration of the server RMI object class hierarchy in one embodiment of this invention.

FIG. 40 is an illustration of the server non-RMI object class hierarchy in one embodiment of this invention.

FIG. 41 is a polling object diagram according to the principles of this invention.

FIG. 42 is a process flow diagram for one embodiment of the auto-discovery process of this invention.

FIG. 43A to 43C are more detailed process flow diagrams of selected operations in FIG. 42.

FIG. 44 is a diagram of the discovery notification structure of this invention.

In the Figures, objects with the same reference numeral are the same object. Also, the first numeral of a reference number for FIGS. 1 to 9 and the first two numerals of a reference number for FIGS. 10 and greater indicate the figure in which the element first appeared.

DETAILED DESCRIPTION OF THE INVENTION

According to the principles of this invention, a managed element server 314 (FIG. 3A) was developed as a comprehensive open, standards-based network management solution for computer networks having a computer network management capability, such as SNMP. Managed element server 314 of this invention efficiently manages a constantly changing and growing computer network 300 which is composed of a wide array of heterogeneous elements, e.g., operating system server 310, which in one embodiment is a Microsoft WINDOWS NT server, workstation 320, which could be for example a DEC, Sun Microsystems, or Silicon Graphics workstation, bridge 330, router 340, and printer 350, that are produced by different vendors, and that support many different platform types. (WINDOWS NT is a registered U.S. trademark of Microsoft Corp. of Redmond, Wash.) The solution of this invention, as described more completely below, is flexible, robust, secure, collaborative, and most importantly works.

Client-server network management system 375 includes a plurality of managed elements, a managed element server 314 that executes on a first computer 310 and at least one managed element client 391 that executes on a second computer 390. Managed element server 314 and managed element client 391 are computer processes that execute from memory of their respective computers. Moreover, prior to loading for execution managed element server 391 and managed element client 391 are stored typically on a non-volatile medium.

Managed element server 314 and managed element client 391 are platform independent computer processes and can be executed on any computer platform that supports the platform independent computer language in which server 314 and client 391 are written. This is particularly advantageous because it is unnecessary to write a different version of the client 391 and server 314 for each of the different computing platforms found on heterogeneous computer network 300. In one embodiment, client 391 and server 314 are written in the JAVA programming language, and are able to take advantage of the languages' inherent simplicity, flexibility, robustness, security, and other object-oriented technology strengths, as described more completely below. (JAVA is a trademark of Sun Microsystems, Inc.)

Client-server network management system 375 provides a new capability for creating a managed element template, called an element manager, for a management-enabled computer network element, such as bridge 331, or workstation 320. Computer 310 has a plurality of element mangers 315 stored on a memory of computer 310. A user can build an element manager without writing a computer program as was required in the prior art. Moreover, since the computer processes are platform independent, the user does not need to be working on a particular type of computer platform to build an element manager. The user utilizes an intuitive graphical user interface (GUI) not only to builder element managers, but also to utilize server 314 in managing computer network elements. FIG. 3B is an example of graphic user interface 376 of this invention.

Graphic user interface 376 includes a visual image 377 of the computer network element being managed, which in this example is a computer network hub. Visual image 377 includes a representation of the components of the computer network element, which in this embodiment includes: ports 1 to 16 that are active components; LEDs 1 to 16, a POWER LED, a set of status LEDs, that are each an LED component; and an input button 378 that is an active button. The user can select one of the components by clicking on the component in a navigation tree 305, or alternatively by clicking on the component in visual image 377. As explained more completely below, navigation tree 305 is a hierarchical representation of the information on server 314 that can be accessed by the user through client 391. An outline 379 is drawn around the selected component, port 1, in visual display 377, and status information about port 1 is displayed on a panel 374 in graphic user interface 376. In this embodiment, port 1 is named a_hotspot Graphic user interface 376 also includes a severity legend bar 311 that allows the user to visually determine the state of the managed computer element by associating the color of the managed computer element with the corresponding color in severity level bar 311. Thus, according to the principles of this invention the color of port 1 is used to communicate to the user the status of the port.

As explained more completely below, the user can configure an element manager for the managed computer element represented by the display in graphic user interface 376 so that port 1 has an outline about the port 1, or port 1 itself has a color. The color of the outline or the color of the port itself gives the user a visual representation of the status, e.g., state of the port. The element manager can also be configured to represent the state of each of the other ports by the color of the port in visual display 377. Similarly, each of the LEDs is assigned a plurality of colors and blink rates. Thus, as a user looks at the visual display in graphic user interface 376, the user is provided the same visual information as if the user where physically present at the location of the managed computer network element. Thus, at a glance, a user can obtain considerable information about the status of the computer network element as represented by visual display 377.

Button Alarms 312B in persistent buttons 312 flashes when the managed computer network element experiences an event that is associated with a alarm. This notifies the user that action may be required in management of computer network 300. The user can determine why button Alarms 312B was activated by reviewing an alarm log that is explained more completely below.

Using graphic user interface 376, the user can initiate action that corrects a problem that generated the alarm, or alternatively, configure server 314 to automatically correct the problem. Also, the user can change the management configuration for the managed computer network element by redefining rules that are used in event management to monitor and control the operation of the managed computer network element.

Through graphic user interface 376. the user can configure server 314 to periodically send user-defined polling event requests. The managed computer network element replies with the requested information to server 314. Depending on the configuration of server 314, actions may also be executed in response to polling events. The event management also supports trap-directed polling. Thus, any user can manage the computer network from a computer connected to the network without being physically present at the location of each managed computer network element. Further, the user does this by using any computer that can be connected to the network independent of the processor or operating system on the computer, and without writing any computer code.

Hence, the intuitive GUI of this invention makes client-server network management system 375 easy to use and hides its complexity. As explained more completely below, the separation of the GUI presentation from the application logic reduces hardware requirements, provides scalability and extensibility, and increases the flexibility of client-server network management system 375. The distributed client-server architecture also promotes coordinated collaboration in that many users can confidently work together simultaneously on shared information which is guaranteed to be consistent for all users. Lastly, a built-in security policy which takes advantage of the security provided by the operating system ensures a controlled environment which prevents unauthorized access and is capable of maintaining accountability.

Client-server network management system 375 is really two applications in one: a visual element manager builder and a manager. As explained more completely below, the visual element manager builder is a visual development environment in which device vendors or network managers may create standardized element management applications, called element managers. The manager provides the run-time environment in which the element managers may be executed to monitor and manage computer network behavior such as network throughput, collision rate, and number of duplicate IP packets, to name a few. No programming is required and the separation between the visual element manager and the manager is seamless and transparent to the user.

According to the principles of this invention, one of a plurality of element managers 315 is associated with each managed computer network element in computer network 300, e.g., an element manager is associated with each of managed computer network elements 310 to 350. Herein, a management-enabled computer network element is any element in a computer network that can be managed using a computer network management protocol, such as SNMP. A management-enabled computer network element can be any hardware or software on computer network 300 that implements the network management protocol by having a network management agent and a network management information database, or a similar process.

Hence, in FIG. 3, workstation 320, bridge 330, router 340, and printer 350 include network management agent 321 and network management database 322, network management agent 331 and network management database 332, network management agent 341 and network management database 342, and network management agent 351 and network management database 352, respectively. Each of network management agents 321, 331, 341, and 351 communicates over network 300 using predefined commands, such as those defined above in TABLE 1, and a predefined protocol, e.g., SNMP. Also, each of the network management agents stores information characterizing the operation of the network element in the network management information database, according to a defined standard, that is associated with the network management agent. The operation of the agents and the storage of data by an agent is the same as in the prior art.

Upon initiation of execution of managed element server 314 or reset of managed element server 314, processing transfers from start/reset 501(FIG. 5) to create server operation 502. In operation 502, managed element server 314 is loaded from disk storage for execution on OS server 310, and processing transfers to initialize user parameters operation 503.

In initialize user parameters operation 503, managed element server 314 accesses a file stored on computer 310, that contains, for example, the name for managed element server 314, a storage location for alarm log files, and a maximum number of entries in each alarm log file, and processes the data in that file. Operation 503 transfers to list managed elements operation 504.

In managed elements operation 504, managed element server 314 first determines whether there are any entries in a startup file stored on computer 310 in additional managed elements check 505. The startup file contains a list of managed computer network elements on network 300 and an address on the network of each managed computer network element. If there is an unprocessed entry in the startup file, check 505 transfers processing to managed element specified check operation 506 and otherwise to create visual element manager builder operation 510.

In managed element specified check 506, managed element server 314 compares the current entry in the startup file with a list of managed computer network elements. If the current entry is in the list of managed computer network elements, check 506 transfers to check 505 and otherwise to specify managed element operation 507.

Managed element server 314 adds the current entry in the startup file to the list of managed elements in specify managed elements operation 507. Operation 507 also returns processing to additional managed elements check operation 505. When all the entries in the startup file have been processed, check operation 505 deletes any managed elements that are in the list of managed elements, but are not listed in the startup file and transfers to create visual element manager builder operation 510.

Managed element server 314 creates a number of objects that utilized by managed element server 314. Specially, in operations 510 to 514, managed element server 314 creates a visual element manager builder 406, a manager 404, a trap server 403, a database browser 405, and a network management application programming interface, respectively. Each of these is described more completely below.

After manager 404 is created, manager 515 creates alarm factory 402 in create alarm factory operation 515. As explained more completely below alarm factory 402 manages alarms generated in response to events that occur in the managed computer network elements. Manager 404 also creates a discovery engine 401 in operation 516.

Discovery engine 401, in discover management-enabled elements operation 517, automatically interrogates each host in network 300 to determine whether the host is running a network management agent in response to initiation of an auto-discovery process by a user through client process 391. Upon detection of a management-enabled computer network element such as workstation 320, discovery engine 401 attempts to associate one of the plurality of element managers 315 with workstation 320 by comparing the system object identification of the discovered computer network element with information stored in a map file. The stored information associates system object identifications with element managers. If discovery engine 401 is able to associate workstation 320 with one with one of the plurality of element managers 315, e.g., element manager 1, discovery engine 401 calls a process that uses element manger 1 to create managed element object 416. Poll server 417, and event engine 418 are also created for managed element object 416. If discovery engine 401 is unable to associate the management-enabled computer network element with an element manager, a poll server and event engine are not created for the management-enabled computer network element, and a predefined element manager name, e.g., EMNotFound, is assigned to the management-enabled computer network element.

Upon completion of discover management enabled elements operation 517, each management-enabled computer network element either has a managed element object and an associated poll server and an event engine, or is assigned the predefined element manager name. Thus, a plurality of managed element objects 415 are created and each managed element object has its own poll server and event engine.

Poll server 417 creates a thread for each polling event (request) specified in poll events of managed element object 416. Poll server 417 also performs single network management operations. When poll server 417 receives a response to polling event, the data in the response is passed to event engine 418 for evaluation. Poll server 427 performs similar operations for managed element object 426.

A poll event in a managed element object contains information on a set of attributes that need to be polled, a default polling interval, a current polling interval that is being used, and a set of flags that are used to determine if polling is turned on or off for the event, and if the polling results are to be logged. The poll event also contains a list of states and an associated polling interval for each state. A poll event is processed by the poll server only when the managed element component associated with the poll event is in one of the listed states. The primary purpose of states is to classify the status of a component. States may also serve as transition points between changes in modes of operation of a component.

In contrast to the trap-based approach to computer network management, with a polling-based approach, the network picture is constructed based on information which managed element server 314 explicitly requests. This is advantageous in that managed element server 314 has full control and is able to get a full picture of the network status. However, this method also has its shortcomings, the biggest one being timeliness. If managed element server 314 requests information too frequently, network bandwidth is used up. If managed element server 314 waits too long between requests, response to critical events may be too late. Another disadvantage is that in either situation, the requests introduce additional traffic onto the network.

Managed server element 314 allows polling events which are used to solicit the information from a computer network element, or any of its components. As just explained, the frequency of the polling request is set initially set by the individual that builds the element manager for the computer network element. However, if the polling request frequency adversely affects the computer network performance, the polling frequency for the managed element object can be modified to achieve optimal performance vs. polling frequency.

A trap-directed polling approach to network management was popularized in an attempt to take advantage of the strengths of the two other techniques while mitigating their weaknesses. With this approach, when an extraordinary event occurs, a single trap event is sent to managed element server 314, which in response to the trap, polls the managed computer network element for more information regarding that event. This method has turned out to be very effective, keeping the effect on managed computer network elements, and on computer network bandwidth down while supporting timeliness. Since traps are not reliably sent, low frequency polling is still necessary.

Managed element server 314 supports trap-directed polling allowing association of polling events with states. In other words, the polling request takes place when the computer network element/component is in a specified state. The rules are defined such that this state is only entered when a particular trap event occurs. This state-dependent polling feature helps to reduce polling traffic.

Event engine 418, in this embodiment, is an event rule engine. Event engine 418 process all polling events, and all trap events for the managed computer network element associated with managed element object 416. Event engine 418 uses event rules 412 to determine the action that should be taken in response to each polling event, and each trap event. The combination of event engine 418 and event rules 412 is a sophisticated state machine and rules engine which allows pro-active management of a managed computer network element. Each active component of a managed computer network element has a state, which is defined within the managed element object. For example, a port of a hub might have normal, warning and alarm states. These states are in event rules 412 to accurately manage a device, by triggering alarms based on sequence of events rather than simple threshold conditions.

For example, an administrator of network 300 may decide that an alarm should be triggered on a port only if a threshold condition is passed continuously for one minute, i.e., a persistence condition is satisfied. With client 391, the administrator can set up a set of rules within event rules 412 which say that the first time the threshold is passed, the port is put in the warning state and the polling rate is increased. If the port remains over the threshold for the rest of the minute, the port is put in the alarm state and an alarm is triggered.

Event rules 412 also allow a network administrator to execute scripted actions when a rule is triggered. In the example above, the administrator might want the port switched off or reset if the error occurs, and using an appropriate rule can save the administrator from having to perform the action. Using rules like this can dramatically reduce the time and complexity of managing a computer network, such as computer network 300.

In response to the result of a poll of the managed computer network element, event engine 418 determines the current state of the element component for the poll event. Next event engine 418 loops through all the rules in event rules 412 for the polling event to determine whether there is a rule that can be applied for the current state. If there is such a rule, event engine 418 uses the information returned in the result of the poll to evaluate the rule. If the rule is true, and any persistence condition is satisfied, the action specified in the rule is executed. The action specified in the rule can be one or more of: executing a system command, logging an event to alarm log 419, and changing the state of the element component for the current state.

In response to a trap event from the managed computer network element, event engine 418 determines the current state of the element component that generated the trap. Next event engine 418 loops through all the rules in event rules 412 for the trap event to determine whether there is a rule that can be applied. If there is such a rule, event engine 418 evaluates the rule using data sent in the trap. If the rule is true, and any persistence condition is satisfied, the action specified in the rule is executed. The action specified in the rule can be one or more of: executing a system command, logging an event to alarm log 419, forwarding the trap event to a host, and changing the state of the element component for the current state. If there is no rule for the trap in event rules 412, event engine 418 logs the trap into alarm log 419.

In one embodiment, event engine 418 can be thought of as a finite state machine that has three user-defined parameters: the managed element component states, events which trigger rule evaluation, and rules which specify what state transition or other action to perform when a given event condition is satisfied. States identify the current status of the managed element component, sometimes simply referred to as component. Events are polling or trap events which a component may experience. Rules are if-then type statements whose condition (if-part) is evaluated each time the corresponding event takes place and whose action (then-part) is executed if the condition is satisfied. FIG. 5C depicts the relationship between the three parameters.

States s1, s2, s3, and s4 are the states that the component can possibly have. Polling events p1, p2, and p3 are user defined. Polling event p1 is performed in either states s1 or s2. Polling event p2 is performed only if the component is in state s3, and polling event p3 is performed only if the component is in state s4. Here, a polling event is performed by polling the component. The user can specify, using client 391, different polling intervals for polling event p1 in states s1 and s2. Polling event rules p1r1, p1r2, and p1r3 are user-configured rules for polling event p1. Polling event rule p1r1 is picked to evaluate the polling result of polling event p1 when the component is in state s1, i.e., polling event rule p1r1 has a requisite state of state s1. Polling event rules p1r2 and p1r3 are used to evaluate the polling result when the component is in state s2. If the condition of polling event rule p1r2 is evaluated true, the component transitions from state s2 to state s3. Hence, since polling event rule p1r3 is evaluated only when the component is in state s2, polling event rule p1r3 is not evaluated. Polling event rules p2r1 and p3r1 are rules defined for polling events p2 and p3 respectively.

It is also possible to define more than one polling event for one particular state. For each polling event defined, there are associated rules for that state. So depending on the polling interval and polling result, different rules can be applied.

As explained more completely below, event rule engine 418 works in a similar same way for trap events except traps can appear when the component is in any state.

After alarm factory 515 is created, alarm factory 515 loads an existing alarm log for each managed element object, e.g., alarm logs 419 and 429. Alarm factory 515 also passes handles to the element alarms in each managed element object, e.g., element alarms 413 and 423. Element alarms 413 and 423 contain the alarms for the managed element. Each alarm has a unique identification. A user can view the alarm logs through client 391. The user can view the alarms for all managed computer network elements, for a group of managed computer network elements, for a specific computer network element, or, for a component of a specific computer network element. When an alarm is received, button Alarms 312B on client GUI 376 is activated, and if the alarm is associated with a particular component, the appearance of the component may be changed in response to the alarm.

Trap server 403 receives all traps from other hosts on network 300. If a received trap is from one of the managed elements, e.g., element 320, represented by the plurality of managed element objects 415, Trap server 403 copies the data in the trap to a buffer, and notifies the event engine, e.g., event engine 418 for the managed element that generated the trap. Event engine 418 processes the trap data as described above.

As explained more completely, a user can specify the rules for each trap event and each polling event. Through definition of the polling and trap events and the set of rules, an accurate picture of extraordinary element behavior can be constructed automatically, and advance problem analysis can be performed automatically. According to the principles of this invention, a filtering mechanism allows definition of which traps managed element server 314 should acknowledge. All other traps are ignored.

Notice that the portion of managed element server 314 described above is independent of any graphic user interface. The logic and structure of manager 404 of managed element server 314 is cleanly separated from the graphic user interfaces described more completely below. Further, in one embodiment, the portion of managed element server 314 preferably is written in a computer language, such as the JAVA computer language that is platform independent. Consequently, managed element server 314 can be executed on any platform that is JAVA enabled independent from the type of platform. This greatly simplifies the generation of the managed element server 314, because it is unnecessary to port managed element server 314 to each type of computer platform that could be conceivably found on computer network 300.

Managed element server 314 also interacts with managed element clients such as managed element server client 391 on portable personal computer 390, managed element server client 361 on personal computer 360, and managed element server client 371 on workstation 370. Multiple managed element clients can connect to managed element server 314, and can view and manipulate the plurality of managed element-objects 415.

Each of managed element server clients 361, 371 and 391 provides a graphic user-interface 375. In one embodiment, the managed element server client is implemented as a JAVA applet and is running inside a World-Wide Web Browser or a JAVA Applet Viewer. The JAVA applet is downloaded from managed element server 314. The JAVA applet includes the structures described more completely below. Briefly, the applet includes information that allows a user a) to monitor the operation of each of the managed computer network elements, b) to edit the event management for the managed computer network elements by reconfiguring the event management model in the element manager object for the network element, and c) in one embodiment, to build and edit element managers using a visual element manager builder 406.

To run a managed element server client, sometimes simply called a client, a user must have a valid user name and password on managed element server 314. In this embodiment, clients 361, 371, and 391 communicate with managed element server 314 through JAVA remote method invocations (JAVA RMI). Clients 361, 371, and 391 send requests and receive synchronous responses by invoking remote methods on managed element server 314, and server 314 sends asynchronous notifications to clients 361, 371, and 391 by invoking remote methods on clients 361, 371, 391. The operation of RMI is known to those of skill in the art and so is not described in detail herein.

In this embodiment, the client processes are computer platform independent. This means that the client process can be executed independent of the particular processor and operating system in the computer on which the client is executed. In general, it is desirable to have most of the client process platform independent, because this minimizes any platform specific code that must be written to support execution of the client process on a particular computer platform. This also facilitates downloading the client process from server 314.

FIGS. 6A and 6B illustrate other specific instances of the client graphic user interface 600A and 600B, respectively. The various areas 601 to 604 are the same in both instances, but the information displayed in a particular area is determined by the managed computer network element selected as well as the specific information concerning the managed computer network element of interest.

In general, header area 601 displays a NetPrism logo 610, persistent buttons 312 and context-sensitive information. When the computer network element displayed in element image area 602 is managed by managed element server 314, i.e., has a managed element object in server 314, header area 601 also contains a severity legend 311. Severity legend 311 shows the current state of the managed element, if only the managed element has been selected.

The primary purpose of severity legend 311 is to visually identify the current level of criticality associated with the managed element or one of its components. In this embodiment, there are six severity levels supplied by managed element server 314. Each severity level has a name, description, priority, color, and blinking speed. The last two attributes specify how a component appears when the component enters a state with the associated severity level.

In this embodiment, the severity level attributes cannot be edited. This restriction prevents conflicts between different vendors since severity levels apply to all managed computer network elements. TABLE 3 lists one embodiment of the severity levels and the attributes of each level. The definitions in TABLE 3 are illustrative only and are not intended to limit the invention to the particular definitions presented. In view of this disclosure, those of skill in the art can define severity levels that are used in a particular management situation.

TABLE 3

SEVERITY LEVEL DEFINITIONS

| REF. NO. | NAME | PRIORITY | COLOR | BLINK SPEED | DESCRIPTION |
|---|---|---|---|---|---|
| 311A | FatalErr | 1 | Red | Fast | Complete loss of functionality |
| 311B | Critical | 2 | Orange | Fast | Severe problem experienced |
| 311C | Warning | 3 | Yellow | Slow | Potential problem |
| 311D | Normal | 4 | Green | None | Operations as expected |
| 311E | Unknown | 5 | Gray | None | Operational performance unknown |
| 311F | Disabled | 6 | Blue | None | Administratively disabled |

Persistent buttons 312 includes a logout button 312A, an alarms button 312B, a MIB browser button 312C, and a help button 312D. Persistent buttons 312 are constantly displayed in header area 601. The user activates, i.e., clicks on, logout button 312A to logout from managed element server 314. When a user logs out, all element managers, managed elements, and their attributes are saved. In addition, managed element server 314 continues to monitor the managed elements, i.e. event processing and rule evaluation continues. This ensures that the next time the user logs on and initiates a client process, component status and alarm history are current.

When the user activates button Alarms 312B, an alarm history log of all managed computer network elements in network 300 is displayed in work area 603. The selection of particular alarms is described more completely below.

In this embodiment, the network management protocol is SNMP, and so network management data are MIBs. Recall as described above, SNMP-capable computer network elements may be detected by discovery engine 401, but discovery engine 401 may be unable to associate an element manager with a computer network element. In such a case, a user may activate button MIB Browser 312C to manage the element.

Upon clicking on button MIB Browser 312C, a MIB browser, e.g., general database browser 405, is launched. The MIB browser uses another graphical user interface that is described more completely below. The MIB browser allows the user to view a MIB Tree and to get and set MIB variables assuming that the permissions allow the user to perform such operations. The MIB browser is also useful for determining instance numbers for MIB variables. Hence, if no element manager exists for a SNMP-capable computer network element, the current invention still permits the user to manually perform some basic network configuration with the MIB browser.

To access on-line help, the user activates button Help 312D. In one embodiment, on-line help is available in Adobe PDF format and in stand-alone HyperText Mark-up Language (HTML) format.

Element image area 602 is an area which is reserved to display a computer network element image which is an image chosen to represent the selected managed computer network element. As explained more completely below, components of a computer network element that are used in management of the computer network element are called hotspots. During management of the computer network element, the appearance of the hotspot provides element status information, e.g., the color of the hotspot is changed to show the state, severity level, of the component. In FIG. 6B, CPU Usage 633, and Cache Memory 634 are embedded graph hotspots. Thus, status information 633 and 634, in the form of graphs, is provided in element image area 602.

Navigation tree area 604, in this embodiment, displays a navigation tree 305 that is an object-oriented hierarchical representation of objects which represent (i) element managers and their attributes and (ii) managed elements and their attributes. Two alternative embodiments of managed element server 314 are possible. A first embodiment includes visual element manager builder 406, and a second embodiment does not include visual element manager builder 406. If visual element manager builder 406 is not included in server 314, element manager folder 641 is not displayed in navigation tree 305.

Root 640 of navigation tree 305 represents managed element server 314, and its name may be configured in a configuration file, that is described more completely below. Each distinct element attribute is represented by a separate node in tree 305. Attributes are either properties of the real physical computer network element or protocols indicating how the computer network element will be/may be managed. As explained more completely below, attributes may be accessed and modified through navigation tree 305. Similar attributes are grouped together in folders, and some folders may also be attributes in themselves. The hierarchical structure of tree 305 parallels the "is an attribute of" relationships of the real element.

FIG. 6C is an illustration of a standard navigation tree 305. Folders, e.g., folders 641 and 642, are containers for other folders or attributes. A user expands or collapses a folder by clicking on the plus sign, or minus sign associated with the folder. In FIG. 6C, the user clicked on the plus sign(not shown) for element manager folder 641 and so folder 641 was expanded to obtain the structure shown. Managed element server 314 distinguishes between two types of folders, those which are created by server 314 and serve solely as containers, and those which serve as both a container AND an attribute. The former type is visually identifiable by the presence of a folder outline in its icon and is referred to as a specialized folder, e.g., folders 660 to 661. Specialized folders contain objects of the same type. The latter type does not have a folder outline in its icon and is simply referred to as a standard folder, e.g., standard folders 650, 651, 652. These folders represent a single object, but the single object may contain many different types of objects. Clicking on any folder displays the contents of the folder in work area 603. Double-clicking on a standard folder opens the folder and displays a panel containing the parameters of its attributes in work area 603. Double-clicking on a specialized folder just toggles the folder between open and closed.

Thus, in navigation tree 605, element mangers, managed elements, specific hotspot attributes, specific states, specific polling events, specific traps and specific rules are each represented by a non-folder icon. While the collection of element manager, the collection of managed elements, the collection of hotspot attributes, the collection of hotspot states, the collection of hotspot polling events, the collection of hotspot trap events, and the collections of rules are each represented by a folder icon that contains the collection.

Attributes, as used here, are similar to files in graphical file systems in that they contain information pertaining to the named attribute which can be displayed by double-clicking on the attribute node. Managed element server 314 supports the following computer network element attribute types:

(i) element hotspots representing (a) components, e.g., ports, LEDs, jacks, meters, connectors, switches, etc., (b) action buttons, and (c) embedded graphs;

(ii) MIB variables associated with the element hotspots and the variable' static attributes, e.g., type, access, etc.;

(iii) states which visually identify the criticality of an element hotspot's current condition;

(iv) polling and trap events associated with the element hotspot; and (v) rules associated with events which cause a element hotspot state change or other action to take place when a specified criteria is satisfied.

Clicking on a pure attribute node of navigation tree 305 has no effect. Double-clicking on the node displays a panel containing the parameters of the attribute in work area 603. If the selected folder or attribute is associated with a computer network element, an image representing the physical computer network element is displayed in element image area 602.

Work area 603 is equivalent to a dialog box of a world-wide-web browser. In other words, this is the primary area that the user utilizes to enter any information. All information related to a node is displayed in this area in logical units called panels. Whenever a folder type, standard or special, in navigation tree 305 is selected, a panel containing a list of the items in the folder is displayed in work area 603. Whenever a user double-clicks on a node of navigation tree 305 which has associated attributes, a panel containing the parameters of the attribute is displayed in work area 603.

In this example, graphic user interface 600A (FIG. 6A) is displayed by client 391 on portable PC 390. The user is checking the status of the number of hits on server 380, that in this embodiment is a Netscape Enterprise server Pop-up graph 631 shows the number of page hits the site is receiving. Table 632 shows more detailed information about the server processes.

Graphic user interface 600B (FIG. 6B) also is displayed by client 391 on portable PC 390. The user is checking the status of CPU and memory usage of WINDOWS NT workstation, e.g., workstation 320. Graphs 633 and 634 in area 602 show CPU and memory utilization, respectively. Table 635 contains detailed information about the memory installed on the workstation.

Element managers make configuration of management-enabled computer network elements simple. Since managed element server 314 includes a visual element manger builder 406, any computer network element manufacturer can easily build an element manager that results in optimal management of the computer network element. Alternatively, an administrator can build an element manager for a computer network element remotely through client 391 by selecting components in for element manger, and defining characteristics of those components in their associated attribute tables. As explained more completely below, in one embodiment, there are four possible types of managed element components, an active component, a LED component, an embedded graph component, and an action button.

The attribute table contains descriptions of each attribute of the component, saving the user from having to understand the complexities for the managed computer element's MIB. The attribute table also contains management information, for example, whether the MIB is being polled, and what the current value is. For more advanced configurations, full access to GET and SET variables in the managed computer network element's MIB tree is allowed.

As described above the client-server network management system of this invention features a three tiered client-server architecture 700. Architecture 700 includes a plurality of clients 702, managed element server 314, and managed elements 701. In the embodiment, where server 314 is implemented using a platform independent language such as the JAVA programming language, the JAVA RMI is used for communications between clients in plurality of clients 702 and server 314. Also, as indicated above, in this embodiment, network 300 uses TCP/IP and the network management protocol is SNMP. This embodiment is used through the remainder of the disclosure. However, the utilization of a particular programming language, network protocol, and network management protocol is illustrative only and is not intended to limit the invention to this particular embodiment. In view of this language, those of skill in the art can implement the invention in a wide variety of ways.

Managed element server 314 is a GUI-less component that manages a domain of SNMP devices, i.e., a plurality of managed elements 701. Each managed computer network element, sometimes called a managed element, s represented by a managed element object. Managed element objects are persistent and kept in a server database 705 on a non-volatile storage system 710. Server database 705 is implemented using JAVA serialization.

As described above, multiple clients can connect to managed element server 314 and view and manipulate managed element objects. As indicated above, server 314 is written in the JAVA programming language, with only a small portion of the native code written in the C programming language. In one embodiment, server 314 is running on a WINDOWS NT, Version 4.0 platform. In another embodiment, server 314 runs on a Sun SOLARIS platform.

In this embodiment of architecture 700, a HTTP server 714 is required to provide an initial bootstrap HTML page to the World-Wide-Web browser that supports client 391. Once this page is loaded, the JAVA applet embedded in the page communicates directly with server 714. After the initial page is loaded, HTTP server 714 is only used to download JAVA classes and image files to client 391.

Managed elements 701 are SNMP-enabled devices which are managed by server 314. Typical managed elements 701 include hubs, routers, switches, bridges, and work stations. In general, a managed element can be any hardware of software entity that implements SNMP protocol, e.g., printers, applications, etc.

The system requirements for running managed element server 314 in one embodiment are:

Microsoft WINDOWS Environment
Server 314
Pentium 166 MHz, Pentium Pro 200 recommended
32 MB RAM minimum, 64 MB recommended
Hard disk with at least 100 MB free hard disk space
WINDOWS NT 4.0 Operating System
JDK 1.1.3 or higher runtime environment
Any HTTP web server
Client 391
Pentium 166 MHz or higher PC
32 MB RAM minimum
800×600 or higher resolution monitor
WINDOWS 95 or NT 4.0
JDK 1.1.3 or higher Appletviewer
Sun SOLARIS Environment
Server 314
Sparc 5 or higher workstation
32 MB RAM minimum
Hard disk with at least 200 MB free hard disk space
SOLARIS 2.5 Operating System
JDK 1.1.3 or higher runtime environment
Any HTTP web server
Client 391
Sparc 5 or higher workstation
32 MB RAM minimum
SOLARIS 2.5 Operating System
JDK 1.1.3 or higher Appletviewer Element Managers Element manager 800 (FIG. 8), which is representative of each element manager in the plurality of element managers 315, typically is stored in a memory 890 of computer 310. As explained above, when element manager 800 is associated with a specific computer network element, element manager 800 is used in generating a managed element object that in turn executes on manager 404 (FIG. 4) of managed element server 314. Hence, effectively, element manger 800 is executed on manager 404.

Element manager 800 (FIG. 8) is a standardized, cross-vendor structure that can be built using visual element manager builder 406(FIG. 4), as described more completely below, to support any computer network element that can be managed using the network management protocol. Element manager 800 is an abstract representation of the managed computer network element that when executed on manager 404 of managed element server 314 manages and monitors the managed computer network element associated with element manager 800.

The information stored in element manager 800 is divided into two categories, basic information 801 and event management information 802. Basic information 801 includes (i) visual display information 810 that is used to provide a user with a visual display of the managed computer network element in element image area 602, (ii) hotspots of the managed computer network element, and (iii) attributes of each hot spot.

Visual display information 810 includes a combination of components representing the features of the managed computer network element that may be used in management of network 300. In this embodiment, the components include: (i) active components, such as ports, jacks, meters, or connectors; (ii) indicator components, such as LEDs: (iii) command buttons such as off/on switches, or reset switches; and (iv) embedded graphs for the managed computer network element.

As explained above, the components of the computer network element, that are actually utilized in the management of the element, are referred to as hotspots. Typically, there is one hotspot per component, but if necessary, more than one hotspot can be defined for a component. The important aspect is that a hotspot is defined for each characteristic of the managed element that is used in computer network management. Attributes, that define and characterize each hotspot, are also stored as a part of element manager 800. A user can click on components in the computer network element image to see attributes which can be monitored. For example, when managing a hub, element manager contains a picture of the front panel of the hub that is displayed in element area 602. Clicking on a port on the hub shows attributes of that port which can be monitored, for example, the number of packet collisions.

Event management information 802 of element manager 800 includes an event management model for the managed element. As explained more completely below, one feature of this invention provides the user with a series of GUI panels, called a wizard, to define the operations that are performed by the event management model. Based upon the information that is provided by the user, an event management model is constructed and stored as a part of element manager 800. Briefly, using this invention, the user builds an event management model that proactively and automatically detects over time specified network conditions and takes automated actions in response thereto.

In one embodiment, as described above, the event management model is a set of rules associated with a managed computer network element which causes specified actions to take place when a specified criterion is satisfied. A rule is evaluated upon occurrence of a predefined polling event or trap event for the managed computer network element. A typical criterion is testing whether a network management variable value has exceeded some threshold value. The specified actions can include, for example changing a component's state, executing a server operating system command, forwarding a trap to another host, and/or logging pertinent information. The severity associated with a element component's state is visually highlighted in the visual display of the managed element, and a visual cue notifies the user whenever information is logged. By carefully defining the polling and trap events and the set of rules, an accurate picture is constructed of extraordinary element behavior and advanced problem analysis is automatically performed to aid in common network management strategies including configuration management, fault management, and performance management.

In this embodiment, as described above, the management model can be thought of as a finite state machine. The management model has three user-defined parameters: the component states, events which trigger rule evaluation; and rules which specify what state transition or other action to perform when a given rule condition is satisfied. The component states identify the status of the component. Events are polling or trap events which a component may experience. Rules, in this embodiment, are if-then type statements whose condition (if-part) is evaluated each time the corresponding event takes.

Building an Element Manager

In one embodiment, managed element server 314 includes a visual element manager builder 406. Visual element manager builder 406 is a standardized visual environment which gives the user the ability to easily build an element manager which, as described above, provides an abstract model of a real physical computer network element and management information for that element. In this embodiment, the managed computer network elements are limited to SNMP-capable host systems such as workstations and terminal servers, router systems, and media devices such as printers, hubs, bridges, and repeaters. Components may include jacks, ports, meters, switches, connectors, LEDs, etc., to name a few.

Visual element management builder 406 runs on any platform on network 300 which supports a World-Wide-Web browser that in turn supports JAVA Development Kit (JDK), Version 1.1.1 or higher of Sun Microsystems. Preferably, either an applet viewer or Sun Microsystems' HOTJAVA browser are used. (HOTJAVA is a trademark of Sun Microsystems, Inc. of Palo Alto, Calif.) However, any World-Wide Web browser that reliably supports JDK Version 1.1.1 or higher may be used.

Visual element management builder 406 gives the user the ability to build element managers with characteristics such as: an image to represent the physical computer network element; logical component hotspots of the element, e.g., the device itself, ports, LEDs, used to monitor MIB variables; action button hotspots used to set MIB variable value(s) when the button is pressed; embedded graph hotspots used to display the value of MIB variable(s) over time; rule-based event management models for any hotspotted component; alarm conditions, alarm logging text, and alarm representation attributes; and a wizard mode which guides the user through any multi-step process such as building a basic element manager. The user does not need any ability to write computer code, but rather only the ability to answer the questions presented by builder 406.

Once an element manager is created using visual element management builder 406, a user can test and verify the element manager's accuracy using managed element server 314. After the element manager has been fully tested, a device manufacturer can distribute managed element server 314 and the element manager along with the device to customers of the device manufacturer. The customers can use server 314 and the element manager to monitor/manage the device, or to customize and further refine the network management strategy built into the element manger.

Visual element management builder 406, which is implemented via a client process and server 314, is unique in its feature set, and unique in that is employed through a World-Wide-Web browser as a JAVA applet. As such, visual element management builder 406 inevitably has a different look than the every-day word processing and spreadsheet-type applications which are known so well. Visual element management builder 406 preserves as much behavior of common well-known applications as possible. However, visual element management builder 406 also introduces a new look which is described more completely below. In this embodiment, the GUI layout for visual element management builder 406 is similar to the GUI layout displayed in FIGS. 6A and 6B.

Recall that element managers include information that falls into two categories. Basic information 801 defines the core properties of the computer network element, including image 810 representing the computer network element, hotspots 811 of the computer network element, and MIB variables 812 associated with each hotspot. Event management information 802 defines how the computer network element is dynamically managed, and is defined by a rule-based event management model of the computer network element. The process of building an element manager is a two step process. In the first step, as described more completely below, basic information 801, i.e., a core description of the computer network element is built by having the user sequentially answer questions about the computer network element. In the second step, the user again answers questions to build event management information 802.

Visual element management builder 406 makes creating an element manager easy by using wizard panels, which guide a user through a set of steps required to build the element manager. Initially, the user invokes visual element management builder 406. To do this the user must first log onto managed element server 314 via a client process as described above. The client communicates with server 314 using JAVA RMI (FIG. 7). After logging in the user is presented with a GUI that is similar to those in FIGS. 3B, 6A and 6B.

Any time after logging in, the user clicks on element managers folder 641 in navigation tree 305 (FIG. 6C) to initiate building of an element manager. See FIGS. 6A, 6B, and 6C. In response to the user selecting element managers folder 641, element managers folder 641 is highlighted in navigation tree 305. In addition, a panel, such as panel 900 (FIG. 9A) is displayed in work area 603. (Herein, the terms highlight and select both refer to the action of clicking the left-most computer mouse button, but highlight indicates that after the action of clicking, the item clicked on is highlighted) Title 901, "Element Managers List" indicates to the user the type of information displayed in panel 900. A name and description 902 of each object at the next hierarchical level within element managers folder 641 is listed in panel 900. A set of command buttons 903 are also displayed.

Using panel 900 and in particular command buttons 903, the user can add an element manager, edit an existing element manager, copy an element manager, remove an element manager, or export an element manager. Thus, to build a new element manager, the user activates button Add 903A. Typically, to activate a command button, or a button in general, the user clicks on the button, or when the button has a frame around it, as button Add 903A does, the user can simply press the enter key on the user's keyboard.

Upon activating button Add 903A, wizard panel 910 (FIG. 9B) is presented in work area 603. A wizard panel is visually characterized by a plurality of command buttons 904. The plurality of command buttons 904 is presented on each wizard panel. The plurality of command buttons are a plurality of edit command buttons. Button <<Back 904A is disabled on the first panel of a wizard sequence. Button Next>> 904B is disabled on the last panel of the wizard sequence. Button Exit 904C changes to a button Finish 904E on the last panel of the wizard sequence. Activating button Exit 904C saves incomplete work and exits visual element management builder 406. Activating button Cancel 904D exits visual element management builder 406 without saving incomplete work.

Title 911, "Describe the Element Manager" indicates to the user what information is to be entered via panel 910. Panel 910 ask for three pieces of information: an element manager name 912; a description of the element manager 913; and a background image 914.

The user enters a name for the new element manager in element manager name text field 918. Typically, the name should be the same as the name of the physical computer network element. The name appears in navigation tree 305 after the element manager has been created. The name may contain spaces if the computer operating system supports spaces in file names. The name is case sensitive if the computer operating system is case sensitive. (The computer operating system is the computer operating system on the computer on which managed element server 314 runs.) The name must be unique and care must be taken to choose a specific enough name to minimize the chance of a name clash with an element manager created by another vendor.

Entry of a description of the element manager in description text field 917 is optional. The description is displayed in the element mangers list that is displayed in work area 603. See FIG. 9A.

Background image 914 is the visual display image that is presented in element image area 602. Initially, the default background image <None> is displayed in field 915. The user selects an appropriate background image for the computer network element by activating button 916. Activation of button 916 displays a drop-down list (not shown) that lists each of the image files stored in a first predefined directory on a non-volatile storage system of computer 310, e.g., a directory with a path netprism\users\images. In one embodiment, only GIF and JPEG image file formats are supported. An example of a background image 960 for a Fujitsu hub is presented in FIG. 9C. If the image of the computer network element is not important, a dummy blank image can be used. The background image need not be elaborate so long as the image depicts the location and markings of each component that is used in computer network management. Viewing the background image is easier if the dimensions of the image are small enough to fit in element image area 602 without scrolling.

FIG. 9D is an example of the GUI after the information has been entered in fields of panel 910. The information in header area 601 and element image area 602 is displayed in each subsequent panel of visual element management builder 406, and so only the information that changes is described below. After the user has completed describe new element manager operation 1001(FIG. 10) by completing panel 910, the user activates button Next>> 904B to proceed to next wizard panel 1110 (FIG. 11) and to select MIB definition files operation 1003 (FIG. 10).

Again wizard panel 1110 (FIG. 11) is displayed in work area 603, as is each of the wizard panels, and so this aspect of the invention is not pointed out again in the following description. Title 1111, "Select the MIB Files to Use With the Manager," tells the users the action that is to be completed with panel 1110. Panel 1111 has two list boxes 1114 and 1117. Each of list boxes 1114 and 1117 has a heading, headings 1112 and 1113, respectively, that describes the information displayed in the respective list box.

In selectable MIB files list box 1114, a list of MIB files 1112 is displayed. The MIB files in the list are those stored in a second predefined directory on non-volatile storage system of computer 310, e.g., a directory with a path netprism\users\mib. All MIB-II and MIB-I definition files are supported and must be placed in the second predefined directory prior to starting to build the new element manager. MIB definition files can be obtained from the vendor of the computer network element.

The user highlights the MIB definition file(s) in the MIB Files list which contain MIB variables that the user wants to associate with the computer network element or any of the components of the computer network element. After the user highlights one or more MIB files, button Move>> 1115 is enabled. The user activates button Move>> 1115 to copy the names of highlighted file or files to manager MIB files list box 1117. This places a pointer to the files in the new element manager. Upon completion of selection MIB definition files operation 1003, the user activates button Next>> 904B to proceed to the next wizard panel 1210 (FIG. 12A) and specify hotspots operation 1004.

Wizard panel 1210, a hotspot definition panel, is part of a GUI that has the background image in element image area 602 and hotspot definition panel 1210 in work area 603. In addition, a hotspot editor 1250 (FIG. 12B) is displayed in header area 601 of the GUI. The user defines a hotspot in define hotspot operation 1301 by clicking and dragging the mouse in the element image to draw an outline around a component. This operation is not illustrated in the drawings, because the operation is similar to those commonly performed in computer drawing programs, and so an illustration is not required for one of skill to understand what is required to define a hotspot.

As explained above, there are four types of hotspots, i.e., active component, LED indicator, button, and embedded graph hotspots. Active component hotspots are used to visually identify a logical component of the network computer element and the current state of the logical component when the computer network element is managed. Similarly, LED indicator hotspots are used to visually identify an LED and its current state when the computer network element is managed. Button hotspots are used to set a MIB variable with a single button action during computer network element management, and graph hotspots are used to graph a MIB variable value over time during computer network element management. Each hotspot may have any number of MIB variables associated with the hot spot.

To associate MIB variables with the computer network element itself, a symbolic component outline (hotspot) is drawn to represent the computer network element. For example, the symbolic component outline used to define this hotspot could be drawn to surround the computer network element's logo image or be placed in some other meaningful area which will not be confused with a real component of the computer network element. Hotspot outlines should not be contained within one another or else it may not be possible to differentiate between the resulting hotspots.

The hotspot can be moved and/or resized using standard moving and resizing methods with the mouse. Alternatively, precise pixel values can be entered in geometry field 1215. Specifically, the x and y coordinates and the height and width of the component can be entered. A hotspot can be removed by selecting the hotspot and clicking scissors icon 1251 in toolbar 1250.

After define hotspot operation 1301(FIG. 13) is completed, i.e., the outline is drawn, the user uses toolbar icons 1251 to 1258 in toolbar 1250 to change the visual characteristics, e.g., color, shape, line thickness, and fill of the outline, as desired in define hotspot visual appearance operation 1302. TABLE 4 defines the operation of each icon in toolbar 1250.

TABLE 4

Hotspot Editor Toolbar Icon Function Definition

| Icon Reference No. | Function |
|---|---|
| 1251 | Cut |
| 1252 | Copy |
| 1253 | Paste |
| 1254 | Square Outline |
| 1255 | Circular Outline |
| 1256 | Outline Line Thickness |
| 1257 | Fill |
| 1258 | Outline Color |

When a computer network element is being managed, hotspots for components which experience an exceptional event are displayed with the visual characteristics specified here. The only visual characteristic which does not carry over is the color of the outline, since the color is dependent on the severity of the event. See Table 3 above. The visual appearance of graph and button hotspots is unaffected during computer network management.

In addition to geometry field 1215, panel 1210 contains a name text field 1212, a description text field 1213, and a type field 1214. Each of fields 1212 to 1214 is labeled for easy identification by the user.

In name operation 1303, the user enters a name for the hotspot in name text field 1212. Preferably, the name entered is the same as the name of the physical component which the hotspot represents or some other meaningful name so that a user of the element manager can immediately associate the name with the correct component in element image area 602. The hotspot name must be unique for the computer network element.

The user enters a description of the hotspot in description text field 1213 to complete description operation 1304.

The user selects the hotspot type in specify type operation 1305. Specifically, the user activates button 1216 and a drop-down list is displayed of the permissible hotspot types, which, as described above, are active component, LED indicator, button, and graph. The user selects one of the four types and that type appears in type field 1214.

After name operation 1303 and specify type operation 1304 both are completed, checks 1306 and 1307 are made to determine whether a button hotspot, or a graph hotspot was specified. If a button hotspot was specified, a wizard hotspot properties panel 1400 (FIG. 14A) is displayed in work area 603. If a graph hotspot was specified, a wizard hotspot properties panel (FIG. 14B) is displayed in work area 603. If neither a button hotspot nor a graph hotspot was specified, processing fall through checks 1306 and 1307 to additional hotspot check 1308 that is described below.

In wizard hotspot properties panel 1400, the name of the selected button hotspot appears in hotspot field 1410. The user can change the selected hotspot by activating pull down menu button 1411 which in turn results in the display of a menu of the name of each button and graph hotspot that has been previously defined. This allows the user to edit information that was previously entered as well as provide information for the button currently selected.

In label operation 1320, the users enters in button label text field 1412, a label as it is to appear on the button. In style operation 1321, the user selects one of a normal and a transparent style for the button hotspot by activating drop-down list button 1414 and then selecting one of the two styles from the menu. A normal style specifies that the button should appear as a standard button. A transparent style specifies that the button should appear as an outline only. Typically, the transparent style is used when the underlying image of the hotspot is already the image of a button. In this embodiment style operation 1321 transfers to additional hotspots check 1308.

In wizard hotspot properties panel 1450, the name of the selected graph hotspot appears in hotspot field 1410. Again, the user can change the selected hotspot by activating pull down menu button 1411 which in turn results in the display of a menu of the name of each button and graph hotspot that has been previously defined. This allows the user to edit information that was previously entered as well as provide information for the graph currently selected.

In title operation 1330, the users enters a title as it is to appear on the graph in graph title text field 1452. In style operation 1321, the user selects one of a 2-D graph and a 3-D graph by activating drop-down list button 1452 and then selecting one of the two styles from the menu. During computer network element management, 2-D graphs appear flat, and 3-D graphs have shadow markings which make them appear 3-D.

The user checks show legend check box 1453 in legend operation 1332 to have a legend for the graph appear automatically when the graph is displayed. The legend can take up a significant amount of storage space. If only a single MIB variable is graphed, preferably the MIB variable is identified in the graph title and the legend is not turned on. If the graph uses more than one MIB variable, the legend is preferred.

In time span displayed field 1454, the user enters a time window that specifies how many seconds to display at any given instance in the graph. As new values of the MIB variable are received via polling, the time window slides in time so that the most recently received values are displayed. Similarly in polling field 1455, the user enters the polling interval in seconds for updating the values of the MIB variable(s) displayed in the graph. Entry of the time window completes time window operation 1333, and entry of the polling interval completes operation 1334, and so processing transfers to additional hotspot check 1308.

If the user has entered all the hotspots for the computer network element, the user presses button NEXT>> 904B to proceed to hot spot MIB variables wizard panel and so processing transfer from check 1308 to associate MIB variables with hotspot operation 1005. Conversely, if there are additional hotspots for the computer network element, the user returns to define hotspot operation 1301 and outlines another hotspot and then repeats operations 1301 to 1307, 1320, 1321 and 1330 to 1334, as appropriate.

Instead of drawing a new outline in define hotspot 1301, a user can copy an existing hotspot outline. When a hotspot outline is copied, visual characteristics as well as the other information associated with the existing hotspot outline is copied. The name of the copy is the original name with an index number appended to the end of the original name. The index number starts at one, or the next highest number if the name already ends in a number, and increments by one each time the copy is pasted.

The sequence of operations illustrated in FIG. 13 is illustrative only and is not intended to limit the invention to the particular sequence of operations shown. The importance aspect is to specify the hotspot by having the user input the information described in the sequence of operation. For example, check 1308 could be positioned after specify type operation 1305. In this embodiment, all of the hotspots would be defined and then one of the button or graph hotspots selected. In this case, checks 1306 and 1307 would be performed for each button hotspot and graph hotspot after all the hotspots were defined.

In associate MIB variables with hotspot operation 1005, select the variables with the hotspot wizard panel 1500 is used. Title 1501, Select the Variable(s) with Each Hotspot, identifies panel 1500 for the user. The user selects a hotspot by activating pull down menu button 1502 which in turn results in the display of a menu of the names of hotspots previously defined. The user selects one of the hotspots and the name of that hotspot is displayed in hotspot field 1503.

Similarly, the user selects a MIB file by activating pull down menu button 1504 which in turn results in the display of a menu of the MIB files, i.e., folders, previously selected for use with this element manager. The folders are a virtual representation of SNMP MIB branch objects. The user selects the MIB file which contains a variable or variables associated with the selected hotspot. The MIB file is displayed in selectable variables list box 1506.

The user then opens the folder or folders in selectable variables list box 1506 until the desired MIB variable(s) is/are visible. When a user highlights one of the MIB variables in selectable variables list box 1506, button ADD>> 1507 is enabled. When the user clicks on button ADD>> 1507, the highlighted MIB variable is copied to hotspot variables list box 1509 as a selected MIB variable.

Both single-valued MIBs and aggregate-valued MIBs, such as tables, with any access mode may be selected for active component and LED hotspots. For graph hotspots, only single-valued MIB variables which have read access may be selected. For button hotspots, only single-valued MIB variables which have write access may be selected.

The selection of files and variables can be repeated for a selected hotspot until all the MIB variables are displayed in hotspot variables list boxes 1509. After all of the MIB variables needed to manage the hotspot are selected, the user selects another hotspot and repeats the process described above for panel 1500. When all the hotspots are processed, the user presses button NEXT>> 904B and proceeds from associate MIB variables with hotspots operation 1005 (FIG. 10) to hotspot variables' attributes wizard panel 1600 in modify MIB variable attributes operation 1006.

As with the other wizard panels, hotspot variables' attributes wizard panel 1600 has a title 1601, Enter the Attributes of Each Hotspot's Variable, that identifies panel 1600 to the user. The currently selected hotspot is shown in hotspot field 1603. To change the currently selected hotspot, the user can activate drop-down list button 1602 and select another hotspot from those listed in the drop-down list.

The MIB variables selected in operation 1005 for the currently selected hotspot are listed in attribute list box 1604. Attribute list box 1604 displays a table having six columns: Attribute, MIB variable, Instance, Access Mode, Type, and Description. The user can modify the data in the cells in the Attribute and Description columns of the table. By default, in a particular row of the table, the Attribute name is the same as the MIB variable name. The Attribute name can be changed to a more meaningful name. The Attribute name must be unique for the hotspot. The description in the Description column is that which was provided for the MIB variable in the MIB definition file.

The other cells in the table, with the exception of those in those in the Instance column, are read-only and represent attributes of the MIB variable as defined in the MIB definition file. These attributes include Access Mode and Type.

Attribute Access Mode specifies whether the MIB variable is read-only, read-write, write-only, or not-accessible. SNMP set operations are not allowed for read-only variables. The access mode is not applicable for aggregate variables such as tables since each variable in the table may have a different access mode. Other factors such as the community name may also affect access. Attribute Type specifies the MIB variable type, e.g., integer, string, etc.

The user must enter the correct instance value for the MIB variable in the Instance column. The instance value uniquely identifies the MIB variable. For aggregate MIB variables such as tables, there are potentially multiple instances for each variable. Thus, the Attribute Instance is not applicable (N/A) for aggregate MIB variables. If instance value for a MIB variable is unknown, the MIB Browser can be used to determine the instance value.

If the selected hotspot represents a button, enter in the Set Value column(not shown), the value to set the MIB variable to when its associated button is clicked. The Access Mode column is not present for button hotspots, because it is already known that the access mode must include the write privilege. Otherwise, the MIB variable could not have been associated with a button hotspot.

After the user edits the attribute's for the selected hotspot, operation 1006 is complete for that hotspot. The user selects the next hotspot by clicking on the hotspot in element image area 602 or selecting the hotspot from the drop-down list associated with drop-down list button 1602. The user then edits the attributes for the next hotspot.

When the user has edited the attributes for all the hotspots of the computer network element, the user has completed entry of basic information 801. Since this panel 1600 is the last wizard panel for entering basic information, the plurality of command buttons includes a button Finish 904E. The user clicks button Finish 904E to complete the entry of basic information 801.

Navigation tree 305 now contains a node for the new element manager and subnodes for each hotspot of the element manager. Component hotspot nodes contain folders for MIB variables, states, polling, and traps. See FIG. 6C. The MIB variables folder contains a node for each MIB variable associated with the component hotspot. Folders states, polling, and traps are discussed in more detail below, but at this time do not contain other than default information. These folders are associated with event management information 802. Graph and button hotspot nodes contain just a MIB variables folder.

Prior to entering event management information 802 for the new element manger, the user can customize an about panel for the element manger by right clicking on the new element manager node in navigation tree 305. This generates a menu that includes Edit About. When the user selects menu item Edit About, an about panel 1700 is displayed in work area 603.

About panel 1700 includes a title 1701, Define About Panel for fjhub, that identifies panel 1700 and new element manger fjhub. Panel 1770 also includes a vendor name text field 1701, a vendor logo image field 1702, an element manager name text field 1704, and a element manager information text field 1705.

The vendor name for the computer network element associated with the new element manager is entered in vendor name text field 1701. This entry is required. If nothing is entered in this text field, an error message is generated.

When pull down menu button 1706 is activated, a pull down menu is generated that lists the names of images stored in a third predefined directory on a non-volatile storage system of computer 310, e.g., a directory with a path netprism\users\images\logo. In one embodiment, only GIF and JPEG image file formats are supported. When one of the images in the drop-down list is selected, the name of the selected image appears in vendor logo field 1702. The selected vendor logo image 1703 appears to the right of vendor logo field 1702.

Entry of text in element manager name text field 1704, and element manager information field 1705 is optional. The default information in field 1704 is the element manager name as it was entered in new element manger description panel 910 (FIGS. 9B and 9D). Similarly, the default information in field 1705 is the element manager description as it was entered in new element manager description panel 910. When button OK 1707A is clicked, the information in panel 1700 is saved.

As explained above event management information 802 is used in an automated rules-based event management model which is central to the power of managed element server 314. Also, as explained above, the event management model can be thought of as a finite state machine. It has three user-defined parameters: the component states, events which trigger rule evaluation, and rules which specify what state transition or other action to perform when a given condition in the rule is satisfied for the current state of the component. For example, if a component is in a normal state, a first rule may be evaluated in response to a given polling request. If the component is in some other state, a different rule may be evaluated.

While the finite state machine is a simple concept, it is also a very powerful concept and can be used for a wide variety of computer network management strategies. The particular strategy implemented for a particular computer network element depends on network conditions and what the network management wishes to accomplish. The essence of creating an efficient event management model is defining the set of events which provide the smallest set of useful and non-redundant information.

With a trap-based approach, a broad picture of network status is constructed from information received in trap events alone. Whenever an exceptional network event occurs, a managed computer network element knowledgeable of the event sends a trap event to managed element server 314. While this is advantageous in that managed element server 314 is immediately notified, there are several shortcomings to this approach. First, resources are required for the managed computer network element to generate the trap. Second, if the trap requires an acknowledgment, the agent in the managed computer network element is further taxed. Third, if many extraordinary events occur at the same time, a high degree of network bandwidth may be used up in generating the traps, which defeats the purpose if the traps are communicating network congestion information.

A partial solution, that has been employed, is to have the agent use thresholds to determine when the trap should be generated. The problem with this is that the agent is again being put to more work which in turn affects the performance of the agent, and in some cases, the performance of the network as well. To make matters worse, even with thresholds, multiple agents could detect the same condition and congest the network with the same traps. Even if agent performance and network condition were not an issue, it is still unlikely that a managed computer network element could provide a broad-enough picture of the network operation.

The user must design an effective rules-based event management model for a computer network element. Once a model, which concisely and accurately captures extraordinary element behavior is designed, implementing the model in an element manager is a simple matter. The basic steps in implementing the model are:

1. Design and draw a state machine on paper showing the states for each hotspot which are to be monitored, the paths between the states, rule conditions, and the rule actions (especially those resulting in a state transition) which may take place.
2. Using visual element management builder 406, define the states for each component in the new element manger. Note at this level, a component and a hotspot are the same thing, because only components defined as hotspots appear in the element manager.
3. Using visual element management builder 406 define the events for each component in the new element manager.
4. Using visual element management builder 406 define the rules associated with each event.

Each of operations 2 through 4 are discussed in more detail below.

To define the states for the hotspots, using visual element management builder 406, the user selects folder States for a hotspot in navigation tree 305, e.g., in FIG. 6C, folder States 661 for hotspot Comp1 651. In response, visual element management builder 406 presents a state definition list panel 1800 (FIG. 18A) for hotspot Comp1 in work area 603. The other areas in the GUI are similar to those shown in FIG. 9D.

State definition list panel 1800 has a title 1801, State Definition List for Comp1, that indicates that panel 1800 is displaying a list of state definitions for hotspot Comp1 651. A state list box 1802 has two columns a state name column and a state description column. The predefined state Initial and its description are displayed as the only states defined for hotspot Comp1 651. Every active component begins in an initial state. The initial state is predefined in the element manager and may not be removed.

Only button Add 1804A is enabled in the plurality of command buttons 1804 in panel 1800 because no states were previously entered in the new element manager. If states were previously defined for the element manager, the states would be listed in state list box 1802, and buttons Edit 1804B, Copy 1804C, and Remove 1804D would be enabled to permit editing of one of the states already defined. To define a new state, the user activates button Add 1804A. If the type of the hotspot selected is a regular component hotspot, a define component state panel 1810 (FIG. 18B) is displayed by visual element management builder 406 in work area 603. Otherwise, if the hotspot is of type LED, a define LED state panel 1820 (FIG. 18C) is displayed in work area 603. Recall that button and graph hotspots do not have states.

Panel 1810 has a title 1811, Define a State for Comp1, that identifies the panel, a state name text field 1812, a description text field 1813, a severity field 1814, a drop-down list button 1815, and a plurality of command buttons 1707. The user enters a name for the new state in state name text field 1812. Preferably, the name entered is descriptive but short. The name appears in navigation tree 305, after the state has been created, as a node under folder States. The name must be unique for the hotspot. Optionally, a description of the state is entered in description text field 1813.

Next a severity level is selected. The primary purpose of a severity level is to visually identify the state of the component when the component is being managed. There are six severity levels as described above. To select a severity level, the user activates drop-down list button 1815 and then selects one of the severity levels from the menu that is displayed. The selected severity level is entered in severity level field 1814. After the severity level is selected, the user activates command button OK 1707A to apply and save the definition of the new state.

Panel 1820 also has a title 1831 that identifies the panel, a state name text field 1812, a description text field 1813, a color field 1814, a first drop-down list button 1822 associated with color field 1823, a second drop-down list button 1824 associated with a blinking field 1825, and a plurality of command buttons 1707. The user enters a name for the new state in state name text field 1812. Optionally, a description of the state is entered in description text field 1813.

Next a color and a blinking rate for this state of the LED are selected. The color and blinking rate determine the appearance of the LED hotspot when the LED enters this state. LEDs do not need a priority (See TABLE 3.) since different LED states don't typically imply different priorities. The user selects the color and blinking rate from drop-down lists and the selections are entered in color field 1823 and blinking field 1825, respectively. The user activates command button OK 1707A to apply and save the definition of the new state for the LED hotspot.

As explained above, there are two types of SNMP network events used to communicate network information: polling events (requests) and trap events. Managed element server 314 uses polling events to solicit information from managed computer network elements, and uses trap events to specify which received traps are of interest. Each time managed element server 314 receives a response to a polling request or a trap event, the rule or rules associated with the event are re-evaluated.

To define a new polling event for the new element manager, the user selects folder Polling in navigation tree 305 under the hotspot of interest. (See FIG. 6C for folder Polling 662 that already contains polling event poll1.). In response to the user selecting folder Polling, visual element management builder 406 generates a polling events list panel 1900 (FIG. 19A) in work area 603.

Polling events list panel 1900 has a title 1901 that identifies the panel and the hotspot. A polling event list box 1902 has three columns an event name column, a polling status column, and a description column. Only button Add 1804A is enabled in the plurality of command buttons 1804 in panel 1900 because no polling events were previously defined for the component. If polling events were previously defined for the component, the polling events would be listed in polling event list box 1902, and buttons Edit 1804B, Copy 1804C, and Remove 1804D would be enabled to permit editing of one of the polling events already defined. To define a new polling event, the user activates button Add 1804A.

In response to activation of button Add 1804A, visual element management builder 406 generates a polling event definition wizard panel for hotspot Comp1 with a title 1911. To describe the new polling event, the user enters a name for the polling event in event name text field 1912. Preferably, the name is descriptive but short. This name appears in navigation tree 305 after the polling event has been created. The name must be unique across polling events for the hotspot.

Optionally, a description of the polling event is entered in description text field 1913. The user checks polling on box 1914 to have the polling request for the hotspot processed automatically as soon as the computer network element is managed. Whether a polling request is actually made depends on the state of the hotspot.

The polling time interval, in seconds, is entered in polling interval field 1916. All polling requests have a default interval of 30 seconds which may be changed. If the polling interval for specific polling requests is not explicitly set by entering a number in polling interval field 1916, the default interval is used. A polling interval of five seconds was entered in field 1916. The polling interval is the time between a polling response and the next polling request. While the polling request is generated at the specified time interval, no guarantees can be made regarding the timeliness of the response to the request. A longer polling interval should be used for table MIBs since the SNMP agent typically takes longer to return all the values for a table. Sometimes, SNMP agents may return incomplete tables (especially when the tables are big) if the polling interval is too short.

If log results box 1915 is checked, polling results are automatically logged whenever a polling response is received. Each log entry includes the object identifier (OID) of the MIB variable which was polled and the value of the MIB variable. The log file is placed on computer 310 in another predefined directory, e.g., in the netprism/users/poll folder, and is named <Element manager Name>@<managed computer network element>.PollLog.

Selectable attributes list box 1917 lists the attributes representing MIB variables that were associated with the hotspot. To include a poll request for an attribute or attributes in the element manager, the user highlights the attribute(s) in list box 1917. The user then activates button Move>> 1918 to copy the highlighted attribute(s) to a polled attributes list in poll attributes list box 1920. At this time, no rules have been associated with the polling and so there is no list of rules in associated rules list box 1921. To proceed to the next wizard panel, button Next>> 904B is activated by the user.

In response to the activation of button Next>> 904B, visual element management builder 406 generates a requisite polling states wizard panel 1930 with title 1931, Select Requisite State(s) for Polling Comp1. The default polling interval for the hotspot, as defined by panel 1910, is also displayed. The states defined for the hotspot are listed in selectable states list box 1937. If no states have been defined, only the Initial state is displayed in the selectable states list.

The user highlights the states in selectable states list box 1937 to specify the states of the hotspot in which the polling request is made, i.e., a polling request is generated by managed element server 314 only when the hotspot is in any one of the specified states. When the user activates button Move>> 1918, visual element management builder 406 copies the highlighted state(s) to a requisite states list in requisite states list box 1938. If no requisite state is specified, the polling request can never be made The previously defined polling interval for each requisite state is listed in polling interval list box 1939. At this time, the polling interval of a requisite state can be changed by editing the polling interval displayed in polling interval list box 1939. To enter the polling state information in the element manager and to save the polling state information by visual element management builder 406, the user activates button Finish 904E. The polling event is saved and appears in navigation tree 305 as a node in folder Polling of the hotspot with which the polling event is associated.

The next portion of event management information 802 that is constructed using visual element management builder 406 is for trap events. To define a trap event, the user first highlights folder Traps in navigation tree 305. See FIG. 6C. In response to the user selecting folder Traps, visual element management builder 406 generates trap events list panel 2000 (FIG. 20) with title 2001, Trap Event List for Comp1 for the hotspot.

Trap events list panel 2000 includes a trap event list box 2004, but no trap events have been defined and so the list is empty. After trap events are defined trap events list panel 2000 lists the name of the trap event under event name 2002, and a description of the trap event under description 2003. To add a trap event, the user activates button Add 1804A in command buttons 1804, and visual element management builder 406 generates define trap event panel 2100 with title 2101, Define a Trap Event for Comp1.

To describe the new trap event, the user enters a name for the trap event in event name text field 2102. Again, preferably, the name is descriptive but short. This name appears in navigation tree 305 after the trap event has been created. The name must be unique across trap events for the hotspot.

Optionally, a description of the trap event is entered in description text field 2103. The user selects a generic code for the trap event by selecting a generic code from the drop-down list generated in response to activating drop-down list button 2105. The generic codes are listed in the first column of TABLE 2. If a generic code of Enterprise was selected, a specific code is entered in specific code text field 2110 to uniquely identify the trap type. An asterisk may be entered in field 2110 if all traps with the specified generic code are to be acknowledged, irrespective of the specific code.

Selectable attributes list box 2106 lists the attributes representing MIB variables that were associated with the hotspot. To select an attribute or attributes to detect in the SNMP trap PDU when the specified trap is received, the user highlights the attribute(s) in list box 1917. The attributes selected can be used later when a rule is specified for this trap event.

When the user activates button Move>> 2107, visual element management builder 406 copies the highlighted attribute(s) to trap attributes list in trap attributes list box 2108. At this time, no rules have been associated with the trap and so there is no list of rules in associated rules list box 2109. To apply and save the trap event definition, the user activates button OK 1707A. The event is saved and appears in navigation tree 305 as a node in folder Traps of the hotspot with which the hotspot is associated.

The next portion of event management information 802 that is added to the element manager are the rules. To define a trap event rule, the user first highlights folder Rules in navigation tree 305 that is a node under a trap, e.g., TRAP1. To define a polling event rule, the user highlights folder Rules in navigation tree 305 that is a node under a polling event. In either case, the operations in defining a rule are the same, but the panels identify the panel as a poll rule panel and identify the polling event associated with the rule in the title.

In response to the user selecting folder Rules for trap TRAP1, visual element management builder 406 generates trap rules list panel 2200 (FIG. 22) with title 2201, Trap Rules List for TRAP1. Trap rules list panel 2200 includes a trap rules list box 2204, but no rules have been defined and so the list is empty. After rules are defined trap rules list panel 2200 lists the name of the rule under rule name 2202, and a description of the rule under description 2203. To add a rule, the user activates button Add 1804A in command buttons 1804, and visual element management builder 406 generates define trap rule wizard panel 2300 with title 2301, Define the Trap Rule for TRAP1.

To describe the new trap rule, the user enters a name for the trap rule in rule name text field 2302. Again, preferably, the name is descriptive but short. This name appears in navigation tree 305 after the trap rule has been created. The name must be unique across trap rules for the associated trap.

Optionally, a description of the trap event is entered in description text field 2303. The states defined for the hotspot are listed in selectable states list box 1937. If no states have been defined, only the Initial state is displayed in the selectable states list.

The user highlights the states in selectable states list box 2304 to specify the states of the hotspot in which the trap event rule is evaluated, i.e., managed element server 314 evaluated the rule only when the hotspot is in any one of the specified initial states. When the user activates button Move>> 1918, visual element management builder 406 copies the highlighted state(s) to a requisite initial states list in requisite states list box 2305. If no requisite initial state is specified, the rule is not evaluated.

To continue with the definition of the rule, the user activates button NEXT>> 904B, and in response, visual element management builder 406 generates trap rule condition wizard panel 2400 with title 2401, Enter the Trap Rule Condition for TEST of TRAP1. This assumes that the name of the rule entered in panel 2300 is TEST.

The user specifies a condition for the rule by either typing the condition directly into expression field 2402 or by clicking on the appropriate buttons to insert the buttons' labels into field 2402. As illustrated in FIG. 24, the buttons include modifiers buttons 2403, and operators 2405. Leaving field 2402 blank means that the rule action automatically takes place when the corresponding event occurs and the component is in any of the specified initial states, i.e., an empty expression is evaluated as True. The condition must obey standard programming-style and syntactical structure.

The buttons indicates what expression components are valid, i.e., only those expression components that are valid are enabled. In the Figures, an enabled button has a black legend, while a disabled button has only an outline legend. The plurality of buttons in modifiers buttons 2403 are operations performed on operands. Button ValueOf is, just as it says, the value of the operand. Button PresenceOf means determine whether the operand is present in the PDU. Button PresenceOf only applies to trap events. Buttons DeltaOf and %ChangeOf measure the degree to which the value of an operand has changed and only apply to numerical-valued attributes found in responses to polling requests. All modifiers buttons except button PresenceOf require that a relational comparison be made to a user-entered value.

The operands listed in operands list box 2402 are those attributes which were selected when the event was defined. Clicking on an operand copies the operand to expression field 2402

The plurality of Operators buttons 2405 are used to define the value of the condition. Clicking on an operator enters the operator in expression field 2402. When selecting bitwise operators, parentheses must be used around the entire expression.

Decimal, octal and hexadecimal values may be used within the expression. A leading 0 (zero) on an integer implies octal, and a leading 0x or 0X indicates hexadecimal. For example, decimal 31 can be written as 037 in octal and 0x 1f or 0X1F in hex. String literals are surrounded by double quotes as "this is a string literal". TABLE 5 summarizes the rules for precedence of all operators. Operators in the same row have the same precedence, and the rows are in the order of decreasing precedence. For example, * and / have the same precedence, which is higher than that of + and −.

TABLE 5

| |
|---|
| ( ) |
| ! (logical not), ~ (bitwise not) |
| *, / |
| +, − |
| <, <=, >, >= |
| ==, != |
| & (bitwise and) |
| ^ (bitwise exclusive or) |
| \| (bitwise or) |
| && (logical and) |
| \|\| (logical or) |

The following are examples of valid rule expressions:

ValueOf var1 ==0 && ValueOf var2<100

(ValueOf var1 & 0xFF)==0xFF (ValueOf var1 |~077)==0x40

ValueOf var1 !="up" && ! ((ValueOf var2<1000)|| (ValueOf var3>2000))

ValueOf var1 !=ValueOf var2.

To prevent a rule action from taking place until the condition has been satisfied more than once, the number of times the condition must be consecutively true is entered in frequency field 2406. After the condition is entered in expression field 2402, the user activates button Next>>, and in response, visual element management builder 406 generates rule action wizard panel 2500 with title 2501, Select the trap rule Actions.

Rule action panel 2500 includes three check boxes, change state to check box 2502, execute command check box 2503, and forward trap to check box 2504, and three corresponding action fields 2506 to 2508. Placing a check in the check box indicates that the action entered in the corresponding action field is to be taken when the condition for the rule is true. One of the states of the hotspot, as presented in a pull down menu, must be entered in filed 2506 when box 2502 is checked.

When box 2503 is checked, the command entered in action field 2507 may be any server command, e.g., execute a user-created bat file under WINDOWS NT v4.0 operating system, or perhaps, execute a shell script file in SOLARIS 2.5 operating system, which does not require an MS-DOS window under WINDOWS NT v4.0 operating system, or a command window in SOLARIS 2.5 operating system to be open to have meaning.

A forward trap action is only available if the event which caused the rule to fire was a trap event. Traps that have been forwarded can be received by any machine which has a trap receiver that understands SNMP and is listening on port 162.

The next action taken by the user depends on whether, the user wants to record information to an alarm log to alert the user of the event. If the user wants to record the event to the alarm log, the user activates button Next>> 904B, and otherwise button Exit 904C. As explained above, when button Exit 904C is activated, visual element management builder 406 saves the rule and the rule appears in navigation tree 305 as a node in folder Rules of the event with which the rule is associated.

If the user activates button Next>> 904B, visual element management builder 406 generates rule alarm log wizard panel 2600(FIG. 26). With respect to logging alarms, trap and polling events are handled differently. All trap events are automatically recorded to the alarm log unless a rule is specified for the trap event. If a rule is specified for the trap event, the trap is recorded in the alarm log only if the rule condition is satisfied and the rule action includes logging the trap event. Polling events are not recorded to the alarm log unless a rule is defined, the rule condition is satisfied, and the rule action includes logging the event.

Rule alarm log wizard panel 2600 includes title 2601, Enter Trap Rule Alarm Log Information, a record information in log alarm check box 2605, and three columns, description of event column 2602, condition 2603, and possible solution 2604. Check box 2605 is initially checked. If the check is removed, recording to the alarm log automatically is disabled.

The user can enter customized text in each of columns 2602 to 2604 that appears in the alarm log when the rule condition is satisfied. Any customized text entered via panel 2600 is in addition to the standard information displayed for every alarm log entry. Standard information includes the date and time which the event took place, the hotspot which experienced the event, the state of the hotspot when the event was experienced, and the severity level associated with that state.

After the customized text is entered, the user activates button Finish 904E and the generation of the element manager is complete. The rule is saved and appears in navigation tree 305 as a node in folder Rules of the event with which the rule is associated.

Managing Computer Network Elements

Management activities performed by server 314 include:

- discovering elements on the network which may be managed;
- organizing the managed elements into groups;
- associating element managers with physical computer network elements;
- responding to alarms and reviewing an alarm log of exceptional network events;
- monitoring and controlling real-time network behavior by getting and setting MIB variables;
- using buttons to configure MIB variables with a single click;
- graphing real-time MIB variable values;
- tweaking rule definitions in order to hone in on anomalous network behavior; and
- using a stand-alone MIB browser to manually manage elements without an EM or just to get MIB information.

Discovering Manageable Computer Network Elements

As explained above, an auto-discovery process, upon initiation by a client, automatically discovers all SNMP-enabled computer network elements which managed element server 314 can manage. In addition to discovering elements, managed element server 314 attempts to associate computer network elements to element managers. Managed element server 314 can make an association only if the association is defined in an system object-to-element manger map file. Each line in this file contains a system object identification sysObjectID of a computer network element followed by and separated by at least one space from an element manager name. The variable sysObjectID is defined by SNMP. The person building an element manager can explicitly indicate which computer network element is associated with a particular element manager through a system object-to-element manager map file. In one embodiment, the map file name is sysObjID__EMName__Map.txt and is located in the netprism\lib directory.

To perform autodiscovery as a client, the user right-clicks folder Managed Elements 642 in navigation tree 305 (FIG. 6C), and selects menu option Discover from the menu that is generated. In response to the selection of menu option Discover, auto discovery panel 2700 (FIG. 27) is generated in work area 603 on the display of the local client machine. The background image is displayed in element image area 602, and header area 601 and navigation area 604 are similar to those illustrated in FIGS. 6A and 6B.

In IP address field 2702, the IP address in the network that is the starting point for the auto-discovery is entered. This IP address identifies the computer network element or network from which to start discovery, i.e., identifies the start element. The address is interpreted as a class C address, i.e., a four byte word, a.b.c.d, where d is the hostname and a.b.c is the network. The hostname may be entered as a number or string. If hostname is entered as a string, a.b.c is optional. If a host is a member of more than one subnetwork, the address which is returned by a ping operation is the one used.

Next, the user must select the search scope used in the auto-discovery process by selecting Yes or No in limited search field 2703. A process flow diagram for the auto-discovery process is presented below.

The computer network elements which can be discovered depend on the type of the start element and the search scope. The auto-discovery process relies on an accurate ipNetToMediaTable MIB for the start element. The ipNetToMediaTable MIB is defined by SNMP. TABLE 6 lists the different combinations and their expected discovery outcome, assuming the MIB is correct.

TABLE 6

Auto Discovery Rules

| Case | Limited Search? | Start Element = Network Address? | Start Element SNMP-enabled? | Discovered Elements |
|---|---|---|---|---|
| a. | Yes | Doesn't Matter | Doesn't Matter | All SNMP-enabled elements connected to the same subnetwork as the start element |
| b. | No | No | Yes | i.) All SNMP-enabled elements connected to the same subnetwork as the start element ii.) All SNMP-enabled elements reachable* from the first SNMP-enabled router element discovered in b. i.) |
| c. | No | No | No | i.) All SNMP-enabled elements connected to the same subnetwork as the start element ii) All SNMP-enabled elements reachable from the elements discovered in c. i.) |
| d. | No | Yes | N/A | Same as case c. |

*Computer network element A is reachable from computer network element B if and only if a network path can be traversed between computer networked element A and computer network element B which only goes through SNMP-enabled hosts.

The following examples, that are based upon FIG. 28, illustrate various possible computer network element configurations. In FIG. 28, computer network elements marked with an (S) are SNMP-enabled.

i. If Start Element=192.240.4.E and Limited Search="Yes," then elements E, A, B are discovered.

ii. If Start Element=192.240.6.E and Limited Search="Yes," then elements E and H are discovered.

iii. If Start Element=192.240.4.E and Limited Search="No," then elements E, A, B, H, and J are discovered.

iv. If Start Element=192.240.4.B and Limited Search="No," then elements E, A, B, H, and J are discovered.

v. If Start Element=192.240.6.F and Limited Search="No," then elements E, A, B, H, and J are discovered.

vi. If Start Element=192.240.6.255 and Limited Search="No," then elements E, A, B, H, and J are discovered.

vii. If Start Element=192.240.6.H and Limited Search="No." then elements H E, and J are discovered.

After, the scope of the search is specified in limited search field 2703(FIG. 27), the user enters a read community name in read community field 2705. If the agent in a SNMP-enabled computer network element does not accept the community name, the computer network element is not discovered.

When the user activates button Discover 2706, the automatic discovery process is initiated. If button Discover 2706 is disabled, the discovery process is already taking place. The discovery process can take some time to complete. A progress indicator in the Status Bar of the GUI indicates the progress of the process. Other things can be done while the discovery process is taking place in the background, and the discovery process can be aborted by returning to auto discover panel 2700 and clicking button Stop 2707. If button Stop 2702 is disabled, either the discovery process is not in progress or it as a point where termination of the discovery process is not feasible. In the latter case, after a few moments, the discovery process reaches a point where it can be stopped.

When the discovery process is complete, all discovered SNMP-enabled computer network elements are displayed in navigation tree 305. If managed element server 314 was able to associate a discovered computer network element with an element manager (EM), navigation tree 305 has a node under managed elements with a node name with the format "<EM Name>@<Element IP Address_or_hostname>". The managed element can be edited and monitored by server 314 based on the definition of components. If no association can be made, the node name has the format "<EMNotFound>@<Element IP Address_or_hostname>". In this embodiment, computer network elements located behind a firewall cannot be discovered.

Organizing Managed Elements

Given the ability to simultaneously manage an almost limitless number of computer network elements, keeping track of the managed computer network elements could easily become a challenge in itself. To organize the managed computer network elements, managed element server 314 allows creation of groups in which managed computer network elements may be stored. Typically, managed computer network elements are grouped by the location of the physical computer network elements, but the elements can be grouped in any desired manner. Managed computer network elements may be a member of more than one group, but a managed computer network element is identical in every group, i.e., changes in an element's management configuration in one group affect its configuration in every other group.

Groups are, in fact, folders in navigation tree 305 under folder Managed Elements 642. One group, folder All Elements 643, exists permanently and provides a way to quickly determine which computer network elements are being managed. If a managed element is removed from the folder All Elements 643, the managed element is removed from all groups. However, the converse is not true i.e., removing a managed element from a regular group does not remove that managed element from the all elements group. Groups can be thought of as symbolic links to the all elements group. Removing a managed element in a user-defined group only removes the link.

To create a group, the user highlights folder Managed Elements 642. In response, a create groups panel that lists each of the groups in a list box is generated on the client. Create groups panel is similar in structure to panels 1800, 1900, and 2000 and so is not illustrated. When the user activates button Add, group definition panel 2900 is generated in work area 603 with title 2901, Define a Group.

Group definition panel includes four text fields. The name of the group is entered in group name text field 2902. The remainder of the information in panel 2900 is optional. A description of the group is entered in description field 2903. A human contact and a telephone number for the contact are entered in contact field 2904, and telephone number field 2905, respectively.

To create the group, the use can activate either button OK 1707A or button Apply 1707C. When either button is activated, the group is saved in navigation tree 305 as a folder node under folder Managed Elements.

Associating Element Managers with Physical Computer Network Elements

As explained above, if the auto discovery process was performed and the map file defined an element manager-physical computer network element association, the association has been done automatically. Once a physical computer network element has been assigned to an element manager and monitoring is turned on, which is done by default, polling and rules-based event management begins automatically based on the trap and polling events and rules specified in the element manager. This management takes place in the background. A flashing button Alarms 312B alerts the user to exceptional events only as the exceptional events arise. Interactive, on-demand management may be performed through the Status Panel, as described more completely below. At the time an element manger is associated with a physical element, other management parameters may be set as well in an element management configuration panel to further specify management configuration details.

To define further management configuration details for an element manager, the group folder is highlighted in navigation tree 305. The managed computer network element that is associated with the element manager is a member of this group as well as member of the group All Elements. If no other group has been created, computer network elements may only be managed in group All Elements. A panel is generated that lists physical computer network elements in the group and the associated element manger for each physical computer network element is displayed. When the user activates button Add, element configuration panel 3000 is generated in work area 603.

To enter a manager name in manager name field 3002, the user activates drop-down list button 3003 and selects one of the element managers in the resulting menu for the physical computer network element. The names of the element managers displayed in the menu are for element managers on computer 310 that are stored in a predefined location, e.g., in a folder in the directory netprism\users\templates. The description of the selected element manager is automatically entered in description field 3004.

The user enters the IP address or the name of the host of the computer network element which is to be managed using this element manger. Selectable groups list box 3006 contains a list of all groups which exist and for which the computer network element having the entered IP address is not a member. To manager the computer network element in more than one group, the group name is highlighted in list box 3006, which in turn enables button Add 3007. When the user activates button Add 3007, the highlighted group is moved to the list in group membership list box 3008.

The group membership list in list box 3008 is a list of the groups which the computer network element having the entered IP address is a member. By default, every managed element is a member of group All Elements. A managed element may not be removed from either of these groups through this panel. Even though a managed element may be a member of more than one group, any modifications to its parameters in one group effectively modifies the parameters in all the groups.

Monitor element check box 3010 is checked by default and indicates that events are being processed. Unchecking the box causes all polling requests for the element to cease without removing the managed element. If monitoring is turned off, the status menu option in component node pop-up menus is disabled.

The Read and Write Community names in read community field 3011 and write community field 3012 are set by default to public, and may be changed as necessary for the computer network element. If the read community string does not match the SNMP agent's in the computer network element the value of any MIB variables for the computer network element are not available to managed element server 314. Likewise, if the write community name doesn't match, the MIB variables for the computer network element cannot be set by managed element server 314.

The number of times to retry polling if the initial attempt fails is entered in polling retries field 3013. The amount of time to wait in seconds before attempting a retry if there is no reply to the initial polling request is entered in polling time-out field 3014.

To create the association and begin managing the element, the user can activate either button OK 1707A or button Apply 1707C. When either button is activated, the element management configuration is saved in navigation tree 305 as a folder node named "<EM Name>@<Host Name>" under the appropriate group folder(s). The folder contains the attributes of the element manager, and its subnode structure is identical to that for the element manager.

Responding to Alarms and Reviewing the Alarm Log

Alarms are an extremely effective and simple way to monitor extraordinary computer network events. In this embodiment, there are three ways that an event generates an alarm. A trap event generates an alarm if there is no rule associated with the trap event. A trap event also generates an alarm if the trap rule condition for the trap event is true, and the rule action includes recording the trap event to the alarm log. A polling event generates an event if a rule condition for the polling event is true and the rule action includes recording the polling event to the alarm log. Whenever managed element server 314 receives an event and the event satisfies one of these three criteria, managed element server 314 causes button Alarms 312B to blink in the clients' GUI.

There are several ways to view an alarm log, and each way allows viewing a different scope of alarms. Managed element server 314 supports four different scopes: i) all alarms, ii) alarms for managed computer network elements in a particular group, iii) alarms for a particular managed computer network element, and iv) alarms for a particular component of a managed computer network element. When all alarms have been acknowledged, button Alarms 312B stops blinking.

To view all alarms, the user clicks on button Alarms 312B in header area 601, or alternatively, right clicks on folder Managed Elements 642 in navigation tree 305 and selects Alarms from the resulting menu. In response, an alarm log for all alarms is displayed in work area 603.

Herein, activate, click and similar terms mean that the user positions a cursor on the mentioned object using a computer pointing device, such as a computer mouse, and then activates a button, typically the left-most button, on the computer pointing device. A right-click means that the right most button on the computer pointing device is activated.

To view alarms for managed computer network elements which are a member of a particular group, the user right-clicks the group name in navigation tree 305 and selects Alarms from the resulting menu. In response, an alarm log for all managed computer network elements in the group is displayed in work area 603.

To view alarms for a particular managed computer network element, the user right-clicks the managed computer network element name in navigation tree 305 and select Alarms from the menu the resulting menu. In response, an alarm log for the particular managed computer network element is displayed in work area 603.

To view alarms for a particular managed element component, the user right-clicks the component name in navigation tree 305, or if an image representing the managed computer network element is displayed in element image area 602, the user can right-click the component outline and in either case, the user selects Alarms from the resulting menu. In response, an alarm log for the component is displayed in alarm log 603.

Hence, the alarm logs can be viewed in a hierarchical manner that directly parallels the hierarchical organization of the navigation tree.

FIG. 31 illustrates a typical alarm log panel that is displayed in work area 603. Title 3101 identifies which alarm log the user has selected for viewing. In this example, the alarm log is for all managed computer network elements on the computer network.

The information contained in alarm log 3110 is defined in TABLE 7.

TABLE 7

Description of Alarm Log Information

| Ref. No. | Column | Description |
|---|---|---|
| 3102 | Date & Time | Day and Time when alarm occurred |
| 3103 | Element | Name of the managed element which experienced the alarm |
| 3104 | Component | Component of the managed element which experienced the alarm |
| 3105 | State | The state which the component was in when the alarm occurred |
| 3106 | Severity | The importance associated with the State |
| 3107 | Acknowledged By | The user name of the person who acknowledged the alarm |
| 3108 | Description | A description of the cause of the alarm, as defined by the rule. |

In addition to this information which is immediately viewable in alarm log 3110, each alarm also contains information which may be viewed by selecting the alarm and clicking button Details 3111. In response to button Details 3111 being activated, a detailed alarm information panel (not illustrated) is displayed in work area 603 that has description, variable bindings, possible causes, possible solutions, and comments columns. With the exception of the information in the variable bindings and comments columns, the information displayed was defined in the rule which caused the alarm to fire. The information in the description column is the same description as displayed in alarm log panel 3100. The information in the variable bindings column is a list of the MIB variables which were associated with the rule's event and the values of the MIB variables. The information in the possible causes column is a description of the potential cause(s) of the alarm. Similarly, the information in the possible solutions column is a description of possible solution(s) to the alarm condition. Finally, the user can enter desired comments about the alarm in the comments column.

The maximum number of alarms in the log is defined by a parameter in the configuration file. The default is 128 alarms. Once the maximum is reached, the oldest alarm is dropped. Thus, the alarm log is managed in a first-in-first-out manner, e.g., the alarm log is a 128 entry FIFO, or alternatively, the alarm log can be viewed being stored in a circular memory.

Column 3107 is provided in alarm log to permit acknowledgment of alarms to server 314 as a reminder that the alarm has been examined. Until an alarm is acknowledged, cell "Ack'd By" is blank. To acknowledge an alarm, the alarms that are to be acknowledged are highlighted, and then the user clicks button Acknowledge 3112. This action enters the name of the user that acknowledged the alarms in the "Ack'd By" cells for each acknowledged alarm.

In many cases, it is useful for to filter entries to an alarm log to limit the list of alarm entries to just those of interest. To define a customized alarm log filter, the user clicks on alarm filter tab 3115 and in response thereto, alarm filter panel 3200 is displayed in work area 603. The customized alarm log filter is applied to every alarm.

Alarm filter panel 3200 initially displays the settings for the default alarm filter. The user can select an acknowledgment status, a severity, an acknowledger, and a date as filter criterion. TABLE 8 lists the possible filter criterion:

The criteria parameters listed in Table 8 may be used in any combination.

TABLE 8

| FILTER CRITERION | OPTIONS | DEFAULT | COMMENTS |
|---|---|---|---|
| Acknowledge Status | i) Acknowledged, ii) Not Acknowledged iii) Both | Not Acknowledged | |
| Severity | See FIG. 32, Table 3 | All | |
| Acknowledger | i) Display alarms acknowledged by a person or persons ii) Do not display alarms acknowledged by a person or persons | | Enter a single user name or multiple space-separated user names. This selection is only enabled if "Acknowledged" is selected |
| 0 Date | Date/Time of Alarm | All | Certain date options require entry of a date or date range. The date/time must be entered in the exact same format as indicated by the date option; date ranges are inclusive. |

The filter can always be reset to the default settings by clicking Button Reset to Defaults 3210 on alarm filter panel 3200. To activate a customized filter, the customized filter is defined in alarm filter panel 3200, customized filter option 3120 alarm log panel 3100 is selected. To use the default filter, default filter option on alarm log panel 3100 is selected and then button Apply 3202 on panel 3200 is activated. To display all alarms, with no filter in effect, no filter option 3122 on alarm log panel 3100 is selected and then button Apply 3202 on panel 3200 is activated.

Monitoring and Controlling Real-Time Network Behavior

The ability to monitor and control computer network 300 is fundamental to network configuration management. The values of MIB variables which have been associated with a component polling or trap event, as predefined in the element manager, may be displayed in a status panel whenever the event is detected on the network. The MIB variables, which have READ-WRITE access, may also be modified. The status panel for a component may be displayed only if monitoring for the managed computer network element was turned on when the computer network element was configured for management.

To display the status panel for a component, the user right-clicks on the component node in navigation tree 305, or alternatively the component outline in element image area and selects Status from the resulting menu. In response to the selection of Status, a status panel such as status panel 3300 (FIG. 33) is displayed.

Status panel 3300 indicates the state of the component, e.g., initial 3302. Status panel 3300 also contains a single list 3305 that includes an attribute name column 3306, an event name column 3307, a polling column 3308, a value column 3309 and a description column 3310. TABLE 9 defines the information displayed in each column.

TABLE 9

| COLUMN | INFO DISPLAYED |
|---|---|
| Attribute Name | Either the MIB variable name, or the name assigned to the MIB variable in the element manager |
| Event Name | The name of the user-defined polling or trap event from which the MIB variable value was read |
| Polling | Valid for polling events only- indicates whether polling is turned on. If polling is not turned on, the MIB variable value is not updated. |
| Value | Value of the MIB variable. If the MIB variable represents a table, Table is displayed as the value. Valid values are not displayed unless a correct read community name was entered when the computer network element was associated with an element manager. |
| Description | The description of the MIB variable as defined in the element manager |

Status panel 3300 is used to update the values displayed in status list 3305. Specifically, the user activates button Update All Values 3316. In response to the update all values instruction, managed element server 314 polls every MIB variable in the list once, and displays the new value.

Any MIB variable value displayed in status list 3305 can be set to a user selected value if a correct write community name was entered when the element manager was associated with the computer network element (See FIG. 30) and the MIB variable has read-write access. To set a single-valued MIB variable, the row in list 3305 containing the variable is highlighted and button Edit Value 3313 is activated. In the panel which is subsequently displayed, enter the new value is entered and button OK clicked. If button Edit Value 3313 is disabled, the MIB variable does not have write access.

To set an aggregate-valued (e.g., table) MIB variable, the table of values is first displayed. When list 3305 contains a table, panel 3300 includes a button Display Table. Hence, the row in list 3305 for that variable is highlighted, and button Display Table is activated. From the panel which is subsequently displayed, a cell in the table is highlighted and then the same steps are followed as in editing a single-valued MIB variable, as described above.

Due to the various implementation of SNMP agents, performing a SNMP Set operation does not guarantee that the set operations was done even if no error message was returned. Thus, a SNMP Get operation is performed immediately after the Set operations to show the results. While the Get operation is performed, a dash is displayed in the Value cell in status panel 3300.

Using Buttons to Configure MIB Variables

Some element managers may include buttons which are embedded in the background image of the element. If so, the behavior of the button has been defined by the element manager creator. A button is used to set MIB variables via a single button action.

Graphing Real-Time MIB Variables

Managed element server 314, in one embodiment, supports two types of graphs, embedded graphs and regular graphs. Embedded graphs are displayed in element image area 602 as a hotspot and are defined by the information in the element manager.(See FIG. 14B). Embedded graphs may not be removed or reconfigured to graph different things during computer network element management. Regular graphs are displayed at the user's request during computer network element management. Both graphs are simple line graphs which show the value of a MIB variable over time in seconds. The time window may be changed and slides whenever a graphed value is updated.

To modify the appearance properties of a graph, the user right-clicks anywhere on the graph and selects menu option Properties from the resulting menu. In response to the selection of properties, a define hotspot properties panel 3400 is displayed in work area 603(FIG. 34.) Fields 1451 to 1455 were previously described, and that description is incorporated herein by reference.

To display a regular graph, the user invokes status panel 3300 (See FIG. 35A), and highlights the row or rows of the MIB variables that are to be graphed, e.g., variables snmpInPkts and snmpOutPkts. Only MIB variables of type integer, gauge, or counter are graphable. To select multiple MIB variables, the key Control on the user's keyboard is pressed while the desired fields in the list are highlighted. After highlighting the MIB variables, button Graph Value 3315 is activated.

In response to activation of button Graph Value 3315, a graph 3500 is displayed in a separate window. If multiple MIB variables are selected, data values for each MIB variable are displayed within the same list box as illustrated in FIG. 35B.

Modifying the Managed Element's Rules-Based Event Management Model

Even after an element manger has been associated with a computer network element, the rule-based event management model for the managed element can be changed. In this case, modifications apply only to the currently managed element, not to the element manager itself, i.e., the changes are made in the managed element object. The pieces of the model or state machine, which includes states, events, and rules for each element component, are the only attributes of the managed element which may be modified. Other attributes, like number and kind of hotspots and their associated MIB variables, may not be changed except by editing the element manger itself. Modifications to the rule model take place immediately.

Using a MIB Browser

If no element manager exists for an element, some basic network configuration can be performed manually with MIB browser 405. MIB browser 405 allows viewing a MIB Tree and to get and set MIB variables (permissions allowing). MIB browser 405 is also useful for determining instance numbers for MIB variables.

To access MIB browser, button MIB Browser 312C is activated, or alternatively, the user right-clicks on a managed element node which was not associated with an element manager and select MIB Browser from the resulting menu. In response to either action, MIB browser GUI 3600 is displayed on the local client machine.

The IP address or hostname of the computer network element, that is to be managed using MIB browser 405 is entered in device name field 3601. If MIB browser 405 was invoked by right-clicking on a managed element, device name field 3601 contains the IP Address or hostname of the element. To view a static MIB tree, device name field 3601 may be left empty.

The MIB file that is loaded to generate the MIB tree, must either be entered in MIB file field 3603 by selecting a MIB file from the menu generated by activating button 3604, or by entering a uniform resource locator (URL) of the MIB file in MIB URL field 3606. If the MIB file is not in the menu and cannot be accessed via the Internet, the MIB file must be obtained from another source and stored in a predefined location on server computer 310, e.g., stored in directory netprism\users\mib. If a URL was entered in field 3606, the user clicks button Load 3608 to retrieve the file on the Internet. The MIB file is retrieved and saved on server computer 310 and becomes an option in the MIB file choice selection menu.

The read community name for the MIB file and the write community name for the MIB file are entered in read community field 3602, and write community field 3605, respectively.

To perform a SNMP Get operation on a MIB variable value, the MIB variable is highlighted in the MIB tree that is generated in MIB tree list box 3612 upon loading of the MIB file. The MIB variable instance is entered in MIB instance field 3609, and button Get 3614 is activated. If the MIB instance is unknown, MIB instance field 3609 is left empty and button Get Next 3615 is activated.

The results of the SNMP Get operation are displayed in result area 3613, and OID field 3607 and MIB instance field 3609 are populated with the OID of the highlighted MIB variable.

To perform a SNMP Get Next operation on a MIB variable value, the MIB variable in the MIB tree is highlighted, and button Get Next 3615 is activated. The results are displayed in result area 3613, and OID field 3607 is populated with the OID of the highlighted MIB variable. If several SNMP Get Next operations are performed in succession, the next variable is retrieved but the highlighting in the MIB tree does not change.

To perform a SNMP Set operation on a MIB variable value using MIB browser 405, a MIB variable is highlighted in MIB tree 3612. The MIB instance is entered in field 3609, and the new value is entered in set value field 3610. To initiate the SNMP Set operation, the user activates button Set 3611. The results of the SNMP Set operation are displayed in result area 3613, and OID field 3607 is populated with the OID of the highlighted MIB variable. Due to the various implementation of SNMP agents, performing a SNMP Set operation does not guarantee that the set was done even if no error message was returned. To assure that the Set operation succeeded, a SNMP Get operation on the MIB variable value should be performed upon completion of the SNMP Set operation. To clear result area 3612, the user activates button Clear Result 3616.

Modifying Attributes

Element managers and managed elements and the attributes of both, e.g., hotspots, hotspot attributes, states, events, and rules, are represented as nodes in navigation tree 305. Any of the user-defined nodes in tree 305 may be edited, copied, and/or removed. The type of the node does not matter. The operations are the same for all node types.

For attributes which are defined through multiple panels, going through the entire Wizard process again would be painful. Consequently, visual element management builder 406 allows jumping directly to any of the panels with a single mouse click.

Editing mode is characterized by a set of four buttons: OK, Cancel, Apply, and Reset that are displayed on the panel in work area 603. For attributes which require only a single panel to define, this is the same set of buttons that is provided when the attribute is first defined. For multi-panel attributes, these buttons replace the Wizard buttons, and tabs are provided to quickly switch between panels. The buttons operate in the standard manner. Button OK is used to save the changes and redisplay the list-type panel for the selected node of navigation tree 305. Button Cancel is used to ignore any changes and redisplay the list-type panel. Button Apply is used to save the changes and leave the panel displayed, and button Reset is used to ignore any changes and repopulate the panel with the previous settings.

For tabbed panels, if the user toggles between tab panels without clicking button Apply, any changes entered on any of the panels are not lost, but the changes are not applied or permanently saved until one of buttons OK and Apply is activated. Likewise, activating button Reset actually resets the values on all the tabbed panels, not just the visible one.

To edit an attribute, the folder containing the node to be edited is highlighted, e.g., folder Element Mangers. In response to highlighting folder Element Managers and an element managers list panel is generated in work area 603. The element manager that is to be edited, e.g., element manager SNMP__Manager, is highlighted in the list of element managers, and then button edit is activated. To edit nodes in the Attributes folder (MIB variables), the node must be double clicked-on directly. The result is a set of tabbed panels that are displayed in work area 603.

For element managers, component definitions, polling events, and rules, to edit information, the tab of the panel which contains the information that is to be edited is clicked on. This brings the panel to the front of the display. For all other attributes, there is only a single panel.

The information is modified in the displayed panel. The name of the Initial state node and the All Elements group node may not be changed since these nodes were not user-defined and may not be removed. For most all node types, the information displayed in the panel applies only to the selected node. The exception is the Attributes nodes. For these nodes, the panel displays information for all defined Attributes with the information pertaining to the selected node highlighted.

If the name of a node has been changed, this is reflected in navigation tree 305.

FIGS. 37A to 37M are GUI's with different tabbed element manager edit panels and single element manager edit panels displayed for editing element manager SNMP__ Manager. The panels are similar to those utilized to build an element manger, and so that description is incorporated herein by reference.

The operation of the edit panels depends upon the node selected in navigation tree 305. If an element manager is selected in navigation tree 305, the tabbed element manager edit panels edit the element manger itself. If an element manager object is selected in navigation tree 305, the element manager object is edited, but the element manager itself is not changed.

When a node is copied, all subnodes of the node are copied as well. The top level node of the copy is provided a default name which is the original name appended with Copy <x> where x is a number starting at one. For each copy made, x is incremented by one. The subnodes of the copy retain their original names. The copy is placed at the same level in navigation tree 305 as the original. If a subnode of an element manger is copied, the copy is also a subnode of the same element manger. At this time, there is no way to copy to an arbitrary location.

To copy a node, the folder which contains the attribute that is to be copied is highlighted and in response a list panel is generated in work area 603. The name of the node to be copied is highlighted in the list panel and button Copy is activated. A node with a default name is created in navigation tree 305. In the panel which is subsequently displayed to edit the copy, a new meaningful name for the copy is entered in the name field and other properties of the copy can be edited. For copied hotspots, the graphical outline of the copy is placed in a default location on the background image. The outline should be moved to a meaningful location in element image area 602.

A node is removed by following the same steps as in a copy, but button Remove is activated. Due to the permanence of this operation and the potential of losing a substantial amount of information, a confirmation is required before managed element server 314 actually removes a node. When a node is removed, the node and all of its subnodes are removed from navigation tree 305.

Security

In one embodiment, anyone who has an account on the same domain as which the server 314 is running on may run a client 391. For security purposes, a login log file is provided so that all successful and failed attempts to log in to server 314 may be tracked. The log file is stored on the server in the netprism\users\log\login.log file. All objects created by any client are accessible by any other client machine with server access. All element managers and the license file have a checksum associated with them to prevent tampering. If an element manager or the license file is modified outside of server 314 (e.g., through a text editor), the file is invalidated.

Three different types of log files are maintained. The three files are text files that may be viewed outside of server 314. The three types of log files are:

i) Polling Log—one per managed element, provided logging was turned on. The log files are located under the netprism/users/poll folder. Each log entry contains a MIB variable and its polled value;

ii) NetPrism Log—records server and/or client events over time. The log file is named NetPrism.out and is in the netprism\users\log directory; and iii) Security Log—records all successful and failed attempts to log in to server 314. The log file is named login.log and is in the netprism\users\log directory.

In the following description, text formatting is used to differentiate different features of the object-orientated properties used in the implementation of the invention. Names of interfaces, classes, and variables used in the code are in italics. Names of methods used in the code are in courier font. References to instantiated classes (objects) are in bold. Text which is to be substituted is surrounded by angled brackets.

One principle followed in implementing the invention was to provide clean separation between GUI and application logic. GUI classes (screen parts) should only be concerned with the layout and interaction of GUI widgets. A GUI class interface should allow externals objects to modify, query the contents of, and receive important events, without exposing the GUI class implementation details, e.g., widgets used to implement the GUI. Also, the GUI classes should try to restrict as much as possible access to other non-GUI objects.

Another principle was to reduce class dependencies by grouping together related classes. This is important as the client runs inside a Web browser. A Web Browser always preloads class files it thinks it will need (all classes referenced in the applet's init( ) methods). Preloading these classes takes precedence over running the code that has already been downloaded. Reducing the dependency between classes result in a faster startup time, as only those classes that are needed for the first screen (login) are initially be downloaded. Once the application starts running, the rest of the classes can be downloaded in the background, or on-demand when a particular operation is selected.

Another principle was to encourage the design in terms of reusable software components, where applicable. Software components have a well-defined set of responsibilities which are accessed through the component interface. The component interface consists of three sets: (1) the set of exposed (public) properties (e.g., Background Color, Shape, etc.), (2) the set of public methods and (3) the set of custom events the component fires.

CLIENT STRUCTURE

The structure of the client of this invention is based on the Model-View-Control (MVC) design pattern that is used in almost every GUI class library. The client structure has three types of loosely coupled objects: A model object represents the application object and its encapsulated data. A view object represents the object's visual appearance on the display screen, and a controller object defines the way the user interface reacts to user input and GUI events. Each client object falls into one of these three categories of objects. Herein, view objects are referred to as Screen part objects, controller objects as Screen objects and model objects as Target objects.

Screen part objects encapsulate GUI logic. Each screen part object is displayed in its dedicated screen area. The display screen is divided into a toolbar area that was called header area 601 above, a view area, e.g., element view area 602, an input area, e.g., work area 603, a command button area 606, and a navigation area 604.

Screen part objects are responsible for laying out primitive GUI widgets on the screen, for controlling the contents of its GUI widgets by implementing set, get methods, and for firing custom events. Screen part objects are building blocks for display screens and can be combined and reused in different screens.

Screen part objects break away from the JAVA AWT event model by consuming all GUI events at the screen part level, and propagating only a subset of the screen parts to controllers as custom, non-GUI, semantic events. The current implementation uses both the JAVA AWT 1.0 event model and the JAVA AWT 1.1 delegation event model. The JAVA AWT (Abstract Window Toolkit) is a class library for basic GUI programming.

Each screen part object has an associated container object and a controller object. The container object is an AWT object that physically contains the screen part object. The container functionality is implemented by a class ScreenLayout that is described more completely below. The controller object is responsible for creating the screen part object(factory role), controlling the contents of the screen part object, interacting with target objects on the behalf of the screen part object, and for processing of the screen part object's custom events. A screen part object delivers all events to its controller object. An abstract class, Screen, and its concrete subclasses provide the controller functionality.

The controller object disassociates the screen part object from the rest of the system, as a screen part object communicates only though the associated controller object. Screen part objects are not aware of each other. All the interactions between related screen part objects takes place through the common class Screen. In the general case, screen part objects do not interact with the Target objects. However, in some cases it is more advantageous to allow direct access to Target objects by screen part objects for performance and convenience reasons. An example is the ElementView screen part, which is tightly coupled with the TargetET and TargetElement objects.

A screen part object can be loosely or tightly coupled with its Screen object(controller object). Loose coupling is achieved by defining a JAVA interface per screen part object which the screen objects must implement. A screen part object interacts with a screen object only through the interface methods. A screen part object is tightly coupled with a screen object if no JAVA interface is declared for the screen part object, and the screen part object simply calls public methods of class Screen.

Essentially, there are two types of screen part objects: (1) general-purpose, common screen part objects, which are active all the time, and (2) short-lived, task-oriented screen part objects. Common screen part objects appear in the toolbar, view and navigation areas. Task-oriented screen part objects are located in the input and command button areas.

As indicated above, controller objects are called Screen objects. Screen objects encapsulate the logic that controls how the application reacts to user input and custom events delivered by screen part objects. Usually, a single screen object controls multiple screen part objects in different display screen areas. Screen objects operate on a target object as result of user input. Screen objects are operation oriented and are named after the operation that they perform.

For complex operations which cannot be implemented in a single screen object, multiple screen objects can be grouped together and provide semantically higher entities called Wizard screen displays. Wizard screen displays are sequentially arranged, where each screen display represents a separate step which the user would have to complete in order to perform a single task.

The naming convention is that all screen classes have a name that ends with the word "Screen".

Target objects represent the entities being managed and manipulated by this invention. Target objects are actually proxy objects for remote server objects. Every target object has a corresponding server object which is accessed through RMI. The purposes of target objects are: to cache for the remote server objects so the number of RMI calls is reduced; to provide a repository area for screen objects' interactions with the user, so that screen objects can store and exchange data through target objects; to provide a destination for server object notifications; and to provide tight integration between the navigation tree and view areas.

Target objects exchange information with server 314 through non-RMI objects called shadow objects. Every server object has a corresponding shadow object. A shadow object is a copy of its server object's state. Should a remote server object change, the server object sends a notification to all client target objects that have subscribed for notifications.

Target objects are arranged into a hierarchy which is visually represented in navigation area 604 as a navigation tree 305. Each target object is represented by an icon and its name. While navigation tree 305 shows the logical view of a target object, view area 602 shows the physical, real view of the target object. It is usually an image of the front panel of the device.

The naming convention is that all target classes have a name that starts with the word "Target".

Two processes, a license manager and managed element server 314, need to be running for a client to do computer network element management. The two processes need to reside on the same machine, but the two processes need not be on the same machine as the machine running the client. The client can be started by downloading the client applet from a remote HTTP server which can access the managed element server class files. See FIG. 7.

In one embodiment, managed element server 314 is implemented as a service of the Microsoft WINDOWS NT operating system. Server 314 queries the license manager to determine which features to make available to a client. This check is performed by server 314 every time a client logs in.

Server 314 signifies to the license manager that server 314 is still alive every 10 minutes to prevent automatic release of client licenses.

A client of server 314 may make explicit RMI requests or may subscribe to server side object events of interest to the client. When the subscribed events occur, server 314 asynchronously sends the client notifications.

Client side objects can be roughly divided into two groups: (1) target objects that encapsulate server RMI objects and (2) non-target objects which do not have direct counterparts on the server. Most client objects belong to the first group.

Non-target objects include Screen objects and Screen part objects, that were described above, as well as a group of objects which is independent of the MVC design pattern. These objects are implemented as singleton objects, i.e., only a single instance can be created. The instance is obtained by calling the class static method instance( ). The group of objects is listed in TABLE 10

TABLE 10

| CLASS NAME | SINGLETON | DESCRIPTION |
| --- | --- | --- |
| NetPrismControl | Yes | Top-level NetPrism class |
| RmiReference | Yes | Connects client to the server and has some important server object references. |
| NotificationDispatcher | Yes | Manages all notifications from the server. |
| AlarmManager | Yes | Manages all alarm notifications |

Target objects are hierarchically arranged. The hierarchy is expressed in terms of object containment and in terms of class inheritance. TABLE 11 shows one embodiment of the containment hierarchy for target objects. Target containers are marked with an asterisk in TABLE 11

TABLE 11

| |
| --- |
| Target (abstract class) |
| *builder |
| TargetET |
| *components, TargetHotspot |
| *attributes, TargetAttribute |
| *states, TargetState or TargetLEDState |
| *pollEvents, TargetPollEvent |
| *rules, TargetRule |
| *trapEvents, TargetTrapEvent |
| *rules, TargetRule |
| *manager |
| TargetGroup |
| TargetElement |
| *components, TargetHotspot |
| *attributes, TargetAttribute |
| *states, TargetState or TargetLEDState |
| *pollEvents, TargetPollEvent |
| *rules, TargetRule |
| *trapEvents, TargetTrapEvent |
| *rules, TargetRule |

Notice that components, a container of TargetHotspots inside the TargetET and TargetElement have the same structure.

Note that command buttons (TargetBC) and embedded graphs (TargetGC) do not have states and trapEvents. Command buttons also do not have pollEvents.

TABLE 12 illustrates one embodiment of the inheritance hierarchy for target objects. Abstract classes are marked with an asterisk '*' in TABLE 12

TABLE 12

| |
| --- |
| * Target |
| TargetContainer |
| *TargetObject |
| TargetET |
| TargetElement |
| TargetElementGroup |
| *TargetHotspot |
| TargetEC |
| TargetGC |
| TargetBC |
| TargetAttribute |
| TargetState |
| TargetLEDState |
| TargetPollEvent |
| TargetTrapEvent |
| TargetRule |
| TargetEventRule |

Client Objects

Controller

Class NetPrismControl is a singleton class that provides methods to get and set a number of client object references. A client object first obtains reference to class iVetPrismControl by calling method NetPrismControl.instance( ). From then on, by calling the appropriate methods of class NetPrismControl, the client object can get references to the applet, server RMI, current screen, previous screen, screen layout, alarm manager, target object, image object, element view, MIB Browser frame, and/or severity. Set methods for many of these objects are also provided.

Other available methods in class NetPrismControl include methods to switch screens (switchscreen( ), switchScreenBack( )), and methods to store (putData( )), retrieve (getData( )), remove (removeData( )) data from an all-purpose Hashtable.

RMI Reference

Class RMIReference is a singleton class which provides access to the server side objects through RMI. When class RMIReference is instantiated, a call is made to method bind( ) which in turn uses method lookup( ) of class JAVA.rmi.Naming to get a reference to a netprism.client-.ServerConnect object based on the URL of the server machine and port number. This results in establishment of the RMI connection.

For a client session to begin, a server reference is needed. Method getServerRef( ) of class RMIReference uses method ServerConnect login( ), which on successful completion, returns a Server object reference. The complement of method getServerRef( ) is method releaseServerRef( ) which invokes method ServerConnect logoff( ). The Server object in turn gives access to Builder and Manager objects through accessor methods getBuilder( ) and getManager( ). Class RMI Reference provides the client with a gateway to server side objects through the use of the ServerConnect, Server, Builder, and Manager objects.

Navigation Tree

As explained above, navigation tree 305 provides a hierarchical view of objects used by managed element server 314. Tree 305 interacts with the controller/container (Screen) classes by invoking methods defined in interface NavigationAction. The response to events originating in navigation tree 305 is context dependent. The controller which implements interface NavigationAction defines the behavior associated with the events originating in navigation tree 305.

Interface NavigationAction interface is made up of methods that correspond to events in navigation tree 305. Method selection( ) is invoked when a single click is detected in tree 305. Method activate( ) is called in response to a double click. There also are methods menuItemActivate( ), collapse( ), and expand( ) which are invoked when a menu item is selected from a tree nodes' popup menu or when a tree node is collapsed or expanded, respectively.

Navigation tree 305 is implemented as two separate classes. Class navigation provides the methods, which are specific to the client-server application. Method buildTree( ) recursively traverses a tree data structure NameTree( ) to construct the initial tree. Method createETTree( ) builds the subtree associated with element managers when they are loaded. These methods know about managed element server objects and their relationships in the tree hierarchy. Class Navigation class also provides stubs, e.g., addNode( ), removeNode( ), for methods which in turn invoke methods on the second class used to implement the navigation tree 305, class TreePanel. Class Navigation invokes methods on class TreePanel to add nodes, remove nodes, etc. without any specific knowledge about how the tree is implemented, i.e., no calls to the Microline tree component which actually displays the tree.

Class TreePanel class encapsulates the Microline tree component used to display the tree. Class TreePanel provides a variety of get and set methods which in turn set properties of the Microline tree component. Class TreePanel class has no managed server element object types and encapsulates all Microline specific code.

During construction, class Navigation passes a reference to itself to class TreePanel in the form of an interface TreePanelAction. The communication from class TreePanel to class Navigation is through this interface. By implementing interface TreePanelAction, class Navigation acts as an observer, which can detect events in the tree and augment the default behavior of the tree by causing new Screen objects to be displayed or Screen parts objects to be updated. The communication from class Navigation class to class TreePanel takes the form of method calls.

Screens and Screen Parts

Abstract base class Screen is a central class in the client. Since class Screen is abstract and cannot be instantiated, statements about the class Screen actually refer to its subclasses. Class Screen controls the various panels or ScreenParts objects, which comprise the view areas. Herein, a ScreenParts object and a Screen part object are the same object. Class Screen instantiates the ScreenParts objects using method createScreen( ), and thereby dictates the content of the dedicated view areas of the client applet. Class Screen also implements two important interfaces: NavigationAction and ElementViewAction. Interface NavigationAction interface allows class Screen, actually subclasses of class Screen, to react to events in the navigation tree 305. Similarly, interface ElementViewAction allows concrete subclasses of class Screen to initiate some action when events are detected in element view area 602. Class Screen provides default implementations for the methods contained in these interfaces so that subclasses only need to implement the methods in which they are interested.

Class Screen provides accessor methods such as methods getLocalToolBar( ), and getNavigation( ) so that a ScreenParts object can get a handle to other ScreenParts objects which occupy the Screen object which controls them. Abstract methods for creating the ScreenParts objects which occupy the various regions of the screen are defined in the class Screen which must be overridden by subclasses of class Screen.

An important method which belongs to class Screen is method isReady( ). This method is called when an event is detected which causes the current screen to be swapped out and a new Screen object to be instantiated. Method isReady( ) calls the ScreenParts object method isReady( ) for each panel currently being managed. The method returns a boolean and if all calls return true, the screen swap proceeds.

Changing of screens is handled by class Screen itself. Three Hashtables, which use ObjectType references as the key, and class names as the value, are used to map events on a specific object of this invention to class Screen which is used to create or modify that object. Usually these events originate in navigation tree 305. Class Activate Table is used to determine which class Screen needs to be instantiated in response to an activate event on a builder object. Class ManagerActivateTable contains mappings from manager objects to subclasses of class Screen for activate events. Finally, class SelectTable is used to determine which Screen object should be used to generate a screen display in response to select events in navigation tree 305.

Class Screen communicates with class VetPrismControl to obtain a handle to the RMI Reference for access to target objects and the Builder and Manager RMI objects.

There are two configurations for class Screen which act as a container and a controller object. Those of skill in the art will appreciate that a class, whether concrete or abstract, cannot act. An instance of a class, which is an object, is what acts. Therefore, when a class is described herein as acting, those of skill will understand that an instance of the class is being described, and in the case of an abstract class, an instance of a subclass of the abstract class.

The most common way class Screen is used is as a primary container. As a primary container, class Screen controls ScreenParts objects. As a parent container, class Screen controls multiple subclasses of class Screen which in turn act as primary containers. Examples of subclasses of class Screen which act as parent containers are classes TemplateScreen and ECConfigScreen. As a parent controller, class Screen instantiates the Screen objects it will manage. Class Screen keeps track of the current or active Screen object and invokes methods on this Screen object, which is acting as a primary container.

There are three variations on the primary class Screen. The most common is a simple subclass of class Screen which manages a single ScreenParts object in the input area. The second type of subclass of primary class Screen is the configuration type. This type is characterized by a tabbed form and the standard buttons residing in the command area. The third type of subclass of primary class Screen is the Wizard type. This type uses the JAVA AWT layout class CardLayout to contain a sequence of ScreenParts objects which the user may step through in order by pressing on buttons Back and Next, as described above. These buttons are part of class PanelSwitch which occupies the command button area of Wizard type Screen objects.

Another class used by class Screen is class ScreenLayout. This class deals with some of the issues pertaining to the actual geometry of the applet appearance, specifically, the dimensions of the regions which comprise the entire view.

The other class which is central to the client is abstract class ScreenParts. The many panels which occupy the areas of the various concrete subclasses of class Screen extend this class. Class ScreenParts provides some default implementations so that the concrete subclasses of class ScreenParts only have to implement the methods in which they are interested.

One important part of class ScreenParts class is an inner class ScreenPartsInnerComponentListener. This listener class is added as an AWT component listener which invokes ScreenParts object method isShown( ). Method isShown( ) is used by ScreenParts instances to set the initial input focus when the panels are first displayed.

A very prevalent form of a subclass of class ScreenParts is the list type panel. This type of panel displays a list of items which correspond to the contents of a folder object such as folder Element Managers or folders Element Components. ScreenParts objects of this type use an instance of class ListPanel class which encapsulates a Microline grid component. The relationship between class ListPanel and class ScreenParts is similar to that of class Navigation and class TreePanel. There is a significant difference, however, as class Navigation is a singleton class which is reused by many Screen objects, and there are many instances of list type ScreenParts objects. The list type ScreenParts objects call methods on a class TreePanels' instance directly and class TreePanel communicates with the observing ScreenParts object through interface ListPanelAction. The list type ScreenParts object does not contain any Microline specific code and class ListPanel does not contain any references to object types of this invention.

Hot Spot Editor

Class HotspotScreen is a subclass of class Screen that is used to form a hot spot editor that in turn creates and edits hotspots. As explained above, hotspots represent element components. The hot spot editor allows the appearance of hotspots to be defined and changed. The appearance of a hotspot is defined in terms of its geometry and visual properties like shape, color, and line thickness. There are four types of hotspots:

Active Components (ports)

Indicator Components (LEDs)

Action Buttons

Embedded Graphs

The hotspot editor is not a stand-alone display. HotSpot Editor appears within the wizard panels used for creating new element managers and inside the tabbed panels for modifying existing element managers. HotSpot Editor is preceded by a Select MIB Files panel (See FIG. 11) that is generated by a SelMibFilesScreen object and followed by a HotSpot Properties panel that is generated by a HotspotPropsScreen object. (See FIGS. 14A & 14B). The latter panel is used only if an element manager contains command buttons and/or embedded graph hotspots. If not, the following panel is Select MIB Variables panel that is generated using MibBrowserScreen object.

The ScreenParts object used by the HotSpot editor are classes HotspotToolbar, HotspotOperation, ElementView and PanelSwitch. The first two are custom ScreenParts objects used only by class HotspotScreen. The first two classes are tightly integrated with class HotspotScreen and call directly its methods as callbacks. To interact with class Element View, class HotspotScreen implements interface ElementEditAction and sets the operational mode for class ElementView to be "edit". The interface implementation is used to deliver custom edit events from class ElementView to class HotspotScreen. Class PanelSwitch is used in the wizard to trigger actions for the wizard navigation buttons: Exit, Back, Next and Cancel. Class HotspotEditor implements interface PanelSwitchAction.

The HotspotScreen object creates or modify hotspots for the current TargetET object. Before the HotspotScreen object can be activated, the current target inside the NetPrismControl object must be set to an instance of class TargetET. All modifications to target hotspot objects are done only by the screen. Screenparts should not modify target objects directly.

HotSpot Toolbar

Subclass HotspotToolbar of class ScreenParts implements a set of image buttons. Image buttons are borrowed from the Graphic JAVA Toolkit library: class gjt.ImageButton and class gjt.ExclusiveImageButtonPannel. The buttons are grouped based on their function into four groups: edit, shape, line width and edit color. When a button is invoked, the ScreenParts object calls one of the following methods on the HotSpot Screen object: method cutAction( ), method copyAction( ), method pasteAction( ) if cut, copy or paste button is invoked respectively; and method updateToolbarProperties( ), for any other button.

The subclass HotspotToolbar provides methods to read or set the state of each button.

HotSpot Operation

Subclass HotspotOperation of class ScreenParts delivers events to the HotspotScreen object by calling:

method selectCompByName( ) when a new hotspot is selected using the name choice. Note, this choice appears only in the tabbed configuration, not in the wizard;

method selectCompType( ) to change the type of a hotspot; the current hotspot is deleted and a new hotspot created of the corresponding type, preserving properties that are transferable (e.g. geometry)); and method updatecomponent( ) to read all the contents from the operation panel; as the panel does not have a button for this operation, e.g. button Apply, the method is invoked any time the mouse pointer leaves the boundaries of the panel.

Element View

Class ElementView is a common screen part used by all Screen objects. It occupies the element view area 602 in the display screen layout. An element is either an element manager (class TargetET) or a managed element (class TargetElement). Class ElementView supports three distinct operational modes:

i) image view mode is activated by method setImageViewMode (String imgName); this mode is used by Screen objects that simply want to show an image in element view area 602; in this mode, the instance of class ElementView is not associated with an element;

ii) element view mode is activated by method setElementViewMode (TargetObject element, ElementViewAction ctr1); this mode is used whenever an element is being viewed, and its visual appearance is not editable; the second parameter in the method call is the actual instance of the class Screen that implements interface ElementViewAction; this interface is used to deliver events to the actual instance of the class Screen when a hotspot or a menu-item is selected; and iii) element edit mode is exclusively used by the HotSpot Editor and is activated by method setElementEditMode (TargetET element, ElementEditAction ctr1); this mode is used to define or modify hotspot areas on the device background image; interface ElementEditAction is the interface that defines events in element edit mode.

Class ElementView is implemented as a custom AWT component using the AWT 1.1 event delegation model. Class ElementView is a singleton class, i.e., class ElementView allows only a single instance of the class to be created. For this purpose all constructors are private, and a call must be made to the static method ElementView.instance( ) to obtain the reference to the instance. However, in another embodiment, multiple detachable instances of class ElementView are supported. This allows displaying images of more than one computer network element at a time.

For smooth, flicker-free drawing class ElementView uses a double-buffering technique: (1) override method update( ) so the method does not clear the background; (2) override method paint( ) to do all drawing into an off-screen buffer first; and. (3) when the drawing is complete, draw the off-screen buffer contents.

Some hotspots, like command buttons, sometimes called action buttons, and embedded graphs, are not drawn. Rather, these hotspot are presented as real AWT components. To support this type of hotspots, class ElementView (1) extends AWT class Container so that AWT components can be added to it, and (2) disables layout manager setLayout (null) so that AWT components can be positioned anywhere in element view area 602.

To render an element, class Element View needs to know the element's background image name, what hotspots are defined for the element, and for each hotspot its geometry, color, shape, line thickness, blinking status and popup-menu item list. If a hotspot is not drawn, a reference to the hotspot's AWT component is required. To obtain all this information, class ElementView is tightly integrated with classes TargetET, TargetElement and TargetHotspot. Class Elementview calls public methods of the three classes just named to access the required rendering information. These methods are read only (get*), so that class Element View never modifies (calls a set* method) an element. Should the state of the shown element change, either in edit mode or as a result of rule engine actions, method updateview( ) should be invoked on class ElementView.

Class ElementView has a helper thread BlinkerThread, which is used to implement blinking for drawn hotspots. The thread is activated on demand, only if the current element has blinking hotspots. The thread checks once per second for all blinking hotspots if they are visible or not, and changes their state accordingly.

MIB Browser

The MIB Browser is invoked by pressing the button MIB Browser in header area 601. The MIB Browser can also be displayed by selecting the MIB Browser pop-up menu option for the computer network elements which do not have an associated element manager. When a MIB Browser frame does not exist, a frame object MibFrame is instantiated from object GlobalToolBar by user action. When MIB Browser is already open, frame object MibFrame is moved into the front when button MIB Browser is pressed.

Object MibFrame contains a panel in MibBrowserPanel object. MIB Tree area 3612 is designated for loading a MIB file. Once a MIB file is selected from MIB File 3603 or MIB URL 3606, callback method mibGetNameTree( ) is executed. In method mibGetNameTree( ), a RMI reference of server object MibBrowsersImpl is obtained to load the MIB file by calling method loadMib( ), and methods find( ) and getNameTree( ) from RMI server object MibTreeImpl 3842 are called to find the root node of the MIB file. Clicking on a node in a MIB Tree causes method expandTree( ) to be executed. If the node is a subfolder or a table, the node is expanded to the next level. If the node is already a leaf node, method setOid( ) is executed by setting the corresponding MIB variable into the OID field 3607.

Buttons Get 3614, Get Next 3615, and Set 3611 are used to apply the corresponding SNMP operation onto the selected MIB variable, and the result of the operation is displayed in Result area 3613. By clicking buttons Get 3614, Get Next 3615, and Set 3611, RMI methods from server object MibBrowsers get( ), getNext( ), and set( ) are executed, respectively.

Target

Target objects represent managed elements on the client side. Target objects contain cached copies of the server side objects. Each target object has a reference to the remote server object and, in the case a target object is visible in tree 305, a reference to the node in navigation tree 305, and can receive remote server notifications. This functionality is captured inside abstract class Target.JAVA which is at the root of the target objects' hierarchy. (Note JAVA is included here only for completeness. Those of skill will appreciate that JAVA is a part of every class name in general and so is not typically used.) In addition, this abstract class serves as the target object factory. Abstract class Target can create a new target object if a target type constant, a tree node, or a shadow structure is provided. See methods create( ) and createTarget( ). Three important abstract methods are defined inside abstract class Target. The methods are: method save( ) which is used to propagate changes on the target (create, delete, modify) to the server; method load( ) which loads a server object and creates a target object from it; and method cancel( ) which discards all changes on a target object.

Class Target has two direct subclasses: class TargetObject and class TargetContainer. Class TargetObject is an abstract class that extends class Target by adding support for object editing, notification updates, and linking with navigation tree 305. To reduce the number of RMI calls to server 314 and to support cancel functionality, the TargetObject object keeps track of create, delete, and modify changes the user has made on the TargetObject object. This is captured inside a private variable editStatus.

At the end of an editing session, the edit can be committed by calling method save( ) in which case, based on the value of variable editStatus, the corresponding change is propagated to server 314. Method save( ) is invoked by the current Screen object as a result of the user activating either button OK or button Apply. An editing session can be aborted by calling method cancel( ), which reverses all changes to the TargetObject object. Method cancel( ) is invoked by the current Screen object either as a result of the user activating button Cancel, or aborting the current operation by navigating elsewhere in navigation tree 305, which causes a switch on the display screen.

Method cancel( ) does not require server access when using the following technique: (1) if an object is deleted by the user, the object is only marked for deletion, rather than being physically removed; and (2) two copies of shadow data are kept, i.e., an origshadow object and a shadow object Changes by the user affect only the structure of the shadow object. To cancel the changes, the shadow object is simply overwritten by the origshadow object.

If a TargetObject object contains other types of objects, e.g. a hotspot object has attribute objects, those contained objects are stored in container objects (class TargetContainer). Method getcontainers( ) is used to obtain a list of all containers for a target object. If a target object exists inside a container, the reference to the parent container is kept in variable parentContainer.

In some cases, navigation tree 305 allows the same object to appear in multiple containers. An example is a managed element, which might belong to multiple groups, e.g., a managed element with IP address fjhub@192.240.6.20 belongs to group Hubs and to group First Floor Devices in addition to group All Elements. To support this concept, classes TargetObject and TargetContainer model the UNIX style directory structure with symbolic links. All additional links to the TargetObject object are kept in a vector variable links. An object physically belongs to only the first container to which it is added, and which is recorded in variable parentContainer. If a target object already has a parent container and the target object is added to another container, the new container is considered a link and is recorded in vector variable links. The main distinction between the official parent container and link containers is what happens when the target object is removed from a container. If the target object is removed form variable parentContainer, the target object is removed from all linked containers as well. If a target object is removed from a link container, all other links and variable parentContainer are preserved.

Class TargetObject implementation of abstract methods load( ) save( ) and cancel( ) applies the operation on all contained objects of the target object as well by invoking the method on the all containers returned by method getcontainers( ). In this manner, tree operations are recursively applied to the target object containment hierarchy.

Class TargetContainer is a concrete class which provides for grouping and processing of target objects of the same type. The TargetContainer object keeps a list of target objects inside a vector targets. The TargetContainer object can keep a reference to a target object which is considered to be the current target. The current target can be set by its name, reference or server object reference using method setTarget( ). An enumeration of all targets in the container is obtained using method getEnumerator( ). A specific target inside the container is found by specifying the target's name, or the target's server object as a parameter to method find( ), and calling method find( ). Another useful method is method getNames( ) which returns a list of names of all targets inside the container.

Class TargetContainer provides for tight, transparent integration between target objects and navigation tree 305. Any time a target object is added to or deleted from the container, this is immediately reflected in tree 305, by creating or deleting the corresponding node.

Another important role of TargetContainer objects is the management of a targets' name space. When a target is added to a TargetContainer object, the object checks if the target has a unique name. If not, the TargetContainer object automatically generates a unique name by appending the appropriate index to the name using method generateuniqName( ).

The TargetContainer object's implementation of abstract methods load( ), save( ) and cancel( ) iterates through all targets inside the object.

Alarm

The Alarm classes, which are used to receive alarm notifications from the alarm observer proxy object, allow the user to acknowledge alarms and view the alarm history log. There are seven classes associated with the alarm functionality.

Class AlarmManager is instantiated by class LoginScreen during logon processing. The class encapsulates the interface for the alarm observer proxy object and implements its only method updateProxy( ). This class provides the monitoring of defined alarms and the sending of various alarm notifications. The class also sends a notification after an outstanding alarm has been reset or acknowledged.

Class AlarmHistoryScreen is instantiated by class Screen when an alarm history is to be displayed. The class creates the alarm panels and handles the events for the alarm panels by implementing interfaces AlarmHistoryAction and AlarmFilterAction. Events handled include tab action, button processing, custom filter states and log updates.

Class AlarmHistory is instantiated by class AlarmHistoryScreen. This class creates the alarm history log components and handles the events for them. This class performs preprocessing for button actions, and processing for history log filters and updates.

Class AlarmFilter also is instantiated by class AlarmHistoryScreen and is used to display the alarm filter panel. This class creates the alarm filter panel and encapsulates the event handling for inner class AlarmFilterEvent.

Class AlarmFilterEvent is encapsulated in and instantiated by class AlarmFilter. This class implements the listener interfaces for receiving item and action events for the panel components. The components include the acknowledgment state radio buttons, the date choice field, and the filter command buttons.

Class AlarmDetailScreen is instantiated by class AlarmHistoryScreen and is used to display the alarm details panel. This class creates the alarm details panel and handles the events for the panel such as button and navigation actions.

Class AlarmDetailText is instantiated by class AlarmDetailScreen and is used to display the various vendor-supplied alarm detail text contents. This class creates the details text components and processes its' entry and display functions.

Severity

There are three classes which help the client display the information pertaining to severity levels. The actual severity level information is passed from server 314 as a properties object reference. The client extracts the various parameters and presents the severity level information to the user.

Class Severity is a helper class which does not directly display anything on the display screen, but helps in parsing the severity parameters, in creating Color objects, and in assigning blinking intervals.

Class SeveritySetup extends class ScreenParts and is used to display the priorities, names, colors, and blinking intervals to the user. This class uses the Microline grid component to show the list of severity entries. The entries are ordered by priority and the get and set methods use the priority to identify the severity entries. An image is inserted into each row of the grid to display the color associated with the severity.

Class SeverityScreen is very simple because, at this point the severities used cannot be modified by the user via the client interface. Class SeverityScreen instantiates class SeveritySetup and interacts with class RMIReference to retrieve the severity information from server 314. Class SeverityScreen invokes class SeveritySetup method setSeverityEntry( ) which populates the severity list.

State

States are represented by classes TargetState and TargetLEDState and are contained in class TargetContainer, which corresponds to server classes State and LEDState that are contained in a class States. All active and indicator components (TargetEC's ) have appropriate state objects in a TargetContainer object. When a component is initially saved, the state of the component is assigned a default state of Initial State. The current state of a component can be accessed via method TargetEC.get/setCurrent State( ) of class TargetEC.

LED states have associated visual parameters, color and blink rate. Non-LED states have a severity level associated with them. For non-LED states, the severity level is accessed via TargetState.get/set Severity( ) of class TargetState. LED states do not have a severity level, so class TargetLEDState stores the visual parameters directly. Method get/setBlinking( ) of class TargetLEDState converts between string descriptions input by a user and integer values. TABLE 13 below shows the number of seconds corresponding to each description. Also, server 314 stores colors as actual JAVA.awt.Color objects, while the actual user deals with color names. A ScreenParts object passes the name of the color to method setColor of class TargetLEDState. Method setcolor is overloaded to accept a Color or String (color name). Method getColor( ) returns the actual Color object. Method getColorName( ) returns String (color name). Methods getColorNames( ) and getBlinkingNames( ) are provided for panels that need to fill lists with all defined color/blinking names. The color and blinking rate methods are included in class TargetLEDState.

TABLE 13

Blinking Rate Conversions

| STRING DESCRIPTION | VALUE (SECS) |
|---|---|
| None | 0 |
| Fast | 1 |
| Slow | 3 |
| N/A | — |

Other than the Initial State, states are completely user-defined. Embedded Graphs (Class TargetGC) and Action Buttons (Class TargetBC) are components that do not have associated states.

Polling can be state dependent, i.e., polling occurs at different intervals depending on current state of the component. Class PollEventShadow contains an array of StatePolled objects which store each state name and corresponding polling interval.

Poll events (Class TargetPollEvent) and trap events (Class TargetTrapEvent) each possess an instance of class TargetContainer of associated rules. (See Table 11.) A rule contains a boolean condition, e.g., ValueOf ipNumErrors>100. When the result of a poll event causes this condition to become true while the component is in one of the requisite states, the rule's action is executed. One of the possible actions of a rule is to change the current state of the component. Whether this action occurs is determined in method TargetRule.get/setIschangestateOn( ) of class TargetRule. The new state that the component is changed to is determined by method TargetRule.get/set NextState( ) of class TargetRule. The list of states that the component must be in when the condition is satisfied for the action to be carried out is defined by method TargetEventRule.get/setStates( ) of class TargetEventRule.

Rules

There are many parameters used to define the rules associated with trap and poll events. Consequently, classes Screen and ScreenParts that help the user to create and modify rules are some of the more involved classes used by the client. There are six classes associated with rule definition. The classes are RuleScreen, RuleScreenWZ, RuleDescription, RuleCondition, RuleAction, and RuleAlarmLog.

Class RuleScreen is used to configure existing rule definitions. Class RuleScreen is a good example of the tabbed or configuration type screen panel which is used to modify an object. Method createOperation( ) is different from that used by simple subclasses of class Screen in that instead of adding a single ScreenParts object, a tabbed form is added which contains multiple ScreenParts objects. Four ScreenParts objects, which are added to a Microline tabbed form, generate: Rule Description panel (FIG. 37H), Rule Condition panel (FIG. 37I), Rule Action panel (FIG. 37J), and Rule Alarm Log panel (FIG. 37K), respectively. As explained above, these panels provide the user with the controls needed to modify any of the values associated with a rule.

The user can switch between the panels by clicking on the tab without causing a different Screen object to be instantiated. The tabbed panel or configuration type Screen object is characterized by the presence of the standard buttons in the command area of the Screen object. The Screen object uses "stuff" methods to perform set methods on the four ScreenParts objects to populate them with values for the rule currently being edited.

Class RuleScreen implements interface StandardButtonsAction. When button OK or button Apply is pressed the RuleScreen object responds by calling method isReady( ) on each of the four ScreenParts objects and on a true response invokes method get which extract all the information from the ScreenParts objects. The RuleScreen object saves the information into the target object corresponding to the rule.

Class RuleScreenWZ is used to create a new rule definition. It is a good example of the wizard type Screen object, which is used to define a new object. Method createOperation( ) of this class is different from that used by simple subclasses of class Screen in that instead of adding a single ScreenParts object, a CardLayout object is added which contains a series of ScreenParts objects. Four ScreenParts objects, which are added to an AWT class CardLayout, generate Rule Description panel (FIG. 23), Rule Condition panel (FIG. 24), Rule Action panel (FIG. 25), and Rule Alarm Log panel (FIG. 26), respectively.

The four ScreenParts objects are unaware of whether they are being used in the context of a configuration type Screen object, or a wizard type Screen object. The user can switch between the ScreenParts objects by clicking on buttons Back or Next without causing a different subclass of class Screen to be instantiated. The wizard or configuration type Screen object is characterized by the presence of the Panel Switch buttons in the command area of the Screen object The Screen object again uses "stuff" methods. Since this is a new object, these methods only populate the controls which help the user to define the new object. Class RuleScreenWZ implements the PanelSwitchAction interface. When button Exit or button Finish is pressed, class RuleScreenWZ responds by calling method isReady( ) on each of the four ScreenParts objects and on a true response invokes the method get which extract all the information from the ScreenParts objects. Class RuleScreenWZ saves the information into the target object corresponding to the rule.

Graphing

Graphing of numeric attributes (MIB variables) is supported using JavaChart, a third party graph/chart tool from Visual Engineering. Class NpGraphCanvas hosts the JavaChart widget and contains accessors to the supported graph parameters. As explained above, in this embodiment, two types of graphs are support. One is framed, and one is embedded in element view area 602.

Class NpGraphCanvas provides a canvas suitable for drawing one or more lines in a date line (the x axis is time) graph. This class maintains arrays of X and Y values and calls JavaChart APIs to construct and draw the graph. The method updateTimeGraph( ) and method updateGraph( ) append an (x, y) value pair to a data set and redraw the graph.

Methods to customize the graph include setTitle( ), setXAxisLabel( ), setYAxisLabel( ), setTimeDuration( ), set3D( ), setLegend( ), setDataSetColor( ), setFontColor( ), setGridLineColor( ), setCanvasBgColor( ), and setGraphAreaBgColor( ). The name of the methods are descriptive of the operations performed by the methods. In a method name Bg is background.

Class NpGrapher provides an AWT Frame with a NpGraphCanvas object inside. This class handles the Frame window events, e.g., reissue, repaint, close, show, etc. and notifies its client when the Frame is destroyed.

An attribute can be monitored in more than one graph at a time. Class TargetAttribute is responsible for tracking and updating any active graphs of itself; it keeps a graphs Hashtable for this purpose. This class does not perform actual graph creation, since this can occur in different ways (framed or embedded.) Class TargetAttribute implements class NpGrapherAction, which contains methods to notify the observer when a graph is destroyed.

Class TargetAttribute provides the following graph support:

- method addGraph( ) adds an (already created) NpGraphCanvas object to graph's Hashtable;
- method deleteGraph( ) removes a graph from the Hashtable; and
- method updateproxy( ) provides notification callback when an Attribute value is modified, overrides from class TargetObject and sends its latest value to all graphs in the Hashtable using method NpGraphCanvas.update TimeGraph( ).

Framed graphs are created on demand by the user hitting button Graph Value in the Attributes Status Panel (AttributeScreen) when one or more graphable attributes are selected. For an attribute to be graphable, the following conditions must be satisfied, in which case method Attribute Screen.isGraphable( ) returns TRUE:

1. variable is of type INTEGER, COUNTER, or GAUGE. If INTEGER, variable is not an enumerated type;
2. variable has read access;
3. managed element is currently being polled; and
4. managed element actually returned a valid value for the variable (if the request for any variable in the poll event returns an error, i.e., 'noSuchName', most likely no values are returned for any variables in the request.)

All selected attributes must satisfy these conditions for graphing to be enabled. Method AttributeScreen.graph( ) creates and initializes a new instance of class NpGrapher by passing names of all graph items in a parameter dataSetNames to the constructor of class NpGrapher. Each attribute appearing in the Attribute Status Panel list, (class AttributeScreen) described above, corresponds to a TargetAttribute object. When the end-user selects items in the list and activates the graph button, method addGraph( ) of each TargetAttribute object is called. Each TargetAttribute object is responsible for tracking itself in the graph. Specifically, when the value of a TargetAttribute object changes, the object must update it value on each graph that the object appears. To do this, the TargetAttribute object calls method updateTimeGraph( ) of class NpGraphCanvas for each graph in which the TargetAttribute object appears. Each TargetAttribute object keeps a graphs Hashtable of graphs in which the object is currently appearing.

When a NpGrapher object is closed, i.e., the user closes the frame/window that the object occupies, the object calls a callback method grapherDestroyed( ), which is defined in interface NpGrapherAction, which AttributeScreen object implements. In the implementation of method grapherDestroyed( ), AttributeScreen object calls method deleteGraph( ) in each TargetAttribute object that appeared in the graph that was just closed. The result is that each TargetAttribute object deletes that graph from its graphs Hashtable.

With both framed graphs and embedded graphs, user can alter properties of the graph via a popup menu over the displayed graph pane, as described above, when the user selects menu option Properties, which results in a switch to a HotspotPropsScreen object. Because framed graphs are not hotspots, for this to work, a dummy object of class TargetGC is created in class NpGraphCanvas and used to maintain the current graph settings.

Embedded graphs, along with action buttons, are special types of hotspots in an element manager. Class TargetHotspot is the parent of all component types. Class TargetGC extends class TargetHotspot to define a graph component. A graph component is created in HotSpot editor and shown in element view area 602 like all other component types. Thus, the graph component is not contained in a class NpGrapher frame.

Class TargetHotspot, which is the parent class of classes TargetEC, TargetBC, and TargetGC as described above, has a variable guiComp. Variable guiComp can be any Java.awt, and is used for the subclasses of class TargetHotspot that contain more that just an outline. Thus; for class TargetGC, variable guiComp is class NpGraphCanvas; for class TargetBC, variable guiComp is classjava.awt.Button, and for class TargetEC, variable guiComp is null. When a computer network element is being managed, class Element View creates (method createGuiComp( )) and updates (method updateGuiComp( )) guiComps for all applicable components. Method TargetGC.createGuiComp( ) instantiates class NpGraphCanvas, sets up the datasets (each attribute is monitored is one dataset), and calls method addGraph( ) on each attribute monitored, as described above.

When an embedded graph hotspot is first created, a default polling event is created for each attribute to be monitored. Once created, embedded graphs remain active even when not displayed, as long as the computer network element associated with the hotspot is being monitored. This way the user can switch between managed elements and see a graph of the latest polled values immediately.

Conditions (1) and (2) in the above discussion of framed graphs are checked on each attribute as the user attempts to associate the attribute with a graph hotspot during graph definition, in method MibBrowserScreen.mbAddAttribute( ). Since an embedded graph is created as soon as a computer network element is managed, if condition (4) fails, the embedded graph simply remain in a blank initial state.

Because space is limited when displaying embedded graphs in the element view area, some adjustments are made to improve readability. The title and x-axis label are left blank because JavaChart truncates them. The y-axis label is used as the graph title.

Notification

The client can receive asynchronous notifications when the state of server side object changes. This functionality is provided through the remote interface NpObserverProxy which is implemented by the client objects. The interface has only a single method: update( ).

Rather than exporting every client object that is a listener for server side changes, a helper class NotificationDispatcher is provided to manage notification updates from the server. This is a singleton class, and the reference to the class object is obtained by calling the static method instance( ). The object acts as an intermediary between the local objects and server 314 and is called a notification dispatcher. All notification requests by the local object are made to the notification dispatcher, which in turn request notifications from server 314 on behalf of local objects. The notification dispatcher methods addobserved( ) and removeObserver( ) are used by local objects to register or unregister their interest for notifications. In addition, a local object must implement interface NpObserverProxy, as the notification dispatcher forwards the remote update notification to the interested objects with exactly the same parameters as received from server 314.

The notification dispatcher maintains a Hashtable where the remote server object is used as the key. For each server object there can be multiple local objects that are interested in notifications. For each local listener, notification dispatcher also records what type of update the local listener is interested in: add, delete, modify or new alarm.

For convenience, target objects are tightly integrated with the notification dispatcher. To enable notifications, the user can call method setNotificationEnabled(true) on both classes TargetObject or TargetContainer. When the method is called on an instance of class TargetContainer, the method subscribes for notifications for all instances of class TargetObjects inside the instance of class TargetContainer.

When a notification is received, the notification dispatcher updates the affected TargetObject object and invokes method Screen.targetupdate(Targetobject target) on the current Screen. Thus, this method has to be overridden to update ScreenParts objects with new data. The target object method getupdatestatus( ) can be used to find the type of change. Possible values are class TargetObject constants CHANGE_CREATE, CHANGE_DELETE and CHANGE_MODIFY.

Method setNotificationEnabled(FALSE) should be called to disable notifications on the target object/container.

Attributes

In the context of the Attribute Status panel, when multiple MIB variables are polled in a single request, if one or more MIB variables are in error (i.e., noSuchName), no MIB variables may get valid values. Thus, valid MIB variables may be displayed in the list without a value until the error condition is corrected.

Tables present a condensed view of multiple instances of multiple leaf MIB variables, any of which could also be monitored individually. They are presented using Microline's MiGrid class. Class TargetAttribute provides accessors to a table and its values, starting with boolean isTable( ). Method getColHeaders( ) provides table column headings from a tableItems array of strings in Attribute object. Likewise, method getRowHeaders( ) provides table row identifiers from a rowlndexes array of strings, and method getvalue (row, col) returns the latest value at the given coordinate.

A couple of issues arise with tables. SNMP agents in the managed computer network elements sometimes return empty tables (no rowIndexes). One reason may be that there are simply no instances of the MIB variables currently in the table. Another reason may be that tables are constructed on demand as they are requested, and this sometimes takes a while. Problems occur when requests come in faster than the SNMP agent can construct the table. Different ways of handling this issue have been tried. It was concluded that the best behavior is to ignore empty tables—server 314 does not call method notifyObserver( ) for an attribute update unless Attribute.rowIndexes array has length >0. It may occur that the initial call to method Attributes.updateAllAttributes( ) returns an empty table, in which case button Display Table remains disabled for that table until the table becomes non-empty.

Because notification of an attribute update can happen at any time, and notification callbacks are on a separate thread, it is quite possible that a table TargetAttribute is updated and changes in size or becomes incomplete while its GUI representation (MlGrid) is in the process of being created. This can cause exceptions or potentially crash class MlGrid. This has been handled by disabling the GUI during updates, synchronizing methods, and adding extra exception handling at various points of table construction.

SERVER STRUCTURE

In one embodiment, managed element server 314 is written in the JAVA programming language and built on top of JAVA Development Kit (JDK) version 1.1 and above with exceptions on user authentication and raw socket support, which are implemented as native methods. JDK Version 1.1 is available from Sun Microsystems, Inc. of Palo Alto, Calif. By implementing server 314 in JAVA code, JAVA's Write Once, and Run Everywhere benefit is obtained, with very minimum porting effort for the native methods mentioned above. The JAVA programming language is a general-purpose concurrent object-orientated programming language that is computer architecture neutral. The JAVA application of this invention is robust, secure, portable distributed, multi-threaded, high performance, and dynamic as described herein. Appendix A is one embodiment of a server API, which is incorporated herein by reference in its entirety.

Managed element server 314 and client 391 require computations running in different address spaces, potentially on different hosts, to be able to communicate. The JAVA programming language provides a basic communication mechanism—sockets, which are flexible and sufficient for general use. However, sockets require the client and server 314 to engage in applications-level protocols to encode and decode messages for exchanging information. The design of such protocols can be cumbersome and error-prone. The JAVA Remote Method Invocation (RMI) system is thus adopted for communication between server 314 and a client. RMI is a distributed object model for the JAVA language that retains the semantics of the JAVA object model, making distributed objects easy to implement and to use. RMI is known to those of skill in the art and is documented in publications available from Sun Microsystems, Inc. and others and so is not described in detail herein.

Element managers created by using visual element management builder 406 are preserved by utilizing JAVA's object serialization. To support versioning of classes, each version of a class except the first must specify a variable SerialVersionUID. Variable SerialVersionID indicates the original class version for which the current class is capable of writing or reading streams. To maintain the element manger compatibility, caution needs to be taken when making changes into the classes. Refer to the JDK 1.1 Object Serialization Specification, that is available from Sun Microsystems of Palo Alto, Calif., for further details.

FIG. 38 is an illustration of the object model as well as the containment hierarchy in managed element server 314. Each of the objects is described in more detail below. ServerConnectImpl object 3800, ServerImpl object 3901, BuilderImpl object 3840, ManagerImpl object 3802, AlarmFactoryImpl object 3820, ElementAlarmImpl object 3821, TrapServer object 3830, MibFactoryImpl object 3841, MibTreeImpl 3842, PollServer 3806, and EventEngine object 3807 are transient objects, i.e., these objects are instantiated during run time and are not saved as part of an element manager. The other objects in FIG. 38 are saved to compose the template and managed element files.

When managed element server 314 starts up, a single ServerConnectImpl object 3800, ServerImpl object 3801, BuilderImpl object 3840, ManagerImpl object 3802, AlarmFactoryImpl object 3820, TrapServer object 3830, and MibFactoryImpl object 3841 are instantiated. If there are group and managed element object files, which have been created before, these files are loaded automatically, and managed by managed element server 314. ETImpl object and those objects it contains, i.e., an element manager, are not loaded in the memory until a client specifically instructs to do so.

FIG. 39 is a illustration of server RMI object class hierarchy. The class naming convention as used herein (FIGS. 38 and 39) is to add Impl to the end of the name of the server RMI interface class to identify the class that implements that server RMI interface class. In FIGS. 38 and 39, for reference numerals that end with the letter A, the last two digits of a reference numeral are used to relate the implementation class with the interface class. Since the hierarchy in FIG. 38 is somewhat different from that shown in FIG. 39, some classes in FIG. 39 have a slash and followed by a two digit number to relate back to the corresponding elements in FIG. 38.

Class ServerObject 3901A (FIG. 39) is the base class for all the server RMI objects. Class ServerObject 3901A has information about an object's name, description, its parent object reference, references to children objects, a list of children's object names to preserve the sequence of creation, and arrays to keep track of event observers. Method getNameTree( ) returns a NameTree object which resembles a subset of the object names in a hierarchical order. Method matchMyName( ) is used to find a server object by giving names in a hierarchical order.

Methods getInfo( ) and setInfo( ) are defined as abstract methods and are left for subclasses to implement. Method getInfo( ) is used by a client to get the server object's attributes; method setInfo( ) is used by the client to save the changes that the user has made into the server side. Shadow classes are used between server 314 and a client to exchange information on an object's attributes. FIG. 40 illustrates the class hierarchy for server shadow classes.

Class ServerConnectImpl 3800 is the class that contains method main( ) for the managed element server application. Two command line options are acceptable by managed element server application: –p to indicate the port number to use for service binding; and –D to indicate the root directory and code base. Wen the root directory and code base are specified, the path is stored as part of the JAVA system properties.

When method main( ) is invoked, the method first creates a ServerSecurityManager object, which implements a security policy for managed element server 314. Class ServerSecurityManager is a subclass of class RMISecurityManager, and overwrites method checkDelete( ) to allow files created by managed element server 314 to be removed from the file system upon a user's instruction. Method main( ) also tries to get the root directory by examining system property netprism. home as result of specifying the –D option). If property netprism. home can not be found, a default directory \netprism\rt is used as the application root directory. A log file NetPrism.out, where server side error messages are logged, is created under $(netprism.home)\users\log.

Method main( ) next instantiates a singleton ServerConnectImpl object 3800 and binds this object with the service name in the registry. The service name has a URL syntax and is specified using the host name, port number, and name:

//<host__name>:<port__number>/NetPrismServer.

The default port number is 5090, and the user can change the port number with the command line option '–p' or during installation.

In one embodiment, a suite of products is packaged together, a basic managed element server, and an advanced managed element server that includes a visual element manager builder. The latter product requires a license to run In method main( ), managed element server 314 tries to find out from the license manager if a proper license file is installed. If no license file is found, basic managed element server is executed, which can manage up to ten computer network elements, and supports one client at a time. If the license key for advanced managed element server is found, an unrestricted number of computer network elements can be managed, and an unrestricted number of clients can be used to manage computer network elements. Flag advanceManagerFeature flag is initialized accordingly. Managed element server 314 uses a separate thread HeartBeatThread to send keep alive message to the license manager every 10 minutes. This is needed when server 314 terminates before server 314 has a chance to release the license it obtains, the license manager re-claims the license if no keep alive message is received within the configured time interval.

The visual element management builder 406 is accessed by a client, so when method Login( ) is called, a visual element management builder 406 license is requested. Upon success, the client id and license handle are stored in method SDKHandleTable. Thus the visual element management builder 406 license can be released later when the user logs off. Method Login( ) invokes WINDOWS native method to verify if user has a valid user id and password on the system where managed element server 314 is running. If user authentication succeeds, method login( ) returns a reference to a remote Server object that is described below.

When class ServerObject 3901A is instantiated by class ServerConnectImpl, object 3801 looks for a netprism.properties file under $(netprism.home)\lib. This file contains some user configurable parameters, such as the managed element server name, directory path for alarm log file, and the maximum entries in alarm log file:

#netprism.domain=NetPrism@myHome

#netprism.alarmlogpath=c:\\Fujitsu\\NetPrism\\users\\log

#netprism.alarmmaxentry=128

Parameter netprism.domain is used as the server name, and is shown in the client browser as the root of navigation tree 305. If parameter netprism.domain is not defined, NetPrism@<hostname> is used as the default. Parameter netprism.alarmlogpath is the absolute directory path where the alarm log files are saved. If parameter netprism.alarmlogpath is not defined, $(netprism.home)\users\log is used as the default. Parameter netprism.alarmmaxentry is the maximum number of entries that an alarm log file can have. If parameter netprism.alarmmaxentry is not specified, 128 is the default number.

When ServerImpl object 3801 is instantiated, object 3801 also looks for a startup file under $(netprism.home)\lib directory. Each line in the startup file contains an element manager name followed by an IP address or host name separated by @. When server 314 is started or restarted, server 314 checks for the existence of the startup file. If the startup file exists, server 314 checks each entry in the startup file to determine whether a managed element object is stored in directory $(netprism.home)\lib\element. If a managed element object is not present for the startup file entry, a managed element object is created and saved in directory $(netprism.home)\lib\element directory. Note the element manager template that is used to create the managed element object should be present in directory $(netprism.home)\lib\template. The managed element objects under directory $(netprism.home)\lib\element are deleted if there is not an entry for the managed element object present in the startup file. Also, if the start-p file does not exist, all the managed element objects under directory '$(netprism.home)\lib\element' are loaded.

ServerImpl object 3801 also instantiates other server objects for performing different functions, including BuilderImpl object 3840, ManagerImpl object 3802, TrapServer object 3830, a SnmpAPI object and a MibBrowsersImpl object 3860. (The SnmpAPI object is from the third party AdventNet Snmp package, that is described below.) Get methods are provided for obtaining references to those objects. Method getBuilder(ClientId) checks variable SDKHandleTable of ServerConnectImpl object 3801 to see if clients are licensed for visual element management builder 406. Method getBuilder(ClientId) returns the BuilderImpl object reference if the client is licensed.

Method find( ) can be called to get the object reference in the object hierarchy by specifying the hierarchical object names. Method find( ) also defines a severity level that is to be associated with the state as an indicator. As described above, each severity level has a name, priority, color, blinking rate, and description.

HotSpot Attributes (MIB Variables)

A singleton MibFactoryImpl object 3841 is instantiated when server 314 starts up. Method getMibList( ) of object 3841 is used to return a list of MIB files found under directory $(netprism.home)\users\mib. This list is displayed in MIB file field 1505 of select MIB variables panel 1500, as well as for the MIB browser. Method load( ) is used to load a MIB file by specifying the MIB file name in response to notification from a client that the user has selected the file. Method load( ) instantiates a MibTree object which uses AdventNet's SNMP.MibModule to compile and load a MIB file. MibFactoryImpl object 3841 keeps track of the MIB files that have been loaded, so the same MIB file is not reloaded when the MIB file is requested the second time.

A MibTree object has methods to get the MIB file name (name( )), the name of the root MIB variable (root( )), and a method find( ) which can be used to get the object reference of a MibObject object by specifying the MIB variable name.

Class MibObject is a wrapper class for a MIB variable. Class MibObject can represent either a leaf node or a table in the MIB tree. Class MibObject contains information that includes MIB variable symbolic name, name in dotted number format, access mode, data type, flags to indicate if the MIB variable is a leaf node, a table, or has predefined enumerate labels. Method getHierarchicalNames( ) returns a name tree object with the current MibObject object as the root, which represents a subset of the MIB tree. Class MibObject is mainly used by a client MIB Browser to navigate and interact with the MIB tree. When a MibObject object is associated with a hotspot, an Attribute object is instantiated based on that MibObject object, and added into the hotspot.

Class Attribute is a sub-class of class MibObject. Class Attribute provides run time information such as polled value(s), previously polled value, and instance numbers if it is a table attribute. The polled value is stored as a string object if it is a leaf Attribute object. For a table Attribute object, a MibTableIndex object is constructed based on the instance number and table item. A TableValue object is constructed as well based on the polled value and its value type. The TableValue object is stored in the rowindexes Hashtable with the corresponding MibTableIndex object as a key.

Methods setvalue( ) and getvalue( ) are provided to do SNMP set and get operation on the SNMP-enabled computer network element. Method setValue2( ) is provided for a polling thread to update the value of the Attribute object. For a table Attribute object, the instance number and table item are specified when methods setValue( ), setValue2( ) and getvalue( ) are called.

Method pollTableDone( ) is called when class PollTableThread finishes polling a table attribute. The polled result is sent to any clients which are registered as an observer.

Method getHierarchicalNames( ) is overwritten to return just its name because in the server object model, Attribute object is considered a leaf node.

Class ValueAttribute (FIG. 39) is a sub-class of class Attribute 3913A, and contains an extra data field—valueToBeset. The extra data field is used by the ButtonComponentImpl object for action buttons. The value in the extra data field is set by the users in the client MIB Attribute Panel 1600 (FIG. 16). When the action button is pressed, method setValue( ) is called with the variable valueToBeSet to do SNMP set operation on the managed computer network element.

State

There are two kinds of state objects, e.g., LEDStateImpl object 3817 and StateImpl object 3816 (non-LED). A hotspot can only associate with either a LEDStateImpl object 3817 or a StateImpl object 3816. Both LEDStateImpl and StateImpl objects are persistent objects.

LEDStateImpl object 3817 contains elements that include names, description, the color of the LEDStateImpl object, and the blinking interval of the LEDStateImpl object. A hotspot LEDStateImpl object name has to be unique, but its color and blinking interval does not have to be unique within the same hotspot. Colors and blinking intervals represent the visual appearance of a LEDStateImpl object.

StateImpl object contains elements such as names, severity and description. Again, a hotspot StateImpl object name has to be unique. Severity level choices are predefined as FatalErr, Critical, Warning, Normal, Unknown, and Disabled.

Poll Event

A PollEventImpl object 3846, 3810 contains information on a set of attributes that are periodically polled, a default polling interval, the current polling interval, flags to determine if polling is turned on or off, and if polling results are logged. A PollEventImpl object 3846, 3810 also contains a list of states and associated polling interval for each state that are used for state-dependent polling. The poll event is polled only when the hotspot is in one of the states listed. Since PollEventImpl object is part of an element manager template, e.g., object 3850, as well as a managed element, e.g., object 3814, there is a flag monitorMode to distinguish between the two uses so that class data members can be initialized correctly. The flag is set to false initially for an element manager. The flag is set to true when the object is in a managed element object.

Method create( ) is called to instantiate EventRuleImpl object 3854, 3818 which is used to check against the polling result. Method needToBeDone( ) is used to check if PollEventImpl object should be performed. Method needToBeDone( ) checks the current state of the hotspot, and determines if the current state matches any states that this PollEventImpl object is scheduled for execution. If there is a match, variable currentPollInterval is set to the polling interval associated with the state, and a boolean true is returned. In the case of a GraphComponentImpl object that does not have states, method needToBeDone( ) returns true, and variable currentPollInterval is set to the default poll interval.

When method setInfo( ) is called, if PollEventImpl object is currently being executed, a call to method PollServer.stopPollEvent( ) is called to stop the polling thread. After the attributes of PollEventImpl object are set, if the hotspot is still being polled, and method needToBeDone( ) returns true, and method PollServer.doPollEvent( ) is called to restart the polling.

Trap Event

TrapEventImpl object 3851, 3815 represents a trap event in server 314. TrapEventImpl object 3851, 3815 contains generic code, specific code, and attributes list: a list of variable bindings of the PDU, mibNumToAttrNameTable, and some necessary data structures. AttributeList object is a vector object, that is used to store the names of all variable bindings of the PDU from a received trap. To increase the performance of method RuleImpl.handleAddAlarm( ), a mibNumToAttrNameTable Hashtable is used to store a mapping of each MIB attribute name in the AttributeList object to a MIB numbered name.

Method createRuleOfTrapEvent( ) is called by method create( ) in interface TrapEvent to instantiate class EventRule 3918/19A.

Event Rule

Class EventRuleImpl is a subclass of class RuleImpl. Class EventRuleImpl contains the necessary information of a rule for a polling event or a trap event. EventRuleImpl object 3854, 3855, 3818, and 3819 can have more than one state, and the states are saved in a states vector. Method perform( ) takes the action for a matched EventRuleImpl object when a trap or polling event happens. If the EventRule object of a trap event matched, method perform( ) calls method handleAddAlarmOfTrap( ) to add the contents of the variable binding data to the alarm log file by alarmFactoryImpl object 3820. For a polling event, method perform( ) calls method handleAddAlarmOfPolling( ) to add the data of the polling result to the alarm log file.

Element Component

Class BaseComponentImpl is a sub-class of class ServerObjectImpl and instaniates the base class for the four classes that implement the different components described above and that are illustrated in FIG. 39. Specifically, Class BaseComponentImpl contains information about the (x, y) coordinates, the component's width and height, its shape, the color for editing, the width of a line surrounding the component (hotspot area), and an object reference to AttributesImpl object, the container object of AttributeImpl.

Class ButtonComponentImpl is used for component type action button. This class contains extra information on the label for the button, the type of the button (regular or transparent), the foreground and background colors of the button.

Class PollComponentImpl is used for components that are hotspots and have poll events associated the hotspot. This class is the base class for classes GraphComponentImpl and ElementComponentImpl. Class PollComponentImpl has an object reference to PollEventsImpl object, a container object of PollEventImpl, and a Hashtable for keeping track all the polling threads that are associated with it.

Class GraphComponentImpl is used for a component type embedded graph. This component has information on the title of the graph, the graph style (line, bar, or pie chart), x axis width, graph background color, and a boolean flag to indicate if the legend is shown.

Class ElementComponentImpl references to StatesImpl object, a container object of StateImpl object, and TrapEventsImpl object, a container object of TrapEventImpl object. Class ElementComponentImpl is the base class for classes PortComponentImpl and LEDComponentImpl, which are used for component types active component and LED component respectively. This class also keeps track of the current state of the component hotspot, which is the basis for state-dependent polling and event rule engines to be functioning. An Initial state is defined for use before the state of the component can be decided, i.e., all the ElementComponentImpl objects are in Initial state before the object receives any events (polling or trap events) that cause state transitions.

Element Manager

Class ETImpl is the class that preserves the element manager application that a user creates. Class ElementComponentImpl contains information on the computer network element image file, sometimes called the background image, the MIB files associated with the computer network element, the vendor name and logo, the product name and information of this element manager file, and user defined components, which represent the different parts of the system that can be managed.

When the user has created the element manager, the element manager is saved into a file using JAVA's Serialization mechanism. The file is kept at $(netprism.home)\users\template for future use. The information saved includes the ETShadow object 4043(FIG. 40), the customer id given to the user, the version number of the software that user used to create the application, and the ETImpl object, and the CRC checksum of the template file. Whenever managed element server 314 loads an element manager from disk, server 314 performs a checksum of the element manager and returns an error if the stored checksum doesn't match the calculated checksum. This is provided to detect if an element manager has been tampered with.

ETImpl object can be considered as a container of user configured components. It has a factory method create( ) to create different kinds of components that users can possibly create. Method create( ) takes a ServerObjectShadow object 4001, and depending on the type of the shadow class, i.e., PortShadow object for component type active component, LEDShadow object for component type LED component, GCShadow object for component type embedded graph, or BCShadow object for component type action button, creates a different component object and saves the different component objects in variable children Hashtable.

In method setInfo( ), if the ETImpl object name is changed, this method update its parent's (BuilderImpl) content object, which is a collection of ETShadow object, variable children Hashtable (ETImpl name is the key to the children Hashtable), and variable childrenList with the new name. The element manager with the old name also is deleted from the file system.

Builder

Class BuilderImpl is the focal point for building an element manager. Class BuilderImpl initializes the directory paths where the image files and element managers are kept. Class BuilderImpl also instantiates a MibFactoryImpl object 3841 for loading and browsing MIB files. Class BuilderImpl is visible only if the user has a license for visual element management builder 406.

Method create( ) is called with an ETShadow object (FIG. 40) to create an element manager template file. When the user has created an element manager, as described above, method save( ) is called with the element manager's name to save the file. The file contains an ETShadow object of the ETImpl object 3843 currently being saved, the server software version number, the id number of the customer who is creating the file, the ETImpl object, and finally a checksum of the file. Method load( ) is called to load a previously created element manager. When managed element server 314 loads an element manager from the disk, server 314 reads in the stored objects in the same sequence as they were stored, and performs a checksum of the file. An exception is thrown if the stored checksum doesn't match the calculated checksum. This is provided to detect if an element manager has been tampered with.

Method getcontent( ) returns an array of ETShadow objects. The purpose of having this method is to provide the client enough information to show the element manager currently available on the system without actually loading them. A specific element manager is loaded only when method load( ) is invoked. Method find( ) is provided for the client to obtain a server remote object reference by giving the hierarchical name of the object it tries to reference. The hierarchical name is represented by an ObjectName object. It contains a vector of names that resembles the hierarchy of navigation tree 305.

Element

All managed elements in the server side are represented by ElementImpl objects 3809. ElementImpl object 3809 contains a set of data structures to control a managed element, e.g., the variables defined in an element manager file, and tables created for internal control. When a managed element is defined from an element manager, all contents of the element manager are copied to this managed element object. The copy operation is done by method copyComponents( ) and method copyTrapRules( ). If the user turns on the monitor mode, the poll server is on for this managed element.

There are two kinds of managed element objects in the server side. A regular managed element object is associated with an element manager, but managed element objects created from auto discovery may not associate with any element manager. The names of these special elements always have a prefix "EMNotFound". Two constructors are implemented in class ElementImpl. One of the constructors is for regular managed element objects, but the other one is designed to build a managed element object without any element manager. This special constructor does not instantiate the EventEngine object 3807 and PollServer object 3806 for the element.

Class ElementShadow is used to pass data between the client and server sides. The purpose of this shadow class is to reduce the RMI calls between the client and server 314 for a simple operation. Methods getInfo( ) and setInfo( ) are used to pass this shadow class.

When a new ElementImpl object is created, the handle of this object is stored in a Hashtable of AllElementsImpl object. The name of this Hashtable is children. The name of the managed element object is used as a key for the entry in Hashtable children.

All managed element objects belong to group All Elements. As explained above, a managed element object can belong to more than one group, and can be assigned to other user defined groups. A vector groupList in ElementImpl object 3809 stores element group names to which this managed element object belongs. However, group All Elements must be the first name in vector groupList.

Group All Elements is the center to control (create and delete) for each managed element object. When a managed element object is created/deleted, every ElementGroupImpl object having this managed element object must be updated. Two methods are provided of this purpose. Method updateElemListOfElemGroup( ) updates the managed element object name in the managed element object list of all groups that have this managed element object. Method updateGroupListOfElement( ) updates Hashtable children in all groups that have this managed element object.

Element Group

An ElementGroupImpl object 3803 represents a user-defined group object in the server side. ElementGroupImpl object 3803 contains the name of the group, the person's name and phone number who maintains the devices of this group, and some necessary data structures. ElementGroupImpl object is instantiated from ManagerImpl object 3802 of server 314, and is referenced from a Hashtable of ManagerImpl object 3802. Server 314 saves all managed element objects to a system-predefined group, and its name is group All Elements. Group All Elements is an AllElementsImpl object instantiated in the constructor of ManagerImpl object 3802.

Class AllElementsImpl inherits from class ElementImpl, and its name is unchangeable. Method load( ) loads an element manager from the server machine as a managed element object. Method delete( ) deletes all references to this element object from any ElementGroupImpl objects and AllElementsImpl object, at which point this object is removed by the garbage collector provided by the JAVA virtual machine.

In class ElementGroupImpl, a set of methods are implemented to handle ElementImpl objects. The methods include method addElement( ), method saveElement( ), method delete( ), method and getAlarms( ). Method saveElement( ) is used to save an ElementImpl object to a file in the server machine. Method addElement( ) is used to add an existing managed element object to another group. Method delete( ) is different from the one defined in AllElementsImpl object. It only deletes the reference of this instance of ElementGroupImpl object to that ElementImpl object. Method delete( ) does not influence the relationship between other ElementGroupImpl objects to that ElementImpl object.

Method createElement( ) is used to create a managed element object. This method calls the constructor of ElementImpl object to build a managed element object.

Manager

ManagerImpl object 3802 is the object that creates the environment to monitor and/or control any SNMP-enabled devices/elements. When server 314 starts up, a ManagerImpl object 3802 is instantiated, and it in turn creates AlarmFactoryImpl object 3820 for managing alarms and DiscoveryImpl object for implementing the auto-discovery operation.

Managed computer network elements can be grouped based on a user's needs. Information about user-defined groups are saved into a file groups stored, in one embodiment at $(netprism.home)\users\groups. File groups is loaded when server 314 starts. The file contains a list of group names and Hashtable children (a collection of ElementGroupImpl). If file groups does not exist, a default group All Elements (an AllElementsImpl object) is created automatically, which keeps track of all the computer network elements currently being managed.

For each ElementImpl object contained in Hashtable children of AllElemntsImpl object, ManagerImpl object 3802 loads the ElementImpl object, and re-establishes the connection between the managed element object and the group(s) to which it belongs, loads in the alarm log file associated with the managed element object, and starts managing the associated computer network element.

Method create( ) is called when a new user-defined group is desired. The name of the group needs to be unique.

Method delete( ) is called to delete an ElementGroupImpl object 3809 that was previously created by a user.

Method save( ) is called to save all the groups' persistent data. Methods getContent( ) and find( ) have the same functions as those defined in class BuilderImpl, except that method getContent( ) returns an array of ElementGroupShadow objects. Method getETList( ) returns a list of ETShadow objects that are currently available on the system. This is to provide users information on the element managers they can choose from when they want to start managing an element. (See FIG. 9A.)

Trap Receiver

Trap server 403 (FIG. 4) receives all traps from other hosts. Trap server 403 is implemented as a TrapServer object 3830. TrapServer object 3830 accepts traps with any community name, If a received trap is from one of the managed computer network elements in server 314, TrapServer object 3830 creates an InSnmpTrap object from the SnmpPDU object, and passes this InSnmpTrap object to the appropriate EventEngine object.

There are two cases trap server 403 needs to handle: 1) trap port 162 is available; and 2) trap port 162 is occupied by a trap daemon. For the first case, an AdNetTrapDaemon object is implemented to receive traps from port 162 directly. For the second case, a daemon object is used to listen to the trap daemon which is installed in the system and occupies trap port 162. Basically, if the user wants to use other programs with server 314 in the same system and let all of the programs receive SNMP traps, a trap daemon is a choice to allow more than one program to get SNMP traps. The trade-off is all programs must use the API for that particular trap daemon to get traps. Trap server 403 checks the port when it is instantiated, and determines which case it needs to handle.

Trap server 403 implements interface Observer, and classes Daemon and AdNetTrapDaemon inherit from class Observable. Any received traps are constructed as class SnmpPDU and passed to Trap server 403. Both classes AdNetTrapDaemon and Daemon perform the same function but the ways they get traps are different. Both pass a SnmpPDU object to trap server 403 when a trap is received. A SnmpPDU object is passed to TrapServer object by calling method notifyObservers from the Daemon or AdNetTrapDaemon objects. TrapServer object 3830 gets the PDU from method update( ).

AdNetTrapDaemon object is implemented by using the class of AdventNet SNMP Package. AdNetTrapDaemon object implements interface SnmpClient. AdNetTrapDaemon object is used only when the trap port 162 is not occupied by any trap daemon. A SnmpClient object receives traps from a callback function, and it needs to implement three methods: callback( ), authenticate, and debugPrint( ). If a trap with Enterprise ID=".1.3.6.1.4.1.212.4.1.4.5", is received, the trap is filtered out, otherwise traps are passed to the trap server 403.

Daemon object is used to call a native method to get the trap's PDU from a running trap daemon. Daemon object is only called when the trap port is occupied by a trap daemon. A trap daemon is dedicated for an operating system. Native code is used to call the API functions to get the PDU of a received trap from the trap daemon. For a SOLARIS operating system, Fujitsu Software, Inc. of San Jose, Calif. provides a SNMP Trap Daemon package. This package is installed in the SOLARIS system before server 314 is invoked. The native code, which implements the Daemon object's native methods, links with a library file: libNWsnmp.so dynamically. Library file libNWsnmp.so is located inside the default library directory after the Fujitsu SNMP Trap Daemon package is installed. In a WINDOWS NT operating system, the SNMP Trap Service that come with the operating system is supported. It is a standard SNMP trap daemon for WINDOWS NT operating systems.

Daemon object is a JAVA thread running a native method createVirtualDaemon( ). This object uses an infinite loop to get traps from the trap daemon. To construct a SnmpPDU object easier, Daemon object provides three methods for the native method to callback. The methods are: getPduPart1( ), addVarBind( ), and returnPdu( ). The implementation of method createVirtualDaemon( ) for both operating system platforms uses these three callback functions to construct the SnmpPDU object. If a trap has Enterprise ID=".1.3.6.1.4.1.212.4.1.4.5", the trap is also filtered out by method createVirtualDaemon( ).

InSnmpTrap object is a buffer to hold the PDU data from a received trap for the EventEngine object. InSnmpTrap object also converts the MIB variables from an attribute name of a MIB variable to numbered name. A method forward( ) is also provided to forward a trap to another host.

Poll Server

PollServer object 3806 is the factory object to create threads for each polling event, or to perform single SNMP operations. There is one PollServer object 3806 for each managed element object. A log file is created automatically for each managed computer network element under $(netprism.home)\users\poll with the computer network element name appended with '.PollLog' as the log file name. A SnmpReply object is responsible for logging the poll data into the log file. The SnmpReply object writes over from the beginning of the file when the maximum poll log size, MAX_POLL_LOG_SIZE (currently it is set to 64000 bytes), is exceeded.

Method snmpSetRequest( ) is called to do the SNMP set operation. The third parameter to the call has the format of "variable=value" for a non-table AttributeImpl object, or "variable=value=type" for a table AttributeImpl object. 'variable' is the MIB variable to be set and 'value' is the value to be used in the set operation. 'type' is needed for setting an item within a table AttributeImpl object, because the type is not known until the table is polled and is stored by calling method AttributeImpl.setValue2( ).

Method doPollEvents( ) loops through all poll events for all the components(hotspots) and calls method doPollEvent( ). Method doPollEvent (PollEventImpl) separates the AttributeImpl(s) object(s) associated with the PollEventImpl object into two groups, those that are table AttributeImpl objects and those that are not. For each table AttributeImpl object, there is a SnmpRequest object created. There is only one SnmpRequest object for all the other non-table AttributeImpl objects. For each SnmpRequest created, a call to method doPoll( ) starts the polling. Method doPoll( ) instantiates a PollTableThread object if a table is polled, or instantiates a PollThread object for non-table AttibureImpl objects. Each PollTableThread object or PollThread object is a separate thread to send out the SNMP request periodically based on PollEventImpl object's variable currentPollInterval. For each response a PollThread object receives, a call to method EventEngine.processEvent( ) activates the event rule engine to check the polling result against the EventRuleImpl object configured for the PollEventImpl object. The PollThread object then sleeps for the polling interval before it sends out next request. Note that PollTableThread object does not invoke EventEngine to evaluate the polling result. When PollTableThread object finishes polling the whole table, a call to method AttributeImpl.pollTableDone( ) notifies the client that the values have been updated.

SnmpRequest object contains information on AttributeImpl(s) objects that needs to be polled, the SNMP operation type (get, set, or getnext), a DatagramSocket object (pduSocket) for sending out the request, and a DatagramWatchThread object acts as a timer for polling time-out and retry. Method sendpdu( ) is called to send out a request by the polling thread. It is a blocking call and returns when it receives response from the device or the request has timed out. In former case, the value of the AttributeImpl object is updated (either the polled value or an error), and in the case of time out, AttributeImpl object has the value "time out".

DatagramWatchThread object is a separate thread that sends a time-out signal to SnmpRequest object's pduSocket. If a time-out signal is received by the SnmpRequest object, the retry counter is decremented, and the request resent. This continues until the retry counter decrements to zero, the DatagramWatchThread object then terminate. If response is received, variable SnmpRequest.gotReply is set to true, and the DatagramWatchThread object terminates.

The above operations are summarized in FIG. 41. For clarity, the above operations are again summarized using FIG. 41. For each polling event, there is one PollTableThread object 4101 for each table Attribute object and one PollThread object 4102 for all the other leaf Attribute objects. (In FIG. 41, rather than draw multiple objects, an integer is located next to the lines leading to and from an object. The integer on the line to the object is the number of instances of the object. Thus, in this embodiment, there are m PollTableThread objects and n PollThread object 4102. A similar method was used in FIG. 38.)

Classes PollTableThread and PollThread are subclasses of class Thread and are running as long as the polling event remains active (polling on). Each PollThread object 4102, and each PollTableThread object 4101 has a corresponding SnmpRequest object 4103, and 4104, respectively that is used to periodically send out the SNMP request 4109 and 4108, respectively, to SNMP agent 4150 in the managed computer network element. Either after a response 4111 and 4110, respectively, comes back from SNMP agent 4150, or the request is timed out, the result is logged by interface SnmpReply (an interface to the polling log file) if logging is turned on. The event engine is also invoked if it is a PollThread object, and then the polling thread sleeps for the polling interval before it issues the next request.

A table Attribute object is polled in a row fashion (one entry at a time) until all the rows (entries) have been polled. PollMibTable object 4107 is used by PollTableThread object 4101 to keep track of the table entries by examining the instance number of the polled result. If the end of the table has not been reached, the instance number is for the SNMP getnext request. To determine if the end of a table has been reached, the OID of the first element of the polled entry is compared with the first table entry (baseOid) defined in the MIB file.

For each SnmpRequest object 4103 and 4104, there is an associated DatagramWatchThread object 4105 and 4106, respectively, serving as a timer. The DatagramWatchThread object sends out a signal to associated the SnmpRequest object when the timer expires. When the SnmpRequest object receives data on the receiving port, if data is sent from the local host, SnmpRequest object assumes it is the time out signal, otherwise, it should be the response from the device.

Due to the resource limitation on SOLARIS platforms, the number of sockets opened for sending out SNMP requests is limited. There is only one socket opened (in PollServer object 417) for all the polling requests within a managed element.

Event Engine

Event engine 418 is the event rule engine and is implement as EventEngine object 3807. EventEngine object 3807 is used to process all polling and trap events for a managed computer network element based on the rule(s) specified in the associated element manger. Method processEvent (PollEventImpl pollEvent) is called by method PollThread.run( ) when a polling result is received. Method processEvent( ) builds a Hashtable with every Attribute object being polled by using its name as the key, and the object reference as the value. This is needed when the expression specified in the EventRuleImpl object is parsed, the attribute names need to be replaced with the polled values. Method processEvent checks the current state of the component that this poll event belongs to; loops through all the rules defined for this poll event; and sees if there is a rule that can be applied in this current state. If there is a rule, the rule's condition is pulled out and evaluated with the polled value. If the condition is evaluated as true and any persistence condition is satisfied, the action specified in the rule is executed.

Method ExpressionParser.evaluate (hashTable attrValueTable) is used to parse and evaluate the rule condition. Variable attrValueTable contains the names of the attributes and the object references to them. ExpressionParser object uses a Stack object to push or pop results while doing parsing/evaluation. During evaluation, the attribute names specified in the condition are replaced with the polled values. ExpressionParser object is generated by a parser generator, JAVACC, a product from SunTest (http://www.suntest.com/JAVACC/index.html). JAVACC is a parser generator that produces parsers in JAVA from grammar specifications written in a Lex/Yacc-like manner.

Method EventRuleImpl.perform (PollEventImpl pollEvent) is called when the action specified needs to be taken. The action can be one or more of the following: execute a system command, log event to the alarm log file, and change component's state. To execute a system command, a separate thread, CommandThread object, is created to execute the system command. When changing state is desired, the current poll event is stopped, the component's state is switched to the one specified, and if there are poll events configured for the new state, they are started.

Method EventRuleImpl.perform(InSnmpTrap trap) works much the same way as the one for poll event, except that this is for a trap event, and if there is no rules associated with the trap event, the default action is to log the trap into the alarm log file. If a matched rule is found, the Attribute names specified in the rule condition are replaced by the values of the MIB variables from the trap. There is one extra action can be taken for trap event—forward trap event to a host.

Alarm

Alarms are generated by all trap events and by the polling events that satisfy a rule which includes recording events to the alarm log. Alarms are recorded into an alarm log file for each managed element. In AlarmFactoryImpl object 3820 (FIG. 38), method loadAlarmLog( ) is used to load the existing alarm log files for the managed elements and to pass the handles to the ElementAlarmImpl objects 3821. In the case where alarm log files do not exist yet, method loadAlarmLog( ) creates the new references of these elements and passes handles to the ElementAlarmImpl objects 3821. For each managed element, method addNewAlarm( ) is used to add a new alarm to the corresponding alarm log file. Method getElementAlarm( ) takes the name of the element, and passes the handle to the corresponding ElementAlarmImpl object. Method getGroupAlarm( ) obtains the filtered alarm headers at a group level. This method is discussed in more detail later.

Alarm object 3804 contains two pieces of information AlarmHeadShadow object and AlarmDetailShadow object. (See FIG. 40.) AlarmHeadShadow object includes an alarm identification, the time when alarm is generated, the component name associated with the computer network element name the alarm belongs to, the state when the alarm is generated, the corresponding severity, and the person who acknowledges the alarm. AlarmDetailShadow object describes the possible causes of an alarm, the possible solutions, the comments, the trap specific code, and the variable binding of an alarm. Since Alarm object 3804 contains so much information, for a better implementation, it is necessary to separate the information into the two objects AlarmHeadShadow and AlarmDetailShadow. ElementAlarmImpl object 3821 contains the alarms for a managed element. Within the same element, each alarm has its unique alarm id which is used for identifying alarms. By default, the most recent 128 alarms are retained in an alarm log persistent file (save under the directory specified by the netprism.properties) for each managed element at any time. When the maximum limit is reached, the oldest alarm in the alarm log is eliminated. These actions are performed in methods saveElementAlarm( ) and checkFile( ). Methods getElmAlarm( ) and getComponentAlarm( ) are used to obtain the filtered alarms at an element level and a component level respectively. Only the header information in these alarms (see AlarmHeadShadow object for more detail) is provided. If more detailed information is required for that alarm, method getDetailShadow( ) is used to provide AlarmDetailShadow object information for that alarm. These two methods getElmAlarm( ) and getComponentAlarm( ) are discussed in more detail below.

Alarms can be obtained at three levels: group, element, and component. For simplicity, to retrieve alarms under three different levels, one interface getAlarms( ) is implemented in base class ServerObject 3901A. Both AlarmFactoryImpl object 3820 and ElementAlarmImpl object 3821 are the sub classes of ServerObjectImpl 3810. For retrieving a group level alarm, method getAlarms( ) implemented in ElementGroupImpl object, internally calls getGroupAlarm( ) from AlarmFactoryImpl object 3820. Whereas for an element level retrieving, method getAlarms( ) invokes method getElmnAlarm( ) from ElementAlarmImpl in object ElementImpl. Moreover, for a component level, method getAlarms( ) implemented in ElementComponentImpl object calls method getComponentAlarm( ) from ElementAlarmImpl object.

Since a large number of alarms could be generated in a multiple managed elements environment, filtering alarm becomes an important issue. Filter object describes the characteristics of the various filters. There are basically three types of filters: Default, None, and Customized. The Default filter filters all the outstanding alarms. The None filter does not filter out anything, and the Customized filter is composed of the following criteria: the acknowledge status such as Acknowledged, Not Acknowledged, and Both, one or more severity levels, one or more users who acknowledge the alarms, and time range of the alarms. A Filter object is used to apply the filtering to the alarms at these three different levels.

MIB Browser

MIB browser 405 is used to view an element's MIB variable when an element manager for the element does not exist. MIB browser 405 is also used to determine the instance number for a MIB variable.

Object MibBrowsersImpl contains methods get( ), getNext( ) set( ), loadMib( ), saveNewMibFile( ), unload( ), and getMibFiles( ). SnmpApp object provides a set of methods to perform SNMP basic operations such as get, getNext, and set. Method get( ) in MibBrowsersImpl object is used to get the value of a valid MIB variable, and it internally calls method snmpGet( ) in SnmpApp object. A valid MIB instance is required to successfully process this method. Method getNext( ) is used to get the next value of a valid MIB variable, or the current MIB variable if the MIB instance is not specified. Method getNext( ) internally calls method snmpGetNext( ) in SnmpApp object. Method set( ) is used to set the value of a MIB variable. This method internally calls method snmpset( ) in SnmpApp object. Valid parameters such as a device name, a community string, and a MIB variable are required to perform these methods, otherwise a corresponding error message is given instead of the valid MIB value.

Method loadmib( ) is used to load a valid MIB file. This method can take either a valid MIB file located on the server directory, or a valid URL which contains the address of a MIB file on the Internet. During the loading, MIB files are parsed into a MIB module which is represented by objects MibTree and MibObject. If the MIB file which is loaded from the Internet does not exit on server 314, this MIB file is first saved by calling method saveNewMibFile( ) on to server 314, and then it is parsed to a MIB module. If the MIB file already exists and the response from the client is to replace the original one, method unload( ) is processed first and then method saveNewMibFile( ) is called to replace the original one. Method getMibFiles( ) is used to obtain a list of MIB file names on server 314.

Notification

The notification mechanism is modeled closely after JAVA's Observable/Observer mechanism. There are four types of notifications which can be sent to the interested parties—ADD, MODIFY, DELETE, and ALARM. To receive notification that an event has occurred in the server objects, the client must register interest in the event. All the server objects that are visible to the client side have methods for the client side to register or de-register for events. Method addObserver(NpObserverProxy op, int interest) is called to register for event notification. Method deleteObserver(NpObserverProxy op, int interest) is called to de-register for event notification. Parameter op, which implements interface NpObserverProxy interface, is a RMI object on the client side used to receive notification. Variable interest can be a bitwise-ORed combination of OBSERVE_ADD, OBSERVE_MODIFY, OBSERVE_DELETE, and OBSERVE_ALARM. When an event occurs, method notifyobserver( ) is called to send notification to the registered observers. Method notifyobserver( ) creates a separate thread, NotifyThread, to call all interested parties' method updateProxy(ServerObject obj, Notification notify) that is defined in NpObserverProxy object; parameter obj is the server object that contains the event which occurred; parameter notify has information on the type of event, event message, and the updated server object shadow class.

Other than GUI events, the other type of asynchronous events that can be received by the client are notifications sent by the server. These notifications are delivered using the JAVA RMI mechanism. Notifications are sent when element managers or managed elements change their state. A change of state can be of the type create, delete or modify. The source of change is either another user connected to the server, an object's attributes were modified, or actions triggered by a certain condition inside the server's rules engine.

There might be cases that the client terminates without having a chance to un-subscribe the notification. Server 314 can detect that condition when it gets an IOException while trying to send out the next notification after the client terminates. In that case, server 314 removes the registered client from the subscriber list, and no further notification are sent to that client.

Event Forwarding

Class EventsForward is used to forward the specific events to the designated host and port. In the properties file, if "netprism.eventForward.destination" is specified, corresponding traps (which are defined in Appendix C) are generated to the specified destination whenever the events occur. If "netprism.eventForward.destination" is not specified, no events are forwarded. The parameters to generate a trap include destination host address, port number, community name, enterprise specific number, agent address, generic trap number, specific trap number, time stamp, and then the data in the variable bindings. The enterprise specific number and the generic trap number are the same for all server specific traps. Static method init( ) is called, after server 314 is started, to initialize the destination host and port, and also the agent address which is the same as the server address. Static method eventForward (string community, String agentAddress, String specificTrap, String[ ] mibOid, String[ ] value) is invoked to generate a trap when the event occurs. Parameters mibOid and value represent the content of a variable binding. In method eventForward( ), utility method trapsend in SnmpApp object is called to obtain a SnmpPDU object. If the return is valid, the trap is successfully sent, and if not, trap sending fails.

Method eventForward( ) in Class EventsForward is invoked to generate server specific traps (which are defined in Appendix C) when the following events occur:

An Alarm is acknowledged by users; a trap with specific code 1 is generated;

Attempted to perform SNMP set operation; there are two places where a SNMP set operation can be done: One is in MIB Browser, and the other is in the element status option; a trap with specific code 2 is generated;

The state is changed to something different from the previous state; a trap with specific code 3 is generated;

A command is executed; a trap with specific code 4 is generated:

Both a state change and command execution has occurred; a trap with specific code 5 is generated;

An element manager is associated with a device; A trap with specific code 6 is generated; and An element (with the format of EM@device) is removed from monitoring: a trap with specific code 7 is generated.

Discovery

Auto discovery is used to search the computer network elements, e.g., hosts in the network that are running SNMP agents. The starting point of the searching process is an IP address of a host or a C-Class subnetwork address. A read community name is required as a password to perform the SNMP getnext operation. Limited/Unlimited search is used to constraint the scope of the search range. A table makes it easier to explain the differences between the settings. The following table provides the same information as the discovery table presented above in a different format.

| Start Point | Limited search | Unlimited search |
|---|---|---|
| host IP address | Find all hosts running SNMP agents and in the same network as the starting host | Find all hosts running SNMP agents and in the same network as the starting host. Find a router in one of these hosts and get all the hosts which are accessible from this router and which are running SNMP agents. |
| Subnetwork address | Find all hosts running SNMP agents in this subnetwork | Find all hosts running SNMP agents in this subnetwork. Find all routers from this resulting hosts list. For each router, get all the hosts which are accessible from the router and which are running SNMP agents. |

Discovery is implemented by a set of classes in server 314. The classes are DiscoveryImpl, Discovery Thread, FindSnmpAgents, CheckSnmpAgentThread, ReceivedAgents, and DiscoveryShadow. Class DiscoveryImpl inherits from class ServerObjectImpl. Class DiscoveryImpl is instantiated in the constructor of class ManagerImpl. Class DiscoveryImpl provides four methods to the client that are described below.

DiscoveryImpl object sends RMI notification to the client side to: create Managed Elements in the navigation tree; update the status of discovery in the status bar window; and disable/enable button Discover on the discovery Panel.

Most of the task of discovery is completed by class DiscoveryThread. Class DiscoveryThread is a thread instantiated by method DiscoveryImpl.doDiscovery( ). Class DiscoveryThread calls class ping and class SnmpApp to find the hosts running SNMP agents in target network(s). Class DiscoveryThread instantiates a set of FindSnmpAgents objects from method getSnmpAgentInHosts InParallel( ). FindSnmpAgents object checks if input hosts are running SNMP agents in parallel. Method CheckRouter( ) checks if a host is a router.

Discovery creates two kinds of managed elements, as described above. To create an element, a method CreateElemFromDiscovery( ) in class ElementGroupImpl is called from DiscoveryImpl object. Method CreateElemFromDiscovery( ) checks the name of the element. If an element manager file name is the prefix of the name, a regular constructor of class ElementImpl is used. This copies all components of an element manager device to this current element, and instantiates the EventEngine and PollServer objects. For the special constructor, no Element Manager file name is in the parameter list, and the PollServer and EventEngine objects are not instantiated.

The complete set of objects in the server side used to implement auto-discovery are DiscoveryImpl, DiscoveryThread, FindSnmpAgents, CheckSnmpAgentThread, ReceivedAgents and DiscoveryShadow. Class DiscoveryImpl has four methods defined in interface Discovery: doDiscovery( ), stopDiscovery( ), checkDiscoverying( ), and getServerIPAddr( ).

In the client, each time discovery is invoked, the DiscoveryScreen object calls method doDiscovery( ). For each call to method doDiscovery( ), the method instantiates a DiscoveryThread object to perform the discovery function in server 314. Method stopDiscovery( ) is used to stop the process of auto discovery, and it also stops all threads created from this DiscoveryThread object.

Class DiscoveryImpl has two Hashtables: clientTable, and stopTable, to control the discovery status for any particular client. Every time a client sends a method doDiscovery( ) request to server 314, the client also passes its client ID to server 314. Server 314 put this client ID with a new created DiscoveryThread handle to Hashtable clientTable, and also puts client ID with a boolean false value to Hashtable stopTable. When server 314 receives method stopDiscovery( ) request, server 314 checks Hashtables stopTable and clientTable to determine which client's DiscoveryThread object should be stop, and where a notification should be sent. The client ID uniquely identifies a client to server 314. Server 314 uses client ID as a key to stop discovery process (DiscoveryThread) for a client, and send out notification to a particular client.

DiscoveryThread object is a thread which performs all tasks to discover hosts in network(s) based on the inputs. As indicated above, discovery uses two basic classes Ping, and SnmpApp:.

Class Ping provides an interface to two native methods: pingHost( ) and pingNetwork( ). Method pingHost( ) is used to check if a host is alive. Method pingNetwork( ) broadcasts a raw socket to a network specified by a class C subnetwork address, and then gets all alive hosts in that subnetwork. Discovery uses method pingNetwork( ) to get the hosts alive in the ping native call.

Both of methods pingHost( ) and pingNetwork( ) use methods sendto( ) and recvfrom( ) to implement the functions of sending and receiving packets. Because the JDK 1.1.2 and 1.1.3 for SOLARIS (not for WINDOWS NT) has problems or bugs, packets that come back from any remote hosts can not be received in method recvf rom( ) when methods pingHost( ) and pingNetwork( ) are implemented as native methods. For this reason, these two routines are implemented as two executable programs: pingHost and pingNetwork. Class Ping calls these two executable programs to work around the problems.

Class SnmpApp is implemented to get MIB variable values from a host which is running a SNMP agent. Discovery only uses two methods: snmpGetNext( ) and snmpGetAll( ) of this class. Method snmpGetNext( ) gets the value of a MIB variable, for example, get sysObjectID and ifNumber, from a SNMP agent. Method snmpGetAll( ) gets all MIB values of a column of a MIB table, e.g. discovery calls snmpGetAll( ) to get all ipNetToMediaNetAddress from ipNetToMediaTable.

FIG. 42 is a process flow diagram for one embodiment of auto-discovery process 4200 that is started in response to the user's activation of button Discover. Any IP address check operation 4201 determines whether the IP address entered in IP address field, 2702 is a hostname or a class C address. If the entered address is a hostnamne, operation 4201 transfers to IP address operation 4202, and otherwise to network address operation 4110.

IP address operation 4202 identifies the host on the network with the hostname and transfers to alive in ping( ) check operation 4203. Operation 4203 uses method pingHost( ) to check if a host is alive. If the host is alive, operation 4203 transfers to running SNMP agent check operation 4204, and otherwise autodiscovery is terminated.

If the starting computer network element is SNMP-enabled, i.e., is running an SNMP agent, operation 4204 transfers to limited search check operation 4205A and other wise to same network hosts operation 4206B. The user selected the search scope used in auto-discovery process 4200 by selecting Yes or No in limited search field 2703. If a limited search was selected, operation 4205A transfers to same network hosts operation 4206A and otherwise to all host operation 4207A.

Same network hosts operation 4206A is illustrated in more detail in FIG. 43A as operation 4206. The input to operation 4206 is an IP address and the output is a vector of IP addresses of all the hosts in the same network as the host having the input hostname. Class ping and a SNMP get ipNetToMedia Table are used to generate the vector of IP addresses. Operation 4206A transfers to generate address list operation 4208A.

All host operation 4207A is shown in more detail in FIG. 43B as operation 4207. The input to operation 4207 is a subnetwork address and the output is a vector of IP addresses for all hosts in this network and other networks connected with this host. Get ipNetTo Media Table is used to generate the vector of IP addresses. Operation 4207A transfers to generate address list operation 4208A.

Generate address list operation 4208 A is shown in more detail as operation 4208 in FIG. 43C. Operation 4208 performs two operations for each IP address in the input vector of IP addresses. Operation 4301 determines that operation 4208 is performed for each host found from the network. Running SNMP operation 4204A performs the same check as operation 4204, i.e., is the current host SNMP-enabled. If the current host is SNMP-enabled, the IP address of the current host is added to a Hashtable of IP addresses that are running SNMP agents, and otherwise the current host is ignored. Hence when operation 4208 is completed, a Hashtable of all IP addresses that are running SNMP-agents in the network locale of interest is generated. Operation 4208A returns the Hashtable from autodiscovery process 4200.

Network address operation 4210 transfers to same network host operation 4206B that performs operation 4206 (FIG. 43A) as described above, and transfers processing to generate address list operation 4208B. Operation 4208B performs the same operation as operation 4208 (FIG. 43C), that was described above, and transfers processing to limited search check operation 4205B. Operation 4205B performs the same check as described for operation 4205A. If a limited search was specified, processing is done and so the Hashtable from operation 4208B is returned, and otherwise processing transfers to all addresses check operation 4220.

If all the addresses in the Hashtable from operation 4208B have been processed, processing is complete and a Hashtable from operation 4208C is returned, otherwise processing transfers to router check operation 4211. If the current address in the Hashtable from operation 4208B is a router, processing increments to the next entry in the Hashtable and processing returns to check operation 4220, and otherwise to all hosts operation 4207B that performs the same operation as described for operation 4207 (FIG. 43B).

Operation 4207B transfers processing to generate address list operation 4308C that performs the same operation as described for operation 4308 (FIG. 43C). Operation 4308C transfers processing to check operation 4220. Thus, eventually, check operation 4220 returns a Hashtable of all hosts in the network including the start element and all hosts connected with the start element that are SNMP-enabled.

For the purpose of synchronization between the parent and child threads among classes DiscoveryImpl, Discovery-Threads FindSnmpAgents, and CheckSnmpAgentThread, an Observer and Observable structure in JAVA are used to pass notification messages back to parent objects from their children's objects. FIG. 44 illustrates the structure used.

DiscoveryScreen object 4401 always pass its client ID to server 314 to identify itself. Server 314 uses the received client ID to control the DiscoveryThread objects. DiscoveryScreen 4401 calls the methods provided by interface Discovery to drive server 314 to perform the discovery task.

The hierarchies of Observer/Observable are very clear in FIG. 44 DiscoveryImpl object 4402 is an observer to DiscoveryThread object 4403. DiscoveryImpl object 4402 also uses RMI notification to pass information to DiscoveryScreen object 4401 in the client. DiscoveryThread object 4402 is observable by DiscoveryImpl object 4402, and is an observer to FindSnmpAgents object 4404. FindSnmpAgents object 440 is observable by DiscoveryThread object 4430 and is an observer to CheckSnmpAgentThread object 4405.

DiscoveryThread object 4403 uses FindSnmpAgents object 4404 to fork a certain amount of threads out to get the sysObjectID (or Enterprise ID) of the hosts. Each thread instantiates a CheckSnmpAgentThread object 4405, and it waits for the result of the EnterpriseID from a host. If time-out passes and nothing is received, the host is not running a SNMP agent, otherwise this host's sysObjectID is returned. In the current version of class FindSnmpAgents class, twenty CheckSnmpAgent Thread objects are executed in parallel. The time-out value is one half second in the SNMP getNext( ) call. Using multiple threads can greatly improve the performance of auto discovery (up to 5 times on an unlimited search).

Connection Setup

Clients connect to server 314 through a registry service running on the server machine. The registry service is used only to obtain the initial RMI reference to a ServerConnect object. After that all RMI references are obtained as returned values of RMI methods. Before clients can connect, server 314 has to be running. Server 314 must register a RMI object that implements interface netprism.server.ServerConnect with the registry service under a predefined name. The ServerConnect object reference is used to log in a user to the server by specifying a valid user name and a password. The name and the password are created on a machine running the WINDOWS NT operating system using the WINDOWS NT operating system User Manager. If login succeeds, method ServerConnect. login( ) provides a reference to a Server object which in turn provides full access to all services of server 314 with RMI interfaces. Class netprism.client.RmiReference is responsible for locating and connecting to the server.

On-line Help Mechanism

A separate browser window is used to display HTML help files. The window is opened using standard JAVA method showDocument( ) in JAVA.applet.AppletContext. Each screen can be provided with its own help URL. A mapping from a screen to an URL is done through a Hashtable. The hash key is client.help.<ScreenName>, where ScreenName is provided by the corresponding screen class. By convention, each screen is defined in the class <ScreenName>Screen.JAVA. The superclass Screen provides the default implementation for the method getName( ), which returns the name of the .JAVA class. In a case that a screen, for some reason, does not follow this convention, it can override it's getName( ) to provide the correct name. The help URL is the name of the help file relative to the AretPrism\help directory. A special key client.help.default is used to provide the default help URL, in a case that a screen does not define its own help URL.

When button Help is invoked on the global tool bar, the current screen reference is obtained from class NetPrismControl, and invokes the method handleHelp( ) on the screen. All screens use the default implementation in class Screen, which first tries to find the help URL for the screen, and if not found, then uses the default screen. As the URL gets resolved, a request is made to the browser AppletContext to display the URL in a separate browser window.

A LicenseServ is a client-server model that has of three primary components: License manager; Client library; and Code generator. LicenseManager (Iserv) is a System Service on Windows NT operating system, and a daemon on UNIX operating systems. On start up, the license manager reads and decrypts license keys from the license file (Iservc). This license file contains license code which is generated by the LicenseServ code generator (Iscgen) after a series of queries about the features and the license agreement.

The LicenseServ client library is integrated with server 314 to ensure that the application does not run without first obtaining a key from the license manager. During the startup, server 314 which is also a system service on WINDOWS NT and a daemon on UNIX, requests the license manager using the following functions (VLSinitialize( ), LSRequest( ), LSRelease( )) for the license key to determine the feature to be enabled. If the license file is not found then the server behaves in Manager mode (default). If license file is found then it can work in either Advanced Manager mode or Visual Element Manager Builder mode, based on the license keys in the license file. Server 314 also has a separate thread HeartBeatThread to send (LSUpdate( )) event to the license manager every 10 minutes and in case of abnormal termination of the server 314, the license manager updates the license file to set the appropriate count on the license keys.

Configuration Files

Server 314 uses two properties files to determine system defaults when it starts. The file netprism.properties is read by server 314, and the file netprismclient.properties is read by the client. They are located in the lib folder underneath the NetPrism directory.

The netprism.properties file contains the following entries:

```
#netprism.domain=NetPrism@myHome
#netprism.alarmlogpath
#=c:\\Fujitsu\\netprism\\users\\log
#netprism.alarmmaxentry=128
#
# DEBUG
# netprism.debug.server can be set to 'true' to turn on
# server side debugging
netprism.debug.server=false
# netprism.debug.client can be set to 'true' to turn on
# client side debugging
netprism.debug.client=false
# netprism.debug.client.screen can be set to 'true' to
# turn on client side debugging and
# display debugging information on client screen
netprism.debug.client.screen=false
netprism.log.fileSize specifies the maximum
# NetPrism.out file size in kbytes
netprism.log.fileSize=1000
#
Event Forward
#
#netprism.eventForward.destination=<enter_host>:162
#netprism.trapForward.destination=<enter_host>:162
```

Each entry in the file contains a property name and a value for the property<property name>=<property value>. They don't need to be in any particular order.

Parameter netprism.domain is the string to use for the root node in the Navigation Tree. Default is "NetPrism@<server name>"

Parameter netprism.alarmlogpath is the folder in which to place the alarm log (at this time, the alarm log is not viewable from outside of server 314. Default is userslog directory under the NetPrism directory.

Parameter netprism.alarmmaxentry is the maximum number of entries to allow in the alarm log. The default is 128 for each managed element.

Parameters netprism.debug.server, netprism.debug.client, netprism.debug.client.screen are debugging options that can be turned on or off independently. When the first two are set to true, the debugging information will be logged into the NetPrism.out file in the users/log directory underneath the NetPrism directory. When the third one is set to true, the client debugging information will be printed on the client output screen.

Parameter netprism.log.fileSize specifies the size of the NetPrism.out file in Kbytes.

Parameters netprism.eventForward.destination and netprism.trapForward.destination are used to specify where the events generated by server 314 or the traps received from managed devices should be forwarded to, respectively. The value has two parts: destination host name and port number separated by ':'. The port number needs not to be present, the default is 162.

Third Party Libraries

One embodiment of the invention uses the following third party libraries:

JAVAChart from Visual Engineering for implementing graphing

Microline Component Toolkit from Neuron Data for grids and navigation trees.

Graphic JAVA Toolkit from Sunsoft Press's "Graphic JAVA" book for GUI components such as dialog boxes.

Snmp from AdventNet for SNMP protocol implementation.

Wyattriver from Wyatt River for requesting licensed features from license manager.

Although the present invention has been described with reference to one embodiment, persons skilled in the art will recognize that changes may be made in form and detail without departing from the spirit and scope of the invention.

68698 U.S. PTO
08/972219
11/17/97

APPENDIX A SERVER OBJECT API

© 1997, Fujitsu Software Corp., All rights reserved

---

Class netprism.server.AttributesImpl

```
java.lang.Object
  |
  +----java.rmi.server.RemoteObject
        |
        +----java.rmi.server.RemoteServer
              |
              +----java.rmi.server.UnicastRemoteObject
                    |
                    +----netprism.server.ServerObjectImpl
                          |
                          +----netprism.server.AttributesImpl
```

--- public class AttributesImpl
extends ServerObjectImpl
implements Attributes

AttributesImpl implements the Attributes interface. It is the factory class that maintains the list of Attribute.

---

[Constructor Index]

[ o ] AttributesImpl(ServerObjectImpl)

[Method Index]

[ o ] addAttribute(ServerObject)
  Add an Attribute
[ o ] create(ServerObjectShadow)
[ o ] getInfo()
[ o ] setInfo(ServerObjectShadow)
[ o ] setName(String)

[Constructors]

[ o ] AttributesImpl public AttributesImpl(ServerObjectImpl parent) throws RemoteException

[Methods]

[ o ] create public ServerObject create(ServerObjectShadow shadow) throws RemoteException Overrides:
create in class ServerObjectImpl

[ o ] addAttribute public ServerObject addAttribute(ServerObject mibObj) throws RemoteException, NameUsedException Add an Attribute Parameters:
attribute - Attribute attribute
Throws: RemoteException
rmi exception

[ o ] setInfo public void setInfo(ServerObjectShadow shadow) throws RemoteException Overrides:
setInfo in class ServerObjectImpl

[ o ] getInfo public ServerObjectShadow getInfo() throws RemoteException

Overrides:
getInfo in class ServerObjectImpl

[ o ] setName public void setName(String name) throws RemoteException

Overrides:
setName in class ServerObjectImpl

------------------------------------------------------------------------
------------------------------------------------------------------------

Interface netprism.server.AttrValue public interface AttrValue

------------------------------------------------------------------------

[Method Index]

[ o ] getCurrentValue()
[ o ] getPreviousValue()

[Methods]

[ o ] getCurrentValue public abstract String getCurrentValue()

[ o ] getPreviousValue public abstract String getPreviousValue()

------------------------------------------------------------------------
------------------------------------------------------------------------

Interface netprism.server.Builder public interface Builder
extends ServerObject

Builder defines the interface for remote BuilderImpl class.

------------------------------------------------------------------------

[Method Index]

[ o ] find(ObjectName)
Locate a ServerObject by specifying the ObjectName
[ o ] getETList()
Gets the name list of all ETs

[ o ] getImageList()
Get the name list of all device background image files
[ o ] getMibFactory()
Return a reference to the MIB Factory
[ o ] load(String)
Loads a element template file.
[ o ] save(String)
Save Element Template

[Methods]

[ o ] getETList public abstract String[] getETList() throws RemoteException

Gets the name list of all ETs

Returns:
name list of all ETs

[ o ] load public abstract ServerObject load(String name) throws RemoteException Loads a element template file Parameters:
name - the element templet file name

[ o ] save public abstract void save(String name) throws RemoteException

Save Element Template

Parameters:
name - ET name

[ o ] find public abstract ServerObject find(ObjectName objectName) throws RemoteException Locate a ServerObject by specifying the ObjectName

```
Parameters:
    objectName - the ObjectName that contains information on the
    object to be found
Returns:
    the found ServerObject

[ o ] getImageList

 public abstract String[] getImageList() throws RemoteException

  Get the name list of all device background image files

  Returns:
      name list of image files

[ o ] getMibFactory

 public abstract MibFactory getMibFactory() throws RemoteException

  Return a reference to the MIB Factory

  Returns:
      reference to the MIB Factory
  Throws: RemoteException
      rmi exception

------------------------------------------------------------------------
------------------------------------------------------------------------

Class netprism.server.BuilderImpl

java.lang.Object
  |
  +----java.rmi.server.RemoteObject
        |
        +----java.rmi.server.RemoteServer
              |
              +----java.rmi.server.UnicastRemoteObject
                    |
                    +----netprism.server.ServerObjectImpl
                          |
                          +----netprism.server.BuilderImpl

------------------------------------------------------------------------
```

public class BuilderImpl
extends ServerObjectImpl
implements Builder

Class to implement the Builder interface

-----------------------------------------------------------------------

[Constructor Index]

[ o ] BuilderImpl(ServerImpl)
Constructor

[Method Index]

[ o ] create(ServerObjectShadow)
Create
[ o ] createET(String, String, String, String[])
Create a new ET
[ o ] createET(String, String, String, String[], Hashtable, Hashtable)
Create a new ET
[ o ] delete(String)
Delete an ET
[ o ] find(ObjectName)
Locate a ServerObject by specifying the ObjectName
[ o ] getETList()
Get the name list of all ETs
[ o ] getImageList()
Get the name list of all device background image files
[ o ] getInfo()
getinfo
[ o ] getMibFactory()
Return a reference to the MIB Factory
[ o ] load(String)
Loads a element template file
[ o ] save(String)
Save ET
[ o ] setInfo(ServerObjectShadow)
setinfo
[ o ] setName(String)
:
[Constructors]

[ o ] BuilderImpl public BuilderImpl(ServerImpl server) throws RemoteException

Constructor

Parameters:
server - ServerImpl object which has this Builder

[Methods]

[ o ] getMibFactory public MibFactory getMibFactory() throws RemoteException

Return a reference to the MIB Factory

Returns:
reference to the MIB Factory
Throws: RemoteException
rmi exception

[ o ] getImageList public String[] getImageList() throws RemoteException

Get the name list of all device background image files

Returns:
name list of image files
Throws: RemoteException
rmi exception

[ o ] getETList public String[] getETList() throws RemoteException

Get the name list of all ETs

Returns:
name list of all ETs
Throws: RemoteException
rmi exception

[ o ] create

```
public ServerObject create(ServerObjectShadow objShadow) throws
RemoteException

  Create

  Returns:
    ServerObject
  Overrides:
    create in class ServerObjectImpl

[ o ] createET

 public ET createET(String name,
                String description,
                String image,
                String mibs[]) throws RemoteException

  Create a new ET

  Parameters:
    name - ET name
    description - text description for the ET
    image - the background image
    mibs - a list of MIB files to be used for the device
  Returns:
    reference to the new ET
  Throws: RemoteException
    rmi exception

[ o ] createET

 public ET createET(String name,
                String description,
                String image,
                String mibs[],
                Hashtable components,
                Hashtable trapRules) throws RemoteException

  Create a new ET

  Parameters:
    name - ET name
    description - text description for the ET
    image - the background image
    mibs - a list of MIB files to be used for the device
```

components - hashtable storing device components by name
trapRules - hashtable storing element trap rules by name
Returns:
reference to the new ET
Throws: RemoteException
rmi exception

[ o ] delete public void delete(String name) throws RemoteException

Delete an ET

Parameters:
name - ET name
Throws: RemoteException
rmi exception
Overrides:
delete in class ServerObjectImpl

[ o ] load public ServerObject load(String name) throws RemoteException

Loads a element template file

Parameters:
name - the element template file name

[ o ] save public void save(String name) throws RemoteException

Save ET

Parameters:
name - ET name
Throws: RemoteException
rmi exception

[ o ] getInfo public synchronized ServerObjectShadow getInfo() throws RemoteException getinfo Overrides:
getInfo in class ServerObjectImpl

[ o ] setInfo public synchronized void setInfo(ServerObjectShadow shadow) throws RemoteException setinfo Overrides:
setInfo in class ServerObjectImpl

[ o ] find public ServerObject find(ObjectName objectName) throws RemoteException Locate a ServerObject by specifying the ObjectName Parameters:
objectName - the ObjectName that contains information on the object to be found
Returns:
the found ServerObject

[ o ] setName public void setName(String name) throws RemoteException

Overrides:
setName in class ServerObjectImpl

---------------------------------------------------------------------
---------------------------------------------------------------------

Class netprism.server.ColorUsedException

```
java.lang.Object
   |
   +----java.lang.Throwable
           |
           +----java.lang.Exception
                   |
                   +----netprism.server.ColorUsedException
```

```
------------------------------------------------------------------------

public class ColorUsedException
extends Exception

------------------------------------------------------------------------

[Constructor Index]

[ o ] ColorUsedException()
[ o ] ColorUsedException(String)

[Constructors]

[ o ] ColorUsedException

 public ColorUsedException()

[ o ] ColorUsedException

 public ColorUsedException(String msg)

------------------------------------------------------------------------
------------------------------------------------------------------------

Class netprism.server.CommandThread

java.lang.Object
   |
   +----java.lang.Thread
           |
           +----netprism.server.CommandThread

------------------------------------------------------------------------

public class CommandThread
extends Thread

------------------------------------------------------------------------

[Constructor Index]

[ o ] CommandThread(String)
```

[Method Index]

[ o ] run()

[Constructors]

[ o ] CommandThread public CommandThread(String command)

[Methods]

[ o ] run public void run()

Overrides:
run in class Thread

------------------------------------------------------------------------
------------------------------------------------------------------------

Class netprism.server.DataManager

```
java.lang.Object
  |
  +----netprism.server.DataManager
```

------------------------------------------------------------------------ public class DataManager
extends Object

Class to manage data using Object serialization, io, and util classes

------------------------------------------------------------------------

[Constructor Index]

[ o ] DataManager()

[Method Index]

[ o ] array2Vector(Object[])
Get the name list of all Objects in specified the String

[ o ] changeKey(String, String, ServerObjectImpl)
[ o ] deleteObject(String, Hashtable)
Delete an object from the specified hashtable
[ o ] deleteObject(String, Hashtable, File)
Delete an object from the specified hashtable and/or from the specified file
[ o ] getObject(String, Hashtable)
Get a reference to an object from the specified hashtable
[ o ] getObject(String, Hashtable, File)
Get a reference to an object from the specified hashtable or from the specified file
[ o ] getObjectNameList(Hashtable)
Get the name list of all Objects in specified Hashtable assumes Hashtable keys are String names of the Objects
[ o ] getObjectNameList(Vector)
Get the name list of all Objects in specified Hashtable assumes Hashtable keys are String names of the Objects
[ o ] getObjects(Hashtable)
Get array of all Objects in specified Hashtable assumes Hashtable keys are String names of the Objects
[ o ] readFromBuffer(byte[])
Read Object to the specified buffer
[ o ] readFromFile(File)
Read Object from the specified file
[ o ] saveObject(String, Hashtable, File)
get Object from hashtable and save to the specified file
[ o ] setParents(Object)
Recursively update parent references of ServerObjectImpl object
[ o ] vector2String(Vector)
Get the name list of all Objects in specified Vector
[ o ] writeToBuffer(Object)
Write Object to byte array
[ o ] writeToFile(File, Object)
Write Object to the specified file

[Constructors]

[ o ] DataManager public DataManager()

[Methods]

[ o ] getObjectNameList public static String[] getObjectNameList(Hashtable objects)

Get the name list of all Objects in specified Hashtable assumes Hashtable keys are String names of the Objects Returns:
name list of all Objects

[ o ] getObjectNameList public static String[] getObjectNameList(Vector objects)

Get the name list of all Objects in specified Hashtable assumes Hashtable keys are String names of the Objects Returns:
name list of all Objects

[ o ] vector2String public static String[] vector2String(Vector aVector)

Get the name list of all Objects in specified Vector

Returns:
name list of all Objects

[ o ] array2Vector public static Vector array2Vector(Object obj[])

Get the name list of all Objects in specified the String

Returns:
a vector of all Objects

[ o ] getObjects public static ServerObject[] getObjects(Hashtable objects)

Get array of all Objects in specified Hashtable assumes Hashtable keys are String names of the Objects Returns:
name list of all Objects

[ o ] getObject

```
public static Object getObject(String name,
                               Hashtable objects) throws NameNotFoundException
```

Get a reference to an object from the specified hashtable

Parameters:
name - object name
objects - hashtable
Returns:
reference to the object

[ o ] getObject

```
public static Object getObject(String name,
                               Hashtable objects,
                               File file) throws NameNotFoundException,
ClassNotFoundException, IOException
```

Get a reference to an object from the specified hashtable or from the specified file Parameters:
name - object name
objects - hashtable
file - File object
Returns:
reference to the object

[ o ] saveObject

```
public static void saveObject(String name,
                              Hashtable objects,
                              File file) throws NameNotFoundException, IOException
```

get Object from hashtable and save to the specified file

Parameters:
name - Object name
objects - hashtable
file - File object

[ o ] deleteObject

```
public static void deleteObject(String name,
                    Hashtable objects) throws NameNotFoundException

  Delete an object from the specified hashtable

  Parameters:
     name - object name
     objects - hashtable

[ o ] deleteObject

 public static void deleteObject(String name,
                    Hashtable objects,
                    File file) throws NameNotFoundException

  Delete an object from the specified hashtable and/or from the
  specified file

  Parameters:
     name - object name
     objects - hashtable
     file - File object

[ o ] readFromFile

 public static Object readFromFile(File file) throws IOException,
ClassNotFoundException

  Read Object from the specified file

  Parameters:
     file - File object
  Returns:
     reference to the Object
  Throws: IOException,
     ClassNotFoundException

[ o ] writeToFile

 public static void writeToFile(File file,
                    Object obj) throws IOException

  Write Object to the specified file
```

```
Parameters:
    file - File object
    obj - Object

[ o ] readFromBuffer

 public static Object readFromBuffer(byte buf[]) throws IOException,
ClassNotFoundException

   Read Object to the specified buffer

   Parameters:
       buf - byte array buffer
   Returns:
       reference to the Object
   Throws: IOException,
       ClassNotFoundException

[ o ] writeToBuffer

 public static byte[] writeToBuffer(Object obj) throws IOException

   Write Object to byte array

   Parameters:
       obj - Object
   Returns:
       reference to byte array containing the Object

[ o ] setParents

 public static void setParents(Object obj)

   Recursively update parent references of ServerObjectImpl object

   Parameters:
       obj - ServerObectImpl object

[ o ] changeKey

 public static void changeKey(String oldKey,
                        String newKey,
                        ServerObjectImpl parent) throws NameNotFoundException

-------------------------------------------------------------------------
```

---

Class netprism.server.ECShadow

```
java.lang.Object
  |
  +----netprism.server.ServerObjectShadow
        |
        +----netprism.server.ECShadow
```

--- public class ECShadow
extends ServerObjectShadow

ElementComponent shadow class

---

[Variable Index]

[ o ] editColor
Color editColor
[ o ] h
int h component height
[ o ] isLed
boolean isLed flag if component is a LED
[ o ] lineWidth
int lineWidth the width of a line
[ o ] shape
int shape component shape
[ o ] w
int w component width
[ o ] x
int x X coordinate relative to the background image
[ o ] y
int y Y coordinate relative to the background image

[Constructor Index]

[ o ] ECShadow()
Constructor

[Method Index]

[ o ] equals(Object)

[Variables]

[ o ] x public int x int x X coordinate relative to the background image

[ o ] y public int y int y Y coordinate relative to the background image

[ o ] w public int w int w component width

[ o ] h public int h int h component height

[ o ] shape public int shape int shape component shape

[ o ] isLed public boolean isLed boolean isLed flag if component is a LED

[ o ] editColor public Color editColor

Color editColor

[ o ] lineWidth public int lineWidth int lineWidth the width of a line

[Constructors]

[ o ] ECShadow public ECShadow()

Constructor

[Methods]

[ o ] equals public boolean equals(Object obj)

Overrides:
equals in class ServerObjectShadow

---

Interface netprism.server.Element public interface Element
extends ServerObject

---

[Method Index]

[ o ] getElementTrapRule(String)
Get a reference to an ElementTrapRule
[ o ] getElementTrapRuleList()
Get the name list of all element trap rules
[ o ] getElementTrapRules()
Get Element trap rules
[ o ] getGroupList()
Get the groupList String array
[ o ] getIPAddress()

Get Element IP Address
[ o ] getMonitorElement()
Get value of Monitor Element
[ o ] getReadCommunity()
Get Element SNMP read community
[ o ] getRetry()
Get number of retries for SNMP requests
[ o ] getTimeout()
Get time interval in seconds between retries
[ o ] getWriteCommunity()
Get Element SNMP write community
[ o ] setGroupList(String[])
set the groupList to the Element
[ o ] setIPAddress(String)
Set Element IP Address
[ o ] setMonitorElement(boolean)
turn on the Monitor Element Exception java.rmi.RemoteException rmi exception
[ o ] setReadCommunity(String)
Set Element SNMP read community
[ o ] setRetry(int)
Set number of retries for SNMP requests
[ o ] setTimeout(int)
Set time interval in seconds between retries
[ o ] setWriteCommunity(String)
Set Element SNMP write community

[Methods]

[ o ] getElementTrapRuleList public abstract String[] getElementTrapRuleList() throws RemoteException Get the name list of all element trap rules Returns:
name list of all element trap rules
Throws: RemoteException
rmi exception

[ o ] getElementTrapRule public abstract ElementTrapRule getElementTrapRule(String name) throws RemoteException Get a reference to an ElementTrapRule Parameters:
name - ElementTrapRule name
Returns:
reference to the TrapRule object
Throws: RemoteException
rmi exception

[ o ] getElementTrapRules public abstract ElementTrapRule[] getElementTrapRules() throws RemoteException Get Element trap rules Returns:
an array of element trap rules
Throws: RemoteException
rmi exception

[ o ] setIPAddress public abstract void setIPAddress(String ipAddress) throws RemoteException Set Element IP Address Parameters:
ipAddress - Element IP address
Throws: RemoteException
rmi exception

[ o ] getIPAddress public abstract String getIPAddress() throws RemoteException

Get Element IP Address

Returns:
Element IP address
Throws: RemoteException
rmi exception

[ o ] getReadCommunity public abstract String getReadCommunity() throws RemoteException Get Element SNMP read community Returns:
Element SNMP read community
Throws: RemoteException
rmi exception

[ o ] setReadCommunity public abstract void setReadCommunity(String readCommunity) throws RemoteException Set Element SNMP read community Parameters:
readCommunity - Element SNMP read community
Throws: RemoteException
rmi exception

[ o ] getWriteCommunity public abstract String getWriteCommunity() throws RemoteException Get Element SNMP write community Returns:
Element SNMP write community
Throws: RemoteException
rmi exception

[ o ] setWriteCommunity public abstract void setWriteCommunity(String writeCommunity) throws RemoteException Set Element SNMP write community Parameters:
writeCommunity - Element SNMP write community
Throws: RemoteException
rmi exception

[ o ] getRetry public abstract int getRetry() throws RemoteException

Get number of retries for SNMP requests

Returns:
number of retries for SNMP requests
Throws: RemoteException
rmi exception

[ o ] setRetry public abstract void setRetry(int retry) throws RemoteException

Set number of retries for SNMP requests

Parameters:
retry - number of retries for SNMP requests
Throws: RemoteException
rmi exception

[ o ] getTimeout public abstract int getTimeout() throws RemoteException

Get time interval in seconds between retries

Returns:
time interval in seconds between retries
Throws: RemoteException
rmi exception

[ o ] setTimeout public abstract void setTimeout(int timeout) throws RemoteException Set time interval in seconds between retries Parameters:
timeout - time interval in seconds between retries
Throws: RemoteException
rmi exception

[ o ] getMonitorElement public abstract boolean getMonitorElement() throws RemoteException Get value of Monitor Element Returns:
the boolean value of the Monitor Element Exception java.rmi.RemoteException rmi exception

[ o ] setMonitorElement public abstract void setMonitorElement(boolean monitorElem) throws RemoteException turn on the Monitor Element Exception java.rmi.RemoteException rmi exception

[ o ] getGroupList public abstract String[] getGroupList() throws RemoteException Get the groupList String array Returns:
the groupList Exception java.rmi.RemoteException rmi exception

[ o ] setGroupList public abstract void setGroupList(String gList[]) throws RemoteException set the groupList to the Element Parameters:
the - groupList array Exception java.rmi.RemoteException rmi exception ------------------------------------------------------------------------
------------------------------------------------------------------------

Interface netprism.server.ElementAlarm public interface ElementAlarm
extends ServerObject ElementAlarm is a RMI interface to access the ElementAlarmImpl class. It is to log and update the alarm information into the alarm log file for each monitoring element. It is also used to provide alarms (with or without filtering) at two different levels, component and element.

---------------------------------------------------------------------------

[Method Index]

[ o ] getComponentAlarm(String, Filter)
    Get a list of alarms at a component level
[ o ] getDetailShadow(Integer)
    get the detail content of an alarm entry
[ o ] getElmAlarm(Filter)
    Get a list of alarms at an element level
[ o ] getHeadShadow(Integer)
    Get alarm information for the alarm
[ o ] setAlarmComments(Integer, String)
    set the comments in the alarm
[ o ] setAlarmInfo(Integer, ServerObjectShadow)
    Set alarm information for the alarm
[ o ] setAlarmUser(Integer, String)
    set the acknowledged user name in the alarm

[Methods]

[ o ] getComponentAlarm

```
 public abstract AlarmHeadShadow[] getComponentAlarm(String
componentName,
                                        Filter filter) throws NoAlarmException,
RemoteException
```

Get a list of alarms at a component level

Parameters:
    componentName - component name
    filter - Filter
Returns:
    a list of alarm headers for a component
Throws: NoAlarmException
    no alarms for this compoment
Throws: RemoteException
    rmi exception

[ o ] getElmAlarm public abstract AlarmHeadShadow[] getElmAlarm(Filter filter) throws NoAlarmException, RemoteException Get a list of alarms at an element level Parameters:
filter - Filter
Returns:
a list of alarm headers for an element
Throws: NoAlarmException
no alarms for this device
Throws: RemoteException
rmi exception

[ o ] getDetailShadow public abstract AlarmDetailShadow getDetailShadow(Integer alarmId) throws RemoteException get the detail content of an alarm entry Parameters:
alarmId - alarm id
Returns:
detail of the alarm
Throws: RemoteException
rmi exception

[ o ] setAlarmComments public abstract void setAlarmComments(Integer alarmId, String comments) throws NameNotFoundException, RemoteException set the comments in the alarm Parameters:
alarmId - alarm id
comments - comments
Throws: NameNotFoundException
alarm not found exception
Throws: RemoteException
rmi exception

[ o ] setAlarmUser

```
public abstract void setAlarmUser(Integer alarmId,
                         String userName) throws NameNotFoundException,
RemoteException

  set the acknowledged user name in the alarm

  Parameters:
      alarmId - alarm id
      userName - user name of acknowledgement
  Throws: NameNotFoundException
      alarm not found exception
  Throws: RemoteException
      rmi exception

[ o ] getHeadShadow

 public abstract AlarmHeadShadow getHeadShadow(Integer alarmId) throws
RemoteException

  Get alarm information for the alarm

  Parameters:
      alarmId - alarm id
  Returns:
      AlarmHeadShadow object
  Throws: RemoteException
      rmi exception

[ o ] setAlarmInfo

 public abstract void setAlarmInfo(Integer alarmId,
                         ServerObjectShadow serverObjectShadow) throws
RemoteException

  Set alarm information for the alarm

  Parameters:
      serverObjectShadow - alarm shadow object (AlarmHeadShadow or
      AlarmDetailShadow)
      alarmId - alarm id
  Throws: RemoteException
      rmi exception

------------------------------------------------------------------------
```

---------------------------------------------------------------------------

Class netprism.server.ElementAlarmImpl

```
java.lang.Object
  |
  +----java.rmi.server.RemoteObject
        |
        +----java.rmi.server.RemoteServer
              |
              +----java.rmi.server.UnicastRemoteObject
                    |
                    +----netprism.server.ServerObjectImpl
                          |
                          +----netprism.server.ElementAlarmImpl
```

--------------------------------------------------------------------------- public class ElementAlarmImpl
extends ServerObjectImpl
implements ElementAlarm

Class to implement RMI interface ElementAlarm. It is to log and update the alarm information into the alarm log file for each monitoring element. It is also used to provide alarms (with or without filtering) at two different levels, component and element.

---------------------------------------------------------------------------

[Constructor Index]

[ o ] ElementAlarmImpl(AlarmFactoryImpl, Hashtable, String)
Constructor

[Method Index]

[ o ] addAlarm(String, String, String, String, String, String, String, String[])
Add a new alarm
[ o ] checkFile(int, Hashtable)
[ o ] create(ServerObjectShadow)
Create a child object with type specified in shadow.
[ o ] customizedFilter(Filter, Hashtable)
[ o ] defaultFilter(Hashtable)
[ o ] delete(String)

Delete a child object
[ o ] filterAck(int, Hashtable)
[ o ] filterDate(Filter, Hashtable)
[ o ] filterSeverity(Filter, Hashtable)
[ o ] filterUserName(Filter, Hashtable)
[ o ] getAlarmHeads(Hashtable)
[ o ] getChild(String)
Gets the child object by giving a name
[ o ] getChildren()
Gets the child(ren) object(s)
[ o ] getChildrenNameList()
Gets the name list of the children objects
[ o ] getComponentAlarm(String, Filter)
Get a list of alarms at a component level
[ o ] getDescription()
Gets the object description
[ o ] getDetailShadow(Integer)
get the detail content of an alarm entry
[ o ] getElmAlarm(Filter)
Get a list of alarms at an element level
[ o ] getHeadShadow(Integer)
Get alarm information for the alarm
[ o ] getInfo()
Gets this object's information
[ o ] getNameTree()
Gets the children, grandchildren names in a hierarchical order
[ o ] nonFilter(Hashtable)
[ o ] saveElementAlarm(String)
[ o ] setAlarmComments(Integer, String)
set the comments in the alarm
[ o ] setAlarmInfo(Integer, ServerObjectShadow)
Set alarm information for the alarm
[ o ] setAlarmUser(Integer, String)
set the acknowledged user name in the alarm
[ o ] setDescription(String)
Sets the object description
[ o ] setInfo(ServerObjectShadow)
Sets this object's attributes
[ o ] setName(String)
Sets the object name
:
[Constructors]

[ o ] ElementAlarmImpl

```
public ElementAlarmImpl(AlarmFactoryImpl alarmFactory,
                Hashtable elementAlarm,
                String elementName) throws RemoteException

  Constructor

  Parameters:
     AlarmFactoryImpl - AlarmFactory which has this ElementAlarm
  Throws: RemoteException
     rmi exception
```

[Methods]

[ o ] addAlarm

```
protected Integer addAlarm(String componentName,
                  String state,
                  String severity,
                  String description,
                  String causes,
                  String solutions,
                  String code,
                  String varBinding[]) throws IOException, RemoteException

  Add a new alarm

  Parameters:
     componentName - alarm component name
     state - alarm state name
     severity - alarm severity name
     userName - userName for acknowledge
     description - event description for an alarm
     causes - possible causes for an alarm
     solutions - possible solutions for an alarm
     code - specific code for an alarm
     varBinding - list of variable binding for an alarm
  Returns:
     new alarm id
  Throws: RemoteException
     rmi exception
```

[ o ] getComponentAlarm

```
public AlarmHeadShadow[] getComponentAlarm(String componentName,
```

Filter filter) throws NoAlarmException, RemoteException

Get a list of alarms at a component level

Parameters:
componentName - component name
filter - Filter
Returns:
a list of alarm headers for a component
Throws: NoAlarmException
no alarms for this compoment
Throws: RemoteException
rmi exception

[ o ] getElmAlarm public AlarmHeadShadow[] getElmAlarm(Filter filter) throws NoAlarmException, RemoteException Get a list of alarms at an element level Parameters:
filter - Filter
Returns:
a list of alarm headers for an element
Throws: NoAlarmException
no alarms for this device
Throws: RemoteException
rmi exception

[ o ] nonFilter protected Hashtable nonFilter(Hashtable in)

[ o ] defaultFilter protected Hashtable defaultFilter(Hashtable in)

[ o ] customizedFilter protected Hashtable customizedFilter(Filter filter, Hashtable in)

[ o ] filterUserName protected Hashtable filterUserName(Filter filter,
Hashtable in)

[ o ] filterDate protected Hashtable filterDate(Filter filter,
Hashtable in)

[ o ] filterSeverity protected Hashtable filterSeverity(Filter filter,
Hashtable in)

[ o ] filterAck protected Hashtable filterAck(int status,
Hashtable in)

[ o ] getAlarmHeads protected AlarmHeadShadow[] getAlarmHeads(Hashtable table) throws RemoteException

[ o ] getHeadShadow public AlarmHeadShadow getHeadShadow(Integer alarmId) throws RemoteException Get alarm information for the alarm Parameters:
alarmId - alarm id
Returns:
AlarmHeadShadow object
Throws: RemoteException
rmi exception

[ o ] getDetailShadow public AlarmDetailShadow getDetailShadow(Integer alarmId) throws RemoteException get the detail content of an alarm entry Parameters:
id - alarm id
Returns:
detail of the alarm
Throws: RemoteException
rmi exception

[ o ] setAlarmUser

```
public void setAlarmUser(Integer alarmId,
                 String userName) throws NameNotFoundException,
RemoteException
```

set the acknowledged user name in the alarm

Parameters:
id - alarm id
userName - user name of acknowledgement
Throws: NameNotFoundException
alarm not found exception
Throws: RemoteException
rmi exception

[ o ] setAlarmComments

```
public void setAlarmComments(Integer alarmId,
                 String comments) throws NameNotFoundException,
RemoteException
```

set the comments in the alarm

Parameters:
id - alarm id
comments - comments
Throws: NameNotFoundException
alarm not found exception
Throws: RemoteException
rmi exception

[ o ] setAlarmInfo

```
public void setAlarmInfo(Integer alarmId,
                 ServerObjectShadow serverObjectShadow) throws
RemoteException
```

Set alarm information for the alarm

Parameters:
serverObjectShadow - alarm shadow object (AlarmHeadShadow or AlarmDetailShadow)
alarmId - alarm id
Throws: RemoteException
rmi exception

[ o ] saveElementAlarm protected void saveElementAlarm(String elementName) throws RemoteException

[ o ] checkFile protected Hashtable checkFile(int max,
Hashtable elementAlarm) throws NoSuchElementException

[ o ] create public ServerObject create(ServerObjectShadow shadow) throws RemoteException Create a child object with type specified in shadow.

Parameters:
shadow - information needed to create a child object
Returns:
the child object created
Overrides:
create in class ServerObjectImpl

[ o ] delete public void delete(String name) throws RemoteException

Delete a child object

Parameters:
name - the name of the child object to be deleted
Overrides:
delete in class ServerObjectImpl

[ o ] getChildren public ServerObject[] getChildren() throws RemoteException

Gets the child(ren) object(s)

Returns:
the children objects collected in Enumeration
Overrides:
getChildren in class ServerObjectImpl

[ o ] getChildrenNameList public String[] getChildrenNameList() throws RemoteException Gets the name list of the children objects Returns:
the name list
Overrides:
getChildrenNameList in class ServerObjectImpl

[ o ] getChild public ServerObject getChild(String name) throws RemoteException

Gets the child object by giving a name

Parameters:
name - the child name
Returns:
the child object
Overrides:
getChild in class ServerObjectImpl

[ o ] getInfo public synchronized ServerObjectShadow getInfo() throws RemoteException Gets this object's information Returns:
the shadow object that contains the information
Overrides:
getInfo in class ServerObjectImpl

[ o ] setInfo public synchronized void setInfo(ServerObjectShadow shadow) throws RemoteException Sets this object's attributes Parameters:
shadow - the shadow object that contains the information to set
Overrides:
setInfo in class ServerObjectImpl

[ o ] getNameTree public NameTree getNameTree() throws RemoteException

Gets the children, grandchildren names in a hierarchical order

Returns:
the output stream that contains the serialized name tree
Overrides:
getNameTree in class ServerObjectImpl

[ o ] setName public void setName(String name) throws RemoteException

Sets the object name

Overrides:
setName in class ServerObjectImpl

[ o ] getDescription public String getDescription() throws RemoteException

Gets the object description

Returns:
the description
Overrides:
getDescription in class ServerObjectImpl

[ o ] setDescription public void setDescription(String description) throws RemoteException Sets the object description Parameters:
the - description to be set
Overrides:
setDescription in class ServerObjectImpl

---

---

Interface netprism.server.ElementComponent public interface ElementComponent
extends ServerObject

---

[Method Index]

[ o ] getAttributes()
Get ElementComponent attributes
[ o ] getBoundingRectangle()
Get bounding rectangle for the element component
[ o ] getEditColor()
Get color for edit
[ o ] getHeight()
Get component height
[ o ] getIsLed()
Determine whether, or not, component is a LED
[ o ] getLineWidth()
Get width for line
[ o ] getPollEvents()
Get ElementComponent poll events
[ o ] getShape()
Get component shape
[ o ] getStates()
Get States
[ o ] getTrapEvents()
Get ElementComponent trap events
[ o ] getWidth()
Get component width
[ o ] getX()
Get X coordinate relative to the background image
[ o ] getY()

Get Y coordinate relative to the background image
[ o ] resetInitState()
Reset initial state
[ o ] setBoundingRectangle(Rectangle)
Set bounding rectangle for the element component
[ o ] setEditColor(Color)
Set color for edit
[ o ] setHeight(int)
Set component height
[ o ] setIsLed(boolean)
Set whether, or not, component is a LED
[ o ] setLineWidth(int)
Set line width
[ o ] setShape(int)
Set component shape
[ o ] setWidth(int)
Set component width
[ o ] setX(int)
Set X coordinate relative to the background image
[ o ] setY(int)
Set Y coordinate relative to the background image

[Methods]

[ o ] getBoundingRectangle public abstract Rectangle getBoundingRectangle() throws RemoteException Get bounding rectangle for the element component Returns:
bounding rectangle for the element component
Throws: RemoteException
rmi exception

[ o ] setBoundingRectangle public abstract void setBoundingRectangle(Rectangle rectangle) throws RemoteException Set bounding rectangle for the element component Parameters:
bounding - rectangle for the element component
Throws: RemoteException rmi exception

[ o ] getX public abstract int getX() throws RemoteException

Get X coordinate relative to the background image

Returns:
X coordinate relative to the background image
Throws: RemoteException
rmi exception

[ o ] setX public abstract void setX(int x) throws RemoteException

Set X coordinate relative to the background image

Parameters:
x - X coordinate relative to the background image
Throws: RemoteException
rmi exception

[ o ] getY public abstract int getY() throws RemoteException

Get Y coordinate relative to the background image

Returns:
Y coordinate relative to the background image
Throws: RemoteException
rmi exception

[ o ] setY public abstract void setY(int y) throws RemoteException

Set Y coordinate relative to the background image

Parameters:
y - Y coordinate relative to the background image
Throws: RemoteException
rmi exception

[ o ] getWidth public abstract int getWidth() throws RemoteException

Get component width

Returns:
component width
Throws: RemoteException
rmi exception

[ o ] setWidth public abstract void setWidth(int w) throws RemoteException

Set component width

Parameters:
w - component width
Throws: RemoteException
rmi exception

[ o ] getHeight public abstract int getHeight() throws RemoteException

Get component height

Returns:
component height
Throws: RemoteException
rmi exception

[ o ] setHeight public abstract void setHeight(int h) throws RemoteException

Set component height

, Parameters:
h - component height
Throws: RemoteException
rmi exception

[ o ] getShape public abstract int getShape() throws RemoteException

Get component shape

Returns:
component shape
Throws: RemoteException
rmi exception

[ o ] setShape public abstract void setShape(int shape) throws RemoteException

Set component shape

Parameters:
shape - component shape
Throws: RemoteException
rmi exception

[ o ] getIsLed public abstract boolean getIsLed() throws RemoteException

Determine whether, or not, component is a LED

Returns:
flag true if component is a LED, false if not a LED
Throws: RemoteException
rmi exception

[ o ] setIsLed public abstract void setIsLed(boolean isLed) throws RemoteException Set whether, or not, component is a LED Parameters:
isLed - flag true if component is a LED, false if not a LED
Throws: RemoteException
rmi exception

[ o ] getEditColor public abstract Color getEditColor() throws RemoteException

Get color for edit

Returns:
Color
Throws: RemoteException
rmi exception

[ o ] setEditColor public abstract void setEditColor(Color color) throws RemoteException Set color for edit Parameters:
color - the color for edit
Throws: RemoteException
rmi exception

[ o ] getLineWidth public abstract int getLineWidth() throws RemoteException

Get width for line

Returns:
the line width
Throws: RemoteException
rmi exception

[ o ] setLineWidth public abstract void setLineWidth(int lWidth) throws RemoteException Set line width Parameters:
lWidth - the width of a line
Throws: RemoteException
rmi exception

[ o ] getAttributes public abstract Attributes getAttributes() throws RemoteException Get ElementComponent attributes Returns:
reference to Attributes of this ElementComponent
Throws: RemoteException
rmi exception

[ o ] getPollEvents public abstract ServerObject getPollEvents() throws RemoteException Get ElementComponent poll events Returns:
reference to PollEvents of this ElementComponent
Throws: RemoteException
rmi exception

[ o ] getTrapEvents public abstract ServerObject getTrapEvents() throws RemoteException Get ElementComponent trap events Returns:
reference to TrapEvents of this ElementComponent
Throws: RemoteException
rmi exception

[ o ] getStates public abstract ServerObject getStates() throws RemoteException

Get States

Returns:
reference to States of this ElementComponent
Throws: RemoteException
rmi exception

[ o ] resetInitState public abstract void resetInitState() throws RemoteException Reset initial state Throws: RemoteException
rmi exception

---

---

Class netprism.server.ElementComponentImpl

```
java.lang.Object
  |
  +----java.rmi.server.RemoteObject
        |
        +----java.rmi.server.RemoteServer
              |
              +----java.rmi.server.UnicastRemoteObject
                    |
                    +----netprism.server.ServerObjectImpl
                          |
                          +----netprism.server.ElementComponentImpl
```

--- public class ElementComponentImpl
extends ServerObjectImpl
implements ElementComponent

---

[Constructor Index]

[ o ] ElementComponentImpl(ETImpl)
Constructor
[ o ] ElementComponentImpl(ETImpl, String, String, int, int, int, int, int, boolean, Color, int)
Constructor
[ o ] ElementComponentImpl(ETImpl, String, String, int, int, int, int, int, boolean, Color, int, AttributesImpl, PollEventsImpl, TrapEventsImpl, StatesImpl)
Constructor

[Method Index]

[ o ] create(ServerObjectShadow)
  Create
[ o ] delete(String)
[ o ] getAttributes()
  Get ElementComponent attributes
[ o ] getBoundingRectangle()
  Get bounding rectangle for the element component
[ o ] getCurrStateName()
  Get current state name
[ o ] getEditColor()
  Get color for edit
[ o ] getHeight()
  Get component height
[ o ] getHierarchicalNames()
[ o ] getInfo()
  Shadow
[ o ] getIsLed()
  Determine whether, or not, component is a LED
[ o ] getLineWidth()
  Get width for line
[ o ] getPollEvents()
  Get remote reference to PollEventsImpl object
[ o ] getShape()
  Get component shape
[ o ] getStates()
  Get remote reference to StatesImpl object
[ o ] getTrapEvents()
  Get remote reference to TrapEventsImpl object
[ o ] getWidth()
  Get component width
[ o ] getX()
  Get X coordinate relative to the background image
[ o ] getY()
  Get Y coordinate relative to the background image
[ o ] matchMyName(Vector, int)
[ o ] resetInitState()
  Reset initial state
[ o ] setBoundingRectangle(Rectangle)
  Set bounding rectangle for the element component
[ o ] setCurrStateName(String)
  Set current state name
[ o ] setEditColor(Color)
  Set color for edit
[ o ] setHeight(int)
  Set component height

```
[ o ] setInfo(ServerObjectShadow)
[ o ] setIsLed(boolean)
   Set whether, or not, component is a LED
[ o ] setLineWidth(int)
   Set line width
[ o ] setShape(int)
   Set component shape
[ o ] setWidth(int)
   Set component width
[ o ] setX(int)
   Set X coordinate relative to the background image
[ o ] setY(int)
   Set Y coordinate relative to the background image

[Constructors]

[ o ] ElementComponentImpl

 public ElementComponentImpl(ETImpl etImpl) throws RemoteException

   Constructor

   Parameters:
      etImpl - ETImpl object which owns this ElementComponent

[ o ] ElementComponentImpl

 public ElementComponentImpl(ETImpl etImpl,
                    String name,
                    String description,
                    int x,
                    int y,
                    int w,
                    int h,
                    int shape,
                    boolean isLed,
                    Color color,
                    int lWidth) throws RemoteException

   Constructor

   Parameters:
      etImpl - ETImpl object which owns this ElementComponent
      name - component name
      description - text description for the component
```

x - X coordinate relative to the background image
y - Y coordinate relative to the background image
w - component width
h - component height
shape - component shape
isLed - flag if component is a LED
Throws: RemoteException
rmi exception

[ o ] ElementComponentImpl

```
public ElementComponentImpl(ETImpl etImpl,
                    String name,
                    String description,
                    int x,
                    int y,
                    int w,
                    int h,
                    int shape,
                    boolean isLed,
                    Color color,
                    int lWidth,
                    AttributesImpl attributes,
                    PollEventsImpl pollEvents,
                    TrapEventsImpl trapEvents,
                    StatesImpl states) throws RemoteException
```

Constructor

Parameters:
etImpl - ETImpl object which owns this ElementComponent
name - component name
description - text description for the component
x - X coordinate relative to the background image
y - Y coordinate relative to the background image
w - component width
h - component height
shape - component shape
isLed - flag if component is a LED
color - edit color
lWidth - the width of a line
attributes - hashtable storing component attributes by name
Throws: RemoteException
rmi exception

[Methods]

[ o ] getInfo public synchronized ServerObjectShadow getInfo() throws RemoteException Shadow Overrides:
getInfo in class ServerObjectImpl

[ o ] setInfo public synchronized void setInfo(ServerObjectShadow shadow) throws RemoteException Overrides:
setInfo in class ServerObjectImpl

[ o ] create public ServerObject create(ServerObjectShadow shadow) throws RemoteException Create Overrides:
create in class ServerObjectImpl

[ o ] delete public void delete(String name) throws RemoteException

Overrides:
delete in class ServerObjectImpl

[ o ] getBoundingRectangle public Rectangle getBoundingRectangle() throws RemoteException Get bounding rectangle for the element component Returns:
bounding rectangle for the element component
Throws: RemoteException rmi exception

[ o ] setBoundingRectangle public void setBoundingRectangle(Rectangle rectangle) throws RemoteException Set bounding rectangle for the element component Parameters:
rectangle - bounding rectangle for the element component
Throws: RemoteException
rmi exception

[ o ] getX public int getX() throws RemoteException

Get X coordinate relative to the background image

Returns:
X coordinate relative to the background image
Throws: RemoteException
rmi exception

[ o ] setX public void setX(int x) throws RemoteException

Set X coordinate relative to the background image

Parameters:
x - X coordinate relative to the background image
Throws: RemoteException
rmi exception

[ o ] getY public int getY() throws RemoteException

Get Y coordinate relative to the background image

Returns:
Y coordinate relative to the background image
Throws: RemoteException
rmi exception

[ o ] setY public void setY(int y) throws RemoteException

Set Y coordinate relative to the background image

Parameters:
y - Y coordinate relative to the background image
Throws: RemoteException
rmi exception

[ o ] getWidth public int getWidth() throws RemoteException

Get component width

Returns:
component width
Throws: RemoteException
rmi exception

[ o ] setWidth public void setWidth(int w) throws RemoteException

Set component width

Parameters:
w - component width
Throws: RemoteException
rmi exception

[ o ] getHeight public int getHeight() throws RemoteException

Get component height

Returns:
component height
Throws: RemoteException
rmi exception

[ o ] setHeight public void setHeight(int h) throws RemoteException

Set component height

Parameters:
h - component height
Throws: RemoteException
rmi exception

[ o ] getShape public int getShape() throws RemoteException

Get component shape

Returns:
component shape
Throws: RemoteException
rmi exception

[ o ] setShape public void setShape(int shape) throws RemoteException

Set component shape

Parameters:
shape - component shape
Throws: RemoteException
rmi exception

[ o ] getIsLed public boolean getIsLed() throws RemoteException

Determine whether, or not, component is a LED

Returns:
flag true if component is a LED, false if not a LED
Throws: RemoteException
rmi exception

[ o ] setIsLed public void setIsLed(boolean isLed) throws RemoteException

Set whether, or not, component is a LED

Parameters:
isLed - flag true if component is a LED, false if not a LED
Throws: RemoteException
rmi exception

[ o ] getAttributes public Attributes getAttributes() throws RemoteException

Get ElementComponent attributes

Returns:
Attributes attributes
Throws: RemoteException
rmi exception

[ o ] getPollEvents public ServerObject getPollEvents() throws RemoteException

Get remote reference to PollEventsImpl object

Returns:
PollEventsImpl reference cast to ServerObject

[ o ] getTrapEvents public ServerObject getTrapEvents() throws RemoteException

Get remote reference to TrapEventsImpl object

Returns:
TrapEventsImpl reference cast to ServerObject

[ o ] getStates public ServerObject getStates() throws RemoteException

Get remote reference to StatesImpl object

Returns:
StatesImpl reference cast to ServerObject

[ o ] getCurrStateName public String getCurrStateName()

Get current state name

Returns:
current state name

[ o ] setCurrStateName public void setCurrStateName(String name)

Set current state name

Parameters:
name - current state name

[ o ] getEditColor public Color getEditColor() throws RemoteException

Get color for edit

Returns:
Color
Throws: RemoteException
rmi exception

[ o ] setEditColor public void setEditColor(Color color) throws RemoteException

Set color for edit

Parameters:
color - the color for edit
Throws: RemoteException
rmi exception

[ o ] getLineWidth public int getLineWidth() throws RemoteException

Get width for line

Returns:
the line width
Throws: RemoteException
rmi exception

[ o ] setLineWidth public void setLineWidth(int lWidth) throws RemoteException

Set line width

Parameters:
lWidth - the width of a line
Throws: RemoteException
rmi exception

[ o ] resetInitState public void resetInitState() throws RemoteException

Reset initial state

Throws: RemoteException
rmi exception

[ o ] getHierarchicalNames protected NameTree getHierarchicalNames()

Overrides:
getHierarchicalNames in class ServerObjectImpl

[ o ] matchMyName protected ServerObjectImpl matchMyName(Vector names,
int index)

Overrides:
matchMyName in class ServerObjectImpl

---

--------------------------------------------------------------------------

Interface netprism.server.ElementGroup public interface ElementGroup
extends ServerObject Interface to access an ElementGroup

--------------------------------------------------------------------------

[Method Index]

[ o ] addElement(String)
Add an Element to the ElementGroup
[ o ] getContact()
get the name of the contact person of this element group
[ o ] getPhone()
get the phone number of the contact person of this element group
[ o ] saveElement(String)
save an element which belongs to this group
[ o ] setContact(String)
set the name of the contact person of this element group
[ o ] setPhone(String)
set the phone number of the contact person of this element group

[Methods]

[ o ] addElement public abstract void addElement(String name) throws RemoteException Add an Element to the ElementGroup Parameters:
element - Element to be added to the ElementGroup
name - Element name

[ o ] getContact public abstract String getContact() throws RemoteException get the name of the contact person of this element group Returns:

the name string of the contact person

[ o ] setContact public abstract void setContact(String contactName) throws RemoteException set the name of the contact person of this element group Parameters:
the - name string of the contact person

[ o ] getPhone public abstract String getPhone() throws RemoteException get the phone number of the contact person of this element group Returns:
the phone number string of the contact person

[ o ] setPhone public abstract void setPhone(String contactName) throws RemoteException set the phone number of the contact person of this element group Parameters:
the - phone number string of the contact person

[ o ] saveElement public abstract void saveElement(String name) throws RemoteException save an element which belongs to this group Parameters:
name - the name of the element to be save ------------------------------------------------------------------------
------------------------------------------------------------------------

Class netprism.server.ElementGroupImpl java.lang.Object
|

```
+----java.rmi.server.RemoteObject
        |
        +----java.rmi.server.RemoteServer
                |
                +----java.rmi.server.UnicastRemoteObject
                        |
                        +----netprism.server.ServerObjectImpl
                                |
                                +----netprism.server.ElementGroupImpl
```

--- public class ElementGroupImpl
extends ServerObjectImpl
implements ElementGroup

Class to implement the ElementGroup interface

---

[Constructor Index]

[ o ] ElementGroupImpl(ManagerImpl)
  Constructor
[ o ] ElementGroupImpl(ManagerImpl, String, String)
  Constructor
[ o ] ElementGroupImpl(ManagerImpl, String, String, String, String)
  Constructor

[Method Index]

[ o ] addElement(String)
  Add an Element to the ElementGroup, keep hashtable of Element objects.
[ o ] checkGroupListOfElem(String[])
[ o ] create(ServerObjectShadow)
[ o ] createElement(String, String, String, String, String, String, int, int, boolean, String[])
  Create a new Element by associating the specified Element Template and IP address
[ o ] delete(String)
[ o ] getChild(String)
[ o ] getChildren()
[ o ] getContact()
  get the name of the contact person for this element group
[ o ] getHierarchicalNames()

[ o ] getInfo()
[ o ] getPhone()
get the phone number of the contact person for this element group
[ o ] matchMyName(Vector, int)
[ o ] saveElement(String)
Save Element
[ o ] setContact(String)
set the name of the contact person for this element group
[ o ] setInfo(ServerObjectShadow)
[ o ] setName(String)
[ o ] setPhone(String)
set the phone number of the contact person for this element group
[ o ] updateGroupListOfElements()

[Constructors]

[ o ] ElementGroupImpl public ElementGroupImpl(ManagerImpl manager) throws RemoteException Constructor Parameters:
ManagerImpl - ManagerImpl object which has this ElementGroup

[ o ] ElementGroupImpl

```
public ElementGroupImpl(ManagerImpl manager,
                String name,
                String description) throws RemoteException
```

Constructor

Parameters:
ManagerImpl - ManagerImpl object which has this ElementGroup
name - name of this ElementGroup
description - description of this ElementGroup

[ o ] ElementGroupImpl

```
public ElementGroupImpl(ManagerImpl manager,
                String name,
                String description,
                String contactName,
                String phone) throws RemoteException
```

Constructor

Parameters:
ManagerImpl - ManagerImpl object which has this ElementGroup
name - name of this ElementGroup
description - description of this ElementGroup
contactName - name of contact person for this ElementGroup
phone - phone number of contact person for this ElementGroup

[Methods]

[ o ] create public ServerObject create(ServerObjectShadow shadow) throws RemoteException Overrides:
create in class ServerObjectImpl

[ o ] createElement

```
public Element createElement(String name,
                    String description,
                    String etName,
                    String ipAddress,
                    String readCommunity,
                    String writeCommunity,
                    int retry,
                    int timeout,
                    boolean monitor,
                    String groups[]) throws RemoteException
```

Create a new Element by associating the specified Element Template and IP address Parameters:
name - Element name
description - description for the Element
etName - ET name
ipAddress - IP address
readCommunity - Snmp read community
writeCommunity - Snmp write community
retry - number of retries for SNMP requests
timeout - time interval in seconds between retries monitor - boolean flag indicate the monitor mode
groups - String[] of groups name who has this Element
Returns:
reference to the new Element
Throws: RemoteException,
NameUsedException

[ o ] checkGroupListOfElem public boolean checkGroupListOfElem(String gList[])

[ o ] getInfo public synchronized ServerObjectShadow getInfo() throws RemoteException Overrides:
getInfo in class ServerObjectImpl

[ o ] setInfo public synchronized void setInfo(ServerObjectShadow shadow) throws RemoteException Overrides:
setInfo in class ServerObjectImpl

[ o ] addElement public void addElement(String name) throws RemoteException

Add an Element to the ElementGroup, keep hashtable of Element objects. ElementGroup's children are the Element object ManagerImpl's children are the ElementGroup Parameters:
name - Element name to be added to the ElementGroup

[ o ] saveElement public void saveElement(String name) throws RemoteException

Save Element

Parameters:
name - Element name

[ o ] getContact public String getContact() throws RemoteException get the name of the contact person for this element group Returns:
the name string of the contact person

[ o ] setContact public void setContact(String contactName) throws RemoteException set the name of the contact person for this element group Parameters:
the - name string of the contact person

[ o ] getPhone public String getPhone() throws RemoteException get the phone number of the contact person for this element group Returns:
the phone number string of the contact person

[ o ] setPhone public void setPhone(String phone) throws RemoteException set the phone number of the contact person for this element group Parameters:
the - phone number string of the contact person

[ o ] setName public void setName(String name) throws RemoteException

Overrides:
setName in class ServerObjectImpl

[ o ] getHierarchicalNames protected NameTree getHierarchicalNames()

Overrides:
getHierarchicalNames in class ServerObjectImpl

[ o ] delete public void delete(String name) throws RemoteException

Overrides:
delete in class ServerObjectImpl

[ o ] getChildren public ServerObject[] getChildren() throws RemoteException

Overrides:
getChildren in class ServerObjectImpl

[ o ] getChild public ServerObject getChild(String name) throws RemoteException

Overrides:
getChild in class ServerObjectImpl

[ o ] matchMyName protected ServerObjectImpl matchMyName(Vector names,
int index)

Overrides:
matchMyName in class ServerObjectImpl

[ o ] updateGroupListOfElements public void updateGroupListOfElements()

---------------------------------------------------------------------
---------------------------------------------------------------------

Class netprism.server.ElementGroupShadow java.lang.Object

```
 |
 +----netprism.server.ServerObjectShadow
        |
        +----netprism.server.ElementGroupShadow
```

--- public class ElementGroupShadow
extends ServerObjectShadow class of ElementGroupShadow

---

[Variable Index]

[ o ] contactName
  The name of the contact person
[ o ] phone
  The phone number of the contact person

[Constructor Index]

[ o ] ElementGroupShadow()
  constructor of the shadow class of an ElementGroup

[Method Index]

[ o ] equals(Object)

[Variables]

[ o ] contactName public String contactName

The name of the contact person

[ o ] phone public String phone

The phone number of the contact person

[Constructors]

[ o ] ElementGroupShadow public ElementGroupShadow()

constructor of the shadow class of an ElementGroup

[Methods]

[ o ] equals public boolean equals(Object obj)

Overrides:
equals in class ServerObjectShadow

---

Class netprism.server.ElementImpl

```
java.lang.Object
  |
  +----java.rmi.server.RemoteObject
        |
        +----java.rmi.server.RemoteServer
              |
              +----java.rmi.server.UnicastRemoteObject
                    |
                    +----netprism.server.ServerObjectImpl
                          |
                          +----netprism.server.ElementImpl
```

--- public class ElementImpl
extends ServerObjectImpl
implements Element

---

[Constructor Index]

[ o ] ElementImpl(ElementGroupImpl)
Constructor

[ o ] ElementImpl(ElementGroupImpl, String, String, ETImpl, String, String, String, int, int, boolean, String[])
Constructor

[Method Index]

[ o ] addAGroupName(String)
[ o ] changeAGroupName(String, String)
[ o ] copyComponents(ETImpl)
Copy element components from element template 1) Need to change each component's parent from ETImpl to this ElementImpl 2) Need to change parents of all children to new references
[ o ] copyTrapRules(ETImpl)
Copy element trap rules from element template
[ o ] create(ServerObjectShadow)
[ o ] delete(String)
[ o ] getElementTrapRule(String)
Get a reference to a trap rule
[ o ] getElementTrapRuleList()
Get the name list of all element trap rules
[ o ] getElementTrapRules()
Get an array of all trap rules
[ o ] getGroupList()
[ o ] getInfo()
[ o ] getIPAddress()
Get Element IP Address
[ o ] getMonitorElement()
Get value of Monitor Element
[ o ] getReadCommunity()
Get Element SNMP read community
[ o ] getRetry()
Get number of retries for SNMP requests
[ o ] getTimeout()
Get time interval in seconds between retries
[ o ] getWriteCommunity()
Get Element SNMP write community
[ o ] removeAGroupName(String)
[ o ] setGroupList(String[])
[ o ] setInfo(ServerObjectShadow)
[ o ] setIPAddress(String)
Set Element IP Address
[ o ] setMonitorElement(boolean)
Change the status of the Monitor Element
[ o ] setName(String)
[ o ] setReadCommunity(String)

Set Element SNMP read community
[ o ] setRetry(int)
Set number of retries for SNMP requests
[ o ] setTimeout(int)
Set time interval in seconds between retries
[ o ] setWriteCommunity(String)
Set Element SNMP write community
[ o ] updateElemListOfElemGroup(String, String, Vector)
update the element name in the element list of all element groups who has this element.
[ o ] updateGroupListOfElement(String[], Vector, String)

[Constructors]

[ o ] ElementImpl

```
public ElementImpl(ElementGroupImpl elemGroupImpl) throws
RemoteException
```

Constructor

Parameters:
manager - ManagerImpl object which has this ElementImpl

[ o ] ElementImpl

```
public ElementImpl(ElementGroupImpl elemGroupImpl,
            String name,
            String description,
            ETImpl et,
            String ipAddress,
            String readCommunity,
            String writeCommunity,
            int retry,
            int timeout,
            boolean monitor,
            String groups[]) throws RemoteException
```

Constructor

Parameters:
manager - ManagerImpl object which has this ElementImpl
name - Element name
description - description for the Element
et - ETImpl object for this element ipAddress - IP address of this element
readCommunity - the password for read data of current device
writecommunity - the password for write data to the device
retry - the number of retry for polling
timeout - the timeout for polling
monitor - a flag indicated stop or run the polling

[Methods]

[ o ] create public ServerObject create(ServerObjectShadow shadow) throws RemoteException Overrides:
create in class ServerObjectImpl

[ o ] delete public void delete(String name) throws RemoteException

Overrides:
delete in class ServerObjectImpl

[ o ] getInfo public synchronized ServerObjectShadow getInfo() throws RemoteException Overrides:
getInfo in class ServerObjectImpl

[ o ] setInfo public synchronized void setInfo(ServerObjectShadow shadow) throws RemoteException Overrides:
setInfo in class ServerObjectImpl

[ o ] updateElemListOfElemGroup
:
public void updateElemListOfElemGroup(String oldName,
String newName,
Vector groups) throws NameNotFoundException update the element name in the element list of all element groups who has this element. --------- should be moved to ManagerImpl.java -------

Parameters:
oldName - the old name of element object
newName - the new name of element object
groups - a Vector of elementgroup names who have this element

[ o ] updateGroupListOfElement

```
public void updateGroupListOfElement(String newGList[],
                        Vector oldGList,
                        String elemName) throws RemoteException
```

[ o ] copyComponents

```
public void copyComponents(ETImpl et) throws RemoteException
```

Copy element components from element template 1) Need to change each component's parent from ETImpl to this ElementImpl 2) Need to change parents of all children to new references Parameters:
et - the ET who has the settings

[ o ] copyTrapRules

```
public void copyTrapRules(ETImpl et) throws RemoteException
```

Copy element trap rules from element template

[ o ] getElementTrapRuleList

```
public String[] getElementTrapRuleList() throws RemoteException
```

Get the name list of all element trap rules

Returns:
name list of all element trap rules
Throws: RemoteException
rmi exception

[ o ] getElementTrapRules public ElementTrapRule[] getElementTrapRules() throws RemoteException Get an array of all trap rules Returns:
array of all trap rules
Throws: RemoteException
rmi exception

[ o ] getElementTrapRule public ElementTrapRule getElementTrapRule(String name) throws RemoteException Get a reference to a trap rule Parameters:
name - trapRule name
Returns:
reference to the TrapRule object
Throws: RemoteException
rmi exception

[ o ] setIPAddress public void setIPAddress(String ipAddress) throws RemoteException Set Element IP Address Parameters:
ipAddress - Element IP address
Throws: RemoteException
rmi exception

[ o ] getIPAddress public String getIPAddress() throws RemoteException

Get Element IP Address

Returns:
Element IP Address
Throws: RemoteException
rmi exception

[ o ] getReadCommunity public String getReadCommunity() throws RemoteException

Get Element SNMP read community

Returns:
Element SNMP read community
Throws: RemoteException
rmi exception

[ o ] setReadCommunity public void setReadCommunity(String readCommunity) throws RemoteException Set Element SNMP read community Parameters:
readCommunity - Element SNMP read community
Throws: RemoteException
rmi exception

[ o ] getWriteCommunity public String getWriteCommunity() throws RemoteException Get Element SNMP write community Returns:
Element SNMP write community
Throws: RemoteException
rmi exception

[ o ] setWriteCommunity public void setWriteCommunity(String writeCommunity) throws RemoteException Set Element SNMP write community Parameters:
writeCommunity - Element SNMP write community
Throws: RemoteException
rmi exception

[ o ] getRetry public int getRetry() throws RemoteException

Get number of retries for SNMP requests

Returns:
number of retries for SNMP requests
Throws: RemoteException
rmi exception

[ o ] setRetry public void setRetry(int retry) throws RemoteException

Set number of retries for SNMP requests

Parameters:
retry - number of retries for SNMP requests
Throws: RemoteException
rmi exception

[ o ] getTimeout public int getTimeout() throws RemoteException

Get time interval in seconds between retries

Returns:
time interval in seconds between retries
Throws: RemoteException
rmi exception

[ o ] setTimeout public void setTimeout(int timeout) throws RemoteException

Set time interval in seconds between retries

Parameters:
timeout - time interval in seconds between retries
Throws: RemoteException
rmi exception

[ o ] getMonitorElement public boolean getMonitorElement() throws RemoteException Get value of Monitor Element Returns:
the boolean value of the Monitor Element Exception
java.rmi.RemoteException rmi exception

[ o ] setMonitorElement public void setMonitorElement(boolean monitorElement) throws RemoteException Change the status of the Monitor Element Parameters:
monitorElem - a boolean flag to set the Monitor Element on or off
Exception java.rmi.RemoteException rmi exception

[ o ] setName public void setName(String name) throws RemoteException

Overrides:
setName in class ServerObjectImpl

[ o ] getGroupList public String[] getGroupList() throws RemoteException

[ o ] setGroupList public void setGroupList(String gList[]) throws RemoteException

[ o ] changeAGroupName public void changeAGroupName(String oldName,
String newName) throws RemoteException

[ o ] addAGroupName public void addAGroupName(String gName)

[ o ] removeAGroupName public void removeAGroupName(String gName)

------------------------------------------------------------------------
------------------------------------------------------------------------

Class netprism.server.ElementShadow

```
java.lang.Object
  |
  +----netprism.server.ServerObjectShadow
        |
        +----netprism.server.ElementShadow
```

------------------------------------------------------------------------ public class ElementShadow
extends ServerObjectShadow

Element shadow class

------------------------------------------------------------------------

[Variable Index]

[ o ] etName
String etName name of the element template for this element
[ o ] groupList
Vector groupList the name of ElementGroup who has this Element
[ o ] ipAddress
String ipAddress IP address of this element
[ o ] monitorElement
boolean monitorElement
[ o ] readCommunity
String readCommunity Snmp read community
[ o ] retry
int retry number of retries for SNMP requests
[ o ] timeout
int timeout time interval in seconds between retries
[ o ] writeCommunity
String writeCommunity Snmp write community

[Constructor Index]

[ o ] ElementShadow()
Constructor

[Method Index]

[ o ] clone()
[ o ] equals(Object)

[Variables]

[ o ] ipAddress public String ipAddress

String ipAddress IP address of this element

[ o ] etName public String etName

String etName name of the element template for this element

[ o ] readCommunity public String readCommunity

String readCommunity Snmp read community

[ o ] writeCommunity public String writeCommunity

String writeCommunity Snmp write community

[ o ] retry public int retry int retry number of retries for SNMP requests

[ o ] timeout public int timeout int timeout time interval in seconds between retries

[ o ] monitorElement public boolean monitorElement boolean monitorElement

[ o ] groupList public String groupList[]

Vector groupList the name of ElementGroup who has this Element

[Constructors]

[ o ] ElementShadow public ElementShadow()

Constructor

[Methods]

[ o ] clone public Object clone()

Overrides:
clone in class ServerObjectShadow

[ o ] equals public boolean equals(Object obj)

Overrides:
equals in class ServerObjectShadow

---

---

Interface netprism.server.ET public interface ET
extends ServerObject

------------------------------------------------------------------------

[Method Index]

[ o ] createElementTrapRule(ElementTrapRuleShadow)
[ o ] deleteElementTrapRule(String)
Delete an ElementTrapRule
[ o ] getElementTrapRule(String)
Get a reference to an ElementTrapRule
[ o ] getElementTrapRuleList()
Get the name list of all ElementTrapRules
[ o ] getElementTrapRules()
Get ET trap rules
[ o ] getImage()
Get ET image
[ o ] getMibs()
Get ET mibs
[ o ] setImage(String)
Set ET image
[ o ] setMibs(String[])
Set ET mibs

[Methods]

[ o ] getImage public abstract String getImage() throws RemoteException

Get ET image

Returns:
the background image
Throws: RemoteException
rmi exception

[ o ] setImage public abstract void setImage(String image) throws RemoteException Set ET image Parameters:
image - the background image
Throws: RemoteException
rmi exception

[ o ] getMibs public abstract String[] getMibs() throws RemoteException

Get ET mibs

Returns:
a list of MIB files to be used for the device
Throws: RemoteException
rmi exception

[ o ] setMibs public abstract void setMibs(String mibs[]) throws RemoteException Set ET mibs Parameters:
mibs[] - a list of MIB files to be used for the device
Throws: RemoteException
rmi exception

[ o ] getElementTrapRuleList public abstract String[] getElementTrapRuleList() throws RemoteException Get the name list of all ElementTrapRules Returns:
name list of all ElementTrapRules
Throws: RemoteException
rmi exception

[ o ] createElementTrapRule public abstract ElementTrapRule createElementTrapRule(ElementTrapRuleShadow shadow) throws RemoteException

[ o ] deleteElementTrapRule public abstract void deleteElementTrapRule(String name) throws RemoteException Delete an ElementTrapRule Parameters:
name - ElementTrapRule name
Throws: RemoteException
rmi exception

[ o ] getElementTrapRule public abstract ElementTrapRule getElementTrapRule(String name) throws RemoteException Get a reference to an ElementTrapRule Parameters:
name - ElementTrapRule name
Returns:
reference to the ElementTrapRule object
Throws: RemoteException
rmi exception

[ o ] getElementTrapRules public abstract ElementTrapRule[] getElementTrapRules() throws RemoteException Get ET trap rules Returns:
an array of element trap rules
Throws: RemoteException
rmi exception

---

---

Class netprism.server.ETImpl

```
java.lang.Object
   |
   +----java.rmi.server.RemoteObject
           |
           +----java.rmi.server.RemoteServer
                   |
                   +----java.rmi.server.UnicastRemoteObject
```

```
   |
   +----netprism.server.ServerObjectImpl
           |
           +----netprism.server.ETImpl
```

--- public class ETImpl
extends ServerObjectImpl
implements ET

Class to implement the ET interface

---

[Constructor Index]

[ o ] ETImpl(BuilderImpl)
  Constructor
[ o ] ETImpl(BuilderImpl, String, String, String, String[])
  Constructor
[ o ] ETImpl(BuilderImpl, String, String, String, String[], Hashtable, Hashtable)
  Constructor

[Method Index]

[ o ] create(ServerObjectShadow)
[ o ] createElementComponent(String, String, int, int, int, int, int, boolean, Color, int)
  Create a new ElementComponent
[ o ] createElementTrapRule(ElementTrapRuleShadow)
  Create a new ElementTrapRule
[ o ] deleteElementTrapRule(String)
  Delete an ElementTrapRule
[ o ] getElementComponentList()
  Get the name list of all element components
[ o ] getElementTrapRule(String)
  Get a reference to an ElementTrapRule
[ o ] getElementTrapRuleList()
  : Get the name list of all ElementTrapRules
[ o ] getElementTrapRules()
  Get ET trap rules
[ o ] getImage()
  Get ET image

```
[ o ] getInfo()
   Gets this object's information
[ o ] getMibs()
   Get ET mibs
[ o ] setImage(String)
   Set ET image
[ o ] setInfo(ServerObjectShadow)
   Sets this object's attributes
[ o ] setMibs(String[])
   Set ET mibs
[ o ] setName(String)

[Constructors]

[ o ] ETImpl

 public ETImpl(BuilderImpl builder) throws RemoteException

   Constructor

   Parameters:
      builder - BuilderImpl object which has this ETImpl

[ o ] ETImpl

 public ETImpl(BuilderImpl builder,
         String name,
         String description,
         String image,
         String mibs[]) throws RemoteException

   Constructor

   Parameters:
      etFactory - ETFactoryImpl object which has this ETImpl
      name - ET name
      description - description for the ET
      image - the background image
      mibs - a list of MIB files to be used for the device

[ o ] ETImpl

 public ETImpl(BuilderImpl builder,
         String name,
         String description,
```

```
            String image,
            String mibs[],
            Hashtable components,
            Hashtable trapRules) throws RemoteException
```

Constructor

Parameters:
  builder - BuilderImpl object which has this ETImpl
  name - ET name
  description - description for the ET
  image - the background image
  mibs - a list of MIB files to be used for the element
  components - hashtable storing element components by name
  trapRules - hashtable storing element trap rules by name

[Methods]

[ o ] getElementComponentList

```
public String[] getElementComponentList() throws RemoteException
```

Get the name list of all element components

Returns:
  name list of all element components
Throws: RemoteException
  rmi exception

[ o ] create

```
public ServerObject create(ServerObjectShadow shadow) throws
RemoteException
```

Overrides:
  create in class ServerObjectImpl

[ o ] createElementComponent

```
public ElementComponent createElementComponent(String name,
                              String description,
                              int x,
                              int y,
                              int w,
                              int h,
```

```
                          int shape,
                          boolean isLed,
                          Color color,
                          int lWidth) throws RemoteException

    Create a new ElementComponent

    Parameters:
        name - component name
        description - description for the component
        x - X coordinate relative to the background image
        y - Y coordinate relative to the background image
        w - component width
        h - component height
        shape - component shape
        isLed - flag if component is a LED
    Returns:
        reference to the new Component object
    Throws: RemoteException,
        NameUsedException

[ o ] getImage

  public String getImage() throws RemoteException

    Get ET image

    Returns:
        the background image
    Throws: RemoteException
        rmi exception

[ o ] setImage

  public void setImage(String image) throws RemoteException

    Set ET image

    Parameters:
        image - the background image
    Throws: RemoteException
        rmi exception

[ o ] getMibs
```

public String[] getMibs() throws RemoteException

Get ET mibs

Returns:
a list of MIB files to be used for the device
Throws: RemoteException
rmi exception

[ o ] setMibs public void setMibs(String mibs[]) throws RemoteException

Set ET mibs

Parameters:
mibs[] - a list of MIB files to be used for the device
Throws: RemoteException
rmi exception

[ o ] getElementTrapRuleList public String[] getElementTrapRuleList() throws RemoteException Get the name list of all ElementTrapRules Returns:
name list of all ElementTrapRules
Throws: RemoteException
rmi exception

[ o ] createElementTrapRule public ElementTrapRule createElementTrapRule(ElementTrapRuleShadow shadow) throws RemoteException Create a new ElementTrapRule Parameters:
name - ElementTrapRule name
description - description for the ElementTrapRule
condition - condition for the ElementTrapRule
persistence - persistence for the ElementTrapRule
runCommand - determine if execute a command
forwardTrap - determine if forward the trap or not toAlarm - determine if add the alarm to a log file
cmd - the command to be executed
runScript - run the command in a script file
host - the host a trap to be forward to
alarmDesc - the description of the alarm
alarmCause - the cause of the alarm
alarmSol - the solution of the alarm Returns:
reference to the new ElementTrapRule object Throws: RemoteException
rmi exception

[ o ] deleteElementTrapRule public void deleteElementTrapRule(String name) throws RemoteException Delete an ElementTrapRule Parameters:
name - ElementTrapRule name Throws: RemoteException
rmi exception

[ o ] getElementTrapRule public ElementTrapRule getElementTrapRule(String name) throws RemoteException Get a reference to an ElementTrapRule Parameters:
name - ElementTrapRule name Returns:
reference to the ElementTrapRule object Throws: RemoteException
rmi exception

[ o ] getElementTrapRules public ElementTrapRule[] getElementTrapRules() throws RemoteException Get ET trap rules Returns:
a hashtable storing element trap rules by name Throws: RemoteException
rmi exception

[ o ] getInfo public ServerObjectShadow getInfo() throws RemoteException

Gets this object's information

Returns:
the shadow object that contains the information
Overrides:
getInfo in class ServerObjectImpl

[ o ] setInfo public void setInfo(ServerObjectShadow shadow) throws RemoteException Sets this object's attributes Parameters:
shadow - the shadow object that contains the information to set
Overrides:
setInfo in class ServerObjectImpl

[ o ] setName public void setName(String name) throws RemoteException

Overrides:
setName in class ServerObjectImpl

---

---

Class netprism.server.ETShadow

```
java.lang.Object
   |
   +----netprism.server.ServerObjectShadow
           |
           +----netprism.server.ETShadow
```

--- public class ETShadow
extends ServerObjectShadow

ET shadow class

------------------------------------------------------------------------

[Variable Index]

[ o ] image
String image the background image
[ o ] mibs
String[] mibs a list of MIB files to be used for the device

[Constructor Index]

[ o ] ETShadow()
Constructor

[Method Index]

[ o ] clone()
[ o ] equals(Object)

[Variables]

[ o ] image public String image

String image the background image

[ o ] mibs public String mibs[]

String[] mibs a list of MIB files to be used for the device

[Constructors]

[ o ] ETShadow public ETShadow()

Constructor

[Methods]

[ o ] clone public Object clone()

Overrides:
clone in class ServerObjectShadow

[ o ] equals public boolean equals(Object obj)

Overrides:
equals in class ServerObjectShadow

---

---

Class netprism.server.EventEngine

```
java.lang.Object
  |
  +----netprism.server.EventEngine
```

--- public class EventEngine
extends Object

EventEngine processes events and takes action(s) when the rule condition is satisfied.

See Also:
ElementImpl

---

[Constructor Index]

[ o ] EventEngine()
[ o ] EventEngine(ElementImpl)

[Constructors]

[ o ] EventEngine public EventEngine()

[ o ] EventEngine public EventEngine(ElementImpl element)

------------------------------------------------------------------------
------------------------------------------------------------------------

Interface netprism.server.EventRule public interface EventRule
extends Rule

EventRule is the rule for the polling and trap events.

------------------------------------------------------------------------

[Method Index]

[ o ] getState()
Get the current state name of a rule (not for the Action).
[ o ] setState(String)
Set the current state name of a rule (not for the Action)

[Methods]

[ o ] getState public abstract String getState() throws RemoteException

Get the current state name of a rule (not for the Action).

Returns:
state names
Throws: RemoteException
rmi exception

[ o ] setState public abstract void setState(String state) throws RemoteException Set the current state name of a rule (not for the Action)

Parameters:
state - state name of a ComponentTrapRule
Throws: RemoteException
rmi exception

---

---

Class netprism.server.EventRuleImpl

```
java.lang.Object
  |
  +----java.rmi.server.RemoteObject
         |
         +----java.rmi.server.RemoteServer
                |
                +----java.rmi.server.UnicastRemoteObject
                       |
                       +----netprism.server.ServerObjectImpl
                              |
                              +----netprism.server.RuleImpl
                                     |
                                     +----netprism.server.EventRuleImpl
```

--- public class EventRuleImpl
extends RuleImpl
implements EventRule

EventRule is the rule for the polling and trap events.

---

[Variable Index]

[ o ] state
The name of current State this rule is applying on.

[Constructor Index]

[ o ] EventRuleImpl(ServerObjectImpl, String)
Constructor

[ o ] EventRuleImpl(ServerObjectImpl, String, String, String, int, String, boolean, boolean, boolean, boolean, boolean, int, String, String, boolean, String, String, String, String)
Constructor

[Method Index]

[ o ] getInfo()
get the shadow class of a EventRule object
[ o ] getState()
Get the current state name of a rule (not for the Action).
[ o ] perform(PollEventImpl)
Execute the actions that users specified
[ o ] perform(TrapEventImpl, InSnmpTrap)
Execute the actions that users specified
[ o ] setInfo(ServerObjectShadow)
set the shadow class of a EventRule object
[ o ] setState(String)
Set the current state name of a rule (not for the Action)

[Variables]

[ o ] state public String state

The name of current State this rule is applying on.

[Constructors]

[ o ] EventRuleImpl public EventRuleImpl(ServerObjectImpl parent,
String name) throws RemoteException Constructor Parameters:
parent - the parent object who has this EventRule
name - the name of the EventRule

[ o ] EventRuleImpl public EventRuleImpl(ServerObjectImpl parent,
String name,

```
String desc,
String expression,
int persistence,
String state,
boolean changePollInterval,
boolean changeState,
boolean runCommand,
boolean forwardTrap,
boolean toAlarm,
int pInterval,
String toState,
String cmd,
boolean runScript,
String host,
String alarmDesc,
String alarmCause,
String alarmSol) throws RemoteException
```

Constructor

Parameters:

parent - the parent object who has this EventRule
name - the name of the Rule
description - the description of the Rule
expression - the condition expression
persistence - the number of consecutive occurrences
state - the current state of the rule
changePollInterval - determine if change the Polling interval
changeState - determine if change to another state
runCommand - determine if execute a command
forwardTrap - determine if forward the trap or not
toAlarm - determine if add the alarm to a log file
pInterval - the new polling time interval
toState - the another state to be change
cmd - the command to be executed
runScript - run the command in a script file
host - the host a trap to be forward to
alarmDesc - the description of the alarm
alarmCause - the cause of the alarm
alarmSol - the solution of the alarm

[Methods]

[ o ] getInfo public synchronized ServerObjectShadow getInfo() throws RemoteException get the shadow class of a EventRule object Returns:
a EventRuleShadow class
Throws: RemoteException
rmi exception
Overrides:
getInfo in class RuleImpl

[ o ] setInfo public synchronized void setInfo(ServerObjectShadow shadow) throws RemoteException set the shadow class of a EventRule object Parameters:
shadow - a EventRuleShadow class
Throws: RemoteException
rmi exception
Overrides:
setInfo in class RuleImpl

[ o ] getState public String getState() throws RemoteException

Get the current state name of a rule (not for the Action).

Returns:
state names
Throws: RemoteException
rmi exception

[ o ] setState public void setState(String state) throws RemoteException

Set the current state name of a rule (not for the Action)

Parameters:
state - state name of a ComponentTrapRule
Throws: RemoteException rmi exception

[ o ] perform public void perform(PollEventImpl pollEvent)

Execute the actions that users specified

[ o ] perform public void perform(TrapEventImpl trapEvent,
InSnmpTrap trap)

Execute the actions that users specified

---

---

Class netprism.server.EventRuleShadow

```
java.lang.Object
  |
  +----netprism.server.ServerObjectShadow
        |
        +----netprism.server.RuleShadow
              |
              +----netprism.server.EventRuleShadow
```

--- public class EventRuleShadow
extends RuleShadow

---

[Variable Index]

[ o ] state
The name of current State this rule is applying on.

[Constructor Index]

[ o ] EventRuleShadow()
constructor construct a shadow class of ComponentTrapRule

[Method Index]

[ o ] equals(Object)

[Variables]

[ o ] state public String state

The name of current State this rule is applying on.

[Constructors]

[ o ] EventRuleShadow public EventRuleShadow()

constructor construct a shadow class of ComponentTrapRule

[Methods]

[ o ] equals public boolean equals(Object obj)

Overrides:
equals in class RuleShadow

---

---

Class netprism.server.Filter

```
java.lang.Object
  |
  +----netprism.server.Filter
```

--- public class Filter
extends Object
implements Serializable

Filters used to filter the alarms

---

[Variable Index]

[ o ] ACKNOWLEDGED
Acknowledge Status: acknowledged
[ o ] BOTH
Acknowledge Status: both
[ o ] CUSTOMIZED
Filter type: filter configured by users
[ o ] DEFAULT
Filter type: default filter
[ o ] NONE
Filter type: no filter
[ o ] NOTACKNOWLEDGED
Acknowledge Status: not acknowledged

[Constructor Index]

[ o ] Filter(int, Date, Date, String[], String[], int)

[Method Index]

[ o ] getAcknowledgeStatus()
Get a constant of the acknowledge status
[ o ] getBeginning()
Get the time range for a filter
[ o ] getEnd()
Get the time range for a filter
[ o ] getFilterType()
Get the filter type
[ o ] getSeverity()
Get a list of severity for filtering.
[ o ] getUserNameList()
Get a list of user name of acknowledging the alarms

[Variables]

[ o ] NONE public final static int NONE

Filter type: no filter

[ o ] DEFAULT public final static int DEFAULT

Filter type: default filter

[ o ] CUSTOMIZED public final static int CUSTOMIZED

Filter type: filter configured by users

[ o ] NOTACKNOWLEDGED public final static int NOTACKNOWLEDGED

Acknowledge Status: not acknowledged

[ o ] ACKNOWLEDGED public final static int ACKNOWLEDGED

Acknowledge Status: acknowledged

[ o ] BOTH public final static int BOTH

Acknowledge Status: both

[Constructors]

[ o ] Filter

```
public Filter(int type,
           Date beginning,
           Date end,
           String severity[],
           String userName[],
           int acknowledgeStatus)
```

[Methods]

[ o ] getFilterType public int getFilterType()

Get the filter type

Returns:
filter type

[ o ] getBeginning public Date getBeginning()

Get the time range for a filter

Returns:
the beginning of the time range

[ o ] getEnd public Date getEnd()

Get the time range for a filter

Returns:
the end of the time range

[ o ] getSeverity public String[] getSeverity()

Get a list of severity for filtering.

Returns:
a list of severity (if no severity specified, a nill is returned)

[ o ] getUserNameList public String[] getUserNameList()

Get a list of user name of acknowledging the alarms

Returns:
a list of user names (if no user name specified, a nill is returned)

[ o ] getAcknowledgeStatus public int getAcknowledgeStatus()

Get a constant of the acknowledge status

Returns:
acknowledge status 0(not acknowledged), 1(acknowledged), 2(both)

------------------------------------------------------------------------
------------------------------------------------------------------------

Class netprism.server.InSnmpTrap java.lang.Object
 |
 +----netprism.server.InSnmpTrap

------------------------------------------------------------------------ public class InSnmpTrap
extends Object

InSnmpTrap is the class contains the data of a SNMP trap received from a network device. TrapSever is the class handle the input SNMP trap, so that InSnmpTrap will be generated by the TrapServer than send it to the EventEngine class

------------------------------------------------------------------------

[Constructor Index]

[ o ] InSnmpTrap(SnmpAPI, int, String, String, String, int, int, long, Vector)
/** Constructor A constructor that contains the information received from the SnmpPDU class of AdventNet's package

[Method Index]

[ o ] forward(String)
Forward a trap to a host.
[ o ] getAgentAddress()
Get the IP address of the network device on which the agent is running, and who generates the traps
[ o ] getAVarValue(String)
Get the value of a specific variable from the variable binding list

[ o ] getCommunity()
Get the community name of snmp trap message
[ o ] getEnterprise()
Get the enterprise code
[ o ] getGenericCode()
Get the generic trap type, the value is from 0 to 6
[ o ] getSpecCode()
Get the specific trap type
[ o ] getTimeStamp()
Get the time stamp value
[ o ] getVarBindingList()
Get the name list of variable binding list
[ o ] getVersion()
Get the version number of snmp trap message
[ o ] printValues()
Print out the receive trap data in detail

[Constructors]

[ o ] InSnmpTrap

```
public InSnmpTrap(SnmpAPI apiObj,
            int version,
            String community,
            String enterprise,
            String agentAddr,
            int genCode,
            int specCode,
            long timeStamp,
            Vector varBindVector)
```

/** Constructor A constructor that contains the information received from the SnmpPDU class of AdventNet's package Parameters:
version - Version number of received Snmp trap
community - community name
enterprise - Snmp sysObjectID of the object generating the trap
agentAddress - IP address of the SNMP agent who generating the trap
genCode - Generic trap type, its value is from 0 - 6
specCode - Specific trap type
timeStamp - Current value of that agent's sysUpTime object
variables - the Vector of variables binding received from the trap's SNMP PDU

[Methods]

[ o ] forward public void forward(String host)

Forward a trap to a host. In the forwarded PDU, the "address" contains the host name and the IP address of the host who passes the trap, and "agent_addr" has the host name and IP address of the agent who generated this trap.

Parameters:
host - The host name or a IP address of a network device receiving this trap

[ o ] getVersion public int getVersion()

Get the version number of snmp trap message

Returns:
the version of snmp trap message

[ o ] getCommunity public String getCommunity()

Get the community name of snmp trap message

Returns:
the community name of snmp trap message

[ o ] getEnterprise public String getEnterprise()

Get the enterprise code

Returns:
enterprise code

[ o ] getAgentAddress public String getAgentAddress()

Get the IP address of the network device on which the agent is running, and who generates the traps Returns:
the IP address of SNMP agent

[ o ] getGenericCode public int getGenericCode()

Get the generic trap type, the value is from 0 to 6

Returns:
generic code

[ o ] getSpecCode public int getSpecCode()

Get the specific trap type

Returns:
specific trap type

[ o ] getTimeStamp public long getTimeStamp()

Get the time stamp value

Returns:
time stamp value

[ o ] getVarBindingList public String[] getVarBindingList()

Get the name list of variable binding list

Returns:
a name list variable binding list

[ o ] getAVarValue public String getAVarValue(String var)

Get the value of a specific variable from the variable binding list

Parameters:
variable - name
Returns:
the value of var

[ o ] printValues public void printValues()

Print out the receive trap data in detail

------------------------------------------------------------------------
------------------------------------------------------------------------

Interface netprism.server.LEDState public interface LEDState
extends ServerObject LEDState is a RMI interface that can access LEDStateImpl class. It provides the information of a LEDstate configuration

------------------------------------------------------------------------

[Method Index]

[ o ] getLEDStateBlinking()
Get blinking interval in seconds of a LEDState
[ o ] getLEDStateColor()
Get LEDState color
[ o ] setLEDStateBlinking(int)
Set blinking interval in seconds for a LEDState
[ o ] setLEDStateColor(Color)
Set LEDState color

[Methods]

[ o ] getLEDStateColor public abstract Color getLEDStateColor() throws RemoteException Get LEDState color Returns:
LEDState color
Throws: RemoteException
rmi exception

[ o ] setLEDStateColor public abstract void setLEDStateColor(Color color) throws RemoteException Set LEDState color Parameters:
color - LEDState color
Throws: RemoteException
rmi exception

[ o ] getLEDStateBlinking public abstract int getLEDStateBlinking() throws RemoteException Get blinking interval in seconds of a LEDState Returns:
blinking interval in seconds
Throws: RemoteException
rmi exception

[ o ] setLEDStateBlinking public abstract void setLEDStateBlinking(int blinking) throws RemoteException Set blinking interval in seconds for a LEDState Parameters:
blinking - blinking interval in seconds
Throws: RemoteException
rmi exception

---

---

Class netprism.server.LEDStateImpl

```
java.lang.Object
  |
  +----java.rmi.server.RemoteObject
        |
        +----java.rmi.server.RemoteServer
              |
              +----java.rmi.server.UnicastRemoteObject
                    |
                    +----netprism.server.ServerObjectImpl
                          |
                          +----netprism.server.LEDStateImpl
```

--- public class LEDStateImpl
extends ServerObjectImpl
implements LEDState

Class to implement the LEDState interface. It provides the information of a LEDstate configuration

---

[Constructor Index]

[ o ] LEDStateImpl(StatesImpl, String, Color, int, String)
Constructor

[Method Index]

[ o ] create(ServerObjectShadow)
Create a child object with type specified in shadow.
[ o ] delete(String)
Delete a child object
[ o ] getChild(String)
Gets the child object by giving a name
[ o ] getChildren()
Gets the child(ren) object(s)
[ o ] getChildrenNameList()
Gets the name list of the children objects
[ o ] getInfo()
Gets this LEDState object's information
[ o ] getLEDStateBlinking()
Get blinking interval in seconds of a LEDState

```
[ o ] getLEDStateColor()
    Get LEDState color
[ o ] setInfo(ServerObjectShadow)
    Sets this LEDState object's attributes
[ o ] setLEDStateBlinking(int)
    Set blinking interval in seconds for a LEDState
[ o ] setLEDStateColor(Color)
    Set LEDState color

[Constructors]

[ o ] LEDStateImpl

  public LEDStateImpl(StatesImpl states,
                String name,
                Color color,
                int blinking,
                String description) throws RemoteException

    Constructor

    Parameters:
        states - States which has this State
        name - LEDState name
        color - color
        blinking - blink interval in seconds
        description - text description for state

[Methods]

[ o ] getLEDStateColor

  public Color getLEDStateColor() throws RemoteException

    Get LEDState color

    Returns:
        LEDState color
    Throws: RemoteException
        rmi exception

[ o ] setLEDStateColor

  public void setLEDStateColor(Color color) throws RemoteException
```

Set LEDState color

Parameters:
color - LEDState color
Throws: RemoteException
rmi exception

[ o ] getLEDStateBlinking public int getLEDStateBlinking() throws RemoteException Get blinking interval in seconds of a LEDState Returns:
blinking interval in seconds
Throws: RemoteException
rmi exception

[ o ] setLEDStateBlinking public void setLEDStateBlinking(int blinking) throws RemoteException Set blinking interval in seconds for a LEDState Parameters:
blinking - blinking interval in seconds
Throws: RemoteException
rmi exception

[ o ] create public ServerObject create(ServerObjectShadow shadow) throws RemoteException Create a child object with type specified in shadow.

Parameters:
shadow - information needed to create a child object
Returns:
the child object created
Overrides:
create in class ServerObjectImpl

[ o ] delete public void delete(String name) throws RemoteException

Delete a child object

Parameters:
name - the name of the child object to be deleted
Overrides:
delete in class ServerObjectImpl

[ o ] getChildren public ServerObject[] getChildren() throws RemoteException

Gets the child(ren) object(s)

Returns:
the children objects collected in Enumeration
Overrides:
getChildren in class ServerObjectImpl

[ o ] getChild public ServerObject getChild(String name) throws RemoteException

Gets the child object by giving a name

Parameters:
name - the child name
Returns:
the child object
Overrides:
getChild in class ServerObjectImpl

[ o ] getChildrenNameList public String[] getChildrenNameList() throws RemoteException Gets the name list of the children objects Returns:
the name list
Overrides:
getChildrenNameList in class ServerObjectImpl

[ o ] getInfo public synchronized ServerObjectShadow getInfo() throws RemoteException Gets this LEDState object's information Returns:
the shadow object that contains the LEDState information
Overrides:
getInfo in class ServerObjectImpl

[ o ] setInfo public synchronized void setInfo(ServerObjectShadow shadow) throws RemoteException Sets this LEDState object's attributes Parameters:
shadow - the shadow object that contains the LEDState information to set
Overrides:
setInfo in class ServerObjectImpl ---------------------------------------------------------------------------
---------------------------------------------------------------------------

Class netprism.server.LEDStateShadow

```
java.lang.Object
   |
   +----netprism.server.ServerObjectShadow
           |
           +----netprism.server.LEDStateShadow
```

--------------------------------------------------------------------------- public class LEDStateShadow
extends ServerObjectShadow

LEDStateShadow provides the information of a LEDstate configuration

---------------------------------------------------------------------------

[Variable Index]

[ o ] blinking
[ o ] color
public Color color color

[Constructor Index]

[ o ] LEDStateShadow()
Constructor

[Method Index]

[ o ] equals(Object)

[Variables]

[ o ] color public Color color public Color color color

[ o ] blinking public int blinking

[Constructors]

[ o ] LEDStateShadow public LEDStateShadow()

Constructor

[Methods]

[ o ] equals public boolean equals(Object obj)

Overrides:
equals in class ServerObjectShadow

---

Interface netprism.server.Manager public interface Manager
extends ServerObject

The manager interface This interface is a combination of the original ElementFactory and ElementGroupFactory interface. The inherited methods like create(), delete(), getChildren(), .. are all for handle the Element object, so that the ElementGroup object will be handle by a set of new methods

----------------------------------------------------------------------

[Method Index]

[ o ] find(ObjectName)
  Locate a ServerObject by specifying the ObjectName
[ o ] getAlarmFactory()
  Return a reference to the Alarm Factory
[ o ] save()
  Save ElementGroup

[Methods]

[ o ] save public abstract void save() throws RemoteException

Save ElementGroup

Parameters:
  name - ElementGroup name
Throws: RemoteException
  rmi exception

[ o ] getAlarmFactory public abstract AlarmFactory getAlarmFactory() throws RemoteException Return a reference to the Alarm Factory Returns:
  reference to the Alarm Factory
Throws: RemoteException
  rmi exception

[ o ] find public abstract ServerObject find(ObjectName objectName) throws RemoteException Locate a ServerObject by specifying the ObjectName Parameters:
objectName - the ObjectName that contains information on the object to be found
Returns:
the found ServerObject
Throws: RemoteException
rmi exception

---

---

Class netprism.server.Alarm

```
java.lang.Object
  |
  +----netprism.server.Alarm
```

--- public class Alarm
extends Object
implements Serializable, Sortable

Class provides an alarm entry information. The class implements the java.io.Serializableinterface in order to be passed as an argument or return value in RMI. It also implements Sortable interface for sorting the alarms according to its alarm id.

---

[Constructor Index]

[ o ] Alarm(ElementAlarmImpl, int, Date, String, String, String, String, String, String, String, String, String, String[])
Constructor

[Method Index]

[ o ] compareTo(Sortable, int)
Implementation for netprism.util.Sortable.
[ o ] getAlarmId()
Get alarm id
[ o ] getCauses()
Get alarm causes
[ o ] getComments()
Get alarm comments
[ o ] getComponentName()
Get component name
[ o ] getDate()
Get date for the alarm
[ o ] getDetail()
Get alarm detail information
[ o ] getHead()
Get alarm header information
[ o ] getSeverity()
Get the name of the severity
[ o ] getSolution()
Get solutions
[ o ] getSpecificCode()
Get specific code for the alarm
[ o ] getState()
Get the name of the state
[ o ] getUserName()
Get the user name for the acknowledge
[ o ] getVariableBinding()
Get variable bindings for the alarm
[ o ] setAlarmId(int)
Set alarm id
[ o ] setComments(String)
Set alarm comments
[ o ] setDetail(AlarmDetailShadow)
Set alarm detail information
[ o ] setHead(AlarmHeadShadow)
Set alarm header information
[ o ] setUserName(String)
Set the user name for the acknowledge

[Constructors]

[ o ] Alarm public Alarm(ElementAlarmImpl eleAlarm,

```
int id,
Date date,
String componentName,
String state,
String severity,
String userName,
String description,
String causes,
String solutions,
String comments,
String code,
String varBinding[])
```

Constructor

Parameters:
eleAlarm - ElementAlarm has this alarm
id - alarm id
date - alarm date
componentName - alarm component name
state - alarm state name
severity - alarm severity name
userName - userName for acknowledge
description - event description for an alarm
causes - possible causes for an alarm
solutions - possible solutions for an alarm
comments - comments for an alarm
code - specific code for an alarm
varBinding - list of variable binding for an alarm

[Methods]

[ o ] getComponentName public String getComponentName()

Get component name

Returns:
component name

[ o ] getDate public Date getDate()

Get date for the alarm

Returns:
date of alarm occurred

[ o ] getState public String getState()

Get the name of the state

Returns:
state name

[ o ] getSeverity public String getSeverity()

Get the name of the severity

Returns:
severity name

[ o ] getUserName public String getUserName()

Get the user name for the acknowledge

Returns:
user name

[ o ] setUserName public void setUserName(String user)

Set the user name for the acknowledge

Parameters:
user - user name

[ o ] getAlarmId public int getAlarmId()

Get alarm id

Returns:
the alarm id

[ o ] setAlarmId public void setAlarmId(int id)

Set alarm id

Parameters:
id - alarm id

[ o ] getCauses public String getCauses()

Get alarm causes

Returns:
the possible causes of the alarm

[ o ] getSolution public String getSolution()

Get solutions

Returns:
the possible solutions

[ o ] getComments public String getComments()

Get alarm comments

Returns:
the alarm comments

[ o ] setComments public void setComments(String comments)

Set alarm comments

Parameters:
comments - text description for the alarm comments

[ o ] getSpecificCode public String getSpecificCode()

Get specific code for the alarm

Throws: RemoteException
rmi exception

[ o ] getVariableBinding public String[] getVariableBinding()

Get variable bindings for the alarm

Returns:
the alarm variable binding

[ o ] getHead public AlarmHeadShadow getHead()

Get alarm header information

Returns:
the alarm header information

[ o ] setHead public void setHead(AlarmHeadShadow shadow)

Set alarm header information

[ o ] getDetail public AlarmDetailShadow getDetail()

Get alarm detail information

Returns:

alarm detail information

[ o ] setDetail public void setDetail(AlarmDetailShadow shadow)

Set alarm detail information

[ o ] compareTo public int compareTo(Sortable other,
int rock)

Implementation for netprism.util.Sortable. If rock is chosen neither ASCENDING nor DESCENDING, the defaul is DESCENDING

---

---

Class netprism.server.AlarmDetailShadow

```
java.lang.Object
  |
  +----netprism.server.ServerObjectShadow
         |
         +----netprism.server.AlarmDetailShadow
```

--- public class AlarmDetailShadow
extends ServerObjectShadow

AlarmDetalShadow provides the detail content of an alarm entry for the component.

---

[Variable Index]

[ o ] causes
public String causes possible causes for an alarm
[ o ] code
public String code specific code for an alarm
[ o ] comments
public String comments comments for an alarm

[ o ] solutions
public String solutions possible solutions for an alarm
[ o ] varBinding
public String[] varBinding list of variable binding for an alarm

[Constructor Index]

[ o ] AlarmDetailShadow()
Constructor

[Method Index]

[ o ] clone()
[ o ] equals(Object)

[Variables]

[ o ] causes public String causes public String causes possible causes for an alarm

[ o ] solutions public String solutions public String solutions possible solutions for an alarm

[ o ] comments public String comments public String comments comments for an alarm

[ o ] code public String code public String code specific code for an alarm

[ o ] varBinding public String varBinding[]

public String[] varBinding list of variable binding for an alarm

[Constructors]

[ o ] AlarmDetailShadow protected AlarmDetailShadow()

Constructor

[Methods]

[ o ] clone public Object clone()

Overrides:
clone in class ServerObjectShadow

[ o ] equals public boolean equals(Object obj)

Overrides:
equals in class ServerObjectShadow

------------------------------------------------------------------------
------------------------------------------------------------------------

Interface netprism.server.AlarmFactory public interface AlarmFactory
extends ServerObject AlarmFactory is a RMI interface to access the AlarmFactoryImpl class. It is to return the handle to the monitoring element, and to provide alarms with or without filtering at a group level.

------------------------------------------------------------------------

[Method Index]

[ o ] getElementAlarm(String)
get ElementAlarm object of the monitoring element
[ o ] getGroupAlarm(String[], Filter)

Get the alarms at a group level

[Methods]

[ o ] getElementAlarm

```
 public abstract ElementAlarm getElementAlarm(String elementName) throws
RemoteException, NameNotFoundException

    get ElementAlarm object of the monitoring element

    Parameters:
        elementName - name of the element
    Returns:
        ElementAlarm, reference to the alarm for each monitoring element
    Throws: RemoteException
        rmi exception
    Throws: NameNotFoundException
        name could not be found exception
```

[ o ] getGroupAlarm

```
 public abstract Hashtable getGroupAlarm(String elementName[],
                              Filter filter) throws NoAlarmException,
NameNotFoundException, RemoteException

    Get the alarms at a group level

    Parameters:
        elementName - a list of element names in a group
        filter - Filter
    Returns:
        alarm reference at a group level
    Throws: NoAlarmException
        no alarms in this group
    Throws: NameNotFoundException
        elementName is not found
    Throws: RemoteException
        rmi exception
```

---

---

Class netprism.server.AlarmFactoryImpl

```
java.lang.Object
  |
  +----java.rmi.server.RemoteObject
        |
        +----java.rmi.server.RemoteServer
              |
              +----java.rmi.server.UnicastRemoteObject
                    |
                    +----netprism.server.ServerObjectImpl
                          |
                          +----netprism.server.AlarmFactoryImpl
```

--- public class AlarmFactoryImpl
extends ServerObjectImpl
implements AlarmFactory

Class to implement RMI interface AlarmFactory. It is to return the handle to the monitoring element, and to provide alarms with or without filtering at a group level.

---

[Constructor Index]

[ o ] AlarmFactoryImpl(ManagerImpl)
   Constructor

[Method Index]

[ o ] addNewAlarm(String, String, String, String, String, String, String, String, String[])
   Add a new alarm
[ o ] create(ServerObjectShadow)
   Create a child object with type specified in shadow.
[ o ] delete(String)
   Delete a child object
[ o ] getAlarmLogFileList()
   Get the name list of alarm log files
[ o ] getChild(String)
   Gets the child object by giving a name
[ o ] getChildren()
   Gets the child(ren) object(s)
[ o ] getChildrenNameList()

Gets the name list of the children objects
[ o ] getDescription()
Gets the object description
[ o ] getElementAlarm(String)
Get a reference to the ElementAlarm
[ o ] getGroupAlarm(String[], Filter)
Get a reference to the alarms at a group level
[ o ] getInfo()
Gets this object's information
[ o ] getName()
Gets the object name
[ o ] getNameTree()
Gets the children, grandchildren names in a hierarchical order
[ o ] loadAlarmLog(String, String)
Load the alarm log file of the monitoring element.
[ o ] setDescription(String)
Sets the object description
[ o ] setInfo(ServerObjectShadow)
Sets this object's attributes
[ o ] setName(String)
Sets the object name

[Constructors]

[ o ] AlarmFactoryImpl public AlarmFactoryImpl(ManagerImpl manager) throws RemoteException Constructor Parameters:
manager - ManagerImpl which has this AlarmFactoryImpl

[Methods]

[ o ] getAlarmLogFileList public String[] getAlarmLogFileList() throws RemoteException Get the name list of alarm log files Returns:
name list of alarm log files
Throws: RemoteException
rmi exception

```
[ o ] loadAlarmLog

 public ElementAlarm loadAlarmLog(String tempName,
                           String ip) throws RemoteException,
ClassNotFoundException, IOException

  Load the alarm log file of the monitoring element.

  Parameters:
      tempName - name of element template name
      ip - ip address of the device
  Returns:
      ElementAlarm reference
  Throws: RemoteException
      rmi exception
  Throws: NameNotFoundException
      name could not be found exception

[ o ] addNewAlarm

 public void addNewAlarm(String elementName,
                    String state,
                    String componentName,
                    String severity,
                    String description,
                    String causes,
                    String solutions,
                    String code,
                    String varBinding[]) throws RemoteException,
ClassNotFoundException, IOException

  Add a new alarm

  Parameters:
      componentName - alarm component name
      state - alarm state name
      severity - alarm severity name
      userName - userName for acknowledge
      description - event description for an alarm
      causes - possible causes for an alarm
      solutions - possible solutions for an alarm
      code - specific code for an alarm
      varBinding - list of variable binding for an alarm
  Throws: RemoteException
```

rmi exception

[ o ] getElementAlarm public ElementAlarm getElementAlarm(String elementName) throws RemoteException Get a reference to the ElementAlarm Parameters:
elementName - name of the device
Returns:
reference to the ElementAlarm
Throws: RemoteException
rmi exception

[ o ] getGroupAlarm public Hashtable getGroupAlarm(String elementName[], Filter filter) throws NoAlarmException, NameNotFoundException, RemoteException Get a reference to the alarms at a group level Parameters:
elementName - a list of element names in a group
filter - Filter
Returns:
reference to the alarms
Throws: NoAlarmException
no alarms in this group
Throws: NameNotFoundException
elementName is not found
Throws: RemoteException
rmi exception

[ o ] create public ServerObject create(ServerObjectShadow shadow) throws RemoteException Create a child object with type specified in shadow.

Parameters:
shadow - information needed to create a child object

Returns:
the child object created
Overrides:
create in class ServerObjectImpl

[ o ] delete public void delete(String name) throws RemoteException

Delete a child object

Parameters:
name - the name of the child object to be deleted
Overrides:
delete in class ServerObjectImpl

[ o ] getChildren public ServerObject[] getChildren() throws RemoteException

Gets the child(ren) object(s)

Returns:
the children objects collected in Enumeration
Overrides:
getChildren in class ServerObjectImpl

[ o ] getChildrenNameList public String[] getChildrenNameList() throws RemoteException Gets the name list of the children objects Returns:
the name list
Overrides:
getChildrenNameList in class ServerObjectImpl

[ o ] getChild public ServerObject getChild(String name) throws RemoteException

Gets the child object by giving a name

Parameters:

name - the child name

Returns:

the child object

Overrides:

getChild in class ServerObjectImpl

[ o ] getInfo public synchronized ServerObjectShadow getInfo() throws RemoteException Gets this object's information Returns:

the shadow object that contains the information

Overrides:

getInfo in class ServerObjectImpl

[ o ] setInfo public synchronized void setInfo(ServerObjectShadow shadow) throws RemoteException Sets this object's attributes Parameters:

shadow - the shadow object that contains the information to set

Overrides:

setInfo in class ServerObjectImpl

[ o ] getNameTree public NameTree getNameTree() throws RemoteException

Gets the children, grandchildren names in a hierarchical order

Returns:

the output stream that contains the serialized name tree

Overrides:

getNameTree in class ServerObjectImpl

[ o ] getName public String getName() throws RemoteException

Gets the object name

Returns:
the object name
Overrides:
getName in class ServerObjectImpl

[ o ] setName public void setName(String name) throws RemoteException

Sets the object name

Overrides:
setName in class ServerObjectImpl

[ o ] getDescription public String getDescription() throws RemoteException

Gets the object description

Returns:
the description
Overrides:
getDescription in class ServerObjectImpl

[ o ] setDescription public void setDescription(String description) throws RemoteException Sets the object description Parameters:
the - description to be set
Overrides:
setDescription in class ServerObjectImpl ----------------------------------------------------------------------
----------------------------------------------------------------------

Class netprism.server.AlarmHeadShadow

```
java.lang.Object
  |
  +----netprism.server.ServerObjectShadow
```

```
    |
    +----netprism.server.AlarmHeadShadow
```

------------------------------------------------------------------------- public class AlarmHeadShadow
extends ServerObjectShadow

AlarmHeadShadow provides the header version of an alarm entry for the component.

-------------------------------------------------------------------------

[Variable Index]

[ o ] componentName
    public String componentName alarm component name
[ o ] date
    public Date date alarm date
[ o ] id
    public int id alarm id
[ o ] severity
    public String severity alarm severity name
[ o ] state
    public String state alarm state name
[ o ] userName

[Constructor Index]

[ o ] AlarmHeadShadow()
    Constructor

[Method Index]

[ o ] equals(Object)

[Variables]

[ o ] id public int id public int id alarm id

[ o ] date public Date date public Date date alarm date

[ o ] componentName public String componentName public String componentName alarm component name

[ o ] state public String state public String state alarm state name

[ o ] severity public String severity public String severity alarm severity name

[ o ] userName public String userName

[Constructors]

[ o ] AlarmHeadShadow protected AlarmHeadShadow()

Constructor

[Methods]

[ o ] equals public boolean equals(Object obj)

Overrides:
equals in class ServerObjectShadow

---

---

Class netprism.server.AllElementsImpl

```
java.lang.Object
  |
  +----java.rmi.server.RemoteObject
        |
        +----java.rmi.server.RemoteServer
              |
              +----java.rmi.server.UnicastRemoteObject
                    |
                    +----netprism.server.ServerObjectImpl
                          |
                          +----netprism.server.ElementGroupImpl
                                |
                                +----netprism.server.AllElementsImpl
```

--- public class AllElementsImpl
extends ElementGroupImpl
implements ElementGroup

Class to implement the ElementGroup interface

---

[Variable Index]

[ o ] allElements

[Constructor Index]

[ o ] AllElementsImpl(ManagerImpl)
Constructor
[ o ] AllElementsImpl(ManagerImpl, String, String, String)
Constructor

[Method Index]

[ o ] delete(String)
delete an Element object, all references from groups to this element, and the file of this element.
[ o ] getInfo()

[ o ] getName()
[ o ] load(String)
Loads a element template file
[ o ] setInfo(ServerObjectShadow)
[ o ] setName(String)

[Variables]

[ o ] allElements public final static String allElements

[Constructors]

[ o ] AllElementsImpl public AllElementsImpl(ManagerImpl manager) throws RemoteException Constructor Parameters:
ManagerImpl - ManagerImpl object which has this ElementGroup

[ o ] AllElementsImpl

```
public AllElementsImpl(ManagerImpl manager,
              String description,
              String contactName,
              String phone) throws RemoteException
```

Constructor

Parameters:
ManagerImpl - ManagerImpl object which has this ElementGroup
description - description of this ElementGroup
contactName - name of contact person for this ElementGroup
phone - phone number of contact person for this ElementGroup

[Methods]

[ o ] setName public void setName(String name) throws RemoteException

Overrides:

setName in class ElementGroupImpl

[ o ] getName public String getName() throws RemoteException

Overrides:
getName in class ServerObjectImpl

[ o ] setInfo public synchronized void setInfo(ServerObjectShadow shadow) throws RemoteException Overrides:
setInfo in class ElementGroupImpl

[ o ] getInfo public synchronized ServerObjectShadow getInfo() throws RemoteException Overrides:
getInfo in class ElementGroupImpl

[ o ] delete public void delete(String name) throws RemoteException delete an Element object, all references from groups to this element, and the file of this element.

Parameters:
name - the name of the element object Exception RemoteException
Overrides:
delete in class ElementGroupImpl

[ o ] load public ServerObject load(String name)

Loads a element template file

Parameters:
name - the element template file name
Throws: RemoteException rmi exception

---

---

Interface netprism.server.Attribute public interface Attribute
extends MibObject Attribute is an interface describing the attributes of a MIB variable

---

[Method Index]

[ o ] getRowIndex()
Gets the row index if it is a table
[ o ] getValue()
Gets the value of a MIB variable that is a leaf in the tree
[ o ] getValue(String, String)
Gets the value of a MIB variable within a table
[ o ] getValues()
Gets the values of all the MIB variables in a Table; the two-dimemsion values are stored in a horizontal sequence - (1,1) (1,2) ...
[ o ] getValues(String)
Gets the values of a table entry (a row) within a MIB table
[ o ] setValue(String)
Sets the value of a MIB variable if it is a leaf
[ o ] setValue(String, String, String)
Sets the value of a MIB variable within a table

[Methods]

[ o ] getRowIndex public abstract String[] getRowIndex() throws RemoteException

Gets the row index if it is a table

Returns:
list of the row index

[ o ] getValue public abstract String getValue() throws RemoteException

Gets the value of a MIB variable that is a leaf in the tree

Returns:
the polled value

[ o ] getValue public abstract String getValue(String tableItem,
String rowIndex) throws RemoteException Gets the value of a MIB variable within a table Parameters:
tableItem - table item name
rowIndex - the row index
Returns:
the polled value

[ o ] getValues public abstract String[] getValues(String rowIndex) throws RemoteException Gets the values of a table entry (a row) within a MIB table Parameters:
rowIndex - the row index
Returns:
polled values of a table entry

[ o ] getValues public abstract String[] getValues() throws RemoteException

Gets the values of all the MIB variables in a Table; the two-dimemsion values are stored in a horizontal sequence - (1,1) (1,2) ... (1,n) (2,1) ...

Returns:
polled values of the whole table

[ o ] setValue public abstract void setValue(String value) throws RemoteException Sets the value of a MIB variable if it is a leaf Parameters:
value - the value to set

[ o ] setValue

```
public abstract void setValue(String tableItem,
                    String rowIndex,
                    String value) throws RemoteException
```

Sets the value of a MIB variable within a table

Parameters:
tableItem - specifies the table item name
rowIndex - specifies the row index
value - the value to set

---

---

Class netprism.server.AttributeImpl

```
java.lang.Object
   |
   +----java.rmi.server.RemoteObject
           |
           +----java.rmi.server.RemoteServer
                   |
                   +----java.rmi.server.UnicastRemoteObject
                           |
                           +----netprism.server.ServerObjectImpl
                                   |
                                   +----netprism.server.MibObjectImpl
                                           |
                                           +----netprism.server.AttributeImpl
```

--- public class AttributeImpl
extends MibObjectImpl
implements Attribute, AttrValue An implementation of Attribute to provide a wrapper for a SNMP MIB variable.

---

[Constructor Index]

[ o ] AttributeImpl(String, String, String, String, String, byte, String, boolean, boolean, boolean, String[], String[], String[])

[Method Index]

[ o ] delete(String)
[ o ] getChild(String)
[ o ] getChildrenNameList()
[ o ] getCurrentValue()
[ o ] getHierarchicalNames()
[ o ] getInfo()
[ o ] getParent()
[ o ] getPreviousValue()
[ o ] getRowIndex()
[ o ] getValue()
[ o ] getValue(String, String)
[ o ] getValues()
[ o ] getValues(String)
[ o ] setValue(String)
[ o ] setValue(String, String, String)
[ o ] setValue2(String, String, String, byte)
[ o ] setValues(Hashtable)

[Constructors]

[ o ] AttributeImpl

```
public AttributeImpl(String name,
                String mibName,
                String mibNumberedName,
                String description,
                String accessMode,
                byte type,
                String instance,
                boolean leaf,
                boolean enum,
                boolean table,
                String enumList[],
                String tableItems[],
```

```
String numberedItems[]) throws RemoteException

[Methods]

[ o ] getRowIndex

 public String[] getRowIndex() throws RemoteException

[ o ] getValue

 public String getValue() throws RemoteException

[ o ] getCurrentValue

 public String getCurrentValue()

[ o ] getPreviousValue

 public String getPreviousValue()

[ o ] getValue

 public String getValue(String tableItem,
              String rowIndex) throws RemoteException

[ o ] getValues

 public String[] getValues(String rowIndex) throws RemoteException

[ o ] getValues

 public String[] getValues() throws RemoteException

[ o ] setValue

 public void setValue(String arg) throws RemoteException

[ o ] setValues

 public void setValues(Hashtable values)

[ o ] setValue

 public void setValue(String tableItem,
              String rowIndex,
```

```
                String value) throws RemoteException

[ o ] setValue2

 public void setValue2(String numberedItem,
                String rowIndex,
                String value,
                byte type)

[ o ] getParent

 public ServerObject getParent() throws RemoteException

   Overrides:
       getParent in class MibObjectImpl

[ o ] getChildrenNameList

 public String[] getChildrenNameList() throws RemoteException

   Overrides:
       getChildrenNameList in class MibObjectImpl

[ o ] getChild

 public ServerObject getChild(String name) throws RemoteException

   Overrides:
       getChild in class MibObjectImpl

[ o ] getHierarchicalNames

 protected NameTree getHierarchicalNames()

   Overrides:
       getHierarchicalNames in class MibObjectImpl

[ o ] delete

 public void delete(String name) throws RemoteException

   Overrides:
       delete in class MibObjectImpl

[ o ] getInfo
```

public ServerObjectShadow getInfo() throws RemoteException

Overrides:
getInfo in class MibObjectImpl

---

---

Interface netprism.server.Attributes public interface Attributes
extends ServerObject Attributes defines the interface for the remote AttributesImpl class. It is the factory class that maintains the list of Attribute.

---

[Method Index]

[ o ] addAttribute(ServerObject)
Add an Attribute

[Methods]

[ o ] addAttribute public abstract ServerObject addAttribute(ServerObject mibObj) throws RemoteException, NameUsedException Add an Attribute Parameters:
ServerObject - MibObject
Throws: RemoteException
rmi exception

---

---

Class netprism.server.AttributeShadow java.lang.Object
|

```
+----netprism.server.ServerObjectShadow
     |
     +----netprism.server.AttributeShadow
```

--- public class AttributeShadow
extends ServerObjectShadow

---

[Variable Index]

[ o ] accessMode
[ o ] instance
[ o ] isTable
[ o ] mibName
[ o ] mibNumberedName
[ o ] type
[ o ] values

[Constructor Index]

[ o ] AttributeShadow()

[Method Index]

[ o ] equals(Object)

[Variables]

[ o ] mibName public String mibName

[ o ] mibNumberedName public String mibNumberedName

[ o ] accessMode public String accessMode

[ o ] type public byte type

[ o ] instance public String instance

[ o ] isTable public boolean isTable

[ o ] values public String values[]

[Constructors]

[ o ] AttributeShadow public AttributeShadow()

[Methods]

[ o ] equals public boolean equals(Object obj)

Overrides:
equals in class ServerObjectShadow

---

---

Class netprism.server.ManagerImpl

```
java.lang.Object
  |
  +----java.rmi.server.RemoteObject
        |
        +----java.rmi.server.RemoteServer
              |
              +----java.rmi.server.UnicastRemoteObject
                    |
                    +----netprism.server.ServerObjectImpl
                          |
                          +----netprism.server.ManagerImpl
```

--- public class ManagerImpl
extends ServerObjectImpl
implements Manager

---

[Constructor Index]

[ o ] ManagerImpl(ServerImpl)
Constructor

[Method Index]

[ o ] create(ServerObjectShadow)
Create a new ElementGroup
[ o ] createElementGroup(String, String)
Create a new ElementGroup
[ o ] createElementGroup(String, String, String, String)
Create a new ElementGroup
[ o ] delete(String)
Delete an ElementGroup
[ o ] find(ObjectName)
Locate a ServerObject by specifying the ObjectName
[ o ] getAlarmFactory()
Return a reference to the Alarm Factory
[ o ] getInfo()
[ o ] save()
Save ElementGroup
[ o ] setInfo(ServerObjectShadow)
[ o ] setName(String)

[Constructors]

[ o ] ManagerImpl public ManagerImpl(ServerImpl server) throws RemoteException

Constructor

Parameters:
server - ServerImpl object which has this ManagerImpl

[Methods]

[ o ] getAlarmFactory public AlarmFactory getAlarmFactory() throws RemoteException Return a reference to the Alarm Factory Returns:
reference to the Alarm Factory
Throws: RemoteException
rmi exception

[ o ] create public ServerObject create(ServerObjectShadow shadow) throws RemoteException Create a new ElementGroup Parameters:
shadow - shadow class of ElementGroup object
Returns:
reference to the new ElementGroup
Throws: RemoteException,
NameUsedException
Overrides:
create in class ServerObjectImpl

[ o ] createElementGroup public ElementGroup createElementGroup(String name,
String description) throws RemoteException Create a new ElementGroup Parameters:
name - ElementGroup name
description - text description for the ElementGroup
Returns:
reference to the new ElementGroup
Throws: RemoteException,
NameUsedException

[ o ] createElementGroup

```
public ElementGroup createElementGroup(String name,
                       String description,
                       String contact,
                       String phone) throws RemoteException

  Create a new ElementGroup

  Parameters:
     name - ElementGroup name
     description - text description for the ElementGroup
     contact - the name of the contact person for this group
     phone - the phone number of the contact person
  Returns:
     reference to the new ElementGroup
  Throws: RemoteException,
     NameUsedException

[ o ] delete

public void delete(String name) throws RemoteException

  Delete an ElementGroup

  Parameters:
     name - ElementGroup name
  Throws: RemoteException
     rmi exception
  Overrides:
     delete in class ServerObjectImpl

[ o ] save

public void save() throws RemoteException

  Save ElementGroup

  Parameters:
     name - ElementGroup name
  Throws: RemoteException
     rmi exception

[ o ] find

public ServerObject find(ObjectName objectName) throws RemoteException
```

Locate a ServerObject by specifying the ObjectName

Parameters:
objectName - the ObjectName that contains information on the object to be found
Returns:
the found ServerObject

[ o ] getInfo public ServerObjectShadow getInfo() throws RemoteException

Overrides:
getInfo in class ServerObjectImpl

[ o ] setInfo public void setInfo(ServerObjectShadow shadow) throws RemoteException Overrides:
setInfo in class ServerObjectImpl

[ o ] setName public void setName(String name) throws RemoteException

Overrides:
setName in class ServerObjectImpl

---------------------------------------------------------------------------
---------------------------------------------------------------------------

Interface netprism.server.MibFactory public interface MibFactory
extends Remote

---------------------------------------------------------------------------

[Method Index]

[ o ] getMibList()
Gets a list of MIB files accessible by the server
[ o ] load(String)

Returns the corresponding MibTree object for the selected file

[Methods]

[ o ] getMibList public abstract String[] getMibList() throws RemoteException

Gets a list of MIB files accessible by the server

Returns:
the list of MIB files resided on the server
Throws: RemoteException
exception for rmi

[ o ] load public abstract MibTree load(String mibFileName) throws MibFileLoadFailException, RemoteException Returns the corresponding MibTree object for the selected file Parameters:
MIB - file name
Returns:
corresponding MibTree object
Throws: MibFileLoadFailException
exception for MIB files load fail
Throws: RemoteException
exception for rmi
See Also:
MibTree, MibFileLoadFailException

---

---

Class netprism.server.MibFactoryImpl

```
java.lang.Object
   |
   +----java.rmi.server.RemoteObject
           |
           +----java.rmi.server.RemoteServer
                   |
                   +----java.rmi.server.UnicastRemoteObject
```

```
                |
                +----netprism.server.MibFactoryImpl
```

--- public class MibFactoryImpl
extends UnicastRemoteObject
implements MibFactory

RMI interface MibFactory is implemented to provides the information of MIB files reside at server site, and also instanitiates MibTree objects on the management server and returns handles to the clients.

See Also:
MibFactory, MibTree

---

[Constructor Index]

[ o ] MibFactoryImpl(BuilderImpl)
Constructor

[Method Index]

[ o ] getMibList()
Returns the list of MIB files accessible by the server.
[ o ] load(String)
Returns the corresponding MibTree object for the MIB file that is sepecified.

[Constructors]

[ o ] MibFactoryImpl public MibFactoryImpl(BuilderImpl builder) throws RemoteException Constructor Throws: RemoteException
exception for rmi

[Methods]

[ o ] getMibList public String[] getMibList() throws RemoteException

Returns the list of MIB files accessible by the server.

Returns:
the list of MIB files resided on the server
Throws: RemoteException
exception for rmi

[ o ] load public MibTree load(String mibFileName) throws MibFileLoadFailException, RemoteException Returns the corresponding MibTree object for the MIB file that is sepecified. It will first check if the selected MIB file has already loaded. If it is just return the previous reference of MibTree. MibTreeException will be caught and a new exception MibFileLoadFailException will be thrown out if the MIB file load fails.

Parameters:
specified - MIB file name
Returns:
corresponding MibTree object
Throws: MibFileLoadFailException
exception for MIB files load failure
Throws: RemoteException
exception for rmi
See Also:
MibTree, MibFileLoadFailException

---

---

Class netprism.server.MibFileLoadFailException

```
java.lang.Object
   |
   +----java.lang.Throwable
           |
           +----java.lang.Exception
                   |
                   +----netprism.server.MibFileLoadFailException
```

--- public class MibFileLoadFailException
extends Exception

Exception is thrown when loading Mib Files fails

---

[Constructor Index]

[ o ] MibFileLoadFailException()
[ o ] MibFileLoadFailException(String)

[Constructors]

[ o ] MibFileLoadFailException public MibFileLoadFailException()

[ o ] MibFileLoadFailException public MibFileLoadFailException(String msg)

---

---

Interface netprism.server.MibObject public interface MibObject
extends ServerObject MibObject is an interface describing a MIB variable

---

[Variable Index]

[ o ] COUNTER
[ o ] GAUGE
[ o ] INTEGER
[ o ] IP_ADDRESS
[ o ] NA
[ o ] NULL_OBJ

[ o ] OBJ_ID
[ o ] STRING
[ o ] TIMETICKS

[Method Index]

[ o ] enumIntToLabel(int)
Translates the integer to enumerated label
[ o ] enumLabelToInt(String)
Translates the enumerated label to integer
[ o ] getAccessMode()
Gets the MIB variable's access mode
[ o ] getEnumLabels()
Gets the list of the enumerated labels if it has enumerated value
[ o ] getInstance()
Gets the instance for the MIB variable
[ o ] getMibName()
Gets the Attribute's MIB name
[ o ] getNumberedItems()
[ o ] getNumberedName()
Gets the MIB variable's numerical name in dot format
[ o ] getTableItems()
Gets the tabel items if it is a table
[ o ] getType()
Get the MIB variable's defined type
[ o ] isEnum()
Check if it has enumerated value
[ o ] isLeaf()
Check to see if it is a leaf in the MIB tree; a leaf node is a node with no sub-nodes.
[ o ] isTable()
Check to see if it is a table
[ o ] setInstance(String)
Sets the instance for the MIB variable

[Variables]

[ o ] NA public final static byte NA

[ o ] INTEGER public final static byte INTEGER

[ o ] STRING public final static byte STRING

[ o ] OBJ_ID public final static byte OBJ_ID

[ o ] NULL_OBJ public final static byte NULL_OBJ

[ o ] IP_ADDRESS public final static byte IP_ADDRESS

[ o ] COUNTER public final static byte COUNTER

[ o ] GAUGE public final static byte GAUGE

[ o ] TIMETICKS public final static byte TIMETICKS

[Methods]

[ o ] getNumberedName public abstract String getNumberedName() throws RemoteException Gets the MIB variable's numerical name in dot format Returns:
MIB variable's numerical name in dot format

[ o ] getAccessMode public abstract String getAccessMode() throws RemoteException Gets the MIB variable's access mode Returns:
MIB variable's access mode

[ o ] getType public abstract byte getType() throws RemoteException

Get the MIB variable's defined type

Returns:
MIB variable's defined type

[ o ] getMibName public abstract String getMibName() throws RemoteException

Gets the Attribute's MIB name

Returns:
Attribute's MIB name

[ o ] setInstance public abstract void setInstance(String instance) throws RemoteException Sets the instance for the MIB variable Parameters:
instance - instance for the MIB variable

[ o ] getInstance public abstract String getInstance() throws RemoteException

Gets the instance for the MIB variable

Returns:
instance for the MIB variable

[ o ] isEnum public abstract boolean isEnum() throws RemoteException

Check if it has enumerated value

Returns:
true if it has enumerated value; false otherwise

[ o ] getEnumLabels public abstract String[] getEnumLabels() throws RemoteException Gets the list of the enumerated labels if it has enumerated value Returns:
list of the enumerated labels

[ o ] enumIntToLabel public abstract String enumIntToLabel(int enumInteger) throws RemoteException Translates the integer to enumerated label Parameters:
enumInteger - the integer to be translated
Returns:
the enumerated label for the corresponding integer exception RemoteException

[ o ] enumLabelToInt public abstract int enumLabelToInt(String enumLabel) throws RemoteException Translates the enumerated label to integer Parameters:
enumLabel - the enumerated label to be translated
Returns:
the integer value for the corresponding enumerated label

[ o ] isLeaf public abstract boolean isLeaf() throws RemoteException

Check to see if it is a leaf in the MIB tree; a leaf node is a node with no sub-nodes.

Returns:
True if it is a leaf node; false otherwise

[ o ] isTable public abstract boolean isTable() throws RemoteException

Check to see if it is a table

Returns:
True if it is a table; false otherwise

[ o ] getTableItems public abstract String[] getTableItems() throws RemoteException Gets the tabel items if it is a table Returns:
list of the table items

[ o ] getNumberedItems public abstract String[] getNumberedItems() throws RemoteException ------------------------------------------------------------------------
------------------------------------------------------------------------

Class netprism.server.MibObjectImpl

```
java.lang.Object
   |
   +----java.rmi.server.RemoteObject
          |
          +----java.rmi.server.RemoteServer
                 |
                 +----java.rmi.server.UnicastRemoteObject
                        |
                        +----netprism.server.ServerObjectImpl
                               |
                               +----netprism.server.MibObjectImpl
```

------------------------------------------------------------------------ public class MibObjectImpl
extends ServerObjectImpl
implements MibObject

An implementation of MibObject to provide a wrapper for a SNMP MIB variable.

---

[Constructor Index]

[ o ] MibObjectImpl(MibNode, MibModule)
[ o ] MibObjectImpl(MibObjectImpl)
[ o ] MibObjectImpl(String, int)

[Method Index]

[ o ] create(ServerObjectShadow)
[ o ] delete(String)
[ o ] enumIntToLabel(int)
[ o ] enumLabelToInt(String)
[ o ] getAccessMode()
[ o ] getChild(String)
[ o ] getChildrenNameList()
[ o ] getEnumLabels()
[ o ] getHierarchicalNames()
[ o ] getInfo()
[ o ] getInstance()
[ o ] getMibName()
[ o ] getNumberedItems()
[ o ] getNumberedName()
[ o ] getParent()
[ o ] getTableItems()
[ o ] getType()
[ o ] isEnum()
[ o ] isLeaf()
[ o ] isTable()
[ o ] setInfo(ServerObjectShadow)
[ o ] setInstance(String)

[Constructors]

[ o ] MibObjectImpl

```
public MibObjectImpl(MibNode node,
              MibModule module) throws RemoteException
```

[ o ] MibObjectImpl public MibObjectImpl(MibObjectImpl old) throws RemoteException

[ o ] MibObjectImpl public MibObjectImpl(String name,
int type) throws RemoteException

[Methods]

[ o ] getNumberedName public String getNumberedName() throws RemoteException

[ o ] getChildrenNameList public String[] getChildrenNameList() throws RemoteException Overrides:
getChildrenNameList in class ServerObjectImpl

[ o ] getChild public ServerObject getChild(String name) throws RemoteException

Overrides:
getChild in class ServerObjectImpl

[ o ] getParent public ServerObject getParent() throws RemoteException

Overrides:
getParent in class ServerObjectImpl

[ o ] getAccessMode public String getAccessMode() throws RemoteException

[ o ] getType public byte getType() throws RemoteException

[ o ] getMibName public String getMibName() throws RemoteException

[ o ] setInstance public void setInstance(String inst) throws RemoteException

[ o ] getInstance public String getInstance() throws RemoteException

[ o ] isEnum public boolean isEnum() throws RemoteException

[ o ] getEnumLabels public String[] getEnumLabels() throws RemoteException

[ o ] enumIntToLabel public String enumIntToLabel(int enumInteger) throws RemoteException

[ o ] enumLabelToInt public int enumLabelToInt(String enumLabel) throws RemoteException

[ o ] isLeaf public boolean isLeaf() throws RemoteException

[ o ] isTable public boolean isTable() throws RemoteException

[ o ] getTableItems public String[] getTableItems() throws RemoteException

[ o ] getNumberedItems public String[] getNumberedItems() throws RemoteException

[ o ] getInfo public ServerObjectShadow getInfo() throws RemoteException

Overrides:
getInfo in class ServerObjectImpl

[ o ] setInfo public void setInfo(ServerObjectShadow shadow) throws RemoteException Overrides:
setInfo in class ServerObjectImpl

[ o ] create public ServerObject create(ServerObjectShadow shadow) throws RemoteException Overrides:
create in class ServerObjectImpl

[ o ] delete public void delete(String name) throws RemoteException

Overrides:
delete in class ServerObjectImpl

[ o ] getHierarchicalNames protected NameTree getHierarchicalNames()

Overrides:
getHierarchicalNames in class ServerObjectImpl

---

---

Class netprism.server.MibTableIndex

```
java.lang.Object
  |
  +----netprism.server.MibTableIndex
```

--- class MibTableIndex
extends Object

This class is not public and can therefore cannot be used outside this package.

---

---

Interface netprism.server.MibTree public interface MibTree
extends Remote

MibTree is a RMI interface that provides information about a MIB file.

See Also:
Attribute

---

[Method Index]

[ o ] find(String)
Return the Attribute corresponding to the String OID argument
[ o ] name()
Return the MIB tree name
[ o ] root()
Return the root node of the MIB tree

[Methods]

[ o ] name public abstract String name() throws RemoteException

Return the MIB tree name

[ o ] root public abstract String root() throws RemoteException

Return the root node of the MIB tree

[ o ] find public abstract ServerObject find(String oid) throws RemoteException

Return the Attribute corresponding to the String OID argument

---

---

Class netprism.server.MibTreeException

```
java.lang.Object
  |
  +----java.lang.Throwable
        |
        +----java.lang.Exception
              |
              +----netprism.server.MibTreeException
```

--- public class MibTreeException
extends Exception

MibTreeException is thrown when the MIB file can't be loaded

---

[Constructor Index]

[ o ] MibTreeException(String)

[Constructors]

[ o ] MibTreeException public MibTreeException(String s)

---

---

Class netprism.server.MibTreeImpl

```
java.lang.Object
  |
  +----java.rmi.server.RemoteObject
        |
        +----java.rmi.server.RemoteServer
              |
```

```
+----java.rmi.server.UnicastRemoteObject
     |
     +----netprism.server.MibTreeImpl
```

--- public class MibTreeImpl
extends UnicastRemoteObject
implements MibTree

---

[Constructor Index]

[ o ] MibTreeImpl(SnmpAPI, String)

[Method Index]

[ o ] find(String)
[ o ] name()
[ o ] root()

[Constructors]

[ o ] MibTreeImpl

```
public MibTreeImpl(SnmpAPI api,
          String fName) throws MibTreeException, RemoteException
```

[Methods]

[ o ] name

```
public String name() throws RemoteException
```

[ o ] root

```
public String root() throws RemoteException
```

[ o ] find

```
public ServerObject find(String name) throws RemoteException
```

---

---

```
Class netprism.server.NameNotFoundException

java.lang.Object
  |
  +----java.lang.Throwable
        |
        +----java.lang.Exception
              |
              +----netprism.server.NameNotFoundException

----------------------------------------------------------------------

public class NameNotFoundException
extends Exception

----------------------------------------------------------------------

[Constructor Index]

[ o ] NameNotFoundException()
[ o ] NameNotFoundException(String)

[Constructors]

[ o ] NameNotFoundException

  public NameNotFoundException()

[ o ] NameNotFoundException

  public NameNotFoundException(String msg)

----------------------------------------------------------------------
----------------------------------------------------------------------

Class netprism.server.NameTree

java.lang.Object
  |
  +----netprism.server.NameTree

----------------------------------------------------------------------

public class NameTree
```

extends Object
implements Serializable, ObjectType

---

[Variable Index]

[ o ] subTree

[Constructor Index]

[ o ] NameTree(String, int)

[Method Index]

[ o ] aLeaf()
[ o ] getName()
[ o ] getSubTree()
[ o ] getType()
[ o ] print()

[Variables]

[ o ] subTree public Vector subTree

[Constructors]

[ o ] NameTree public NameTree(String name,
int type)

[Methods]

[ o ] getName public String getName()

[ o ] getType public int getType()

[ o ] aLeaf

```
public boolean aLeaf()

[ o ] getSubTree

 public Enumeration getSubTree()

[ o ] print

 public void print()

-----------------------------------------------------------------------
-----------------------------------------------------------------------

Class netprism.server.NameUsedException

java.lang.Object
   |
   +----java.lang.Throwable
           |
           +----java.lang.Exception
                   |
                   +----netprism.server.NameUsedException

-----------------------------------------------------------------------

public class NameUsedException
extends Exception

-----------------------------------------------------------------------

[Constructor Index]

[ o ] NameUsedException()
[ o ] NameUsedException(String)

[Constructors]

[ o ] NameUsedException

 public NameUsedException()

[ o ] NameUsedException

 public NameUsedException(String msg)
```

```
-----------------------------------------------------------------------
-----------------------------------------------------------------------

Class netprism.server.NoAlarmException

java.lang.Object
  |
  +----java.lang.Throwable
        |
        +----java.lang.Exception
              |
              +----netprism.server.NoAlarmException

-----------------------------------------------------------------------

public class NoAlarmException
extends Exception

-----------------------------------------------------------------------

[Constructor Index]

[ o ] NoAlarmException()
[ o ] NoAlarmException(String)

[Constructors]

[ o ] NoAlarmException

 public NoAlarmException()

[ o ] NoAlarmException

 public NoAlarmException(String msg)

-----------------------------------------------------------------------
-----------------------------------------------------------------------

Class netprism.server.NoHomeDirException

java.lang.Object
  |
  +----java.lang.Throwable
        |
```

```
+----java.lang.Exception
      |
      +----netprism.server.NoHomeDirException
```

--- public class NoHomeDirException
extends Exception

---

[Constructor Index]

[ o ] NoHomeDirException()
[ o ] NoHomeDirException(String)

[Constructors]

[ o ] NoHomeDirException public NoHomeDirException()

[ o ] NoHomeDirException public NoHomeDirException(String msg)

---

---

Class netprism.server.Notification

```
java.lang.Object
  |
  +----netprism.server.Notification
```

--- public class Notification
extends Object
implements Serializable

Notification is a base class for notification objects passed from ServerObject to Observers of ServerObject. The notification objects are passed when an event occurs in the object.

------------------------------------------------------------------------

[Variable Index]

[ o ] ADD
[ o ] DELETE
[ o ] MODIFY

[Constructor Index]

[ o ] Notification(byte, ServerObjectShadow)
[ o ] Notification(byte, String, ServerObjectShadow)

[Method Index]

[ o ] getMessage()
  Return a message associated with a Notification
[ o ] getShadow()
  Return a ServerObjectShadow which contains information about addition/modification/deletion
[ o ] getType()
  Gets the type of the notification
[ o ] setMessage(String)
  Sets a message associated with a Notification
[ o ] setShadow(ServerObjectShadow)
  Sets the ServerObjectShadow
[ o ] setType(byte)
  Sets the type of the notification

[Variables]

[ o ] ADD public final static byte ADD

[ o ] MODIFY public final static byte MODIFY

[ o ] DELETE public final static byte DELETE

[Constructors]

[ o ] Notification

```
protected Notification(byte notificationType,
                       ServerObjectShadow shadow)
```

[ o ] Notification

```
protected Notification(byte notificationType,
                       String msg,
                       ServerObjectShadow shadow)
```

[Methods]

[ o ] getType

```
public byte getType()
```

Gets the type of the notification

Returns:
  the type

[ o ] setType

```
protected void setType(byte notificationType)
```

Sets the type of the notification

Parameters:
  the - type

[ o ] getMessage

```
public String getMessage()
```

Return a message associated with a Notification

Returns:
  the message

[ o ] setMessage

```
protected void setMessage(String msg)
```

Sets a message associated with a Notification

Parameters:
msg - the message

[ o ] getShadow public ServerObjectShadow getShadow()

Return a ServerObjectShadow which contains information about addition/modification/deletion Returns:
the ServerObjectShadow

[ o ] setShadow protected void setShadow(ServerObjectShadow shadow)

Sets the ServerObjectShadow

Parameters:
shadow - the ServerObjectShadow

---

---

Class netprism.server.ObjectName

```
java.lang.Object
   |
   +----netprism.server.ObjectName
```

--- public class ObjectName
extends Object
implements Serializable

---

[Constructor Index]

[ o ] ObjectName(String)
[ o ] ObjectName(String[])

[Method Index]

[ o ] getNames()

[Constructors]

[ o ] ObjectName public ObjectName(String name)

[ o ] ObjectName public ObjectName(String names[])

[Methods]

[ o ] getNames public Vector getNames()

---

---

Interface netprism.server.ObjectType public interface ObjectType

---

[Variable Index]

[ o ] ATTRIBUTELEAF
[ o ] ATTRIBUTES
[ o ] BUILDER
[ o ] ELEMENT
[ o ] ELEMENTCOMPONENT
[ o ] ELEMENTCOMPONENTS
[ o ] ELEMENTGROUP
[ o ] ELEMENTRULES
[ o ] ELEMENTS
[ o ] ELEMENTTEMPLATE
[ o ] EVENTRULES
[ o ] MANAGER
[ o ] OTHERS
[ o ] POLLING

[ o ] POLLLEAF
[ o ] POLLRULELEAF
[ o ] RULELEAF
[ o ] SERVER
[ o ] STATELEAF
[ o ] STATES
[ o ] TRAPLEAF
[ o ] TRAPRULELEAF
[ o ] TRAPS

[Variables]

[ o ] OTHERS public final static int OTHERS

[ o ] SERVER public final static int SERVER

[ o ] BUILDER public final static int BUILDER

[ o ] MANAGER public final static int MANAGER

[ o ] ELEMENTTEMPLATE public final static int ELEMENTTEMPLATE

[ o ] ELEMENTGROUP public final static int ELEMENTGROUP

[ o ] ELEMENT public final static int ELEMENT

[ o ] ELEMENTS public final static int ELEMENTS

[ o ] ELEMENTCOMPONENTS public final static int ELEMENTCOMPONENTS

[ o ] ELEMENTRULES public final static int ELEMENTRULES

[ o ] EVENTRULES public final static int EVENTRULES

[ o ] ELEMENTCOMPONENT public final static int ELEMENTCOMPONENT

[ o ] ATTRIBUTES public final static int ATTRIBUTES

[ o ] POLLING public final static int POLLING

[ o ] STATES public final static int STATES

[ o ] TRAPS public final static int TRAPS

[ o ] ATTRIBUTELEAF public final static int ATTRIBUTELEAF

[ o ] POLLLEAF public final static int POLLLEAF

[ o ] TRAPLEAF public final static int TRAPLEAF

[ o ] STATELEAF public final static int STATELEAF

[ o ] RULELEAF public final static int RULELEAF

[ o ] POLLRULELEAF public final static int POLLRULELEAF

[ o ] TRAPRULELEAF public final static int TRAPRULELEAF

---

---

Interface netprism.server.PollEvent public interface PollEvent
extends ServerObject PollEvent defines the interface for remote PollEventImpl class. It is used to configure a polling event for a ElementComponent that the user is interested in monitoring.

---

[Method Index]

[ o ] getAttributeList()
Gets the list of the Attributes' names that are associated with this polling event
[ o ] getLogFileLocation()
Gets the location of the logging file
[ o ] getLogStatus()
Gets the logging status
[ o ] getPollingInterval()
Gets the polling interval
[ o ] getPollingStatus()
Gets the polling status
[ o ] setAttributeList(String[])
Sets the list of the Attributes' names that are associated with this polling event
[ o ] setLogStatus(boolean)

Sets the logging status
[ o ] setPollingInterval(int)
Sets the polling interval
[ o ] setPollingStatus(boolean)
Sets the polling status

[Methods]

[ o ] getPollingInterval public abstract int getPollingInterval() throws RemoteException Gets the polling interval Returns:
the polling interval

[ o ] setPollingInterval public abstract void setPollingInterval(int intl) throws RemoteException Sets the polling interval Parameters:
intl - the polling interval to be set

[ o ] getPollingStatus public abstract boolean getPollingStatus() throws RemoteException Gets the polling status Returns:
'false' if polling is off; 'true' if polling is on

[ o ] setPollingStatus public abstract void setPollingStatus(boolean status) throws RemoteException Sets the polling status Parameters:
status - 'false' to turn off the polling; 'true' to turn on the polling

[ o ] getLogStatus public abstract boolean getLogStatus() throws RemoteException Gets the logging status Returns:
'false' if logging is off; 'true' if logging is on

[ o ] setLogStatus public abstract void setLogStatus(boolean status) throws RemoteException Sets the logging status Parameters:
status - 'false' to turn off the logging; 'true' to turn on the logging

[ o ] getLogFileLocation public abstract String getLogFileLocation() throws RemoteException Gets the location of the logging file Returns:
the location of the logging file

[ o ] getAttributeList public abstract String[] getAttributeList() throws RemoteException Gets the list of the Attributes' names that are associated with this polling event Returns:
the list of Attributes' names

[ o ] setAttributeList public abstract void setAttributeList(String list[]) throws RemoteException Sets the list of the Attributes' names that are associated with this polling event Parameters:
list - the Attributes' names to be set

---

---

Class netprism.server.PollEventImpl

```
java.lang.Object
   |
   +----java.rmi.server.RemoteObject
           |
           +----java.rmi.server.RemoteServer
                   |
                   +----java.rmi.server.UnicastRemoteObject
                           |
                           +----netprism.server.ServerObjectImpl
                                   |
                                   +----netprism.server.PollEventImpl
```

--- public class PollEventImpl
extends ServerObjectImpl
implements PollEvent

PollEventImpl implements the PollEvent interface. It is used to configure a polling event for a ElementComponent that the user is interested in monitoring.

---

[Constructor Index]

[ o ] PollEventImpl(PollEventsImpl, String, String, boolean, int, boolean, String[])
Constructor

[Method Index]

[ o ] create(ServerObjectShadow)
Creates PollRule for this PollEvent
[ o ] getAttributeList()
Gets the list of the Attributes' names that are associated with this polling event

[ o ] getInfo()
Gets the PollEvent info
[ o ] getLogFileLocation()
Gets the location of the log file
[ o ] getLogStatus()
Gets the logging status
[ o ] getPollingInterval()
Gets the polling interval
[ o ] getPollingStatus()
Gets the polling status
[ o ] setAttributeList(String[])
Sets the list of the Attributes' names that are associated with this polling event
[ o ] setInfo(ServerObjectShadow)
Sets the PollEvent info
[ o ] setLogStatus(boolean)
Sets the logging status
[ o ] setPollingInterval(int)
Sets the polling interval
[ o ] setPollingStatus(boolean)
Sets the polling status

[Constructors]

[ o ] PollEventImpl

```
public PollEventImpl(PollEventsImpl pollEvents,
                String str,
                String desc,
                boolean pollOn,
                int interval,
                boolean logOn,
                String attributes[]) throws RemoteException
```

Constructor

Parameters:
PollEvents - PollEventsImpl object which has this PollEventImpl
str - event name
desc - event description
pollOn - polling status; 'true' means polling is on; 'false' means polling is off
interval - polling interval in seconds
logOn - logging status; 'true' means logging is on; 'false' means logging is off attributes - a list of attributes of the PollEventImpl

[Methods]

[ o ] create public ServerObject create(ServerObjectShadow shadow) throws RemoteException Creates PollRule for this PollEvent Parameters:
name - : the name of the rule
desc - : description of the rule
state - : the name of the state
expression - : the regular expression of the rule
persistence - : the persistence
Returns:
: the PollRule object
Throws: :
RemoteException
Overrides:
create in class ServerObjectImpl

[ o ] getInfo public synchronized ServerObjectShadow getInfo() throws RemoteException Gets the PollEvent info Parameters:
name - the name to be set
Overrides:
getInfo in class ServerObjectImpl

[ o ] setInfo public synchronized void setInfo(ServerObjectShadow shadow) throws RemoteException :Sets the PollEvent info Parameters:
name - the name to be set
Overrides:

setInfo in class ServerObjectImpl

[ o ] getPollingInterval public int getPollingInterval() throws RemoteException

Gets the polling interval

Returns:
the polling interval

[ o ] setPollingInterval public void setPollingInterval(int intl) throws RemoteException Sets the polling interval Parameters:
intl - the polling interval to be set

[ o ] getPollingStatus public boolean getPollingStatus() throws RemoteException

Gets the polling status

Returns:
'false' if polling is off; 'true' if polling is on

[ o ] setPollingStatus public void setPollingStatus(boolean status) throws RemoteException Sets the polling status Parameters:
status - 'false' to turn off the polling; 'true' to turn on the polling

[ o ] getLogStatus public boolean getLogStatus() throws RemoteException

Gets the logging status

Returns:
'false' if logging is off; 'true' if logging is on

[ o ] setLogStatus public void setLogStatus(boolean status) throws RemoteException Sets the logging status Parameters:
status - 'false' to turn off the logging; 'true' to turn on the logging

[ o ] getLogFileLocation public String getLogFileLocation() throws RemoteException Gets the location of the log file Returns:
the location of the log file

[ o ] getAttributeList public String[] getAttributeList() throws RemoteException Gets the list of the Attributes' names that are associated with this polling event Returns:
the list of Attributes' names

[ o ] setAttributeList public void setAttributeList(String list[]) throws RemoteException Sets the list of the Attributes' names that are associated with this polling event Parameters:
list - the Attributes' names to be set ------------------------------------------------------------------------
------------------------------------------------------------------------

Class netprism.server.PollEventShadow

```
java.lang.Object
  |
  +----netprism.server.ServerObjectShadow
        |
        +----netprism.server.PollEventShadow
```

--- public class PollEventShadow
extends ServerObjectShadow

---

[Variable Index]

[ o ] attrList
  a list of attributes associated with this PollEvent
[ o ] logFileLocation
  the log file location
[ o ] logStatus
  the logging status
[ o ] pollInterval
  the polling interval in seconds
[ o ] pollStatus
  the polling status
[ o ] ruleList
  a list of PollRule associated with this PollEvent

[Constructor Index]

[ o ] PollEventShadow()
  Constructor

[Method Index]

[ o ] clone()
  This method creates a copy (clone) of the PollEventShadow object.
[ o ] equals(Object)
  This method checks if the given object is equal to "this" object

[Variables]

[ o ] pollStatus public boolean pollStatus the polling status

[ o ] pollInterval public int pollInterval the polling interval in seconds

[ o ] logStatus public boolean logStatus the logging status

[ o ] logFileLocation public String logFileLocation the log file location

[ o ] attrList public String attrList[]

a list of attributes associated with this PollEvent

[ o ] ruleList public String ruleList[]

a list of PollRule associated with this PollEvent

[Constructors]

[ o ] PollEventShadow public PollEventShadow()

Constructor

[Methods]

[ o ] clone public Object clone()

This method creates a copy (clone) of the PollEventShadow object.

Overrides:
clone in class ServerObjectShadow

[ o ] equals public boolean equals(Object obj)

This method checks if the given object is equal to "this" object

Overrides:
equals in class ServerObjectShadow

---

---

Class netprism.server.PollEventsImpl

```
java.lang.Object
   |
   +----java.rmi.server.RemoteObject
           |
           +----java.rmi.server.RemoteServer
                   |
                   +----java.rmi.server.UnicastRemoteObject
                           |
                           +----netprism.server.ServerObjectImpl
                                   |
                                   +----netprism.server.PollEventsImpl
```

--- public class PollEventsImpl
extends ServerObjectImpl
implements ServerObject

---

[Constructor Index]

[ o ] PollEventsImpl(ElementComponentImpl)
PollEventsImpl

[Method Index]

[ o ] addPollEvent(PollEvent)
Add a Poll Event
[ o ] create(ServerObjectShadow)
Create a Poll Event
[ o ] getInfo()
Add a getInfo - This is a stub for ServerObject.getInfo which is an abstract method.
[ o ] setInfo(ServerObjectShadow)
Set a poll event info - This is a stub for ServerObject.setInfo which is an abstract method.
[ o ] setMonitorMode(boolean)

[Constructors]

[ o ] PollEventsImpl public PollEventsImpl(ElementComponentImpl ec) throws RemoteException PollEventsImpl Parameters:
ElementComponentImpl - ec
Throws: RemoteException
rmi exception

[Methods]

[ o ] create public ServerObject create(ServerObjectShadow shadow) throws RemoteException Create a Poll Event Parameters:
ServerObjectShadow - shadow
Throws: RemoteException
rmi exception
Overrides:
create in class ServerObjectImpl

[ o ] addPollEvent public void addPollEvent(PollEvent pollevent)

Add a Poll Event

Parameters:
PollEvent - pollevent
Throws: NO
java.rmi.RemoteException rmi exception - since this method will not get called via RMI.

[ o ] setMonitorMode public void setMonitorMode(boolean monitorMode)

[ o ] setInfo public void setInfo(ServerObjectShadow shadow) throws RemoteException Set a poll event info - This is a stub for ServerObject.setInfo which is an abstract method.

Parameters:
ServerObjectShadow - shadow
Throws: RemoteException
rmi exception
Overrides:
setInfo in class ServerObjectImpl

[ o ] getInfo public ServerObjectShadow getInfo() throws RemoteException

Add a getInfo - This is a stub for ServerObject.getInfo which is an abstract method.

Throws: RemoteException
rmi exception
Overrides:
getInfo in class ServerObjectImpl ---------------------------------------------------------------------------
---------------------------------------------------------------------------

Class netprism.server.PollServer java.lang.Object
  |
  +----netprism.server.PollServer

--- public class PollServer
extends Object

Class to poll a specified network element and send get/getnext/set SNMP requests

---

[Constructor Index]

[ o ] PollServer(ElementImpl)
  Constructor

[Method Index]

[ o ] doPollEvent(PollEventImpl, Hashtable)
[ o ] doPollEvents()
[ o ] getEventAttributes(String[], Hashtable)
[ o ] getMibVars(String[], Hashtable)
[ o ] getTableEventAttributes(String[], Hashtable)
[ o ] getTableMibVars(String[], Hashtable)
[ o ] isTable(String[], Hashtable)
[ o ] makePollLogLocation()
[ o ] resumePollEvent(PollEventImpl)
[ o ] resumePollEvents()
[ o ] snmpInstRequest(String, ElementComponentImpl, String[])
[ o ] snmpSetRequest(String[])
[ o ] stopPollEvent(PollEventImpl)
[ o ] stopPollEvents()
[ o ] suspendPollEvent(PollEventImpl)
[ o ] suspendPollEvents()

[Constructors]

[ o ] PollServer

```
public PollServer(ElementImpl element) throws RemoteException

  Constructor

  Parameters:
     element - ElementImpl object which has this PollServer

[Methods]

[ o ] makePollLogLocation

 public void makePollLogLocation()

[ o ] doPollEvents

 public void doPollEvents()

[ o ] doPollEvent

 public void doPollEvent(PollEventImpl pollEvent,
                 Hashtable attributes)

[ o ] getEventAttributes

 public Hashtable getEventAttributes(String names[],
                         Hashtable attributes) throws NameNotFoundException,
RemoteException

[ o ] getTableEventAttributes

 public Hashtable getTableEventAttributes(String names[],
                            Hashtable attributes) throws NameNotFoundException,
RemoteException

[ o ] getMibVars

 public String[] getMibVars(String names[],
                   Hashtable attributes) throws NameNotFoundException,
RemoteException

[ o ] getTableMibVars

 public String[] getTableMibVars(String names[],
                      Hashtable attributes) throws NameNotFoundException,
RemoteException
```

[ o ] isTable

```
public boolean[] isTable(String names[],
                    Hashtable attributes) throws NameNotFoundException,
RemoteException
```

[ o ] snmpInstRequest

```
public void snmpInstRequest(String type,
                    ElementComponentImpl elementComponent,
                    String attrs[]) throws NameNotFoundException,
RemoteException
```

[ o ] snmpSetRequest

```
public void snmpSetRequest(String attrs[]) throws SnmpException,
RemoteException
```

[ o ] stopPollEvents

```
public void stopPollEvents()
```

[ o ] stopPollEvent

```
public void stopPollEvent(PollEventImpl pollEvent)
```

[ o ] suspendPollEvents

```
public void suspendPollEvents()
```

[ o ] suspendPollEvent

```
public void suspendPollEvent(PollEventImpl pollEvent)
```

[ o ] resumePollEvents

```
public void resumePollEvents()
```

[ o ] resumePollEvent

```
public void resumePollEvent(PollEventImpl pollEvent)
```

------------------------------------------------------------------------
------------------------------------------------------------------------

Class netprism.server.PriorityUsedException

```
java.lang.Object
  |
  +----java.lang.Throwable
        |
        +----java.lang.Exception
              |
              +----netprism.server.PriorityUsedException
```

--- public class PriorityUsedException
extends Exception

---

[Constructor Index]

[ o ] PriorityUsedException()
[ o ] PriorityUsedException(String)

[Constructors]

[ o ] PriorityUsedException public PriorityUsedException()

[ o ] PriorityUsedException public PriorityUsedException(String msg)

---

---

Interface netprism.server.Rule public interface Rule
extends ServerObject

Rule defines the interface for the remote RuleImpl class. This is the base interface for other Rule interfaces See Also:

ElementTrapRule

---

[Variable Index]

[ o ] AnyState
AnyState - use this to indicate this rule applies to all the states

[Method Index]

[ o ] getAlarmLogInfo()
Gets alarm log information
[ o ] getAlarmLogInfoCause()
Gets the possible causes for the alarm log information
[ o ] getAlarmLogInfoDescription()
Gets the event description for the alarm log information
[ o ] getAlarmLogInfoSolution()
Gets the possible solutions for the alarm log information
[ o ] getCommand()
Gets the command
[ o ] getExpression()
Gets the expression of the rule
[ o ] getPersistence()
Gets the persistence of the rule
[ o ] getPollInterval()
Gets the polling interval
[ o ] getToStateName()
Gets the name of the state that it will change to
[ o ] getTrapDestination()
Gets the destination host name for forwarding trap
[ o ] isCommandScript()
Check if the command is an embedded script
[ o ] setAddToAlarmLogOff()
Turns off the adding to alarm log option
[ o ] setAddToAlarmLogOn()
Turns on the adding to alarm log option, and sets the contents
[ o ] setAlarmLogInfoCause(String)
Sets the possible causes for the alarm log information
[ o ] setAlarmLogInfoDescription(String)
Sets the event description for the alarm log information
[ o ] setAlarmLogInfoSolution(String)
Sets the possible solutions for the alarm log information
[ o ] setChangePollIntervalOff()
Turns off the changing polling interval option

[ o ] setChangePollIntervalOn(int)
Turns on the changing polling interval option, and sets the value in second
[ o ] setChangeStateOff()
Turns off the changing state option
[ o ] setChangeStateOn(String)
Turns on the changing state option, and sets the state name
[ o ] setExecuteCommandOff()
Turns off the executing command option
[ o ] setExecuteCommandOn(String, boolean)
Turns on the executing command option, and sets the command
[ o ] setExpression(String)
Sets the expression of the rule
[ o ] setForwardSnmpTrapOff()
Turns off the forwarding SNMP trap option
[ o ] setForwardSnmpTrapOn(String)
Turns on the forwarding SNMP trap option, and sets the value
[ o ] setPersistence(int)
Sets the persistence of the rule

[Variables]

[ o ] AnyState public final static String AnyState

AnyState - use this to indicate this rule applies to all the states

[Methods]

[ o ] getExpression public abstract String getExpression() throws RemoteException Gets the expression of the rule Returns:
the expression of the rule

[ o ] setExpression public abstract void setExpression(String expression) throws RemoteException Sets the expression of the rule Parameters:
expression - the expression to be set

[ o ] getPersistence public abstract int getPersistence() throws RemoteException Gets the persistence of the rule Returns:
the persistence of the rule

[ o ] setPersistence public abstract void setPersistence(int persistence) throws RemoteException Sets the persistence of the rule Parameters:
persistence - the persistence of the rule

[ o ] getPollInterval public abstract int getPollInterval() throws RemoteException Gets the polling interval Returns:
-1 if the option is off; else the 'polling interval' in second

[ o ] setChangePollIntervalOn public abstract void setChangePollIntervalOn(int interval) throws RemoteException Turns on the changing polling interval option, and sets the value in second Parameters:
interval - the value to be set

[ o ] setChangePollIntervalOff public abstract void setChangePollIntervalOff() throws RemoteException Turns off the changing polling interval option

[ o ] getToStateName public abstract String getToStateName() throws RemoteException Gets the name of the state that it will change to Returns:
'null' if this option is off; else the 'state name'

[ o ] setChangeStateOn public abstract void setChangeStateOn(String name) throws RemoteException Turns on the changing state option, and sets the state name Parameters:
name - the state to change to

[ o ] setChangeStateOff public abstract void setChangeStateOff() throws RemoteException Turns off the changing state option

[ o ] getCommand public abstract String getCommand() throws RemoteException

Gets the command

Returns:
'null' if this option is off; else 'the command'

[ o ] isCommandScript public abstract boolean isCommandScript() throws RemoteException Check if the command is an embedded script Returns:
'false' if not; 'true' if yes

[ o ] setExecuteCommandOn

```
public abstract void setExecuteCommandOn(String command,
                        boolean isScript) throws RemoteException

  Turns on the executing command option, and sets the command

  Parameters:
    command - the command to be executed
    isScript - 'true' if the command is an embedded script; 'false'
    otherwise

[ o ] setExecuteCommandOff

 public abstract void setExecuteCommandOff() throws RemoteException

  Turns off the executing command option

[ o ] getTrapDestination

 public abstract String getTrapDestination() throws RemoteException

  Gets the destination host name for forwarding trap

  Returns:
    'null' if this option is off; else the destination host name

[ o ] setForwardSnmpTrapOn

 public abstract void setForwardSnmpTrapOn(String host) throws
RemoteException

  Turns on the forwarding SNMP trap option, and sets the value

  Parameters:
    host - the name of the host the trap is forwarding to

[ o ] setForwardSnmpTrapOff

 public abstract void setForwardSnmpTrapOff() throws RemoteException

  Turns off the forwarding SNMP trap option

[ o ] getAlarmLogInfo

 public abstract String[] getAlarmLogInfo() throws RemoteException
```

Gets alarm log information

Returns:
'null' if this option is off; else the 'description', 'causes', 'solutions' are returned

[ o ] setAddToAlarmLogOn public abstract void setAddToAlarmLogOn() throws RemoteException Turns on the adding to alarm log option, and sets the contents

[ o ] getAlarmLogInfoDescription public abstract String getAlarmLogInfoDescription() throws RemoteException Gets the event description for the alarm log information Returns:
the event description

[ o ] setAlarmLogInfoDescription public abstract void setAlarmLogInfoDescription(String description) throws RemoteException Sets the event description for the alarm log information Parameters:
description - the event description

[ o ] getAlarmLogInfoCause public abstract String getAlarmLogInfoCause() throws RemoteException Gets the possible causes for the alarm log information Returns:
the possible causes

[ o ] setAlarmLogInfoCause public abstract void setAlarmLogInfoCause(String causes) throws RemoteException Sets the possible causes for the alarm log information Parameters:
causes - the possible causes

[ o ] getAlarmLogInfoSolution public abstract String getAlarmLogInfoSolution() throws RemoteException Gets the possible solutions for the alarm log information Returns:
the possible solutions

[ o ] setAlarmLogInfoSolution public abstract void setAlarmLogInfoSolution(String solutions) throws RemoteException Sets the possible solutions for the alarm log information Parameters:
solutions - the possible solutions

[ o ] setAddToAlarmLogOff public abstract void setAddToAlarmLogOff() throws RemoteException Turns off the adding to alarm log option

---

---

Class netprism.server.RuleShadow

```
java.lang.Object
  |
  +----netprism.server.ServerObjectShadow
        |
        +----netprism.server.RuleShadow
```

--- public class RuleShadow extends ServerObjectShadow

---

[Variable Index]

[ o ] alarmInfoCause
[ o ] alarmInfoDescription
[ o ] alarmInfoSolution
[ o ] command
[ o ] destinationHost
[ o ] expression
  the expression for condition evaluation
[ o ] isAddToAlarmLogOn
[ o ] isChangePollIntervalOn
[ o ] isChangeStateOn
[ o ] isCommandScript
[ o ] isExecuteCommandOn
[ o ] isForwardSnmpTrapOn
[ o ] nextState
[ o ] persistence
  the persistence - number of consecutive occurrences
[ o ] pollInterval

[Constructor Index]

[ o ] RuleShadow(int)

[Method Index]

[ o ] equals(Object)

[Variables]

[ o ] expression public String expression the expression for condition evaluation

[ o ] persistence public int persistence the persistence - number of consecutive occurrences

[ o ] isChangePollIntervalOn public boolean isChangePollIntervalOn

[ o ] isChangeStateOn public boolean isChangeStateOn

[ o ] isExecuteCommandOn public boolean isExecuteCommandOn

[ o ] isForwardSnmpTrapOn public boolean isForwardSnmpTrapOn

[ o ] isAddToAlarmLogOn public boolean isAddToAlarmLogOn

[ o ] pollInterval public int pollInterval

[ o ] nextState public String nextState

[ o ] command public String command

[ o ] isCommandScript public boolean isCommandScript

[ o ] destinationHost public String destinationHost

[ o ] alarmInfoDescription public String alarmInfoDescription

[ o ] alarmInfoCause public String alarmInfoCause

[ o ] alarmInfoSolution public String alarmInfoSolution

[Constructors]

[ o ] RuleShadow public RuleShadow(int shadowType)

[Methods]

[ o ] equals public boolean equals(Object obj)

Overrides:
equals in class ServerObjectShadow

---

---

Interface netprism.server.Server public interface Server
extends Remote

Interface to access the NetPrism server

---

[Method Index]

[ o ] find(ObjectName)
Return a reference to the ServerObject in interest
[ o ] getBuilder()
:Return a reference to the Builder
[ o ] getManager()
Return a reference to the Manager
[ o ] getServerName()
Return the name of the server

[ o ] getSeverity(String)
Return a reference to the Severity Properties object
[ o ] setSeverity(Properties, String)
Set severity preference to a user preference file

[Methods]

[ o ] getServerName public abstract String getServerName() throws RemoteException Return the name of the server Returns:
name of the server
Throws: RemoteException
rmi exception

[ o ] getBuilder public abstract Builder getBuilder() throws RemoteException

Return a reference to the Builder

Returns:
reference to the Builder
Throws: RemoteException
rmi exception

[ o ] getManager public abstract Manager getManager() throws RemoteException

Return a reference to the Manager

Returns:
reference to the Manager
Throws: RemoteException
rmi exception

[ o ] getSeverity public abstract Properties getSeverity(String userName) throws RemoteException Return a reference to the Severity Properties object Parameters:
userName - user name
Returns:
reference to the Severity Properties object
Throws: RemoteException
rmi exception

[ o ] setSeverity

```
public abstract void setSeverity(Properties userPreference,
                    String userName) throws RemoteException
```

Set severity preference to a user preference file

Parameters:
userName - user name
Returns:
reference to the Severity Properties object
Throws: RemoteException
rmi exception

[ o ] find

```
public abstract ServerObject find(ObjectName objectName) throws
RemoteException
```

Return a reference to the ServerObject in interest

Parameters:
target - the Target object
Returns:
reference to the ServerObject in interest
Throws: RemoteException
rmi exception

---

---

Interface netprism.server.ServerConnect

```
public interface ServerConnect
extends Remote
```

Interface to accept a user connection and authenticate the user The implementation binds the name "NetPrismServer" to the ServerConnectImpl object.

-----------------------------------------------------------------------

[Method Index]

[ o ] login(String, String)
  User login
[ o ] stop()
  stop temporary, for testing

[Methods]

[ o ] login

```
public abstract Server login(String uname,
                    String upasswd) throws RemoteException
```

User login

Parameters:
  uname - User name
  upasswd - User password
Returns:
  reference to the NetPrism server
Throws: RemoteException
  rmi exception

[ o ] stop

```
public abstract void stop() throws RemoteException
```

stop temporary, for testing

Throws: RemoteException
  rmi exception

-----------------------------------------------------------------------
-----------------------------------------------------------------------

Class netprism.server.ServerConnectImpl java.lang.Object
  |

```
+----java.rmi.server.RemoteObject
     |
     +----java.rmi.server.RemoteServer
          |
          +----java.rmi.server.UnicastRemoteObject
               |
               +----netprism.server.ServerConnectImpl
```

--- public class ServerConnectImpl
extends UnicastRemoteObject
implements ServerConnect Class to implement ServerConnect interface

---

[Variable Index]

[ o ] defaultRegistryPort
[ o ] registryPort
[ o ] rmiRegistry
[ o ] serverName
  NetPrism server name "NetPrismServer"
[ o ] serverPort
  NetPrism server port "1996"

[Constructor Index]

[ o ] ServerConnectImpl()
  Constructor

[Method Index]

[ o ] login(String, String)
  User login
[ o ] main(String[])
  main sets security manager, creates a new ServerConnectImpl, and binds server name "NetPrismServer" to the ServerConnectImpl object
[ o ] parseOption(String[])
[ o ] stop()
  temporary stop method for testing
[ o ] usage()

[Variables]

[ o ] serverName public final static String serverName

NetPrism server name "NetPrismServer"

[ o ] serverPort public final static int serverPort

NetPrism server port "1996"

[ o ] defaultRegistryPort public final static int defaultRegistryPort

[ o ] registryPort public static String registryPort

[ o ] rmiRegistry public static Registry rmiRegistry

[Constructors]

[ o ] ServerConnectImpl public ServerConnectImpl() throws RemoteException

Constructor

[Methods]

[ o ] stop public void stop() throws RemoteException temporary stop method for testing

[ o ] login public Server login(String uname,

String upasswd) throws RemoteException

User login

Parameters:
uname - User name
upasswd - User password
Returns:
reference to the NetPrism server

[ o ] usage public static void usage()

[ o ] parseOption public static void parseOption(String args[])

[ o ] main public static void main(String args[])

main sets security manager, creates a new ServerConnectImpl, and binds server name "NetPrismServer" to the ServerConnectImpl object

---

---

Class netprism.server.ServerImpl

```
java.lang.Object
  |
  +----java.rmi.server.RemoteObject
        |
        +----java.rmi.server.RemoteServer
              |
              +----java.rmi.server.UnicastRemoteObject
                    |
                    +----netprism.server.ServerImpl
```

--- public class ServerImpl
extends UnicastRemoteObject
implements Server

Class to implement Server interface

---

[Constructor Index]

[ o ] ServerImpl()
Constructor

[Method Index]

[ o ] find(ObjectName)
Return a reference to the ServerObject in interest
[ o ] getBuilder()
Return a reference to the Builder
[ o ] getManager()
Return a reference to the Manager
[ o ] getServerName()
Return the name of the server
[ o ] getSeverity(String)
Return a reference to the Severity Properties
[ o ] getTrapServer()
Return a reference to the TrapServer
[ o ] setSeverity(Properties, String)
Set severity preference to a user preference file

[Constructors]

[ o ] ServerImpl public ServerImpl() throws NameNotFoundException, RemoteException Constructor

[Methods]

[ o ] getServerName public String getServerName() throws RemoteException

Return the name of the server

Returns:
name of the server

Throws: RemoteException
rmi exception

[ o ] getBuilder public Builder getBuilder() throws RemoteException

Return a reference to the Builder

Returns:
reference to the Builder
Throws: RemoteException
rmi exception

[ o ] getManager public Manager getManager() throws RemoteException

Return a reference to the Manager

Returns:
reference to the Manager
Throws: RemoteException
rmi exception

[ o ] getSeverity public Properties getSeverity(String userName) throws RemoteException Return a reference to the Severity Properties Returns:
reference to the Severity Properties
Throws: RemoteException
rmi exception

[ o ] setSeverity public void setSeverity(Properties userPreference,
String userName) throws RemoteException Set severity preference to a user preference file Parameters:
userName - user name Returns:
reference to the Severity Properties object
Throws: RemoteException
rmi exception

[ o ] find public ServerObject find(ObjectName objectName) throws RemoteException Return a reference to the ServerObject in interest Parameters:
target - the Target object
Returns:
reference to the ServerObject in interest
Throws: RemoteException
rmi exception

[ o ] getTrapServer public TrapServer getTrapServer()

Return a reference to the TrapServer

Returns:
reference to the TrapServer

---

---

Interface netprism.server.ServerObject public interface ServerObject
extends Remote ServerObject is the abstract class to define netprism server object interface This is the class that all server objects will be inherited from.

---

[Variable Index]

[ o ] OBSERVE_ADD
[ o ] OBSERVE_DELETE
[ o ] OBSERVE_MODIFY

[Method Index]

[ o ] addObserver(NpObserverProxy, int)
Adds event observer to this object
[ o ] create(ServerObjectShadow)
Create a child object with type specified in shadow.
[ o ] delete(String)
Delete a child object
[ o ] deleteObserver(NpObserverProxy, int)
Deletes event observer from this object
[ o ] getChild(String)
Gets the child object by giving a name
[ o ] getChildren()
Gets the child(ren) object(s)
[ o ] getChildrenNameList()
Gets the name list of the children objects
[ o ] getDescription()
Gets the object description
[ o ] getInfo()
Gets this object's information
[ o ] getName()
Gets the object name
[ o ] getNameTree()
Gets the children, grandchildren names in a hierarchical order
[ o ] getParent()
Gets the parent object
[ o ] setDescription(String)
Sets the object description
[ o ] setInfo(ServerObjectShadow)
Sets this object's attributes
[ o ] setName(String)
Sets the object name

[Variables]

[ o ] OBSERVE_ADD public final static int OBSERVE_ADD

[ o ] OBSERVE_MODIFY public final static int OBSERVE_MODIFY

[ o ] OBSERVE_DELETE public final static int OBSERVE_DELETE

[Methods]

[ o ] create public abstract ServerObject create(ServerObjectShadow shadow) throws RemoteException Create a child object with type specified in shadow.

Parameters:
shadow - information needed to create a child object
Returns:
the child object created

[ o ] delete public abstract void delete(String name) throws RemoteException

Delete a child object

Parameters:
name - the name of the child object to be deleted

[ o ] getParent public abstract ServerObject getParent() throws RemoteException

Gets the parent object

Returns:
the parent object

[ o ] getChildren public abstract ServerObject[] getChildren() throws RemoteException Gets the child(ren) object(s)

Returns:
the children objects collected in Enumeration

[ o ] getChildrenNameList public abstract String[] getChildrenNameList() throws RemoteException Gets the name list of the children objects Returns:
the name list

[ o ] getChild public abstract ServerObject getChild(String name) throws RemoteException Gets the child object by giving a name Parameters:
name - the child name
Returns:
the child object

[ o ] getInfo public abstract ServerObjectShadow getInfo() throws RemoteException Gets this object's information Returns:
the shadow object that contains the information

[ o ] setInfo public abstract void setInfo(ServerObjectShadow shadow) throws RemoteException Sets this object's attributes Parameters:
shadow - the shadow object that contains the information to set

[ o ] getNameTree public abstract NameTree getNameTree() throws RemoteException

Gets the children, grandchildren names in a hierarchical order

Returns:

the output stream that contains the serialized name tree

[ o ] addObserver public abstract void addObserver(NpObserverProxy proxy,
int interest) throws RemoteException Adds event observer to this object Parameters:
proxy - the observer to be added
interest - the event(s) that is interested to the observer

[ o ] deleteObserver public abstract void deleteObserver(NpObserverProxy proxy,
int interest) throws RemoteException Deletes event observer from this object Parameters:
proxy - the observer to be deleted
interest - the event(s) that the observer is no longer interested in

[ o ] getName public abstract String getName() throws RemoteException

Gets the object name

Returns:
the object name

[ o ] setName public abstract void setName(String name) throws RemoteException

Sets the object name

[ o ] getDescription public abstract String getDescription() throws RemoteException Gets the object description Returns:
the description

[ o ] setDescription public abstract void setDescription(String description) throws RemoteException Sets the object description Parameters:
the - description to be set

---

---

Class netprism.server.ServerObjectImpl

```
java.lang.Object
   |
   +----java.rmi.server.RemoteObject
           |
           +----java.rmi.server.RemoteServer
                   |
                   +----java.rmi.server.UnicastRemoteObject
                           |
                           +----netprism.server.ServerObjectImpl
```

--- public class ServerObjectImpl
extends UnicastRemoteObject
implements ServerObject, ObjectType ServerObject is the abstract class to define netprism server object interface This is the class that all the server objects will be inherited from.

---

[Constructor Index]

[ o ] ServerObjectImpl(int)
[ o ] ServerObjectImpl(String, int)

[Method Index]

[ o ] addObserver(NpObserverProxy, int)
Adds an observer to the list of observers for this object.
[ o ] create(ServerObjectShadow)
[ o ] delete(String)
[ o ] deleteObserver(NpObserverProxy, int)
Deletes an observer from the list of observers for this object.
[ o ] getChild(String)
[ o ] getChildren()
[ o ] getChildrenNameList()
[ o ] getDescription()
[ o ] getHierarchicalNames()
[ o ] getInfo()
[ o ] getName()
[ o ] getNameTree()
[ o ] getParent()
[ o ] matchMyName(Vector, int)
[ o ] notifyObserver(int, String, ServerObjectShadow)
[ o ] observerCount(int)
Returns the number of observers for this object on the type of events specified
[ o ] setDescription(String)
[ o ] setInfo(ServerObjectShadow)
[ o ] setName(String)

[Constructors]

[ o ] ServerObjectImpl public ServerObjectImpl(int type) throws RemoteException

[ o ] ServerObjectImpl public ServerObjectImpl(String name,
int type) throws RemoteException

[Methods]

[ o ] create public abstract ServerObject create(ServerObjectShadow shadow) throws RemoteException

[ o ] delete public void delete(String name) throws RemoteException

[ o ] getParent public ServerObject getParent() throws RemoteException

[ o ] getChildren public ServerObject[] getChildren() throws RemoteException

[ o ] getChildrenNameList public String[] getChildrenNameList() throws RemoteException

[ o ] getChild public ServerObject getChild(String name) throws RemoteException

[ o ] getInfo public synchronized abstract ServerObjectShadow getInfo() throws RemoteException

[ o ] setInfo public synchronized abstract void setInfo(ServerObjectShadow shadow) throws RemoteException

[ o ] getNameTree public NameTree getNameTree() throws RemoteException

[ o ] getName public String getName() throws RemoteException

[ o ] setName public void setName(String name) throws RemoteException

[ o ] getDescription public String getDescription() throws RemoteException

[ o ] setDescription

```
public void setDescription(String description) throws RemoteException
```

[ o ] getHierarchicalNames

```
protected NameTree getHierarchicalNames()
```

[ o ] addObserver

```
public synchronized void addObserver(NpObserverProxy op,
                            int interest) throws RemoteException
```

Adds an observer to the list of observers for this object.

Parameters:
op - the observer object to be added
interest - the type of events that are interested to the observer

[ o ] deleteObserver

```
public synchronized void deleteObserver(NpObserverProxy op,
                            int interest) throws RemoteException
```

Deletes an observer from the list of observers for this object.

Parameters:
op - the observer object to be deleted
interest - the type of events that the observer is no longer interested in

[ o ] observerCount

```
public int observerCount(int interest)
```

Returns the number of observers for this object on the type of events specified

Parameters:
interest - the type of events that the observers are interested in
Returns:
number of observers of this object

[ o ] matchMyName

```
protected ServerObjectImpl matchMyName(Vector names,
                                       int index)

[ o ] notifyObserver

protected void notifyObserver(int event,
                              String msg,
                              ServerObjectShadow shadow)

------------------------------------------------------------------------
------------------------------------------------------------------------

Class netprism.server.ServerObjectShadow

java.lang.Object
   |
   +----netprism.server.ServerObjectShadow

------------------------------------------------------------------------

public class ServerObjectShadow
extends Object
implements Serializable, Cloneable

------------------------------------------------------------------------

[Variable Index]

[ o ] ALARMDETAIL_SHADOW
[ o ] ALARMHEAD_SHADOW
[ o ] ATTRIBUTE_SHADOW
[ o ] description
[ o ] EC_SHADOW
[ o ] ELEMENT_SHADOW
[ o ] ELEMENTGROUP_SHADOW
[ o ] ELEMTRAPRULE_SHADOW
[ o ] ET_SHADOW
[ o ] EVENTRULE_SHADOW
[ o ] LEDSTATE_SHADOW
[ o ] name
[ o ] POLLEVENT_SHADOW
[ o ] RULE_SHADOW
[ o ] STATE_SHADOW
[ o ] TRAPEVENT_SHADOW
```

[Constructor Index]

[ o ] ServerObjectShadow(int)
[ o ] ServerObjectShadow(String, int)

[Method Index]

[ o ] clone()
[ o ] equals(Object)
[ o ] getShadowType()
Gets the type of the shadow object

[Variables]

[ o ] ET_SHADOW public final static int ET_SHADOW

[ o ] EC_SHADOW public final static int EC_SHADOW

[ o ] ATTRIBUTE_SHADOW public final static int ATTRIBUTE_SHADOW

[ o ] POLLEVENT_SHADOW public final static int POLLEVENT_SHADOW

[ o ] TRAPEVENT_SHADOW public final static int TRAPEVENT_SHADOW

[ o ] RULE_SHADOW public final static int RULE_SHADOW

[ o ] EVENTRULE_SHADOW public final static int EVENTRULE_SHADOW

[ o ] STATE_SHADOW public final static int STATE_SHADOW

[ o ] LEDSTATE_SHADOW public final static int LEDSTATE_SHADOW

[ o ] ELEMENT_SHADOW public final static int ELEMENT_SHADOW

[ o ] ELEMENTGROUP_SHADOW public final static int ELEMENTGROUP_SHADOW

[ o ] ALARMHEAD_SHADOW public final static int ALARMHEAD_SHADOW

[ o ] ALARMDETAIL_SHADOW public final static int ALARMDETAIL_SHADOW

[ o ] ELEMTRAPRULE_SHADOW public final static int ELEMTRAPRULE_SHADOW

[ o ] name public String name

[ o ] description public String description

[Constructors]

[ o ] ServerObjectShadow public ServerObjectShadow(int type)

[ o ] ServerObjectShadow public ServerObjectShadow(String name, int type)

[Methods]

[ o ] getShadowType public int getShadowType()

Gets the type of the shadow object

Returns:
the type

[ o ] clone public Object clone()

Overrides:
clone in class Object

[ o ] equals public boolean equals(Object obj)

Overrides:
equals in class Object

---

---

Class netprism.server.ServerSecurityManager

```
java.lang.Object
  |
  +----java.lang.SecurityManager
         |
         +----java.rmi.RMISecurityManager
                |
                +----netprism.server.ServerSecurityManager
```

--- public class ServerSecurityManager
extends RMISecurityManager

Class to implement NetPrism server security policy allowing user to delete a single element template file in netprism.home users templates directory

-----------------------------------------------------------------------

[Variable Index]

[ o ] homeDir
NetPrism home directory System dependent path to parent of users directory

[Constructor Index]

[ o ] ServerSecurityManager()

[Method Index]

[ o ] checkDelete(String)
Allows a file with the specified system dependent file name to be deleted.

[Variables]

[ o ] homeDir public static String homeDir

NetPrism home directory System dependent path to parent of users directory

[Constructors]

[ o ] ServerSecurityManager public ServerSecurityManager() throws NoHomeDirException

[Methods]

[ o ] checkDelete public void checkDelete(String file)

Allows a file with the specified system dependent file name to be deleted.

Parameters:
file - the system dependent file name

Throws: SecurityException
If the file is not located in netprism.home users templates directory .
Overrides:
checkDelete in class RMISecurityManager

---

---

Interface netprism.server.State public interface State
extends ServerObject

State is a RMI interface that can access StateImpl. It provides the information of a state configuration.

---

[Method Index]

[ o ] getStateSeverity()
Get state severity name
[ o ] setStateSeverity(String)
Set severity name of a state

[Methods]

[ o ] getStateSeverity public abstract String getStateSeverity() throws RemoteException Get state severity name Returns:
severity name of a state
Throws: RemoteException
rmi exception

[ o ] setStateSeverity public abstract void setStateSeverity(String severityName) throws RemoteException Set severity name of a state Parameters:
severityName - name of a severity
Throws: RemoteException
rmi exception
Throws: NameUsedException
exception for name already in use

---

---

Class netprism.server.StateImpl

```
java.lang.Object
   |
   +----java.rmi.server.RemoteObject
           |
           +----java.rmi.server.RemoteServer
                   |
                   +----java.rmi.server.UnicastRemoteObject
                           |
                           +----netprism.server.ServerObjectImpl
                                   |
                                   +----netprism.server.StateImpl
```

--- public class StateImpl
extends ServerObjectImpl
implements State

StateImpl implements the State interface. StateImpl provides the information of a state configuration.

---

[Constructor Index]

[ o ] StateImpl(StatesImpl, String, String, String)
Constructor

[Method Index]

[ o ] create(ServerObjectShadow)
Create a child object with type specified in shadow.

```
[ o ] delete(String)
    Delete a child object
[ o ] getChild(String)
    Gets the child object by giving a name
[ o ] getChildren()
    Gets the child(ren) object(s)
[ o ] getChildrenNameList()
    Gets the name list of the children objects
[ o ] getInfo()
    Gets this state object's information
[ o ] getStateSeverity()
    Get state severity name
[ o ] setInfo(ServerObjectShadow)
    Sets this state object's attributes
[ o ] setStateSeverity(String)
    Set severity name of a state

[Constructors]

[ o ] StateImpl

 public StateImpl(StatesImpl states,
            String name,
            String severity,
            String description) throws RemoteException

  Constructor

  Parameters:
      states - States which owns this State
      name - State name
      severity - severity name
      description - text description for state

[Methods]

[ o ] getStateSeverity

 public String getStateSeverity() throws RemoteException

  Get state severity name

  Returns:
      severity name of a state
  Throws: RemoteException
```

rmi exception

[ o ] setStateSeverity public void setStateSeverity(String severityName) throws RemoteException Set severity name of a state Parameters:
severityName - name of a severity
Throws: RemoteException
rmi exception
Throws: NameUsedException
exception for name already in use

[ o ] create public ServerObject create(ServerObjectShadow shadow) throws RemoteException Create a child object with type specified in shadow.

Parameters:
shadow - information needed to create a child object
Returns:
the child object created
Overrides:
create in class ServerObjectImpl

[ o ] delete public void delete(String name) throws RemoteException

Delete a child object

Parameters:
name - the name of the child object to be deleted
Overrides:
delete in class ServerObjectImpl

[ o ] getChildren public ServerObject[] getChildren() throws RemoteException

Gets the child(ren) object(s)

Returns:
the children objects collected in Enumeration
Overrides:
getChildren in class ServerObjectImpl

[ o ] getChild public ServerObject getChild(String name) throws RemoteException

Gets the child object by giving a name

Parameters:
name - the child name
Returns:
the child object
Overrides:
getChild in class ServerObjectImpl

[ o ] getChildrenNameList public String[] getChildrenNameList() throws RemoteException Gets the name list of the children objects Returns:
the name list
Overrides:
getChildrenNameList in class ServerObjectImpl

[ o ] getInfo public synchronized ServerObjectShadow getInfo() throws RemoteException Gets this state object's information Returns:
the shadow object that contains the state information
Overrides:
getInfo in class ServerObjectImpl

[ o ] setInfo public synchronized void setInfo(ServerObjectShadow shadow) throws RemoteException Sets this state object's attributes Parameters:
shadow - the shadow object that contains the state information to set
Overrides:
setInfo in class ServerObjectImpl ------------------------------------------------------------------------
------------------------------------------------------------------------

Class netprism.server.StateShadow

```
java.lang.Object
  |
  +----netprism.server.ServerObjectShadow
        |
        +----netprism.server.StateShadow
```

------------------------------------------------------------------------ public class StateShadow
extends ServerObjectShadow

StateShdow provides the information of a state configuration.

------------------------------------------------------------------------

[Variable Index]

[ o ] severity
public String severity severity name

[Constructor Index]

[ o ] StateShadow()
Constructor

[Method Index]

[ o ] equals(Object)

[Variables]

[ o ] severity public String severity public String severity severity name

[Constructors]

[ o ] StateShadow public StateShadow()

Constructor

[Methods]

[ o ] equals public boolean equals(Object obj)

Overrides:
equals in class ServerObjectShadow

---

---

Class netprism.server.StatesImpl

```
java.lang.Object
  |
  +----java.rmi.server.RemoteObject
         |
         +----java.rmi.server.RemoteServer
                |
                +----java.rmi.server.UnicastRemoteObject
                       |
                       +----netprism.server.ServerObjectImpl
                              |
                              +----netprism.server.StatesImpl
```

--- public class StatesImpl
extends ServerObjectImpl
implements ServerObject

Class to implement the ServerObject RMI interface.

------------------------------------------------------------------------

[Constructor Index]

[ o ] StatesImpl(ElementComponentImpl)
Constructor

[Method Index]

[ o ] create(ServerObjectShadow)
Create a child object with type specified in shadow.
[ o ] createLEDState(String, Color, int, String)
Create a LEDState
[ o ] createState(String, String, String)
Create a State
[ o ] getChildNameList()
Get the name list of all states or LED states
[ o ] getDescription()
Gets the object description
[ o ] getInfo()
Gets this object's information
[ o ] setDescription(String)
Sets the object description
[ o ] setInfo(ServerObjectShadow)
Sets this object's attributes
[ o ] setName(String)
Sets the object name

[Constructors]

[ o ] StatesImpl public StatesImpl(ElementComponentImpl el) throws RemoteException Constructor Parameters:
el - ElementComponetImpl object which owns this States
Throws: RemoteException
rmi exception

[Methods]

[ o ] getChildNameList

```
public String[] getChildNameList() throws RemoteException

  Get the name list of all states or LED states

  Returns:
      name list of states or LED states
```

[ o ] createState

```
public State createState(String name,
                         String severity,
                         String description) throws RemoteException

  Create a State

  Parameters:
      name - State name
      severity - severity name
      description - text description for state
  Returns:
      reference to the State object
  Throws: RemoteException,
      NameUsedException
```

[ o ] createLEDState

```
public LEDState createLEDState(String name,
                               Color color,
                               int blinking,
                               String description) throws RemoteException

  Create a LEDState

  Parameters:
      name - LEDState name
      color - the color of LEDState
      blinking - blinking interval in seconds of LEDState
      description - text description for LEDState
  Returns:
      reference to the LEDState object
  Throws: RemoteException,
      NameUsedException
```

[ o ] create public ServerObject create(ServerObjectShadow obj) throws RemoteException Create a child object with type specified in shadow.

Parameters:
shadow - information needed to create a child object
Returns:
the child object created
Overrides:
create in class ServerObjectImpl

[ o ] getInfo public synchronized ServerObjectShadow getInfo() throws RemoteException Gets this object's information Returns:
the shadow object that contains the information
Overrides:
getInfo in class ServerObjectImpl

[ o ] setInfo public synchronized void setInfo(ServerObjectShadow shadow) throws RemoteException Sets this object's attributes Parameters:
shadow - the shadow object that contains the information to set
Overrides:
setInfo in class ServerObjectImpl

[ o ] setName public void setName(String name) throws RemoteException

Sets the object name

Overrides:
setName in class ServerObjectImpl

[ o ] getDescription public String getDescription() throws RemoteException

Gets the object description

Returns:
the description
Overrides:
getDescription in class ServerObjectImpl

[ o ] setDescription public void setDescription(String description) throws RemoteException Sets the object description Parameters:
the - description to be set
Overrides:
setDescription in class ServerObjectImpl ------------------------------------------------------------------------
------------------------------------------------------------------------

Class netprism.server.TableValue

```
java.lang.Object
  |
  +----netprism.server.TableValue
```

------------------------------------------------------------------------ public class TableValue
extends Object

------------------------------------------------------------------------

[Constructor Index]

[ o ] TableValue()
[ o ] TableValue(String, byte)

[Method Index]

```
[ o ] toString()

[Constructors]

[ o ] TableValue

 public TableValue()

[ o ] TableValue

 public TableValue(String value,
          byte type)

[Methods]

[ o ] toString

 public String toString()

   Overrides:
      toString in class Object

------------------------------------------------------------------------
------------------------------------------------------------------------

Class netprism.server.TrapAttr

java.lang.Object
  |
  +----netprism.server.TrapAttr

------------------------------------------------------------------------

public class TrapAttr
extends Object
implements AttrValue

------------------------------------------------------------------------

[Constructor Index]

[ o ] TrapAttr(String, String)

[Method Index]
```

[ o ] getCurrentValue()
[ o ] getPreviousValue()

[Constructors]

[ o ] TrapAttr

```
public TrapAttr(String name,
        String value)
```

[Methods]

[ o ] getCurrentValue

```
public String getCurrentValue()
```

[ o ] getPreviousValue

```
public String getPreviousValue()
```

------------------------------------------------------------------------
------------------------------------------------------------------------

Interface netprism.server.TrapEvent public interface TrapEvent
extends ServerObject The interface of the TrapEvent

------------------------------------------------------------------------

[Method Index]

[ o ] getAttributeList()
  Get the name list of Attributes which are associated with current TrapEvent
[ o ] getGenericCode()
  Get the generic-code of TrapEvent
[ o ] getSpecificCode()
  Get the specific-code of TrapEvent
[ o ] setAttributeList(String[])
  Set the attribute list of current TrapEvent
[ o ] setGenericCode(int)

Set the generic-code of TrapEvent
[ o ] setSpecificCode(int)
Set the specific-code of TrapEvent

[Methods]

[ o ] getGenericCode public abstract int getGenericCode() throws RemoteException Get the generic-code of TrapEvent Returns:
generic-code of the TrapEvent
Throws: RemoteException
rmi exception

[ o ] getSpecificCode public abstract int getSpecificCode() throws RemoteException Get the specific-code of TrapEvent Returns:
specific-code of the TrapEvent
Throws: RemoteException
rmi exception

[ o ] getAttributeList public abstract String[] getAttributeList() throws RemoteException Get the name list of Attributes which are associated with current TrapEvent Returns:
name list of the Attributes
Throws: RemoteException
rmi exception

[ o ] setGenericCode public abstract void setGenericCode(int genCode) throws RemoteException Set the generic-code of TrapEvent

```
Parameters:
   genCode - generic-code of the TrapEvent
Throws: RemoteException
   rmi exception

[ o ] setSpecificCode

 public abstract void setSpecificCode(int specCode) throws RemoteException

  Set the specific-code of TrapEvent

  Parameters:
     specCode - specific-code of the TrapEvent
  Throws: RemoteException
     rmi exception

[ o ] setAttributeList

 public abstract void setAttributeList(String attributes[]) throws RemoteException

  Set the attribute list of current TrapEvent

  Parameters:
     attributes - String array of the attributes' name which
     associated with current TrapEvent
  Throws: RemoteException
     rmi exception

-----------------------------------------------------------------------
-----------------------------------------------------------------------

Class netprism.server.TrapEventImpl

java.lang.Object
  |
  +----java.rmi.server.RemoteObject
        |
        +----java.rmi.server.RemoteServer
              |
              +----java.rmi.server.UnicastRemoteObject
                    |
                    +----netprism.server.ServerObjectImpl
                          |
                          +----netprism.server.TrapEventImpl
```

------------------------------------------------------------------------ public class TrapEventImpl
extends ServerObjectImpl
implements TrapEvent

The implementation class of the TrapEvent

------------------------------------------------------------------------

[Constructor Index]

[ o ] TrapEventImpl(TrapEventsImpl, String, String, int, int, String[])
Constructor

[Method Index]

[ o ] create(ServerObjectShadow)
create an EventRule
[ o ] createRuleOfTrapEvent(String)
Create an EventRule for a TrapEvent of current component
[ o ] createRuleOfTrapEvent(String, String, String, int, String, boolean, boolean, boolean, boolean, boolean, int, String, String, boolean, String, String, String, String)
Create an EventRule for a TrapEvent of current component
[ o ] getAttributeList()
Get the name list of Attributes which are associated with current TrapEvent
[ o ] getGenericCode()
Get the generic-code of TrapEvent
[ o ] getInfo()
get the shadow class of a TrapEvent object
[ o ] getSpecificCode()
Get the specific-code of TrapEvent
[ o ] setAttributeList(String[])
Set the attribute list of current TrapEvent
[ o ] setGenericCode(int)
Set the generic-code of TrapEvent
[ o ] setInfo(ServerObjectShadow)
set the shadow class of a TrapEvent object
[ o ] setSpecificCode(int)
Set the specific-code of TrapEvent

[Constructors]

[ o ] TrapEventImpl

```
public TrapEventImpl(TrapEventsImpl trapEventsImpl,
            String eventName,
            String desc,
            int genCode,
            int specCode,
            String attList[]) throws RemoteException
```

Constructor

Parameters:
trapEventsImpl - A handle store the reference of the TrapEventsImpl
eventName - the name of the TrapEvent
desc - the description of the TrapEvent
genCode - the generic code
specCode - the specific code
attList - the name list of the attributes of the current TrapEvent
Throws: RemoteException
rmi exception

[Methods]

[ o ] create

```
public ServerObject create(ServerObjectShadow shadow) throws RemoteException
```

create an EventRule

Parameters:
shadow - a EventRule class. If it omly contains the name field, and the description is null, then create an EventRule with only the name, otherwise create an EventRule with all data. If the argument is null pointer, then exception is returned.
Returns:
ServerObjectImpl
Throws: RemoteException
rmi exception
Overrides:
create in class ServerObjectImpl

[ o ] createRuleOfTrapEvent public EventRule createRuleOfTrapEvent(String name) throws RemoteException Create an EventRule for a TrapEvent of current component Parameters:
name - the name of the EventRule
Returns:
EventRule
Throws: RemoteException
rmi exception

[ o ] createRuleOfTrapEvent

```
public EventRule createRuleOfTrapEvent(String name,
                                       String description,
                                       String condition,
                                       int persistence,
                                       String state,
                                       boolean changePollInterval,
                                       boolean changeState,
                                       boolean runCommand,
                                       boolean forwardTrap,
                                       boolean toAlarm,
                                       int pInterval,
                                       String toState,
                                       String cmd,
                                       boolean runScript,
                                       String host,
                                       String alarmDesc,
                                       String alarmCause,
                                       String alarmSol) throws RemoteException
```

Create an EventRule for a TrapEvent of current component

Parameters:
name - name of an EventRule of a TrapEvent
description - description of the EventRule
state - current state name
condition - the content of the condition expression
persistence - the number of consecutive occurrences for the condition expression having true value
state - the current state of the rule
changePollInterval - determine if change the Polling interval changeState - determine if change to another state
runCommand - determine if execute a command
forwardTrap - determine if forward the trap or not
toAlarm - determine if add the alarm to a log file
pInterval - the new polling time interval
toState - the another state to be change
cmd - the command to be executed
runScript - run the command in a script file
host - the host a trap to be forward to
alarmDesc - the description of the alarm
alarmCause - the cause of the alarm
alarmSol - the solution of the alarm
Returns:
EventRule
Throws: RemoteException
rmi exception

[ o ] getInfo public synchronized ServerObjectShadow getInfo() throws RemoteException get the shadow class of a TrapEvent object Returns:
a TrapEventShadow class
Throws: RemoteException
rmi exception
Overrides:
getInfo in class ServerObjectImpl

[ o ] setInfo public synchronized void setInfo(ServerObjectShadow shadow) throws RemoteException set the shadow class of a TrapEvent object Parameters:
shadow - a TrapEventShadow class
Throws: RemoteException
rmi exception
Overrides:
setInfo in class ServerObjectImpl

[ o ] getGenericCode public int getGenericCode() throws RemoteException

Get the generic-code of TrapEvent

Returns:
generic-code of the TrapEvent
Throws: RemoteException
rmi exception

[ o ] getSpecificCode public int getSpecificCode() throws RemoteException

Get the specific-code of TrapEvent

Returns:
specific-code of the TrapEvent
Throws: RemoteException
rmi exception

[ o ] getAttributeList public String[] getAttributeList() throws RemoteException Get the name list of Attributes which are associated with current TrapEvent Returns:
name list of the Attributes
Throws: RemoteException
rmi exception

[ o ] setGenericCode public void setGenericCode(int genCode) throws RemoteException Set the generic-code of TrapEvent Parameters:
genCode - generic-code of the TrapEvent
Throws: RemoteException
rmi exception

[ o ] setSpecificCode public void setSpecificCode(int specCode) throws RemoteException Set the specific-code of TrapEvent Parameters:
specCode - specific-code of the TrapEvent
Throws: RemoteException
rmi exception

[ o ] setAttributeList public void setAttributeList(String attributes[]) throws RemoteException Set the attribute list of current TrapEvent Parameters:
attributes - String array of the attributes' name which associated with current TrapEvent
Throws: RemoteException
rmi exception

---

---

Class netprism.server.TrapEventShadow

```
java.lang.Object
  |
  +----netprism.server.ServerObjectShadow
         |
         +----netprism.server.TrapEventShadow
```

--- public class TrapEventShadow
extends ServerObjectShadow

The Shadow class of the TrapEventImpl

---

[Variable Index]

[ o ] attrList the array of the attributes name list of a trap
[ o ] genericCode
the generic code of a trap
[ o ] ruleList
the array of the name of rule
[ o ] specificCode
the specific code of a trap

[Constructor Index]

[ o ] TrapEventShadow()
Constructor

[Method Index]

[ o ] clone()
[ o ] equals(Object)

[Variables]

[ o ] genericCode public int genericCode the generic code of a trap

[ o ] specificCode public int specificCode the specific code of a trap

[ o ] attrList public String attrList[]

the array of the attributes name list of a trap

[ o ] ruleList public String ruleList[]

the array of the name of rule

[Constructors]

[ o ] TrapEventShadow public TrapEventShadow()

Constructor

[Methods]

[ o ] clone public Object clone()

Overrides:
clone in class ServerObjectShadow

[ o ] equals public boolean equals(Object obj)

Overrides:
equals in class ServerObjectShadow

---

---

Class netprism.server.TrapEventsImpl

```
java.lang.Object
   |
   +----java.rmi.server.RemoteObject
           |
           +----java.rmi.server.RemoteServer
                   |
                   +----java.rmi.server.UnicastRemoteObject
                           |
                           +----netprism.server.ServerObjectImpl
                                   |
                                   +----netprism.server.TrapEventsImpl
```

--- public class TrapEventsImpl
extends ServerObjectImpl
implements ServerObject

------------------------------------------------------------------------

[Constructor Index]

[ o ] TrapEventsImpl(ElementComponentImpl)

[Method Index]

[ o ] create(ServerObjectShadow)
[ o ] getDescription()
[ o ] getInfo()
[ o ] setDescription(String)
[ o ] setInfo(ServerObjectShadow)
[ o ] setName(String)

[Constructors]

[ o ] TrapEventsImpl public TrapEventsImpl(ElementComponentImpl ecImpl) throws RemoteException

[Methods]

[ o ] create public ServerObject create(ServerObjectShadow shadow) throws RemoteException Overrides:
create in class ServerObjectImpl

[ o ] setName public void setName(String name) throws RemoteException

Overrides:
setName in class ServerObjectImpl

[ o ] setDescription public void setDescription(String description) throws RemoteException Overrides:

setDescription in class ServerObjectImpl

[ o ] getDescription public String getDescription() throws RemoteException

Overrides:
getDescription in class ServerObjectImpl

[ o ] getInfo public ServerObjectShadow getInfo() throws RemoteException

Overrides:
getInfo in class ServerObjectImpl

[ o ] setInfo public void setInfo(ServerObjectShadow shadow) throws RemoteException Overrides:
setInfo in class ServerObjectImpl ------------------------------------------------------------------------
------------------------------------------------------------------------

Class netprism.server.TrapServer

```
java.lang.Object
  |
  +----netprism.server.TrapServer
```

------------------------------------------------------------------------ public class TrapServer
extends Object
implements SnmpClient

A TrapServer class to handle all the input traps which are generated from agents

------------------------------------------------------------------------

[Constructor Index]

[ o ] TrapServer(ServerImpl, SnmpAPI, boolean)
Constructor construct a TrapServer class to handle all the input trap which is generated from agents which generates traps based on the situtation of the device

[Method Index]

[ o ] authenticate(SnmpPDU, String)
A method to be called by the Snmp session to check the authentication privilege of a received trap
[ o ] callback(SnmpSession, SnmpPDU, int)
The callback function defined in the SnmpClient class which is used to let the application program to define the operations need to be performed when a trap is received
[ o ] debugPrint(String)
A method to be called by the Snmp session to print out the debugging data

[Constructors]

[ o ] TrapServer

```
public TrapServer(ServerImpl serverImpl,
            SnmpAPI snmpApi,
            boolean debug)
```

Constructor construct a TrapServer class to handle all the input trap which is generated from agents which generates traps based on the situtation of the device Parameters:
serverImpl - A handle stores the reference of the ServerImpl class
snmpApi - A handle of the SnmpAPI which is instantiated in the ServerImpl class
debug - a flag to set the debug mode of the SnmpApi

[Methods]

[ o ] callback

```
public boolean callback(SnmpSession session,
            SnmpPDU pdu,
            int reqid)
```

The callback function defined in the SnmpClient class which is used to let the application program to define the operations need to be performed when a trap is received Parameters:
session - a handle of the SnmpSession which is open by this class
pdu - a handle of the SnmpPDU class which contains all the data of the received trap
reqid - a request ID of the received packet

[ o ] debugPrint public void debugPrint(String s)

A method to be called by the Snmp session to print out the debugging data

Parameters:
s - the debugging information

[ o ] authenticate

```
public boolean authenticate(SnmpPDU pdu,
                    String community)
```

A method to be called by the Snmp session to check the authentication privilege of a received trap Parameters:
pdu - a handle of the SnmpPDU class which contains all the data of the received trap
community - a string contains the password to pass the authentication check
Returns:
a boolean value indicates if the authentication check is pass

---------------------------------------------------------------------------

APPENDIX B LOCALIZATION

Approach

The localization resources are separated in to several files, each containing the resource information, such as strings(errors, warnings & other GUI labels), color, font, menu etc., associated with screen components. In JAVA parlance these files are called *Resource Bundles*. Based on simplicity and ease of maintenance considerations, there is one-to-one mapping between *ScreenParts-d*erived components and *Resource Bundle* files. *ScreenParts* is a building block for the Panels(form-like components) in the client.

ResourceBundle Names

Bundle class names are composed of the Base JAVA class name suffixed with "Bundle", the language code and an optional country code, in that order. So, Resource Bundle name = ScreenParts + "Bundle" + Locale . JAVA Ex: The resource bundle for the default locale(US) of Alarm Filter Panel, whose implementation is in *AlarmFilter.JAVA,* will be in *AlarmFilterBundle.JAVA*; The Japanese counterpart for the same will be *AlarmFilterBundle_ja.JAVA*.

Contents of a Resource Bundle

Each file will have a concrete class subclassed from *ListResourceBundle*. This class will contain the resource information in the form of <key, value> tuples in an array and overridden methods to operate on this data as required by the resource type.

Key -- Any string identifier for the resource

Value -- Can include any of the following types:

- String
- Dimension
- Integer
- Color
- Font
- Menu

Obtaining the locale

The locale information is obtained by using the *getLocale* method of the applet class. Locale information is available as part of system configuration and the locale is not explicitly set as part of the Client initializations; the locale object obtained with class *getLocale* is used for fetching the correct resource bundle(s).

In the client, a reference applet object is obtained by:

- using method `getApplet` of class *Screen.*
- using method `getAppletRef` of class *NetPrismControl.*

Extracting the Resources

Create an object of type *ResourceBundle* by giving the fully qualified ResourceBundle package name and current locale as arguments. Based on the locale specified, the ResourceBundle object uses the appropriate Bundle, if one is available. If the Bundle for the specified locale is not available, the default bundle is used. In fact, the localized bundle names must have the correct suffixes for the search to succeed.

Use the get methods of class *ResourceBundle* to extract any resource from the Resource Bundles. These methods take the key as an argument. The following table gives the Object type and the get methods for frequently used resources:

| Resource Type | "get" Method Name | Remarks |
|---|---|---|
| **String** | getString | |
| **Font** | getObject | casting may be needed on the return value |
| **Dimension** | getObject | .... ditto ... |
| **Color** | getObject | .... ditto ... |

Sample Resource Bundle

```
public class RuleScreenBundle extends ListResourceBundle
{
 public Object[][] getContents()
  {
   return contents;
  }
 static final Object[][] contents =
  {
   // Key        Value
```

```
{ "Description", "Description" },
{ "Condition", "Condition" },
{ "Action", "Action" },
{ "Alarm Log", "Alarm Log" },
{ "errDlgTitle", "Error building rules" },
{ "errRetrieveValues", "Error retrieving values from the parent
component." },
{ "errDlgDuplicateRule", "Duplicate Rule Name" },
{ "msgRuleInUse", "The name \"{0}\" is already being used, Please
change it."},
/* {0} - rulename, a string */
{ "RuleDesc", " {0} Rule Description for {1}" },
/* {0} - RueType, a string
  {1} - EventName, a string */
{ "RuleCond", " {0} Rule Condition for {1} of {2}" },
/* {0} - RueType, a string
  {1} - RuleName, a string
  {2} - EventName, a string */
{ "RuleAction", " {0} Rule Action for {1} of {2}" },
/* {0} - RueType, a string
  {1} - RuleName, a string
  {2} - EventName, a string */

{ "RuleAlarm", " {0} Rule Alarm Log Information for {1} of {2}" },
/* {0} - RueType, a string
  {1} - RuleName, a string
  {2} - EventName, a string */

{ "Trap", "Trap" },
{ "Poll", "Poll" },
{ "msgInvalidIP", "{0} is not a valid host name" },
/* {0} - host name or IP address, a string */
{ "msgInvalidIP-p2", "{0} Please check the spelling and make sure that
the host is reachable." }
};
}
```

Formatted Text

This could be a combination of strings, numbers, time etc. Typically, this is a case where a portion of the message is dynamic and available only at runtime. The help ordering the message in a locale-specific way, we use formatting classes & pattern strings corresponding to the complete message. The dynamic parameters numbered 0, 1, 2 etc., enclosed in {}. During localization, these parameters need to be kept intact, except for possible shifting of positions (please see the sample bundle above).

As an example, consider a <*key, value*> combination:

```
/* key */              /* value */
{ "RuleCond",        " {0} Rule Condition for {1} of {2}" }.
```

The "value" portion of the key "RuleCond" has three parameters which are variable. When the parameters get substituted at runtime this might be something like:

"Poll Rule Condition for "Low Alarm" of "Variable_X" ", *OR*

"Trap Rule Condition for "High Alarm" of "Variable_Y".

The localization of these patterns needs to be done, keeping the final form in mind.

List of Resource Bundles

The following is the list of Resource Bundles for NetPrism Client:

AboutBundle.JAVA
AlarmDetailScreenBundle.JAVA
AlarmDetailTextBundle.JAVA
AlarmFilterBundle.JAVA
AlarmHistoryBundle.JAVA
AlarmHistoryScreenBundle.JAVA
AttributeButtonsBundle.JAVA
AttributeScreenBundle.JAVA
AttributesDefBundle.JAVA
AttributeTableBundle.JAVA
AttributeValueBundle.JAVA
BlurbPanelBundle.JAVA
DiscoveryButtonsBundle.JAVA
DiscoveryPanelBundle.JAVA
DiscoveryScreenBundle.JAVA ECConfigScreenBundle.JAVA
ECListBundle.JAVA
ETListBundle.JAVA
ETListScreenBundle.JAVA
EventConfigBundle.JAVA
ExportEMBundle.JAVA
ExportEMScreenBundle.JAVA
GlobalToolBarBundle.JAVA
GroupDefBundle.JAVA
GroupElemConfigBundle.JAVA
GroupElemListBundle.JAVA
GroupElemScreenBundle.JAVA
GroupListBundle.JAVA
GroupScreenBundle.JAVA
HotspotOperationBundle.JAVA
HotspotPropsBundle.JAVA
HotspotToolbarBundle.JAVA
ImportButtonsBundle.JAVA
ImportEMBundle.JAVA
ImportEMListBundle.JAVA
ImportEMScreenBundle.JAVA
ImportListButtonsBundle.JAVA
LEDStateDefBundle.JAVA
ListButtonsBundle.JAVA
LoginBundle.JAVA
LoginScreenBundle.JAVA
MenuItemBundle.JAVA
MenuItemLabelsBundle.JAVA
MibAttributeBundle.JAVA
MibBrowserBundle.JAVA
MibBrowserPanelBundle.JAVA
MibBrowserScreenBundle.JAVA
MibFrameBundle.JAVA
NavigationBundle.JAVA
NewETBundle.JAVA
NpGraphCanvasBundle.JAVA NpMessageDialogBundle.JAVA
NpYesNoDialogBundle.JAVA
PanelPropertiesBundle.JAVA
PanelSwitchBundle.JAVA
PollEventBundle.JAVA
PollEventListBundle.JAVA
PollEventListScreenBundle.JAVA
PollEventScreenBundle.JAVA
PollEventScreenWZBundle.JAVA
PollEventSuperScreenBundle.JAVA
PollReqStatesBundle.JAVA
RuleActionBundle.JAVA
RuleAlarmLogBundle.JAVA
RuleConditionBundle.JAVA
RuleDescriptionBundle.JAVA
RuleListBundle.JAVA
RuleListScreenBundle.JAVA
RuleScreenBundle.JAVA
RuleScreenWZBundle.JAVA
ScreenBundle.JAVA
SelMIBFilesBundle.JAVA
SeverityBundle.JAVA
SeveritySetupBundle.JAVA
StandardButtonsBundle.JAVA
StateDefBundle.JAVA
StateDefListBundle.JAVA
SubNodeListBundle.JAVA
TargetBCBundle.JAVA
TargetContainerBundle.JAVA
TargetECBundle.JAVA
TargetElementBundle.JAVA
TargetETBundle.JAVA
TargetGCBundle.JAVA
TargetHotspotBundle.JAVA
TemplateScreenBundle.JAVA
ToolBarBundle.JAVA ToolPanelBundle.JAVA
TrapEventBundle.JAVA
TrapEventListBundle.JAVA
TrapRuleListBundle.JAVA
TrapScreenBundle.JAVA
VendorInfoBundle.JAVA
WelcomeBundle.JAVA

APPENDIX C NETPRISM ENTERPRISE SPECIFIC TRAPS

The following file is used as a format to forward server 314 events to other generic network management applications. Enterprise specific trap format is used to forward server 314 events.

```
-- Title:     NetPrism MIB
-- Date:      Sep 10, 1997
-- Version:   1.0

-- ©1997 FUJITSU SOFTWARE CORPORATION, All Rights Reserved.
-- This file is a ASN.1 file. This file name is "NetPrism.mib".
-- This file offered by FUJITSU SOFTWARE CORPORATION.

        NETPRISM-MIB-V01
        DEFINITIONS ::= BEGIN
        IMPORTS

            application, aplNetMpNP
              FROM FUJITSU-EXTENDED-NETWORK-
APL-MIB-V15
            OBJECT-TYPE
              FROM RFC-1212
            DisplayString
              FROM RFC-1213
            TRAP-TYPE
              FROM RFC-1215;
    -- NetPrism specific parameters

    mpNP            OBJECT IDENTIFIER ::= { application 32 }
npAlarmAck    OBJECT IDENTIFIER ::= { mpNP 1 }
    npSnmpSet       OBJECT IDENTIFIER ::= { mpNP 2 }
-- the alarm acknowledgement group
    npAlarmDate OBJECT-TYPE
```

```
        SYNTAX  DisplayString (SIZE (0..255))
        ACCESS  read-only
        STATUS  mandatory
        DESCRIPTION
                "This display string describes the time that
                an alarm has been generated"
        ::= { npAlarmAck 1 }

npStateName OBJECT-TYPE
        SYNTAX  DisplayString (SIZE (0..255))
        ACCESS  read-only
        STATUS  mandatory
        DESCRIPTION
                "This display string represents the name of
                the state when the alarm is generated."
        ::= { npAlarmAck 2 }

npSeverityName OBJECT-TYPE
        SYNTAX  DisplayString (SIZE (0..255))
        ACCESS  read-only
        STATUS  mandatory
        DESCRIPTION
                "This display string represents the name of
                the severity which associates with the state."
        ::= { npAlarmAck 3 }

npAcknowledger OBJECT-TYPE
        SYNTAX  DisplayString (SIZE (0..255))
        ACCESS  read-only
        STATUS  mandatory
        DESCRIPTION
                "This display string represents the name of
                the person who acknowledges the alarm."
        ::= { npAlarmAck 4 }

-- the SNMP set operation group
```

```
npMibOid OBJECT-TYPE
        SYNTAX  DisplayString (SIZE (0..255))
        ACCESS  read-only
        STATUS  mandatory
        DESCRIPTION
                "This display string represents the name of
                the MIB variable that is to be set."
        ::= { npSnmpSet 1 }

npOriginalMibValue OBJECT-TYPE
        SYNTAX  DisplayString (SIZE (0..255))
        ACCESS  read-only
        STATUS  mandatory
        DESCRIPTION
                "This display string represents the value of
                the MIB variable before SNMP set is done."
        ::= { npSnmpSet 2 }

npNewMibValue OBJECT-TYPE
        SYNTAX  DisplayString (SIZE (0..255))
        ACCESS  read-only
        STATUS  mandatory
        DESCRIPTION
                "This display string represents the value of
                the MIB variable that is attemped to set."
        ::= { npSnmpSet 3 }

-- the state change group
npOriginalState OBJECT-TYPE
        SYNTAX  DisplayString (SIZE (0..255))
        ACCESS  read-only
        STATUS  mandatory
        DESCRIPTION
                "This display string represents the name of
                the state before it is changed."
        ::= { npSnmpSet 1 }
```

```
npNewState OBJECT-TYPE
        SYNTAX  DisplayString (SIZE (0..255))
        ACCESS  read-only
        STATUS  mandatory
        DESCRIPTION
                "This display string represents the name of
                the state after it is changed."
        ::= { npSnmpSet 2 }

-- NetPrism events specific parameters

npDevice OBJECT-TYPE
        SYNTAX  DisplayString (SIZE (0..255))
        ACCESS  read-only
        STATUS  mandatory
        DESCRIPTION
                "This display string represents the device name
                or IP address.  A device is usually associated
                with an Element Manager which can be managed
                through SNMP protocol.  It can be a network device
                or an application e.g.RMON agent, Database server."
        ::= { mpNP 4 }

npComponent OBJECT-TYPE
        SYNTAX  DisplayString (SIZE (0..255))
        ACCESS  read-only
        STATUS  mandatory
        DESCRIPTION
                "This display string represents the component
                name in an ElementManager."
        ::= { mpNP 5 }

npElementManager OBJECT-TYPE
        SYNTAX  DisplayString (SIZE (0..255))
        ACCESS  read-only
```

```
        STATUS  mandatory
        DESCRIPTION
                "This display string represents the name of
                the Element Manager. An Element Manager is
                a platform-independent format which defines
                the visual presentation of a device or an
                element and its monitoring configuration."
        ::= { mpNP 6 }

npRuleExpression OBJECT-TYPE
        SYNTAX  DisplayString (SIZE (0..255))
        ACCESS  read-only
        STATUS  mandatory
        DESCRIPTION
                "This display string describes the conditon of
                an event processing specification"
        ::= { mpNP 7 }

npCommandExe OBJECT-TYPE
        SYNTAX  DisplayString (SIZE (0..255))
        ACCESS  read-only
        STATUS  mandatory
        DESCRIPTION
                "The command to be executed after a rule conditon
                is satisfied."
        ::= { mpNP 8 }

npStartUpFlag OBJECT-TYPE
        SYNTAX  DisplayString (SIZE (0..255))
        ACCESS  read-only
        STATUS  mandatory
        DESCRIPTION
        "This display string represents if the device is
```

```
                        from NetPrism 'Start Up File'.  The value of TRUE
                        means the device is from the file, and FALSE means
                        the device is not from the file."
                ::= { mpNP 9 }


        npMibVarCount OBJECT-TYPE
                SYNTAX  DisplayString (SIZE (0..255))
                ACCESS  read-only
                STATUS  mandatory
                DESCRIPTION
                        "This display string represents the number
                        of MIB variables specified in a rule expression."
                ::= { mpNP 10 }
-- MIB variables specified in the rule expression
        npMibVarPairs OBJECT-TYPE
                SYNTAX  SEQUENCE OF NpMibVarEntry
                ACCESS  not-accessible
                STATUS  mandatory
                DESCRIPTION
                        "A table consisting of the list of MIB name and
                        value pairs that are specified in the rule
                        expression."
                ::= { mpNP 11 }
        npMibVarEntry OBJECT-TYPE
                SYNTAX  NpMibVarEntry
                ACCESS  not-accessible
                STATUS  mandatory
                DESCRIPTION
                        "An entry contains a pair of MIB name and value."
                ::= { npMibVarPairs 1 }
        NpMibVarEntry ::= SEQUENCE {
                npMibVarName
                        DisplayString (SIZE (0..255)),
                npMibVarValue
                        DisplayString (SIZE (0..255))
```

```
        }
    npMibVarName OBJECT-TYPE
        SYNTAX DisplayString (SIZE (0..255))
        ACCESS read-only
        STATUS mandatory
        DESCRIPTION
            "The MIB variable name that is specified in
            the rule expression. The instance number associates

            with it will be from 0 to npMibVarCount-1."
        ::= { npMibVarEntry 1 }

    npMibVarValue OBJECT-TYPE
        SYNTAX DisplayString (SIZE (0..255))
        ACCESS read-only
        STATUS mandatory
        DESCRIPTION
            "The value of the corresponding MIB variable.
            The instance number associates with it will be
            from 0 to npMibVarCount-1."
        ::= { npMibVarEntry 2 }
-- Traps for use by Fujitsu products
-- Traps are defined using the conventions in RFC1215.
-- alarm acknowledgement trap
    npAckAlarmEvent TRAP-TYPE
        ENTERPRISE aplNetMpNP
        VARIABLES {
            npDevice,
            npComponent,
            npElementManager,
            npAcknowledger,
            npAlarmDate,
            npStateName,
            npSeverityName }
        DESCRIPTION
        "The trap is generated when the alarm is acknowledged
```

```
                by the users. It contains the informaion of an alarm header
                in NetPrism."
                ::= 1
-- SNMP set trap
        npSnmpSetEvent TRAP-TYPE
                ENTERPRISE aplNetMpNP
                VARIABLES {
                        npDevice,
                        npComponent,
                        npMibOid,
                        npOriginalMibValue,
                        npNewMibValue }
                DESCRIPTION
                "The trap is generated after a SNMP set is attemped."
                ::= 2
-- state change trap
        npStateChangeEvent TRAP-TYPE
                ENTERPRISE aplNetMpNP
                VARIABLES {
                        npDevice,
                        npComponent,
                        npRuleExpression,
                        npOriginalState,
                        npNewState,
                        npMibVarCount,
                        npMibVarName,
                        npMibVarValue }
                DESCRIPTION
                "The trap is generated when the state is changed
                to something different from the previous state
                after the rule condition is satisfied."
                ::= 3
-- execute command trap
        npExeCommandEvent TRAP-TYPE
                ENTERPRISE aplNetMpNP
                VARIABLES {
```

```
                npDevice,
                npComponent,
                npRuleExpression,
                npCommandExe,
                npMibVarCount,
                npMibVarName,
                npMibVarName }
            DESCRIPTION
            "The trap is generated when the command defined
            by the users is executed after the rule condition
            is satisfied."
            ::= 4
-- both state change and execute command trap
        npStateChgAndCommandExeEvent TRAP-TYPE
            ENTERPRISE aplNetMpNP
            VARIABLES {
                npDevice,
                npComponent,
                npRuleExpression,
                npCommandExe,
                npOriginalState,
                npNewState,
                npMibVarCount,
                npMibVarName,
                npMibVarName }
            DESCRIPTION
            "The trap is generated when both the state is changed
            to something different from the previous state and
            the command which is defined by the users is executed
            after the rule condition is satisfied."
            ::= 5
-- associate device and EM trap
        npAssocDevEMEvent TRAP-TYPE
            ENTERPRISE aplNetMpNP
            VARIABLES {
                npDevice,
```

```
        npElementManager,
        npStartUpFlag }
    DESCRIPTION
    "The trap is generated when a device is
    associated with an Element Manager."
    ::= 6

-- remove device trap
  npRemDeviceEvent TRAP-TYPE
    ENTERPRISE aplNetMpNP
    VARIABLES {
        npDevice,
        npElementManager,
        npStartUpFlag }
    DESCRIPTION
    "The trap is generated when a device is
    removed."
    ::= 7
    END
```

Appendix D A RUN-TIME DIRECTORY STRUCTURE

- The run-time directory is automatically created when server 314 is installed. The default directory is c:\Fujitsu\NetPrism. Subdirectories under the install directory store groups of related files.
- NetPrism root-directory contains the following:
  - NetPrism.html, the document which references the NetPrism client applet
  - DelsL1.isu, the InstallShield uninstall data file
  - NWService.out, the logfile from startup of the "Netprism Server" Service
  - Readme.txt
  - Release_Notes.txt
  - Installation_Guide.pdf
  - User'sGuide.pdf
- NetPrism\bin directory contains the following:
  - Pinghost.exe
  - Pingnetwork.exe
  - Client.bat starts the client applet
  - ExportEM.bat for packaging EMs and elements
  - ImportEM.bat for unpackaging EMs and elements
  - Npset.bat for to initializing environment settings such as CLASSPATH.
- NetPrism\help contains help related files
- NetPrism\lib directory contains the following:
  - netprism.properties
  - netprismclient.properties
  - startup
  - sysObjID_EMName_Map.txt
- The NetPrism\lib\classes directory contains Ml31Key.class, the Microline Toolkit key file, and subdirectories (adventnet, chart, gjt, mlsoft, netprism, Snmp, and wyattriver) which hold JAVA class files used by both the NetPrism server and NetPrism client.
- The NetPrism\lib\classes\client\i18n directory contains all locale-related class files.
- The NetPrism\lib\images directory contains .gif files used in the NetPrism toolbar, navigation tree, and element view areas.
- The NetPrism\solaris directory contains non-JAVA files used by the NetPrism server running in Solaris environment.

- The NetPrism\win32 directory contains subdirectories of non-JAVA files used by the NetPrism server running in WINDOWS NT environment.
- The NetPrism\win32\License directory contains lservlog, the license server log file; lservrc, the license key file; and lservnt.exe, the license server executable.
- The NetPrism\users directory contains subdirectories that hold log files and various types of data files used by element managers.
- The NetPrism\users\archives directory is the default directory for element managers that are exported (archived).
- The NetPrism\users\elements directory contains managed element files.
- The NetPrism\users\groups directory contains managed group files.
- The NetPrism\users\images directory contains background image files of element managers.
- The NetPrism\users\images\logos directory, which is created automatically when it is needed, contains corporate logo image files for EM vendors.
- The NetPrism\users\imported directory contains EMs that are imported by users. Each subdirectory with a directory name <EM_name>_<customer_id> contains the EM template, image file(s), mib file(s), vendor logo file(s), etc..
- The NetPrism\users\log directory is the default directory for the alarm and NetPrism server log files.
- The NetPrism\users\poll directory is the default directory for polling log files.
- The NetPrism\users\mib directory contains MIB files referenced by element managers.

The NetPrism\users\templates directory contains element managers that are recognized by the NetPrism server.

We claim:

1. A computer network management server comprising:

a manager for performing computer network management tasks associated with a plurality of computer network elements; and a visual element manager builder for generating an element manager object wherein said visual element manager builder communicates with a client process that includes a graphic user interface for soliciting information regarding the computer network element corresponding to said element manager object and regarding event management of said computer network element, said user interface being downloaded from said visual element manager builder for execution on a client computer.

2. A computer network management server as in claim 1 further comprising:

a plurality of element manager objects coupled to said manager wherein each of said plurality of element manager objects is associated with one of said computer network elements managed by said manager, said manager using said information to manage said associated computer network elements.

3. A computer network management server as in claim 2 wherein at least one element manager object in said plurality of element manager objects further comprises:

an active component hotspot representing an active component of said computer network element associated with said at least one element manager object.

4. A computer network management server as in claim 3 wherein at least one element manager object in said plurality of element manager objects further comprises a state of said active component hotspot.

5. A computer network management server as in claim 2 wherein at least one element manager object in said plurality of element manager objects further comprises:

an action button hotspot representing a switch of said computer network element associated with said at least one element manager object.

6. A computer network management server as in claim 3 wherein at least one element manager object in said plurality of element manager objects further comprises a polling event associated with said active component hotspot.

7. A computer network management server as in claim 6 wherein at least one element manager object in said plurality of element manager objects further comprises a rule associated with said polling event, and having a condition and an action wherein upon said manager determining that said condition of said rule is true, said manager causes said managed computer network element to perform said action of said rule.

8. A computer network management server as in claim 2 wherein at least one element manager object in said plurality of element manager objects further comprises:

an embedded graph hotspot representing a component of said computer network element associated with said at least one element manager object.

9. A computer network management server as in claim 3 wherein at least one element manager object in said plurality of element manager objects further comprises a trap event associated with said active component hotspot.

10. A computer network management server as in claim 9 wherein at least one element manager object in said plurality of element manager objects further comprises a rule associated with said trap event, and having a condition and an action wherein upon said manager determining that said condition of said rule is true, said manager causes said managed computer network element to perform said action of said rule.

11. A computer network management server as in claim 1 further comprising:

a discovery engine, wherein upon activation of said discovery engine, said discovery engine finds each computer network element on a computer network that is capable of being managed by said computer network management server.

12. A computer network management server as in claim 1 further comprising:

a trap server coupled to a computer network wherein said trap server receives traps generated by computer network elements connected to said network and determines whether a trap event is from a computer network element managed by said computer network management server.

13. A computer network management server as in claim 12 further comprising:

an event engine coupled to said trap server wherein upon notification of a trap event from said trap server, said event engine determines a management action for the computer network element that generated the trap event.

14. A computer network management server as in claim 1 further comprising:

a poll server coupled to a computer network wherein said poll server periodically sends poll requests to a computer network element connected to said network.

15. A computer network management server as in claim 14 further comprising:

an event engine coupled to said poll server wherein upon notification of a response to a poll event from said poll server, said event engine determines a management action for the computer network element that was polled.

16. A computer network management server as in claim 1 further comprising an alarm factory wherein said alarm factory maintains an alarm log.

* * * * *